United States Patent [19]

Tajima et al.

[11] Patent Number: 5,915,316

[45] Date of Patent: Jun. 29, 1999

[54] EMBROIDERING AND LASER PROCESSING MACHINE

[75] Inventors: Ikuo Tajima; Takashi Ito; Takashi Shibata, all of Kasugai, Japan

[73] Assignee: Tokai Kogyo Mishin Kabushiki Kaisha, Kasugai, Japan

[21] Appl. No.: 08/702,560

[22] PCT Filed: Jan. 11, 1996

[86] PCT No.: PCT/JP96/00047

§ 371 Date: Sep. 11, 1996

§ 102(e) Date: Sep. 11, 1996

[87] PCT Pub. No.: WO96/21534

PCT Pub. Date: Jul. 18, 1994

[30] Foreign Application Priority Data

| Jan. 13, 1995 | [JP] | Japan | 7-004401 |
| Jan. 23, 1995 | [JP] | Japan | 7-008232 |
| Jan. 26, 1995 | [JP] | Japan | 7-010786 |
| Feb. 28, 1995 | [JP] | Japan | 7-040405 |
| Jun. 23, 1995 | [JP] | Japan | 7-157813 |
| Jul. 10, 1995 | [JP] | Japan | 7-173684 |
| Aug. 31, 1995 | [JP] | Japan | 7-223637 |
| Nov. 9, 1995 | [JP] | Japan | 7-291221 |

[51] Int. Cl.⁶ ............... D05B 21/00; B23K 26/08

[52] U.S. Cl. .............. 112/470.05; 112/470.06; 112/155; 219/121.67; 219/121.82

[58] Field of Search ............ 112/470.05, 470.01, 112/470.06, 102.5, 155, 2; 219/121.67, 121.69, 121.82, 121.83; 364/470.05, 474.08

[56] References Cited

U.S. PATENT DOCUMENTS

| 4,752,668 | 6/1988 | Rosenfield | 219/121.82 |
| 5,262,612 | 11/1993 | Momany et al. | 219/121.67 |
| 5,293,024 | 3/1994 | Sugahara et al. | 219/121.67 |
| 5,449,881 | 9/1995 | Nakata et al. | 219/121.67 |
| 5,537,939 | 7/1996 | Horton | 112/102.5 X |
| 5,555,827 | 9/1996 | Tanabe | 112/470.05 X |
| 5,607,606 | 3/1997 | Mori et al. | 219/121.67 |

*Primary Examiner*—Peter Nerbun
*Attorney, Agent, or Firm*—Dennison, Meserole, Pollack & Scheiner

[57] ABSTRACT

An embroidering and laser processing machine including at least one sewing head, one laser head and one laser generator, a work holder mounted on a machine table capable of movement in an X-axis and Y-axis direction according to predetermined movement data, the laser generator being on-off controlled according to laser cut codes which are included in the predetermined movement data.

48 Claims, 97 Drawing Sheets

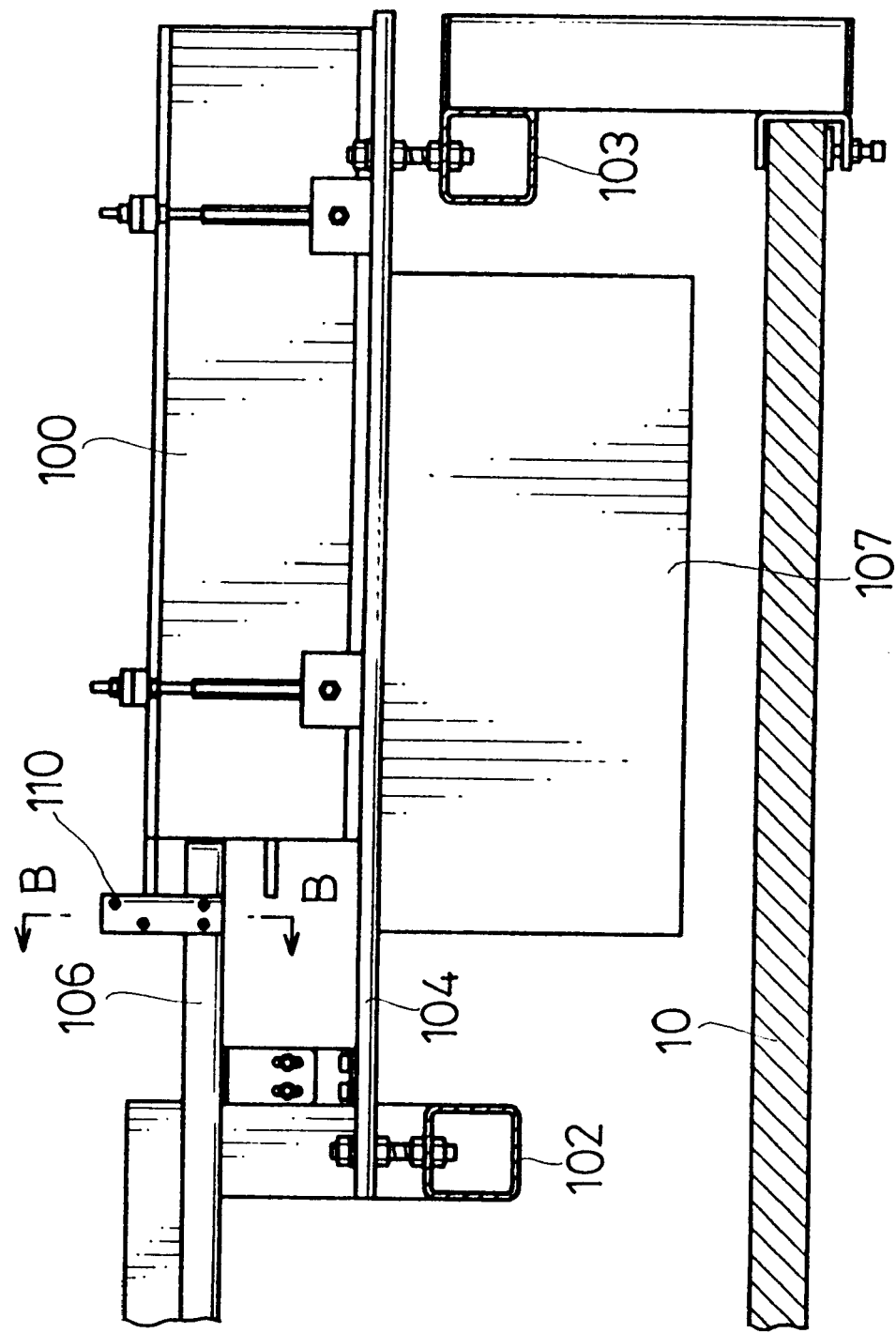

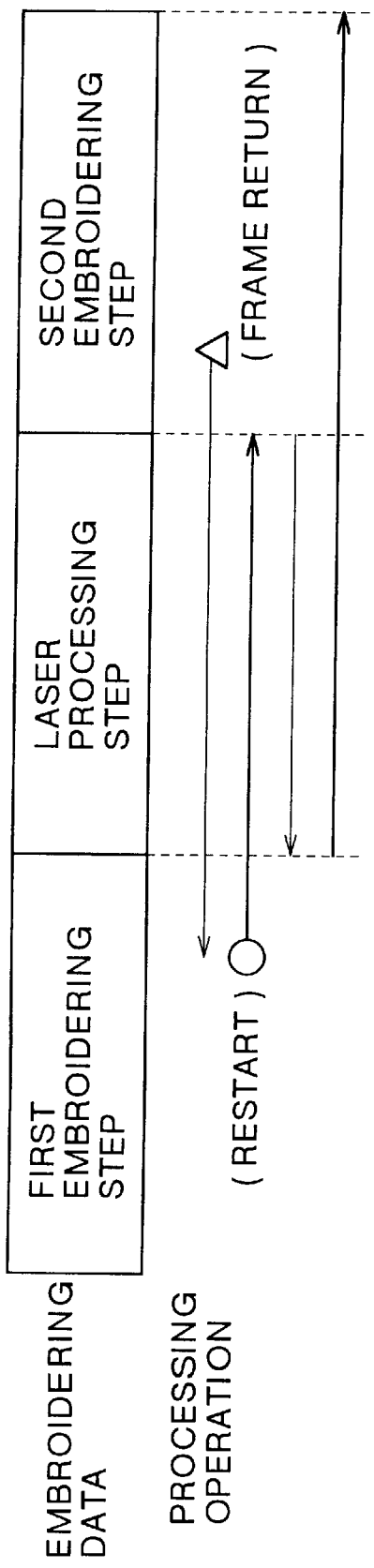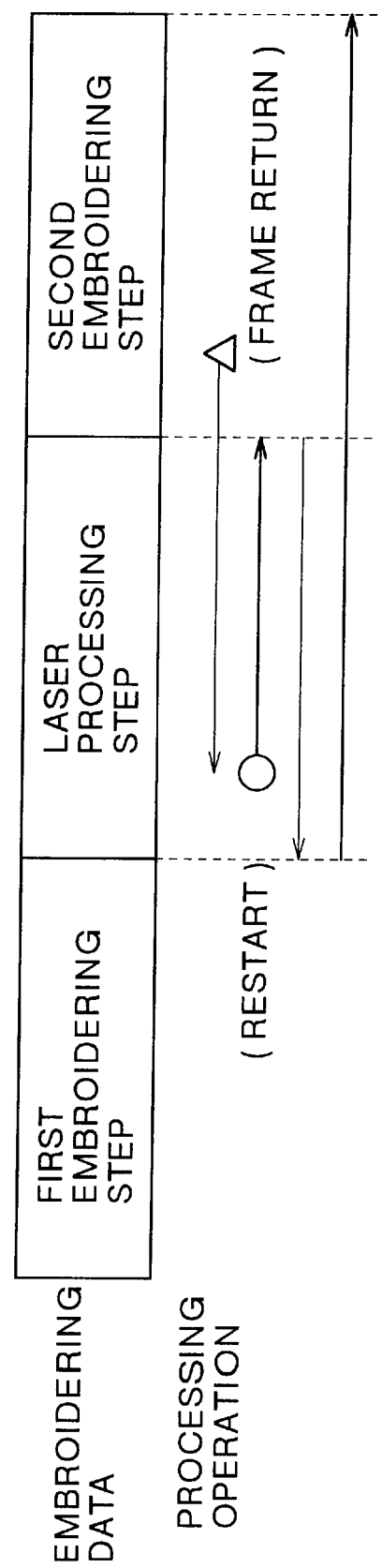

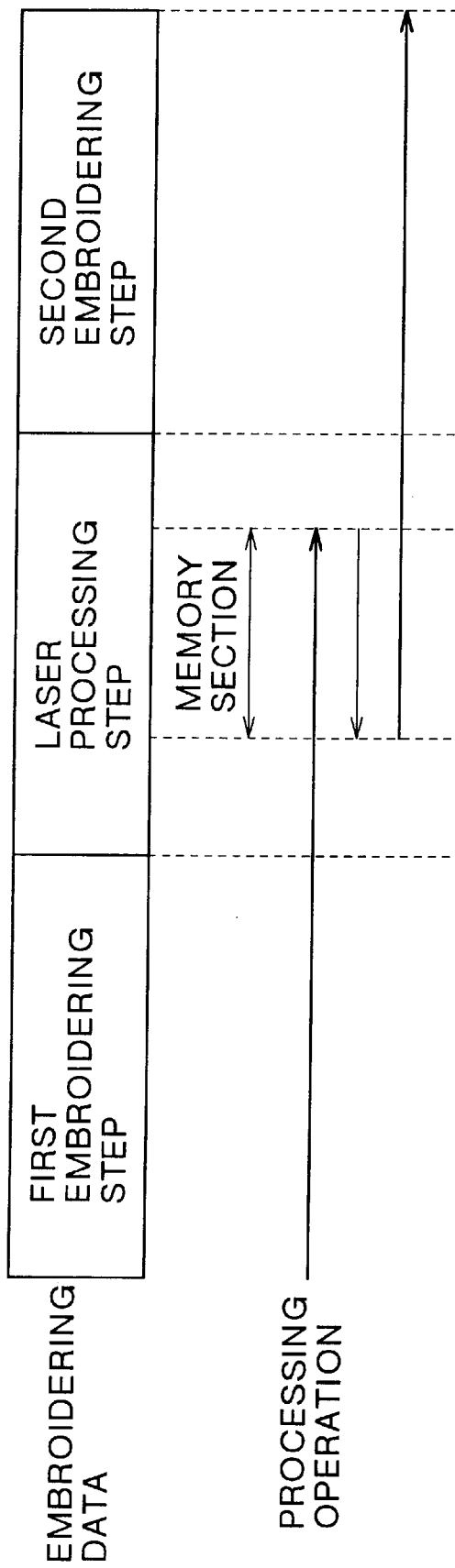

EMBROIDERING AND LASER PROCESSING MACHINE

BACKGROUND OF THE INVENTION

This invention relates to laser processing machines and also to sewing machines with a laser processing function for performing processing such as cutting and engraving on a work by irradiating a work with a laser beam.

Japanese Patent Publication No. 6-33550 shows an embroidering machine with a plurality of sewing heads and laser heads each mounted on each sewing head. The embroidering machine further comprises an embroidering frame which can hold a cloth (or work). The embroidering frame is controlled for movement in X- and Y-axis directions according to drive data, while each laser head irradiates a laser beam to cut the cloth.

The above prior art embroidering machine has the following disadvantages.

(1) It is necessary to produce the drive data separately from a data for embroidering. The production of the drive data requires considerable man-hours.

(2) It is necessary to secure a certain distance between each laser head and the cloth (or work) to facilitate such operations as replacement of cloth for the embroidering frame. This means that no means for protecting the operator from a laser beam is provided between the laser head and the cloth.

(3) Each laser head requires an independent laser generator. The laser generator is relatively expensive, and an increase of the number of laser heads inevitably increases the cost.

(4) The laser head is mounted on the sewing head, and the laser beam is irradiated in the close vicinity of the sewing head. This means that a throat plate covering a shuttle receives the laser beam at a position below the sewing head. This may result in scorching of a lower thread wound on a bobbin in the shuttle by the heat of the laser beam or in adverse effects on the throat plate or the shuttle by the heat of the laser beam.

(5) When it is detected at the end of, or, during a cutting operation by a plurality of laser heads that an imperfect cut is produced by any of the laser heads, the cutting operation by that laser head has to be performed afresh. In such a case, it is necessary to return the work frame (or embroidering frame) by the frame return control to a point from which the cutting is to be performed afresh, and make cutting afresh from that point to the point from which the work frame has been returned.

In this case, however, with a laser head which has made a proper cutting, the laser beam is overlappingly irradiated onto the cut portions between the cutting restart point and the work frame return point. In this case, no problem arises so long as the cloth is perfectly cut by the laser beam. However, when only the upper one of two overlapped cloths is to be cut, the repeated cutting may result in the cutting or scorching of the lower cloth which should not be cut.

(6) In the conventional embroidering machine, power that is outputted from a plurality of laser tubes of a laser generator is made constant through feedback control according to a drive signal provided from a laser controller. However, the system for realizing the feedback control is expensive, thus inevitably leading to a cost increase of the embroidering machine.

(7) When the work to be cut has a large thickness, or, in dependence on the material of the work or like conditions, it is necessary to increase the laser beam output. With an increased output of the laser beam, however, a cut (particularly edges) of work may excessively be burnt, thus resulting in an unclean finish. Besides, while it is necessary to set an increased laser beam output to cut a work having a large thickness as noted above, the output (or capacity) of the laser generator is limited.

(8) For leading a laser beam from a laser generator to a laser head, a cylindrical guide is used to ensure safety. For redirecting a laser beam, a mirror is used. The redirection of the laser beam requires accuracy. This means that the mounting angle of the mirror has to be finely adjusted. This operation is very difficult and time-consuming.

(9) Depending on laser processing, it is necessary to frequently adjust the focal point of the lenses. For example, this is required when laser processing two overlapped works to cut the upper work first and then cut the lower work, or when varying the width of scorching by the laser beam for providing a scorch pattern (or mark) on the surface of leather or like work.

Heretofore, in such cases, the focal point of a lens has to be adjusted whenever it is necessary to do so by manually vertically moving a cylindrical member after loosening bolts. This operation is very time-consuming.

OBJECTS OF THE INVENTION

The invention was made in order to solve the above problems, and it has an object of providing a laser processing machine and an embroidering machine with a laser processing function, which reliably performs laser processing such as cutting and engraving while permitting reduction in cost.

To attain this object, according to the invention, a laser processing machine is provided, which comprises a work holder capable of holding a work and controlled for movement in X- and Y-axis directions according to predetermined movement data, and a laser head capable of performing laser processing on the work held by the work holder, the predetermined movement data including laser codes for on-off controlling a laser generator, the laser generator being on-off controlled according to the laser codes.

According to the invention, an embroidering machine with a laser processing function is provided, which comprises a holder capable of holding a work controlled for movement over a machine table in X- and Y-axis directions according to predetermined movement data, a sewing head supported by a machine frame disposed above the machine table and capable of performing embroidering operations on the work held by the work holder, and a laser head disposed to be capable of performing laser processing on the work held by the work holder, the predetermined movement data including laser codes for on-off controlling a laser generator, and the laser generator being on-off controlled according to the laser codes.

In the above laser processing machine and embroidering machine with a laser processing function according to the invention, the laser codes for on-off controlling the laser generator are included in the predetermined movement data and have not to be prepared separately from the embroidering data, thus permitting a saving of the time and the cost required to prepare data.

In addition, since the laser generator is on-off controlled according to the laser codes, no particular control means is needed, thus permitting reduction in cost.

BRIEF DESCRIPTION OF THE DRAWINGS

FIG. 10 is a view of a laser generator and its peripheral parts;

FIG. 11 (B) is an enlarged sectional view taken along line B—B in FIG. 10, showing the solenoid with the rod thereof in a projected position;

FIG. 79(A) is a view illustrating processing operation in a frame return routine, in which a frame return command is given in a second embroidering step and a restart command is given in a first embroidering step;

FIG. 79(B) is a view illustrating processing operation in a frame return routine, in which a frame return command is given in a second embroidering step and a restart command is given in a laser processing step;

FIG. 80 is a view illustrating repeat processing operation in part of a laser processing step;

DETAILED DESCRIPTION OF THE DRAWINGS

The laser processing machine and sewing machine with laser processing function according to the invention will now be described in detail in conjunction with eight preferred embodiments thereof with reference to FIGS. 1 to 100.

First Embodiment

A first embodiment will now be described with reference to FIGS. 1 to 12. This embodiment is an application of the invention to a multiple sewing head embroidering machine with a laser processing function provided for each sewing head.

Figure 1:
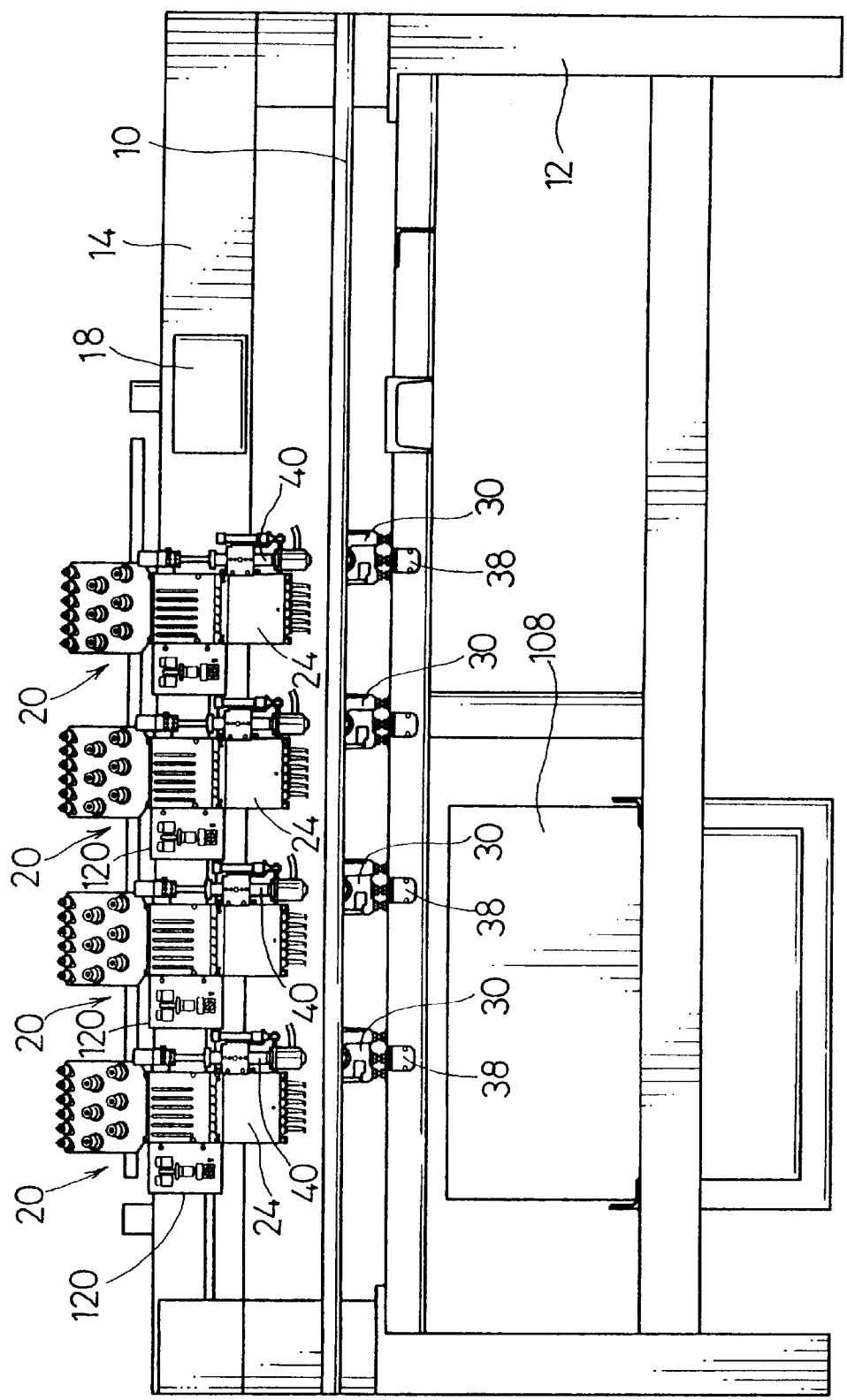
FIG. 1 is a front view of an embroidering machine.
Figure 2:
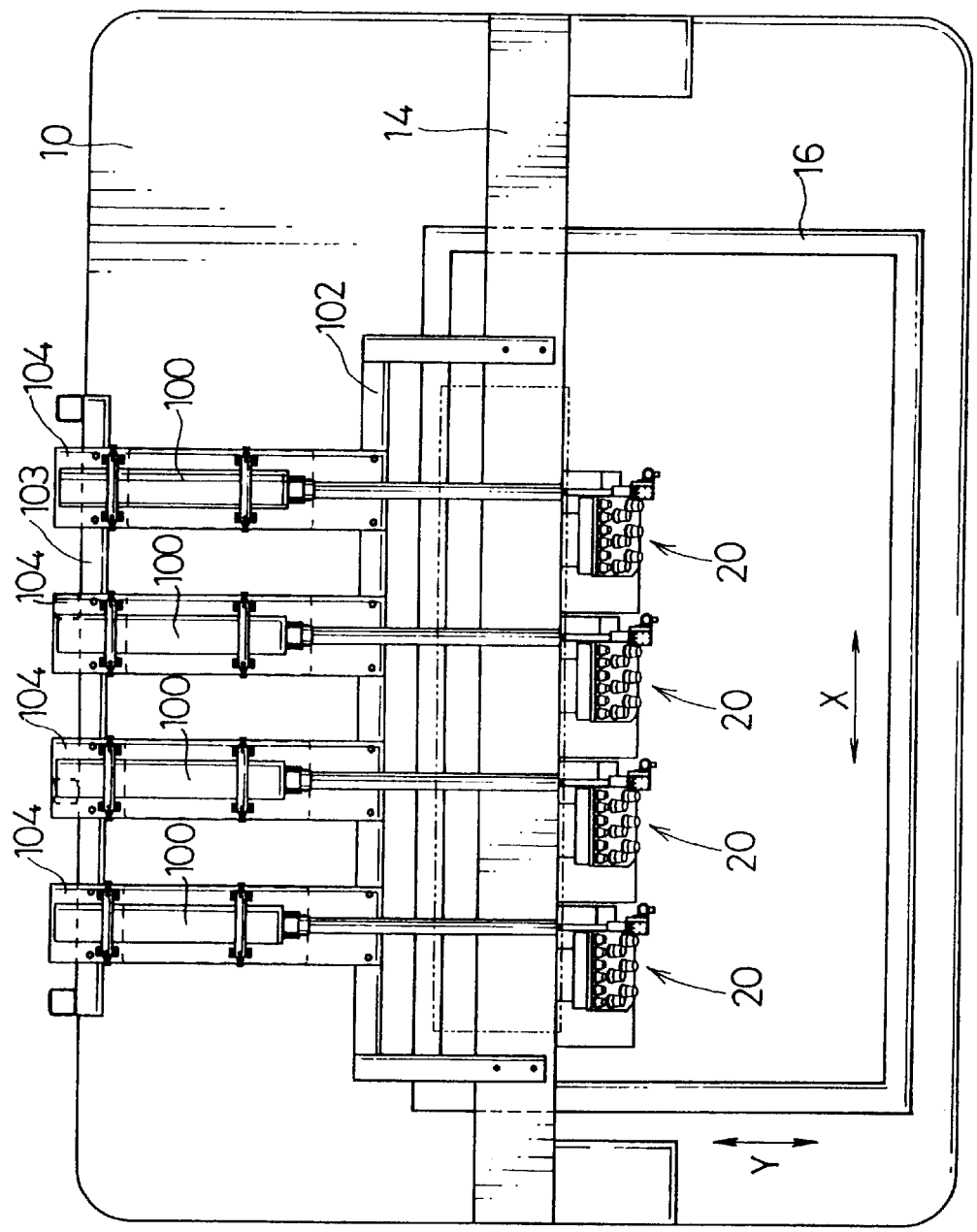
FIG. 2 is a plan view of FIG. 1.

FIG. 1 is a front view of the embroidering machine, and FIG. 2 is a plan view of FIG. 1. As shown in these drawings, the machine has four sewing heads 20 provided at uniform intervals in front of a machine frame 14 which is located above a table 10. Over the machine table 10, an embroidering frame 16 as a work holder for holding a work (or cloth) to be described later, is disposed such that it can be controlled for movement in X- and Y-axis directions as shown in FIG. 2 according to predetermined movement data (or embroidering data). As shown in FIG. 1, on the underside of the machine table 10, shuttle bases 30 are each supported on a transversal frame between opposite table legs 12 and at a position corresponding to each sewing head 20.

Figure 3:
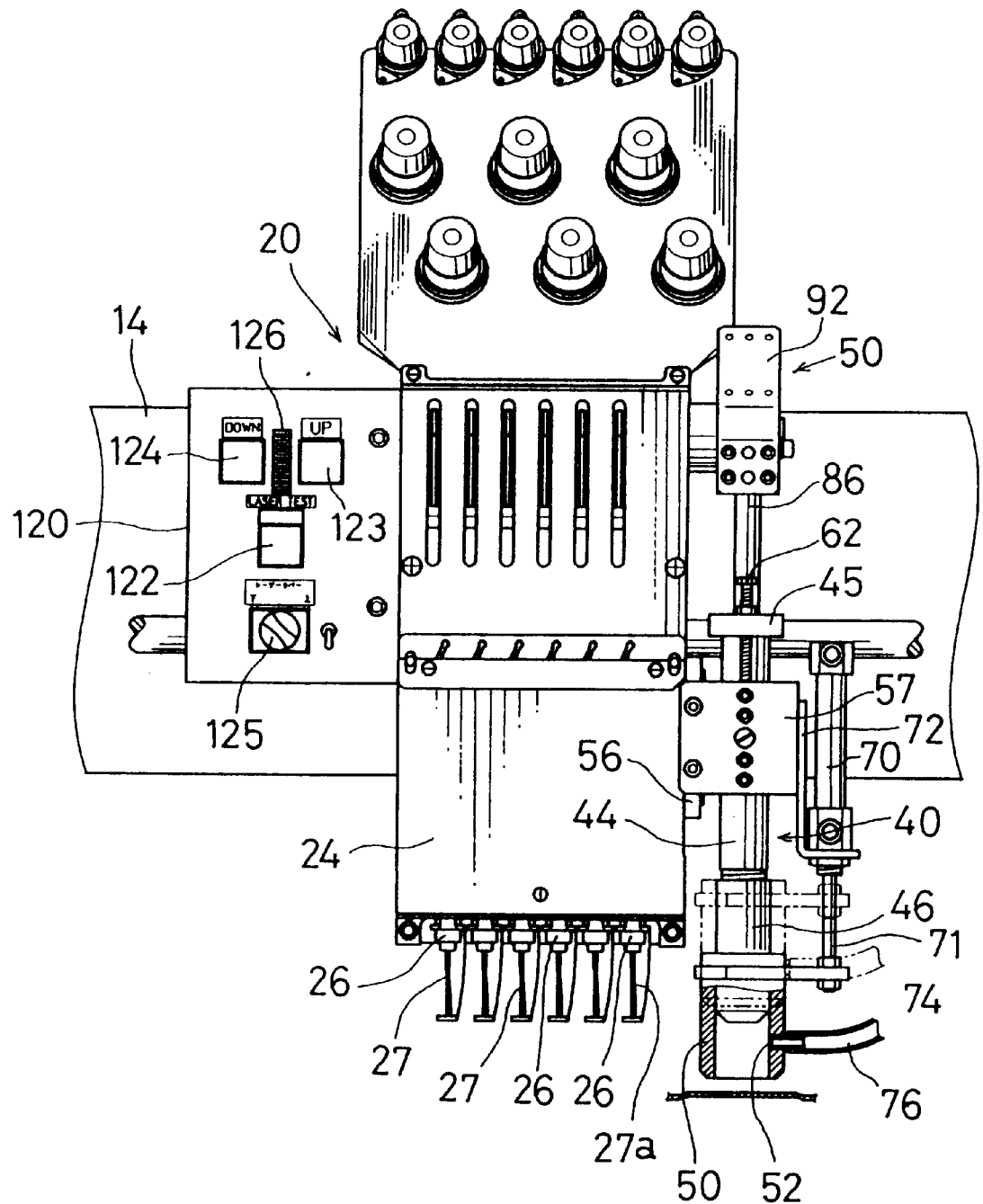
FIG. 3 is a front view, on an enlarged scale, of one of sewing heads and its peripheral parts.
Figure 4:
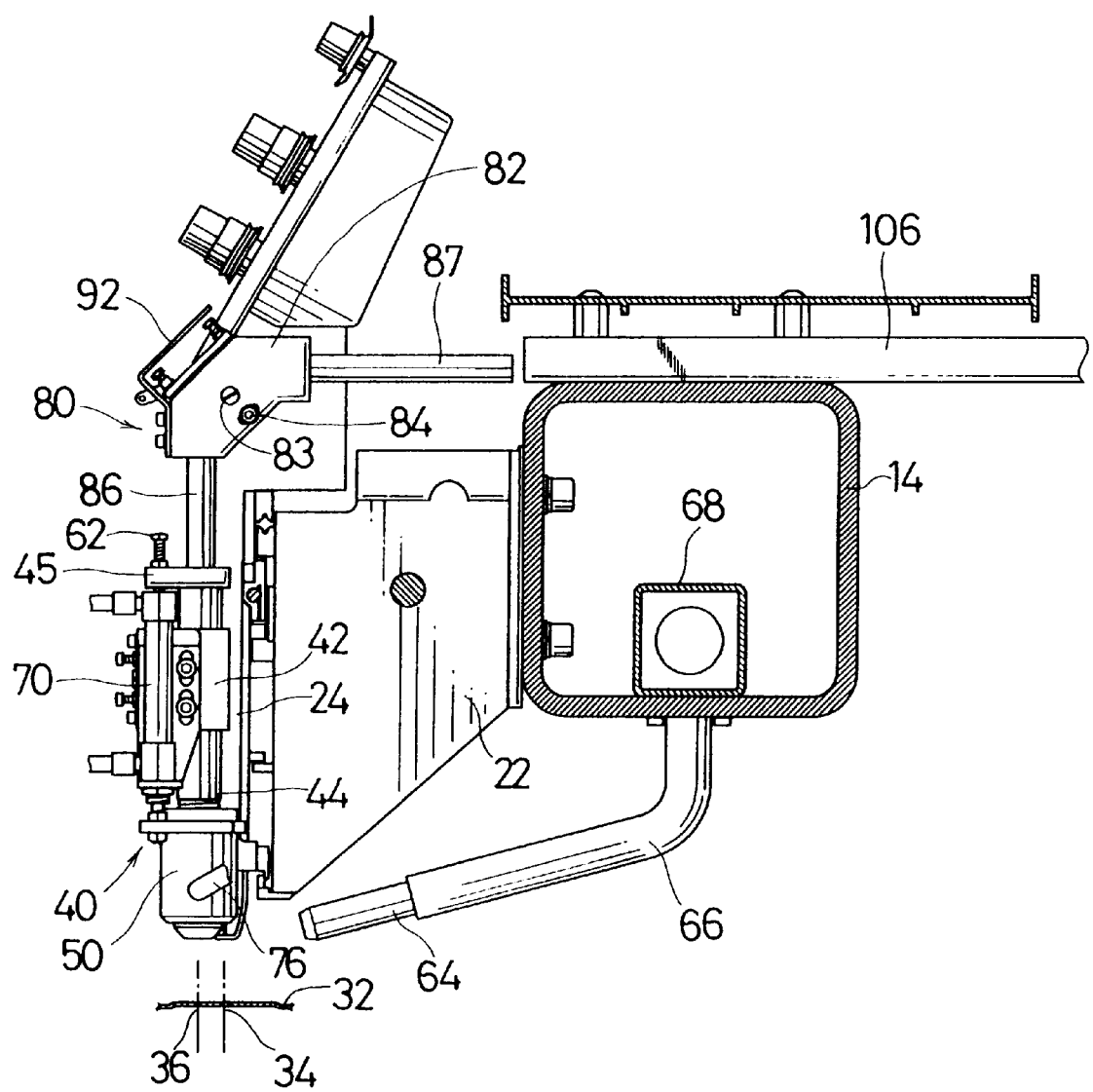
FIG. 4 is a side view of FIG. 3.

FIG. 3 is a front view, on an enlarged scale, of one sewing head 20 and its peripheral parts, and FIG. 4 is a side view of FIG. 3. As shown in these drawings, the sewing head 20 has a needle bar case 24 which is supported on the front of a machine arm 22 secured to the machine frame 14 such that it is slidable to the left and right. In this embodiment, the sewing head 20 is a multiple needle (i.e., six needle) head.

As shown in FIG. 3, at the lower end of the needle bar case 24, six needle bars 26 each with a needle 27 are supported such that they can be vertically moved. As is well known in the art, one of the needle bars 26 is selected by sliding the needle bar case 24, and only the selected needle bar 26 is vertically driven together with its associated needle 27.

In each sewing head 20, a laser head 40 is mounted on one side of the needle bar case 24. As shown in FIG. 3, the axis of the laser head 40, i.e., the optical axis of the laser beam, is spaced apart to the right from the right end needle 27a (i.e., first needle) by a distance corresponding to an integral multiple of the pitch of arrangement of the needle bars 26 (i.e., needles 27). As shown in FIG. 4, the axis of the laser head 40 is offset forwardly of the machine from the axis of each needle bar 26 (i.e., each needle 27) by a predetermined distance.

As shown in FIG. 4, a throat plate 32 is mounted on the shuttle base 30 and has a needle hole 34 through which the needle 27 of the selected needle bar 26 is inserted, and a hole 36 for receiving a laser beam irradiated from the laser head 40. The hole 36 is offset forwardly of the machine from the needle hole 34 by the same distance as the offset extent of the laser head 40.

Figure 5:
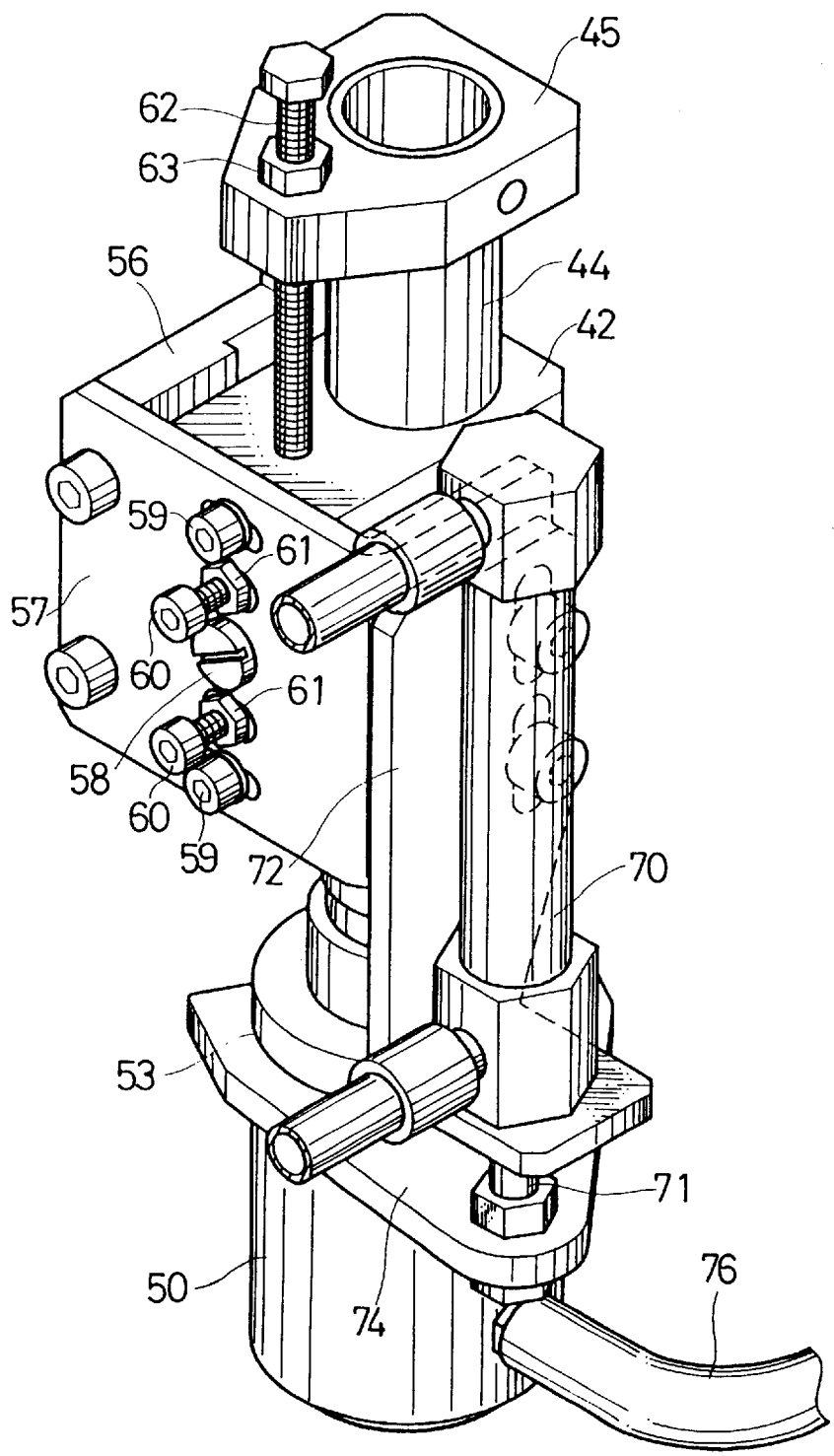
FIG. 5 is a perspective view of a laser head.
Figure 6:
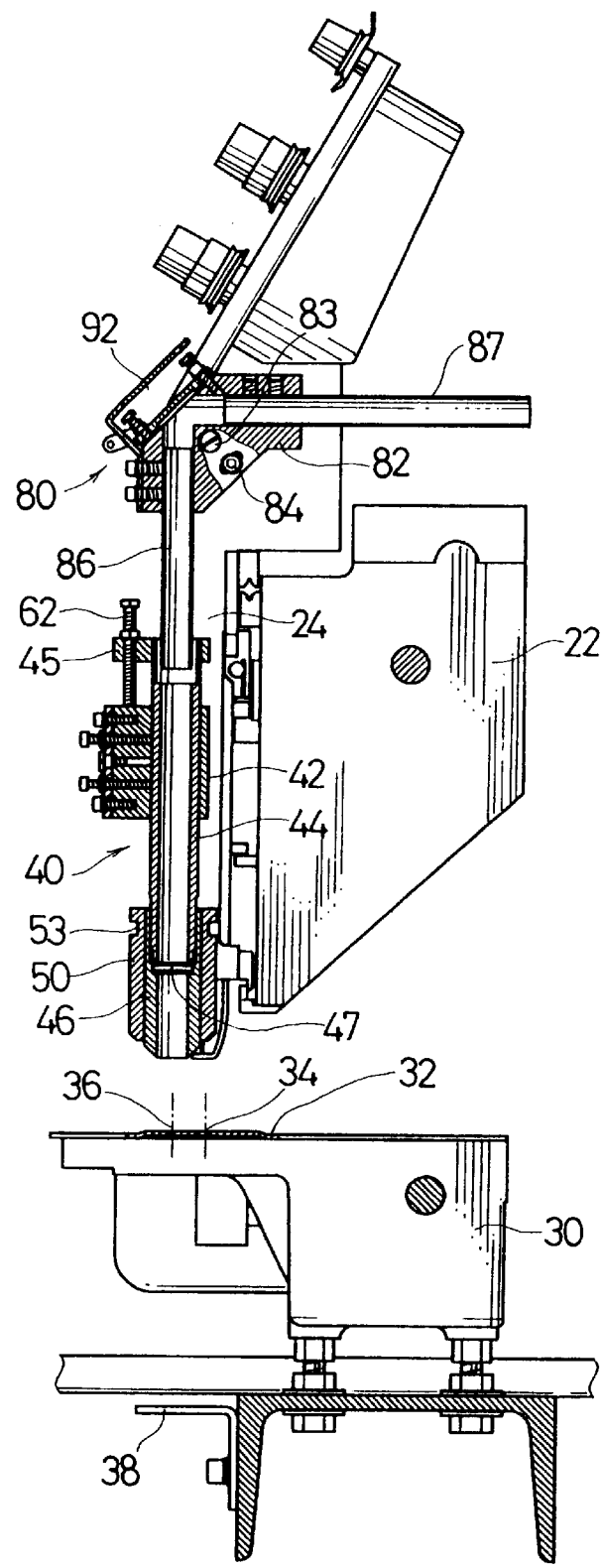
FIG. 6 is a sectional view of the laser head.

FIG. 5 is a perspective view of the laser head 40, and FIG. 6 is a side view of the laser head 40, partly in section, together with the sewing head 20, the shuttle base 30 and other related parts. As shown in these drawings, the laser head 40 has a block 42 mounted in an L-shaped bracket 57, a cylindrical member 44 vertically penetrating the block 42, a lens mounting cylinder 46 coupled to the lower end of the cylindrical member 44, and a protective cylinder 50 mounted for vertical movement along the outer periphery of the lens mounting cylinder 46. As shown in FIG. 5, the head bracket 57 is bolted to a mounting plate 56 secured to one side of the needle bar case 24.

The cylindrical member 44 is vertically slidable relative to the block 42 and has a flange 45 secured to the upper end thereof. An adjustment bolt 62 is screwed through the flange 45 with its free end in contact with the top of the block 42. The height of the cylindrical member 44 is adjusted by vertically moving the cylindrical member 44 relative to the block 42 in correspondence to the extent of screwing of the adjustment bolt 62.

Figure 7:
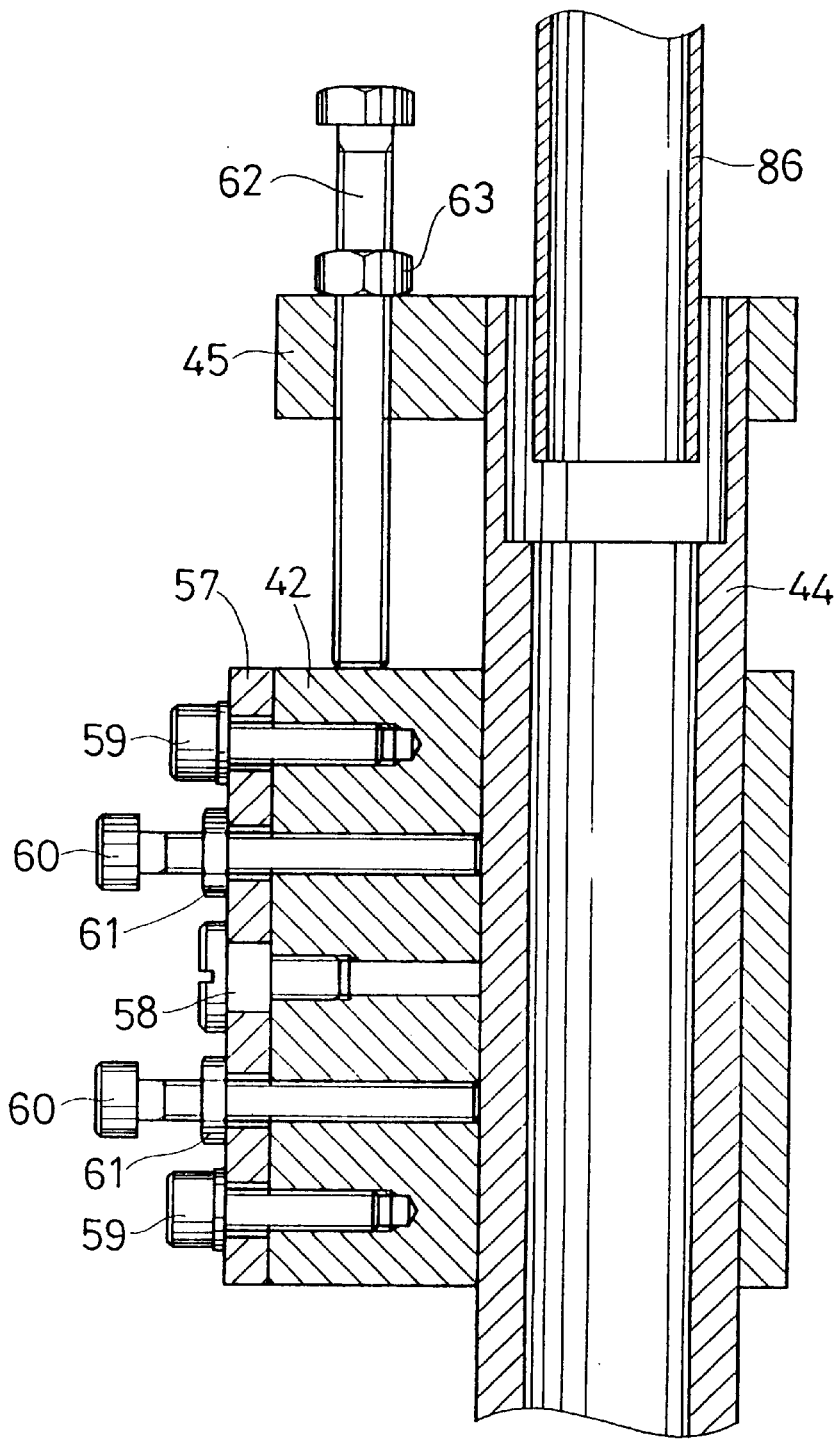
FIG. 7 is a sectional view, on an enlarged scale, showing part of FIG. 6.

FIG. 7 is an enlarged sectional view showing part of FIG. 6. As shown in the drawing, the block 42 is mounted on the head bracket 57 by a support pin 58 such that it is capable of adjusting its rotational angle about the axis of the support pin 58 (for adjusting tilt of the cylindrical member 44).

As is clearly shown in FIGS. 5 and 7, two lock bolts 59 disposed above and below the support pin 58, are screwed such that they can clamp both the head bracket 57 and the block 42, while two lock bolts 60 each disposed between the support pin 58 and the lock bolt 59, are screwed such that they can clamp the cylindrical member 44 relative to the block 42. After the rotational angle of the block 42 has been adjusted, the block 42 is locked to the head bracket 57 by tightening the two lock bolts 59. After the height of the cylindrical member 44 has been adjusted, the cylindrical member 44 is locked to the block 42 by tightening the other two lock bolts 60 and lock nuts 61 and also tightening a lock nut 63 on the adjustment bolt 62.

As shown in FIG. 6, the lens mounting cylinder 46 is screwed on the outer periphery of a lower end portion of the cylindrical member 44. A lens 47 is held between the lower end of the cylindrical member 44 and an inner shoulder of the lens mounting cylinder 46.

The protective cylinder 50 is made of a transparent synthetic resin or like material and has an annular groove 53 formed in the outer periphery of the upper end portion thereof. As shown in FIGS. 3 to 5, a fork-like arm 74 is engaged in the annular groove 53 and is coupled to a rod 71 of an air cylinder 70 which is mounted on the head bracket 57 via a bracket 72. The protective cylinder 50 is driven by the air cylinder 70 and is moved along the outer periphery of the lens mounting cylinder 46 between a raised position (or retreated position) as shown by phantom lines in FIG. 3 and a lowered position (or working position) as shown by solid lines.

As shown in FIG. 3, the protective cylinder 50 has an air hole 52; formed in the lower end portion thereof. As shown in FIGS. 3 and 5, an air pipe 76 is connected at one end to the air hole 52 and connected at the other end to an air source (not shown), thus permitting air blowing into the protective cylinder 50 through the air hole 52.

As shown in FIG. 4, below the machine arm 22, a pipe 66 extends forwardly of the machine from the machine frame 14. To the front end of the pipe 66 is connected a suction nozzle 64 which is located in the vicinity of the lower end of the laser head 40 (i.e., lower end of the protective cylinder 50). The rear end of the pipe 66 is connected to a duct 68 which extends in the machine frame 14 and is connected to an air suction blower (not shown) for sucking air around the lower end of the laser head 40.

As shown in FIGS. 4 and 6, above the laser head 40, a beam guide 80 is mounted on one side of the needle bar case 24. The beam guide 80 has a mirror support block 82 and two guide pipes 86 and 87 connected thereto. The mirror support block 82 is mounted by a support pin 83 on one side of the needle bar case 24 such that it is capable of adjusting its rotational angle (i.e., tilt adjustment in transversal direction of the machine), and after the adjustment, it can be locked by tightening a lock bolt 84.

The guide pipes 86 and 87 are connected to the mirror support block 82 such that they are perpendicular to each other, one extending in the vertical direction of the machine and the other extending in a transversal direction thereof. Specifically, the guide pipe 86 extends downward from the mirror support block 82, and has an end portion inserted in an opening of the upper end of the cylindrical member 44 in the laser head 40. The other guide pipe 87 extends rearward from the mirror support block 82.

Figure 8:
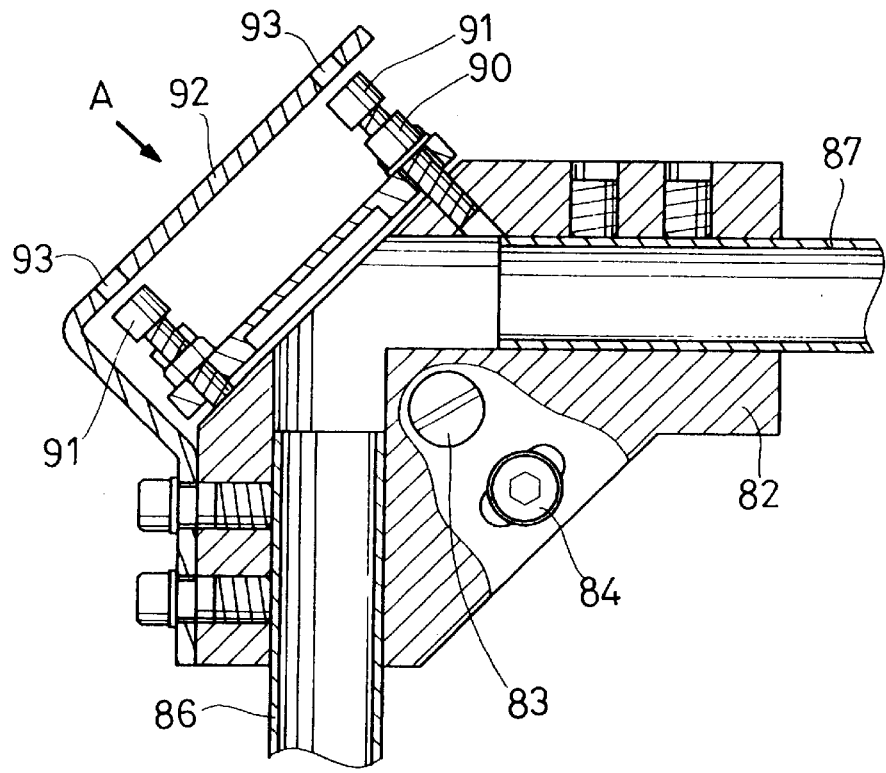
FIG. 8 is a sectional view, on an enlarged scale, showing part of a beam guide.
Figure 9:
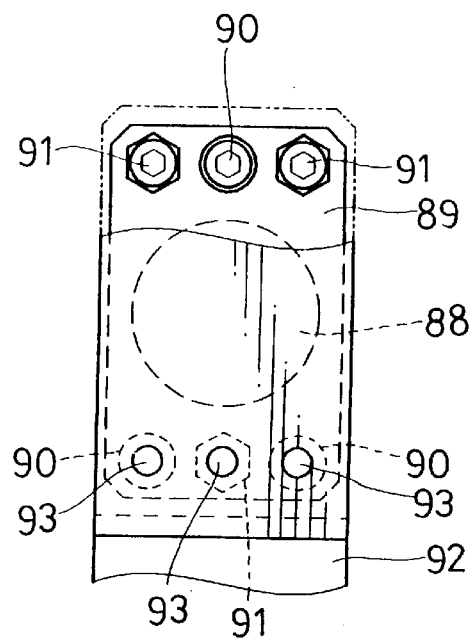
FIG. 9 is a view taken in the direction of arrow A in FIG. 8.

FIG. 8 is a sectional view, on an enlarged scale, showing part of the beam guide 80, and FIG. 9 is a view taken in the direction of arrow A in FIG. 8. As shown in these drawings, the two guide pipes 86 and 87 are inserted in a hole bent at right angles in the mirror support block 82. The mirror support block 82 is open at the corner of the hole, and a mirror holder 89 with a mirror 88 provided therein is mounted in the open portion of the mirror support block 82.

As shown in FIG. 9, the mirror holder 89 is clamped to the mirror support block 82 by a total of three set bolts 90, i.e., a central one in an upper bolt row and left and right ones in a lower bolt row. As shown also in FIG. 9, other three bolts 91, i.e., left and right ones in the upper bolt row and a central one in the lower bolt row, are adjustment bolts with the free end thereof in contact with the surface of the mirror support block 82. The tilt of the mirror holder 89 or the mirror 88, can be adjusted in correspondence to the extent of turning of the adjustment bolts 91, and after the adjustment, the mirror holder 89 is secured to the mirror support block 82 by tightening the set bolts 90.

A protective cover 92 is mounted on the front of the mirror support block 82 such that it covers the mirror holder 89 holding the mirror 88. The protective cover 92 serves to protect the operator from the laser beam in the event of detachment of the mirror holder 89 from the mirror support block 82. The protective cover 92 has through holes 93 in which a tool for turning the set bolt 90 or the adjustment bolt 91 is inserted.

As shown in FIG. 2, laser generators 100 are each disposed behind each of the sewing heads 20 such that they extend in the transversal direction of the machine. Each laser generator 100 uses a gas laser (for instance, $CO_2$ laser) which can generate a laser beam for continues irradiation. In front of the laser generator 100, a guide pipe 106 is provided, which leads a laser beam from each radiation nozzle (not shown) to a guide pipe 87 in the beam guide 80.

When the laser head 40 is selected by sliding the needle bar case 24, the rear open end of the guide pipe 87 is brought to a position facing the front open end of the guide pipe 106 of the laser generator 100 corresponding to the laser head 40. The laser beam irradiated from the laser generator 100 is led through the guide pipe 106 into the beam guide 80 and strikes the mirror 88 to be led into the cylindrical member 44 of the laser head 40. The laser beam then passes through the lens 47, so that it can laser process (or cut) the work (or cloth) at the focal point of the lens 47.

As clearly shown in FIG. 4, the guide pipe 106 is secured to the top of the machine frame 14.

FIG. 10 is a view of the laser generator 100 and its peripheral parts. As shown in FIG. 10 and also in FIG. 2, the laser generator 100 is set on and secured to the top of a support plate 104 which is supported horizontally by a support frame 102 secured to the machine frame 14 and also by a support frame 103 secured to the rear end of the machine table 10. A controller 107 for the laser generator 100 is mounted on the underside of the support plate 104. As shown in FIG. 1, a chiller box 108 is disposed under the machine table 10 for cooling the laser generator 100.

As shown in FIG. 10, a blocking device 110 capable of blocking the laser beam is disposed at the end of the guide pipe 106 near each laser generator 100. The blocking device 110 is provided as a safety measure to cope with erroneous radiation of a laser beam from the laser generator 100 when the laser head 40 is not selected, that is, when the rear open end of the guide pipe 87 does not face the front open end of the guide pipe 106.

Figures 11A, 11B:
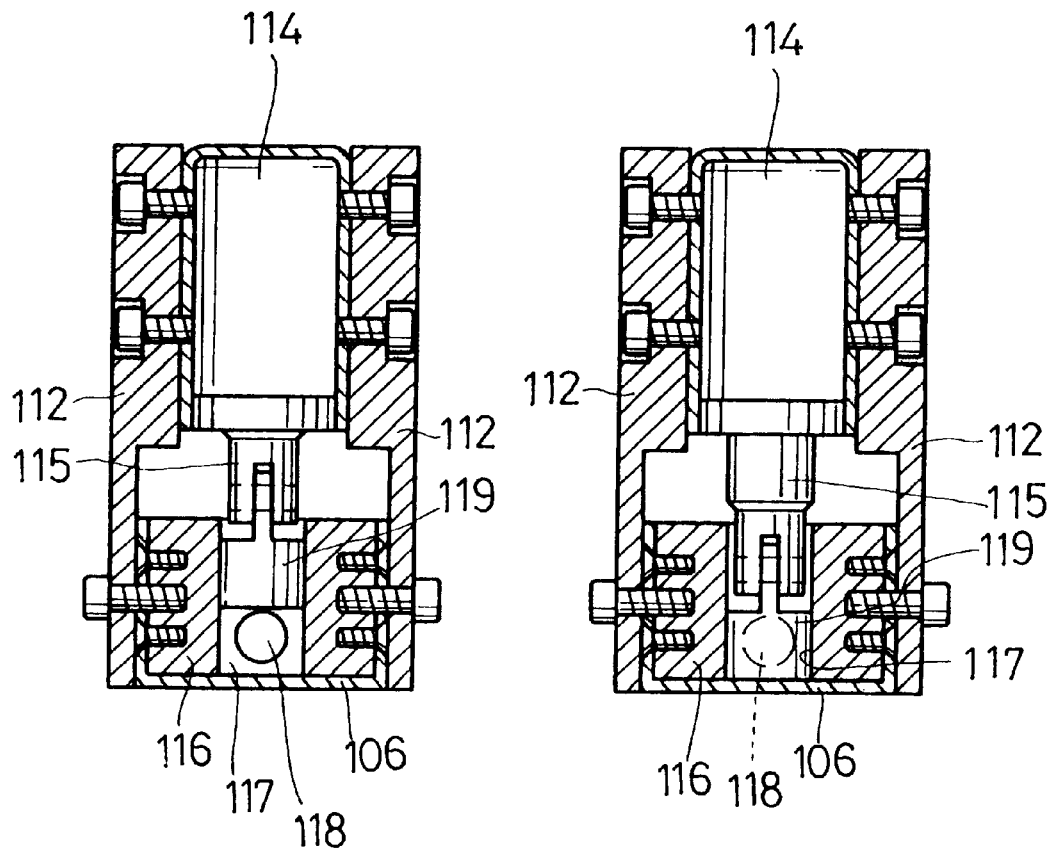
FIG. 11(A) is an enlarged sectional view taken along line B—B in FIG. 10, showing a solenoid with a rod thereof in a retreated position.

FIGS. 11(A) and 11(B) are enlarged sectional views taken along line B—B in FIG. 10. The blocking device 110 will now be described with reference to these drawings. Supports 112 are secured to the guide pipe 106 on the opposite outsides thereof and above the open top thereof. A steel block member 116 is provided in and secured to the guide pipe 106. A latching solenoid 114 as an actuator of the blocking device 110 is secured between the supports 112 above the open top of the guide pipe 106, and with its rod 115 directed downward.

The block member 116 has a vertically extending through hole 117 and a transversally extending horizontal hole 118 crossing the through hole 117. The horizontal hole 118 communicates with the interior of the guide pipe 106, so that a laser beam can pass therethrough.

A blocking element 119 coupled to a rod 115 of the latching solenoid 114, is vertically movably located in the vertical hole 117 of the block member 116. As shown in FIG. 11(A), when the rod 115 of the solenoid 114 is in its retreated position, the blocking element 119 is pulled up to hold the horizontal hole 118 open. By contrast, as shown in FIG. 11(B), when the rod 115 is in its projected position, the blocking element 119 is pushed down to hold the horizontal hole 118 closed and blocks the laser beam erroneously irradiated from the laser generator 100. When the latching solenoid is deenergized in either state of FIG. 11(A) or 11(B), it can hold the rod 115 in that state.

As shown in FIG. 3, a control panel 120 is provided on the needle bar case 24 in each sewing head 20 on the side opposite the laser head 40. The control panel 120 includes a test switch 122 for commanding the radiation of a laser beam when adjusting the power level of the laser beam, power-up and power-down switches 123 and 124 for adjusting the power level during radiation of the laser beam, a display 126 for displaying the power level of the laser beam, a lift switch 125 for commanding the driving of the air cylinder 70 to raise or lower the protective cylinder 50 of the laser head 40, and other switches if required.

When a main switch (not shown) of the above embroidering machine is turned on, the power is supplied to the laser generators 100 and the chiller box 108 to start preheating of the laser generators 100 and also to start circulatory supply of cooling water from the chiller box 108 to the laser generators 100. Various adjustments of the laser beam irradiated from the laser generators 100 will now be described. Laser beam position adjustment:

(1) The laser head 40 to be operated is selected by sliding the needle bar cases 24 of the sewing heads 20.

(2) The protective cylinder 50 is lowered from the retreated position to the working position by operating the lift switch 125 on the control panel 120.

(3) The test switch 122 and the power-up switch 123 on the control panel 120 are momentarily depressed at a time. As a result, a "TEST" mode is set up, and a laser beam of superlow power level is irradiated for a predetermined period of time.

At this time, a check is made as to whether the laser beam passes through the center of the hole 36 in the throat plate 32. When the laser beam is found to be deviated, a tilt adjustment of the cylindrical body 44 in the laser head 40 with respect to the longitudinal direction of the machine or a tilt adjustment of the beam guide 80 in the transversal direction of the machine is made.

Laser beam power adjustment:

After the operations in (1) to (3) above:

(4) The mode is switched over to a "SETTING" mode on an operating panel 18 of the machine as shown in FIG. 1.

(5) In this mode, the laser beam is irradiated while the test switch 122 on the control panel 120 is held depressed. The status of cutting by the laser beam is thus checked by putting a test cloth on the throat plate 32.

The power level of the laser beam is gradually increased by holding the test switch 122 and the power-up switch 123 depressed simultaneously and is gradually reduced by holding the test switch 122 and power-down switch 124 depressed simultaneously.

Focal point adjustment:

After the operations in (1) to (5) above:

(6) The focal point of the lens 47 is adjusted by adjusting the height of the cylindrical member 44 in the laser head 40 with the adjustment bolt 62.

Depending on the work (or cloth), the lens 47 is replaced with one having a different suitable focal distance. In such a case, the laser head 40 itself is removed from the head bracket 57 and is replaced with one having a lens with a different focal distance.

The adjustment of the power level of laser beam and the adjustment of the focal point are made whenever the work is replaced.

The switching of embroidering and laser processing will now be described.

As described before, one of the needle bars 26 (or needles 27) or the laser head 40 is selected by sliding the needle bar case 24 of the sewing heads 20. In the case of the embroidering, the needle 27 of the selected needle bar 26 is positioned such that it can pass through the needle hole 34 in the throat plate 32. In the case of the laser processing, the laser head 40 is positioned such that the laser beam irradiated therefrom passes through the hole 36 in the throat plate 32.

It is possible to manually switch the embroidering and the laser processing. Usually, these operations are set in advance. The setting is made by key inputs on the operating panel 18 of the machine in units of embroidering and laser processing. In this embodiment, each sewing head 20 has six needle bars 26 (i.e., six needles 27), and the selection thereof is made by key inputs "1" to "6". The selection of the laser head 40 is made by key input "0".

The difference of the control of the embroidering frame 16 for movement in the embroidering and in the laser processing, will now be briefly described. In the embroidering, the embroidering frame 16 is controlled for normal movement according to movement data (or embroidering data). In the laser processing, the embroidering frame 16 is controlled for continuous movement at a uniform speed while providing linear interpolation according to the embroidering data.

In the case of embroidering, the embroidering frame 16 has to be moved intermittently since it can be moved only while the needle 27 is separated from the work (or cloth) held thereon. In the embroidering, it is only necessary that the needle 27 falls at points specified by data, and the embroidering frame 16 is thus not always moved along a line connecting points. On the other hand, in the laser processing, the embroidering frame 16 has to be moved at a uniform speed and continuously along a line connecting points as specified by data. However, when the stitch length of the embroidering data used for laser processing is set to be small to some extent, the laser processing is possible without controlling the embroidering frame 16 for movement at a uniform speed or with linear interpolation.

In the laser processing, the main shaft of the machine which is a drive source for the needle bars 26 of the sewing heads 20 and so forth is not rotated.

A combination operation of embroidering and laser processing (or cutting) will now be described.

Figure 12:
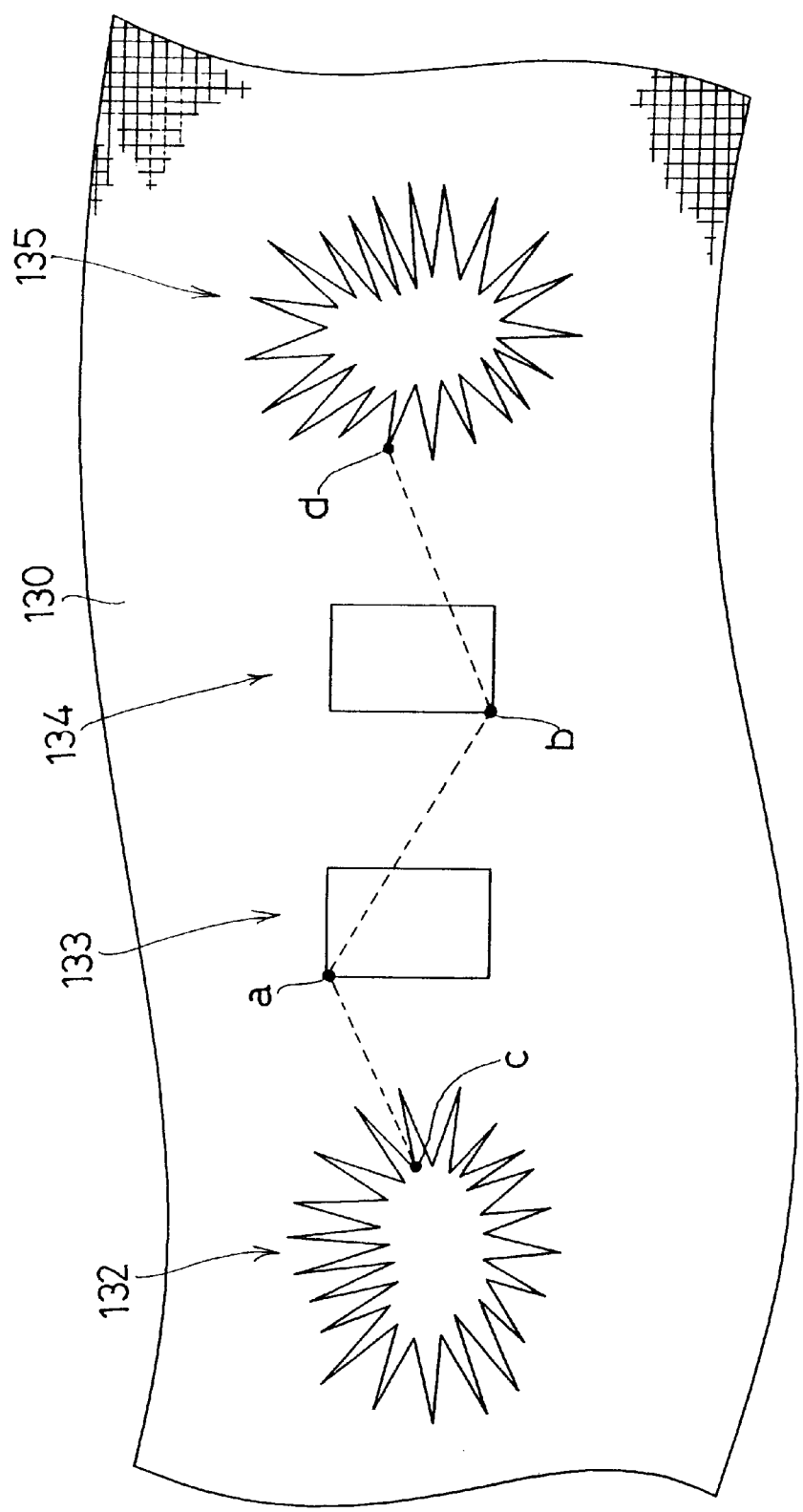
FIG. 12 is a view illustrating an example of combination operation of embroidering and laser processing (or cutting)

FIG. 12 shows an example of the combination operation. As shown therein, in this operation, on a cloth 130 as a work, an embroidery 132 is produced in a first step, laser cuts 133 and 134 are produced in a second step, and an embroidery 135 is produced in a third step.

After inputting and setting embroidering data for this operation, setting is made for performing embroidering and laser cutting in the order of the first to third steps. As described above, the embroidering data are set by key inputs on the operating panel 18 of the machine. Specifically, for the first step, the selection of one of the six needle bars 26 that is to be used is commanded by key input "1". For the second step, the selection of the laser head 40 is commanded by key input "0". For the third step, the selection of one of the needle bars 26 that is to be used is commanded by key input "5".

The embroidering data for the combination operation of embroidering and laser processing, includes special codes which command laser cuts (hereinafter referred to as "laser cut codes"). The data is set such that the radiation of the laser beam from the laser head 40 is started when a first "laser cut code" is read out and is stopped when the next "laser cut code" is read out.

With the laser cuts 133 and 134 shown in FIG. 12, points a and b are start points of cutting and also end points of cutting. The embroidering data thus includes "laser cut codes" for four points corresponding to the points a and b.

In the following description, a step for which the selection of the needle bar 26 is commanded, such as the first and third steps, is referred to as "embroidering step", and a step for which the selection of the laser head 40 is commanded, such as the second step, is referred to as "laser processing step". In the "laser processing step", the controller 107 shown in FIG. 10 controls the laser generator 100 for starting and stopping the radiation of the laser beam when the "laser cut code" is read out.

In performing the combination operation shown in FIG. 12, when the machine is started, one of the needle bars 26 as commanded by key input "1" is selected by sliding the needle bar case 24. Also, the embroidering frame 16 is controlled for movement to bring a point c on the embroidery 132 to be produced in the first step to a position right above the needle hole 34 in the throat plate 32, and the production of the embroidery 132 is executed by driving the selected needle bar 26 and controlling the embroidering frame 16 for movement for embroidering.

After the production of the embroidery 132 has been ended, the embroidering frame 16 is controlled for movement to bring the point a of the laser cut 133 to be produced in the second step to a position right above the hole 36 in the throat plate 32. Subsequently, the laser head 40 commanded by key input "0" is selected by sliding the needle bar case 24.

After the laser head 40 has been selected, the protective cylinder 50 is lowered from its retreated position as shown by phantom lines in FIG. 3 to the working position as shown by solid lines. Also, air blowing into the protective cylinder 50 through the air pipe 76 and air suction through the air suction nozzle 64 shown in FIG. 4 are started. As shown in FIG. 11(A), the horizontal hole 118 is subsequently opened by driving the solenoid 114 in the blocking device 110.

In the second step, which is the "laser processing step", the laser beam is irradiated from the laser head 40 in response to the reading of the first "laser cut code" at the point a of the laser cut 133. At the same time, the embroidering frame 16 is controlled for movement at a uniform speed along the laser cut 133, so that this portion of the work is cut away.

At the point a at the end of the cutting, the second "laser cut code" is read out and thus, radiation of the laser beam is stopped. Subsequently, the embroidering frame 16 is controlled for movement to bring the point b of the laser cut 134 to be produced to a position right above the hole 36 in the throat plate 32. This means that the cloth 130 is not cut between the points a and b.

At the point b of the laser cut 134, the radiation of the laser beam is started again in response to the reading of the third "laser cut code". At the same time, the embroidering frame 16 is controlled for movement at a uniform speed along the laser cut 134 to be produced, so that this portion is cut away.

At the point b at the end of the cutting of the laser cut 134, the radiation of the laser beam is stopped in response to the reading of the fourth "laser cut code". Subsequently, the embroidering frame 16 is controlled for movement to bring a point d of the embroidery 135 to be produced in the third step to a position right above the hole 34 in the throat plate 32. Then, one of the needle bars 26 as commanded by key input "5" is selected by sliding the needle bar case 24, and the production of the embroidery 135 in the third step is executed by driving the selected needle bar 26 and controlling the embroidering frame 16 for movement for embroidering.

As shown in FIG. 11(B), after the needle bar 26 for the third step has been selected, the horizontal hole 118 is closed by driving the solenoid 114 in the blocking device 110. Also, the protective cylinder 50 is raised to the retreated position as shown by phantom lines in FIG. 3. The air blowing into the protective cylinder 50 and the air suction by the suction nozzle 64 are discontinued whenever the radiation of the laser beam is stopped.

The air blowing into the protective cylinder 50 during the above laser cutting, has an effect of extinguishing a flame generated as the cloth 130 is scorched by the laser beam, and smoke is blown out through the clearance between the lower end of the protective cylinder 50 and the cloth 130 to the outside. The blown-out smoke is sucked out by the suction nozzle 64 for disposal.

As an alternative construction, the protective cylinder 50 and a suction duct 68 shown in FIG. 4 may be connected to each other with a pipe or the like, so that air is sucked from the protective cylinder 50 during laser cutting. With this construction, air is sucked through the clearance between the lower end of the protective cylinder 50 and the cloth 30 into the protective cylinder 50, and an air stream thus generated extinguishes the flame, while at the same time blowing out the smoke.

As shown in FIG. 6, the laser beam passing through the hole 36 in the throat plate 32 during the laser cutting, is received below the machine table 10 by a receiving plate 38 which is secured to the transversal frame between the opposite table legs 12.

Thus, according to the above first embodiment, the work replacement and like operations may be readily performed. In addition, during the laser cutting, the operator is protected from laser beam, and safety is enhanced. Moreover, the laser head can be switched between the working position and the retreated position without adverse effects on the focal point of the laser beam and so forth.

Second Embodiment

A second embodiment of the invention will now be described with reference to FIGS. 13 to 25.

Figure 13:
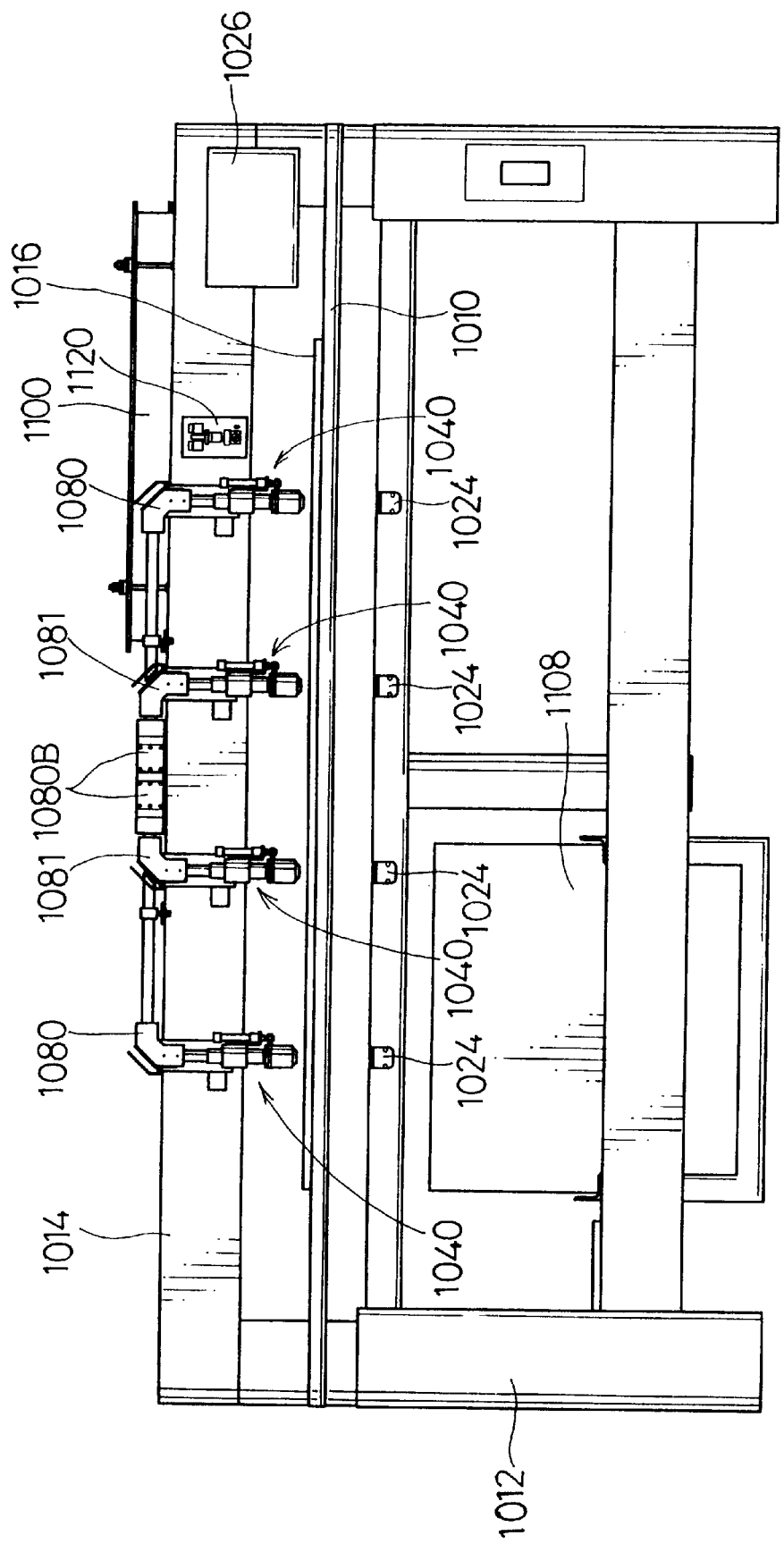
FIG. 13 is a front view of a laser processing machine.
Figure 14:
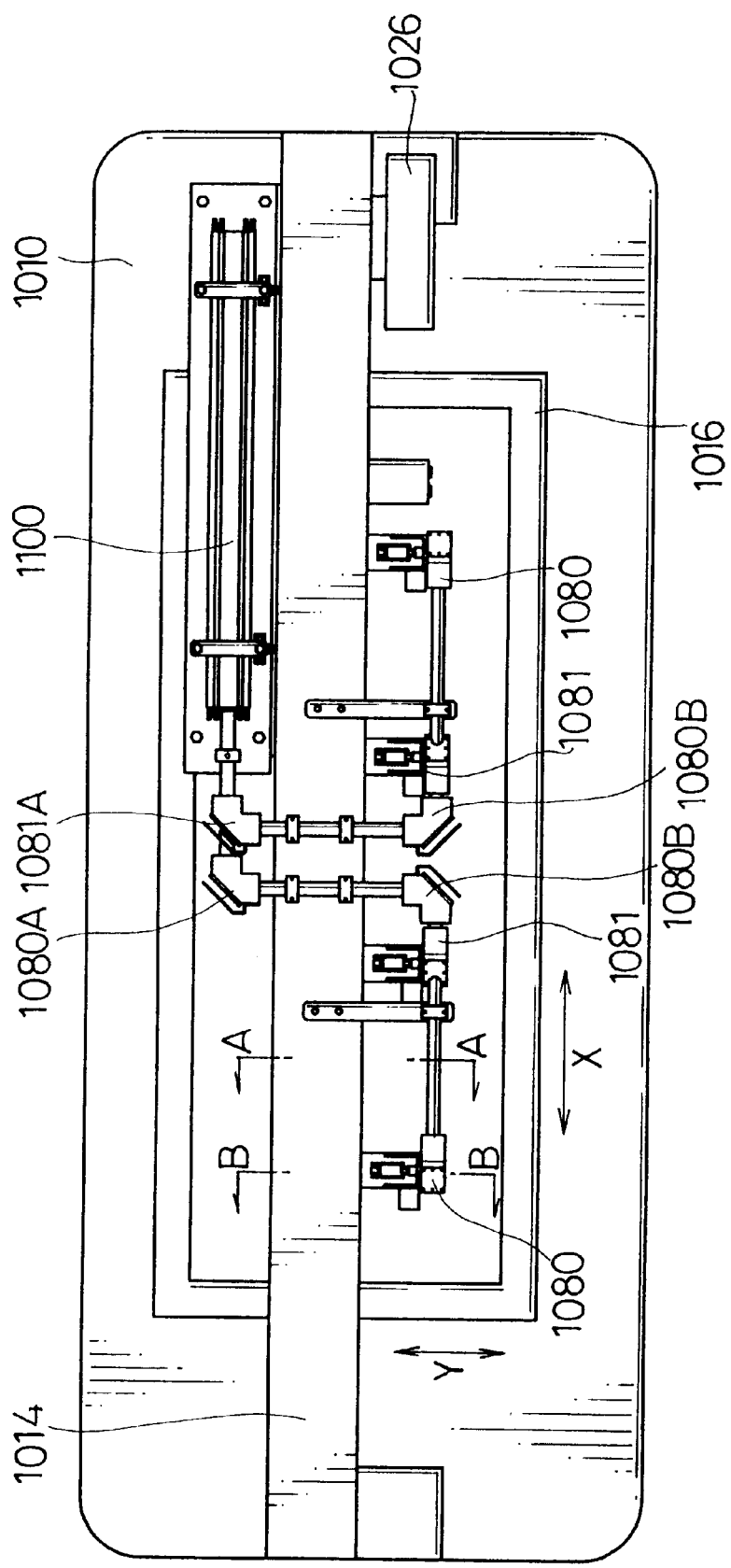
FIG. 14 is a plan view of FIG. 13.

FIG. 13 is a front view of a laser processing machine, and FIG. 14 is a plan view of FIG. 13. As shown in these drawings, the machine comprises a plurality of (i.e., four) laser heads 1040 which are disposed substantially at a uniform interval in the longitudinal direction in front of a frame 1014 located above a table 1010. On top of the table 1010, a work holder 1016 which can hold a work (or cloth) as will be described later, is provided such that it can be controlled for movement in X- and Y-axis directions in FIG. 14 according to predetermined movement data. As shown in FIG. 13, a horizontal frame supported between opposite table legs 1012 on the underside of the table 1010, supports steel blocks 1024 which are each located at a position corresponding to each laser head 1040 for blocking laser beam irradiated from each laser head 1040.

Figure 15:
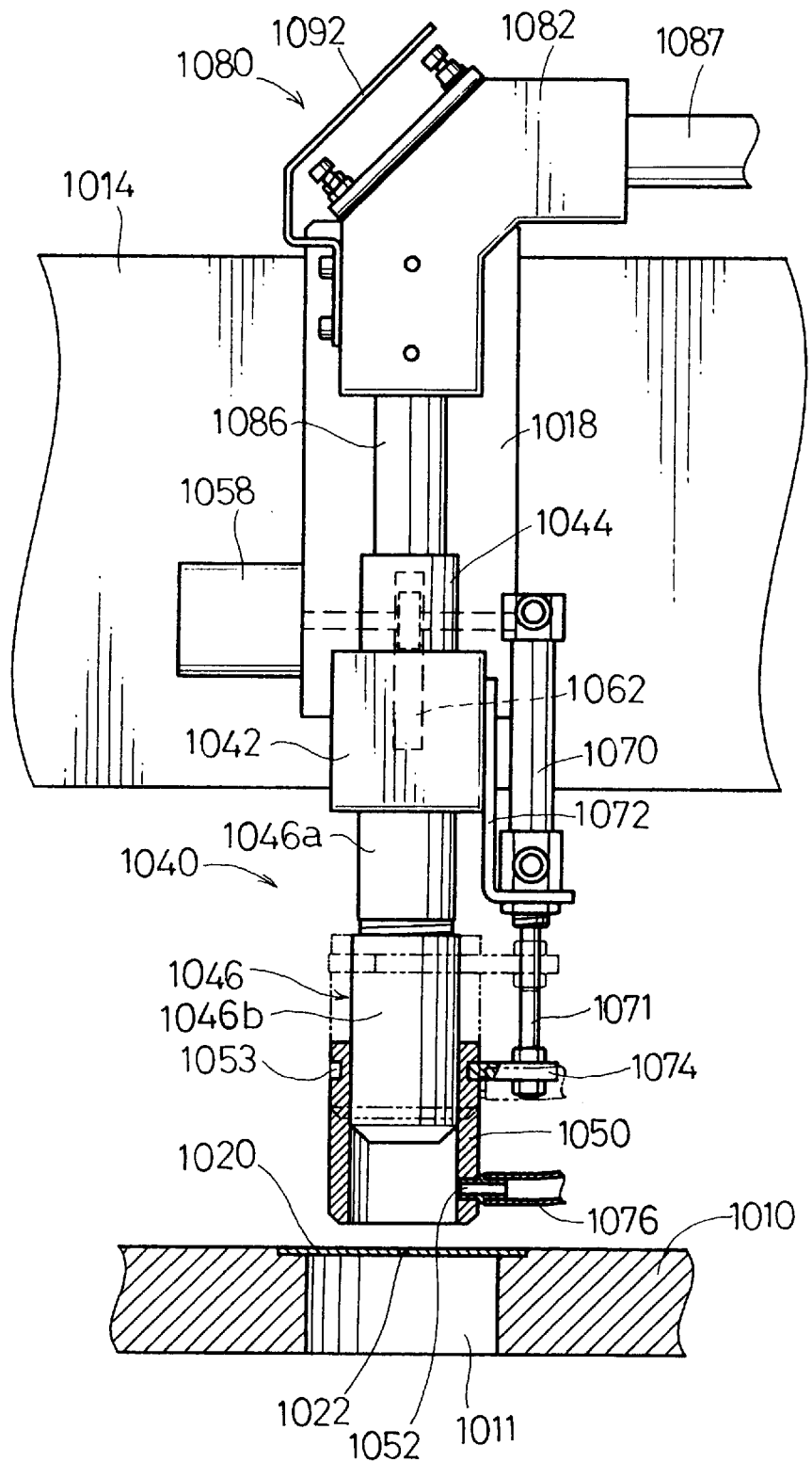
FIG. 15 is a front view, on an enlarged scale, of one of laser heads and its peripheral parts.
Figure 16:
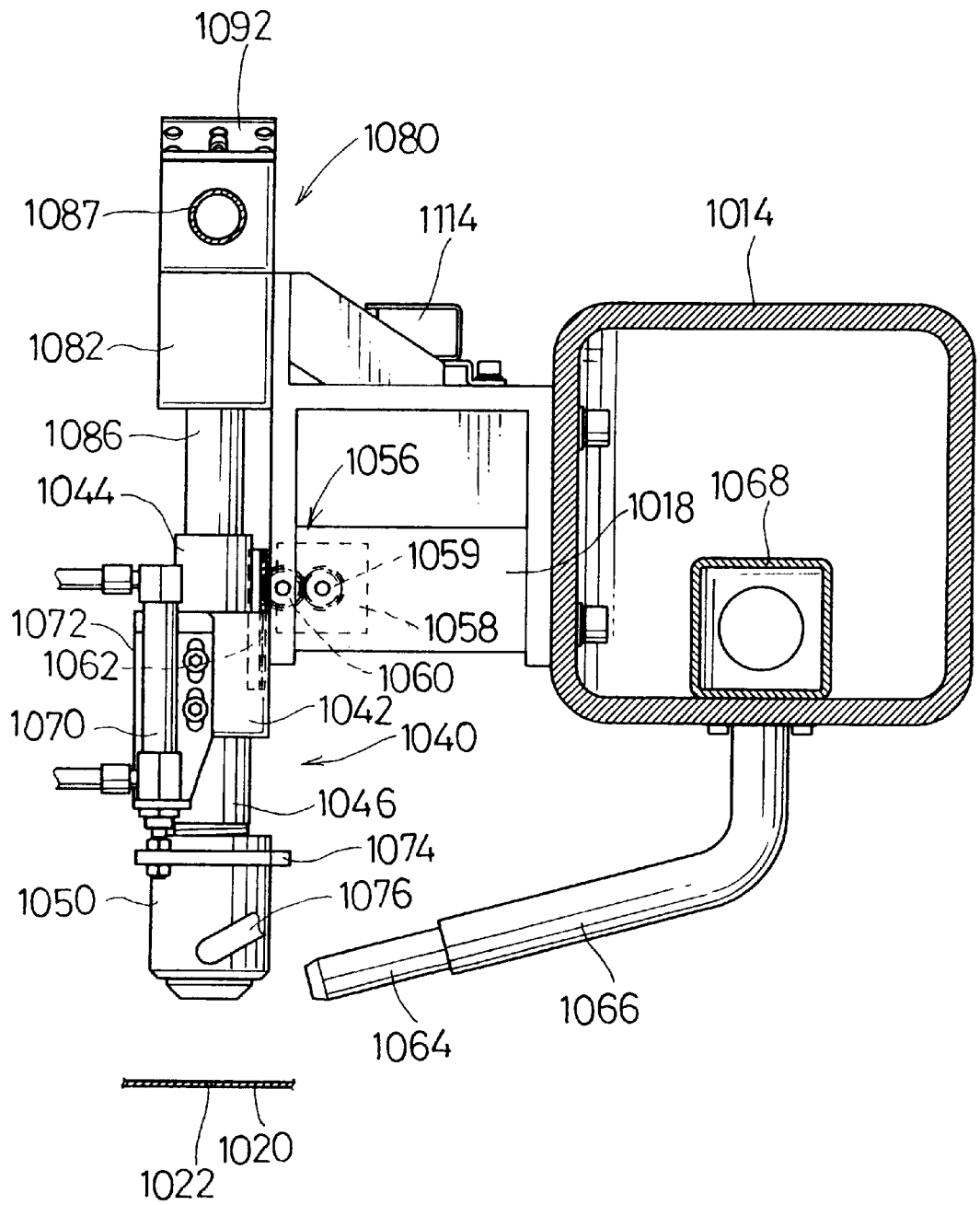
FIG. 16 is an enlarged side view taken along line A—A in FIG. 14.
Figure 17:
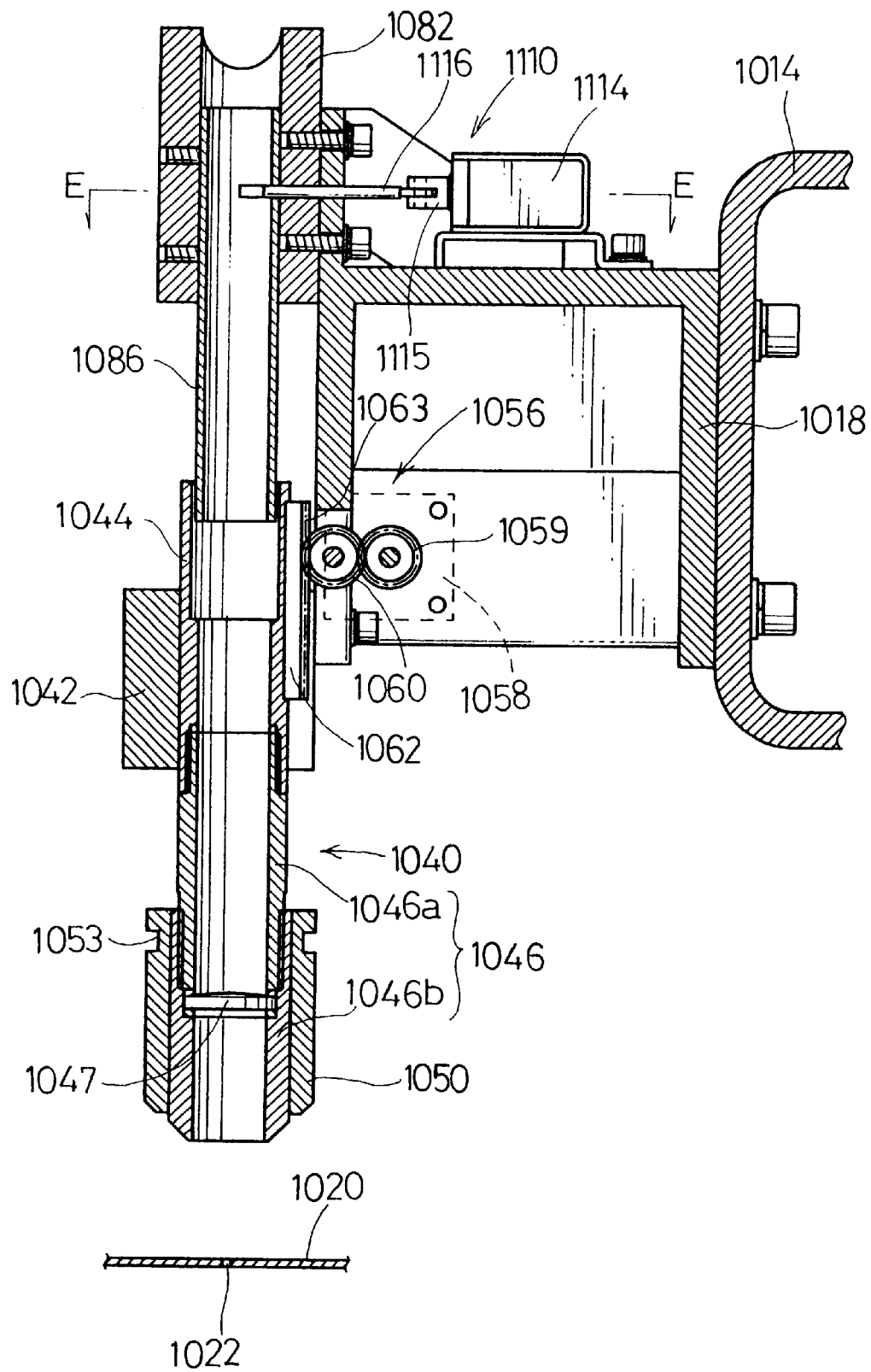
FIG. 17 is an enlarged sectional view taken along line B—B in FIG. 14.

FIG. 15 is a front view, on an enlarged scale, of one laser head 1040 and its peripheral parts, FIG. 16 is an enlarged side view taken along line A—A in FIG. 14, and FIG. 17 is an enlarged sectional view taken along line B—B in FIG. 14.

As shown in these drawings, the laser head 1040 comprises a support 1042 mounted on a front lower portion of a head bracket 1018, a cylindrical member 1044 vertically penetrating the support 1042 for relative vertical movement, a lens mounting cylinder 1046 coupled to the lower end of the cylindrical member 1044, and a protective cylinder 1050 mounted on the outer periphery of the lens mounting cylinder 1046 for relative vertical movement. As shown in FIGS. 16 and 17, the bracket 1018 is bolted to the front of the frame 1014.

The cylindrical member 1044 can be driven by a lift mechanism 1056 for vertical movement. The construction of the lift mechanism 1056 will now be described mainly with reference to FIG. 17. The head bracket 1018 supports a motor 1058 as a drive source mounted on a side wall thereof. The motor 1058 has a shaft which in turn has a drive gear 1059 secured thereto. The drive gear 1059 is meshed with an intermediate gear 1060 which is rotationally supported by the head bracket 1018 and is meshed with rack teeth 1063 of a rack 1062 secured to the back side of the cylindrical member 1044.

By driving the motor 1058 for forward and reverse rotations, the cylindrical member 1044 is raised and lowered by the meshing engagement of the drive gear 1059, intermediate gear 1060 and rack teeth 1063 of the rack 1062.

As is clearly shown in FIG. 17, the lens mounting cylinder 1046 includes an upper cylinder 1046a screwed in a lower end portion of the cylindrical member 1044, and a lower cylinder 1046b screwed on an upper end portion of the upper cylinder 1046a. A lens 1047 is held between the lower end of the upper cylinder 1046a and an inner shoulder of the lower cylinder 1046b.

The protective cylinder 1050 is made of a transparent synthetic resin or like material and has an annular groove 1053 formed in the outer periphery of the upper end portion thereof. As shown in FIGS. 15 and 16, a fork-like arm 1074 is engaged in the annular groove 1053. The arm 1074 is coupled to a rod 1071 of an air cylinder 1070 which is mounted on the head bracket 1018 via a cylinder bracket 1072. The protective cylinder 1050 can be driven by the air cylinder 1070 for movement along the outer periphery of the lens mounting cylinder 1046 between a raised position (or retreated position) as shown by phantom lines in FIG. 15 and a lowered position (or working position) as shown by solid lines.

As shown in FIG. 15, the protective cylinder 1050 has an air hole 1052 formed in the lower end portion thereof. As shown in FIGS. 15 and 16, an end of an air pipe 1076 is connected to the air hole 1052, the other end of the air pipe 1076 being connected to an air source (not shown) to permit air blowing from the air hole 1052 into the protective cylinder 1050.

As shown in FIG. 16, on the rear side of the laser head 1040, a pipe 1066 extends forwardly of the laser processing machine from the frame 1014. To the front end of the pipe 1066 is connected a suction nozzle 1064 which is located in the vicinity of the laser head 1040 (i.e., lower end of the protective cylinder 1050). The rear end of the pipe 1066 is connected to a duct 1068 disposed in the frame 1014. The duct 1068 is connected to a suction blower (not shown) which can suck air around the lower end of the laser head 1040.

As shown in FIG. 15, the table 1010 has vertically extending through holes 1011 each formed in a portion thereof corresponding to each laser head. 1040. Each of the holes 1011 is closed by a beam plate 1020 mounted on top of the table 1010. As shown in FIGS. 15 to 17, the beam plate 1020 has a beam hole 1020 through which the laser beam irradiated from the laser head 1040 is passed.

The laser beam irradiated from the laser head 1040 is passed through the beam hole 1022 instead of striking and being reflected by the beam plate 1020, and is blocked by the block 1024 under the table 1010.

As shown in FIGS. 13 and 14, above each laser head 1040, beam guides 1080 and 1081 are mounted on the front of the head bracket 1018. A mirror 1088, which is a full reflection mirror as will be described later, is provided in each of the beam guides 1080. A half reflection mirror (half mirror) is provided in each of the other beam guides 1081. The beam guides 1080 are used in the leftmost and rightmost laser heads 1040 in FIGS. 13 and 14, and the beam guides 1081 are used in the two intermediate laser heads 1040.

FIGS. 15 to 17 show the leftmost laser head 1040 shown in FIGS. 13 and 14 and the associated beam guide 1080. The construction of the beam guide 1080 will be fully described, and the other beam guide 1081 will be described only in connection with the difference in the construction.

As shown in FIGS. 15 and 16, the beam guide 1080 has a mirror support block 1082 secured to the front of the head bracket 1018 and two guide pipes 1086 and 1087 connected to the mirror support block 1082. The two guide pipes 1086 and 1087 are connected to the mirror support block 1082 such that they are perpendicular to each other, one extending in the vertical direction of the machine and the other extending in the transversal direction thereof. That is, the guide pipe 1086 extends downward from the mirror support block 1082, and as shown in FIG. 17, the guide pipe 1086 has an end portion inserted in an opening of the upper end of the cylindrical member 1044 in the laser head 1040. The other guide pipe 1087 extends horizontally from the mirror support block 1082.

Figure 18:
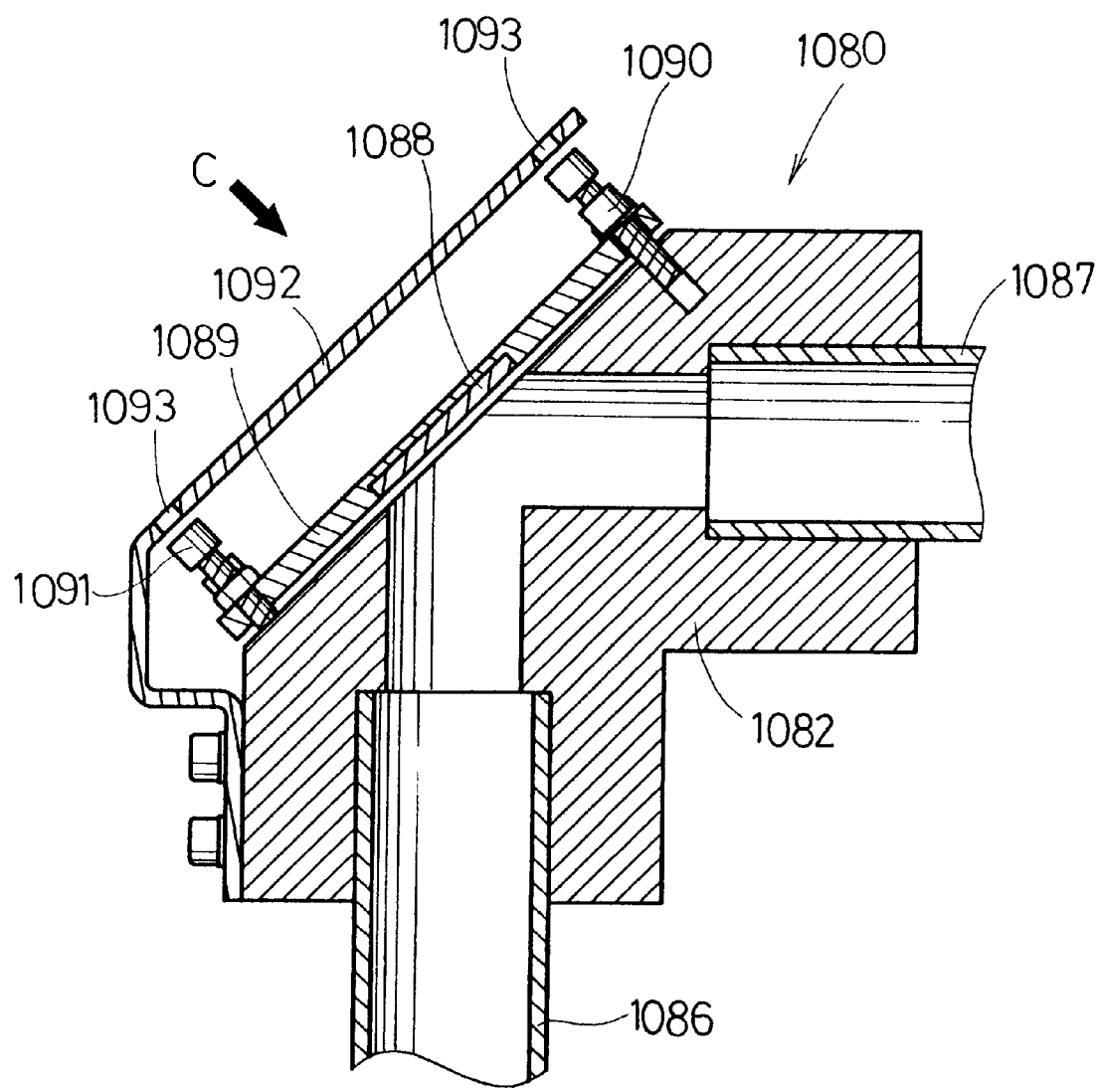
FIG. 18 is a sectional view, on an enlarged scale, showing part of one of beam guides.
Figure 19:
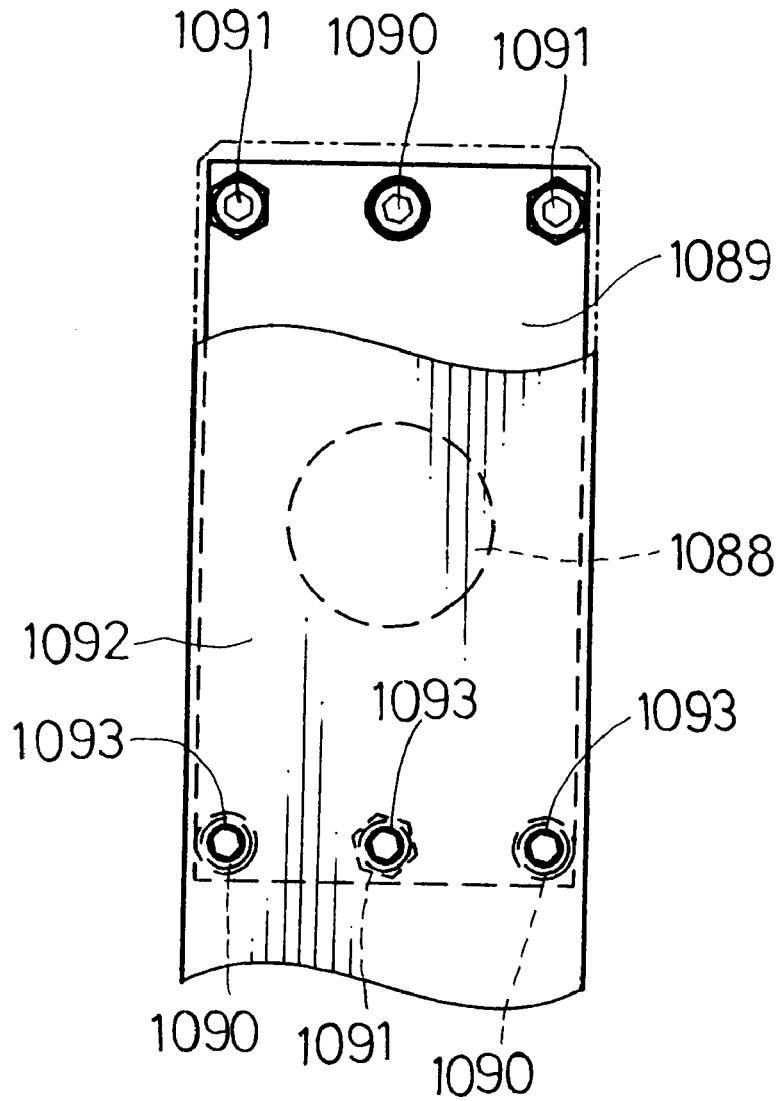
FIG. 19 is a view taken in the direction of arrow C in FIG. 18.

FIG. 18 is a sectional view, on an enlarged scale, showing part of the beam guide 1080, and FIG. 19 is a view taken in the direction of arrow C in FIG. 18. As shown in these drawings, the guide pipes 1086 and 1087 are inserted in a hole bent at right angles in the mirror support block 1082. The mirror support block 1082 is open at the corner of the hole, and a mirror holder 1089 with the total reflection mirror 1088 mounted therein is mounted in the open portion of the mirror support block 1082.

As shown in FIG. 19, the mirror holder 1089 is clamped to the mirror support block 1082 by a total of three set bolts 1090, i.e., a central one in an upper bolt row and left and right ones in a lower bolt row. As shown also in FIG. 19, other three bolts 1091, i.e., left and right ones in the upper bolt row and central one in the lower bolt row, are adjustment bolts with their free ends in contact with the surface of the mirror support block 1082. The tilt of the mirror holder 1089 or the mirror 1088, can be adjusted in correspondence to the extent of turning of the adjustment bolts 1091. After the tilt adjustment, the mirror holder 1089 can be secured to the mirror support block 1082 by tightening the set bolts 1090.

A protective cover 1092 is mounted on the front of the mirror support block 1082 such that it covers the mirror holder 1089 supporting the mirror 1088. The protective cover 1092 serves to protect the operator from the laser beam in the event of detachment of the mirror holder 1089 from the mirror support block 1082. The protective cover 1092 has through holes 1093 in which a tool for turning the set bolts 1090 and the adjustment bolts 1091 is inserted.

Figure 20:
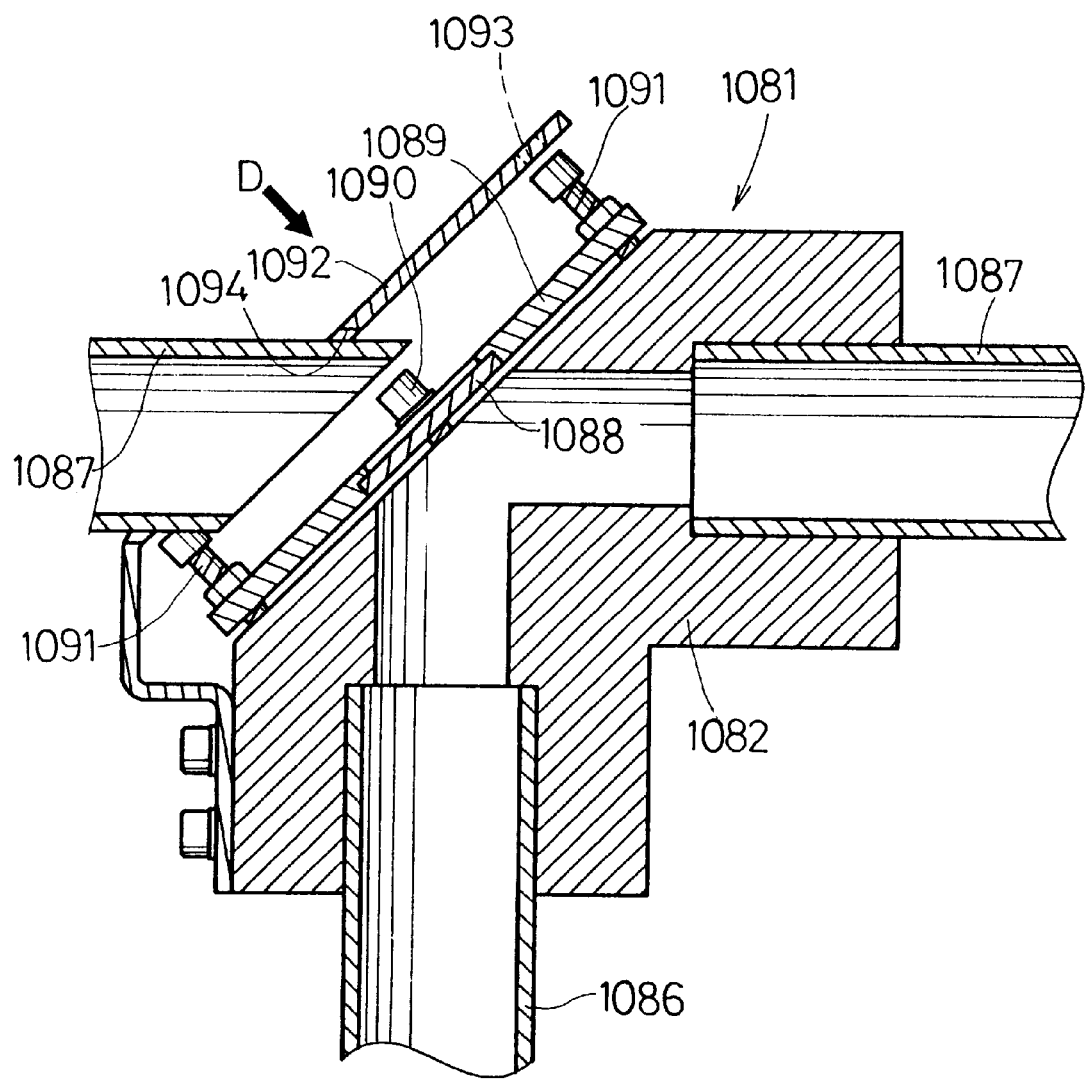
FIG. 20 is a sectional view, on an enlarged scale, showing part of the other beam guide.
Figure 21:
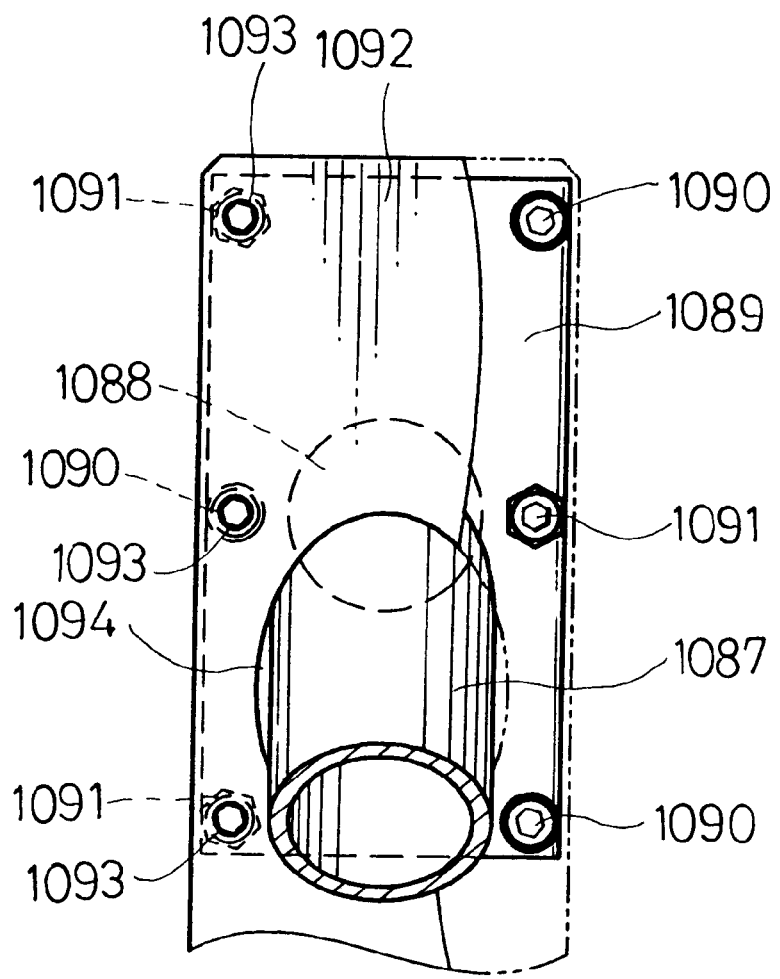
FIG. 21 is a view taken in the direction of arrow D in FIG. 20.

FIG. 20 is a sectional view, on an enlarged scale, showing part of the other beam guide 1081, and FIG. 21 is a view taken in the direction of arrow D in FIG. 20. As shown in these drawings, the beam guide 1081, the mirror holder 1080 with the half reflection mirror 1088 provided therein is clamped to the mirror support block 1082 by three set bolts 1090, i.e., a central one in a left bolt row in FIG. 21 and upper and lower ones in a right bolt row. The tilt of the mirror holder 1089 or the mirror 1088, can be adjusted in correspondence to the extent of turning of three adjustment bolts 1091, i.e., upper and lower ones in the left bolt row in FIG. 21 and central one in the right bolt row. After the tilt adjustment, the mirror holder 1089 is secured to the mirror support block 1082 by tightening the set bolts 1090.

As shown in FIG. 20, the beam guide 1081 has an open portion on the back side of the half reflection mirror 1088 to pass part of the laser beam transmitted therethrough. The protective cover 1092 of the beam guide 1081 also has a through hole 1093 in which a tool for turning the set bolt 1090 or the adjustment bolt 1091 is inserted, and it also has a through hole 1094 in which an end portion of the guide pipe 1087 in the beam guide 1080 is inserted.

As shown in FIG. 17, a blocking device 1110 is provided which can block the laser beam passed through the mirror support block 1082. The blocking device 1110 has a blocking plate 1116 provided on the side of the mirror support block 1082 and a latching solenoid 1114 provided on the rear side of the blocking plate 1116 and secured to the top of the head bracket 1018.

Figure 22A:
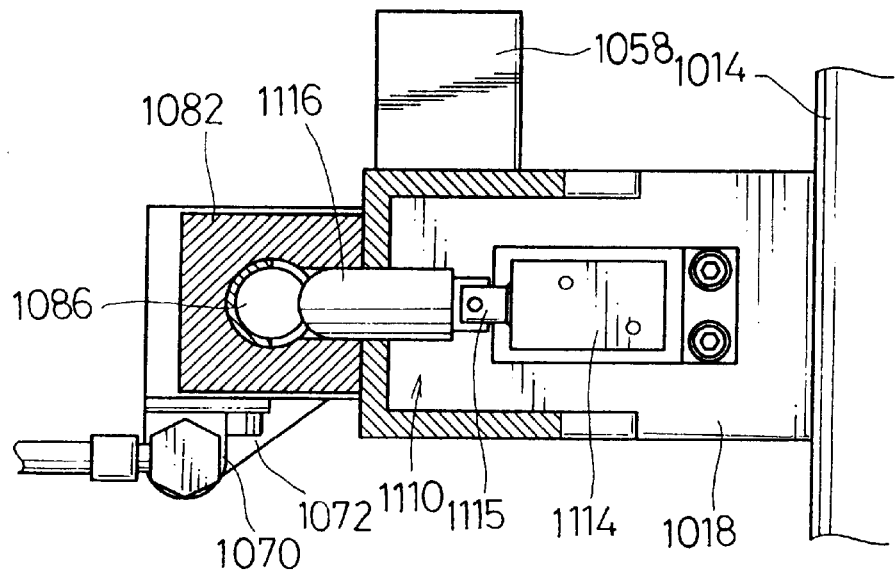
FIG. 22(A) is a sectional view taken along line E—E in FIG. 17, showing a latching solenoid with a rod thereof in a retreated position.
Figure 22B:
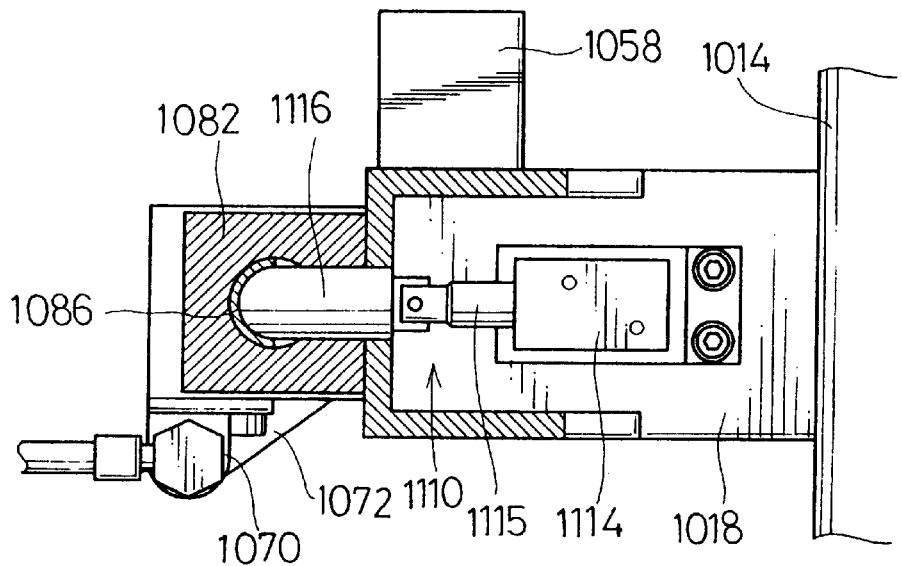
FIG. 22(B) is a sectional view taken along line E—E in FIG. 17, of the latching solenoid with the rod thereof in a projected position.

FIGS. 22(A) and 22(B) are sectional views taken along line E—E in FIG. 17. As shown in these drawings, the blocking plate 1116 can be advanced into the mirror support block 1082 (i.e., into the guide pipe 1086), and has a rear end coupled to a rod 1115 of the latching solenoid 1114. As shown in FIG. 22(A), when the rod 115 of the latching solenoid 1114 is in its retreated position, the blocking plate 1116 is retreated from the guide pipe 1086, and the guide pipe 1086 is open. By contrast, as shown in FIG. 22(B), when the rod 1115 of the solenoid 1114 is in its projected position, the blocking plate 1116 is advanced into the guide pipe 1086, and the guide pipe 1086 is thus closed. When the latching solenoid 1114 is deenergized in either state of FIG. 22(A) or 22(B), it can hold the rod 1115 in that state.

As shown in FIGS. 13 and 14, behind the frame 1014, a laser generator 1100 which is used in common for the laser heads 1040, is disposed such that it extends in the longitudinal direction of the machine. The laser generator 1100 uses a gas laser (i.e., a $CO_2$ laser) capable of continuously irradiating a laser beam, and the laser beam irradiated from a radiation nozzle (not shown) of the laser generator 1100 is distributed to the beam guides 1080 and 1081 of the laser heads 1040.

As shown in FIG. 14, the laser beam irradiated from the laser generator 1100 is supplied to a beam guide 1081A which has substantially the same construction as the beam guide 1081, and is also transmitted through a half reflection mirror in the beam guide 1081A to a beam guide 1080A which has substantially the same construction as the beam guide 1080.

The laser beam that is reflected by the full reflection mirror in the beam guide 1080, is led to a beam guide 1080B which is disposed forwardly of and on the left side of the frame 1014 and which has substantially the same construction as the beam guide 1080, and is reflected by the full reflection mirror in the beam guide 1080B to be supplied to the beam guides 1081 and 1080 of the two laser heads 1040 of the machine on the left side thereof. On the other hand, the laser beam that is reflected by the half reflection mirror in the beam guide 1081A, is led to another beam guide 1080B disposed forwardly of and on the right side of the frame 1014, and is reflected by the full reflection mirror in the beam guide 1080B to be supplied to the beam guides 1081 and 1080 of the two laser heads 1040 of the machine on the right side thereof.

The laser beams supplied to the beam guides 1081 and 1080 of the laser heads 1040, are reflected by the respective full reflection mirrors 1088 and are led into the cylindrical members 1044 in the laser heads 1040. The laser beams are passed through the lenses 1047 to permit laser processing (or cutting) on a work (or cloth) at the focal points of the lenses 1047.

As shown in FIG. 13, a chiller box 1108 is disposed below the table 1010 for cooling the laser generator 1100. A piping (not shown) is provided for circulation of cooling water between the chiller box 1108 and the laser generator 1100. In addition, as shown in FIG. 13, a control panel 1120 for the laser heads 1040 is provided on a front right portion of the frame 1014.

Figure 23:
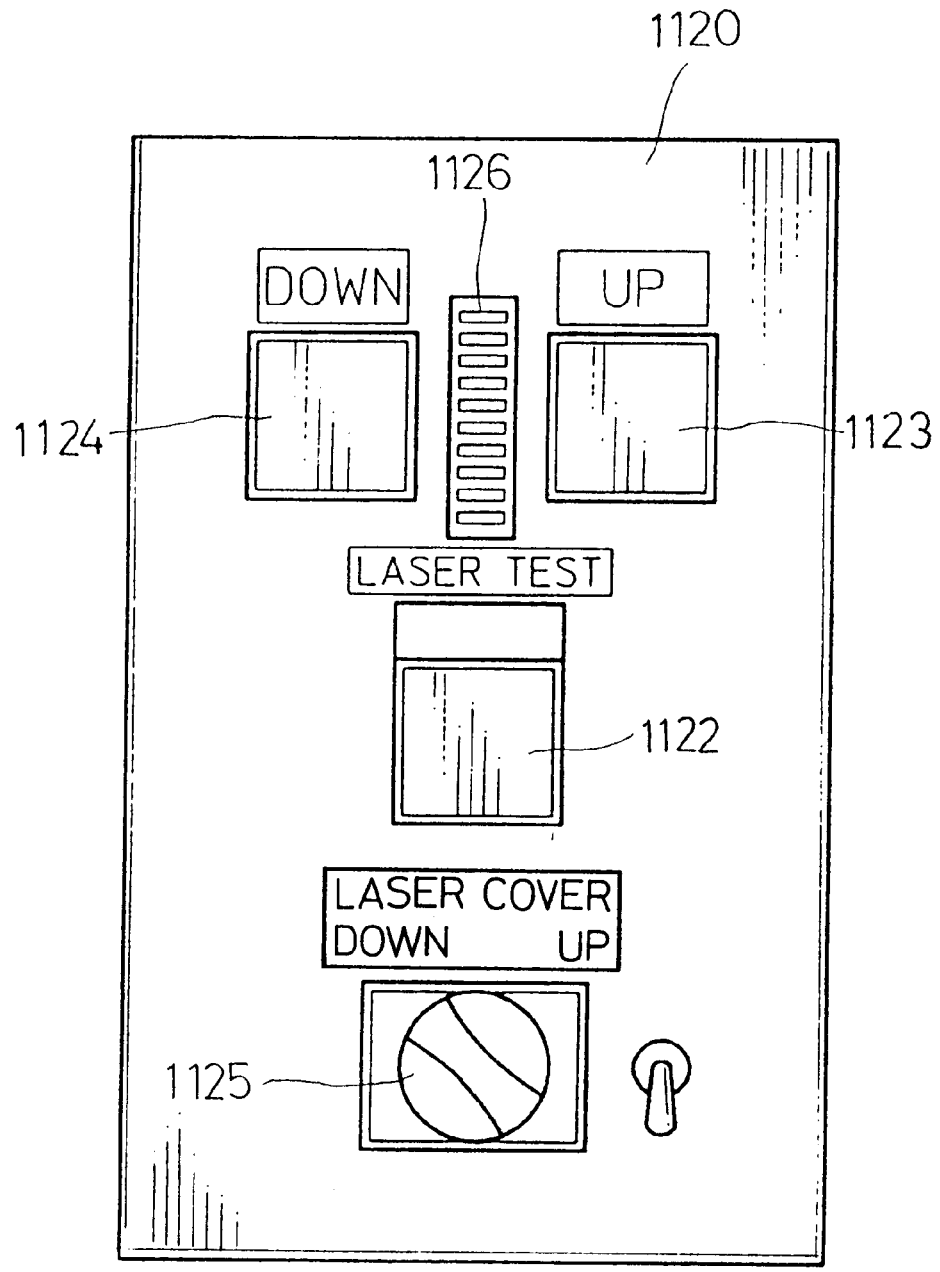
FIG. 23 is an enlarged view of a control panel.
Figure 24:
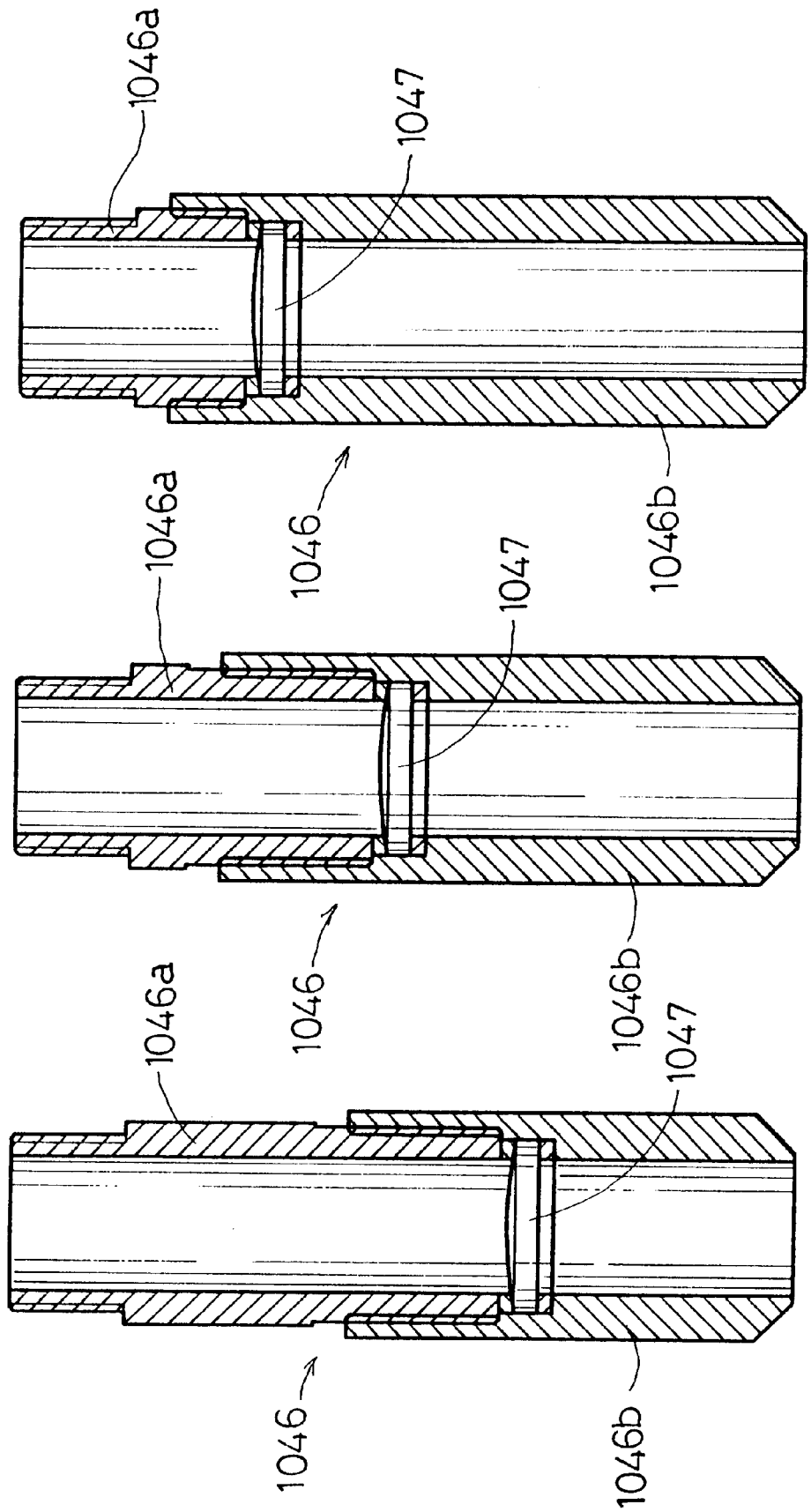
FIG. 24(A) is a sectional view of a lens mounting cylinder in the case of a short focal distance.
FIG. 24(B) is a sectional view of a lens mounting cylinder in the case of a middle focal distance.
FIG. 24(C) is a sectional view of a lens mounting cylinder in the case of a long focal distance.

FIG. 23 is an enlarged view of the control panel 1120. As shown in the drawing, the control panel 1120 has a test switch 1122 for commanding radiation of a laser beam in a case as when adjusting the power level of the laser beam, power-up and power-down switches 1123 and 1124 for adjusting the power level during radiation of the laser beam, a display 1126 for displaying the power level of the laser beam, a lift switch 1125 for commanding the driving of the air cylinder 1070 to raise or lower the protective cylinder 1050 of the laser head 1040, and other switches or the like.

In the operation of the laser processing machine having the above construction, when a main switch (not shown) is turned on, the power is supplied to the laser generator 1100 and the chiller box 1108 to start preheating of the laser generator 1100 and also start circulatory supply of cooling water from the chiller box 1108 to the laser generator 1100. Various adjustments of the laser beam irradiated from the laser generator 1100 will now be described.

Laser beam position adjustment:

(11) The protective cylinder 1050 is lowered from the retreated position to the working position by operating the lift switch 1125 on the control panel 1120.

(12) The test switch 1122 and the power-up switch 1123 on the control panel 1120 are momentarily depressed at a time. As a result, "TEST" mode is set up, and a laser beam of superlow power level is irradiated for a predetermined period of time.

(13) A check is made as to whether the laser beam irradiated from each laser head 1040 properly passes through the center of the beam hole 1022 in the beam plate 1020.

When it is found that the laser beam is deviated from the center of the beam hole 1022, the deviation of the laser beam is corrected by adjusting, for instance, the tilt of the mirror 1088 in each of the beam guides 1080 and 1081 as described above.

Laser beam power level adjustment:

After the operations in (11) to (13) above:

(14) The mode is switched over to "SETTING" mode on an operating panel 1026 of the machine shown in FIGS. 13 and 14.

(15) In this mode, the laser beam is irradiated while the test switch 1122 on the control panel 1120 is held depressed. The status of cutting by the laser beam is thus checked by putting a test cloth on the beam plate 1020.

The power level of the laser beam is gradually increased by holding the test switch 1122 and the power-up switch 1123 depressed simultaneously and is gradually reduced by holding the test switch 1122 and the power-down switch 1124 depressed simultaneously. The power level is displayed on the display 1125.

Focal point adjustment:

After the operations in (11) to (15) above:

(16) "FOCAL POINT ADJUSTMENT" mode is set on the operating panel 1026 of the machine, and the height of each laser head 1040 is adjusted by controlling the driving of the motor 1058 of the lift mechanism 1056 with a drive switch (not shown).

In this way, the focal point of the lens 1047 is adjusted. This adjustment may be done for each laser head 1040. Depending on the work (or cloth), the lens 1047 is suitably replaced with one having a different focal distance. In this case, the lens mounting cylinder 1046 of the laser head 1040 is removed from the cylindrical member 1044 and is replaced with one having a lens 1047 with a different focal distance.

Shown in the sectional views of FIGS. 24(A) to 24(C) are three lens mounting cylinders 1046 with lenses 1047 of different focal distances.

Figure 25:
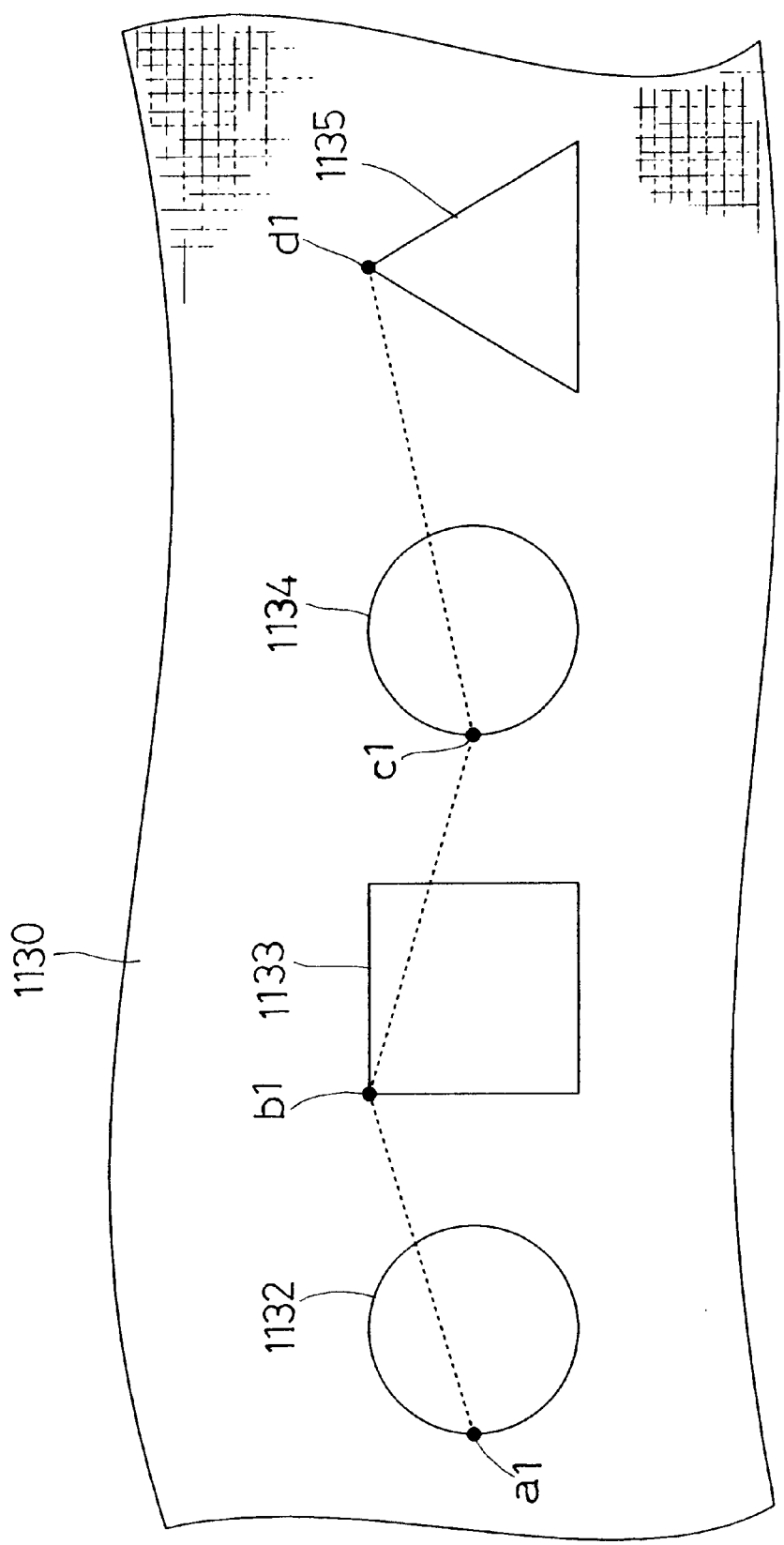
FIG. 25 is a view illustrating an example of laser processing (or cutting)

FIG. 25 shows an example of laser processing (or cutting). Specifically, the drawing shows an example of cutting in which a cloth 1130 as work is cut with four cut patterns 1132 to 1135. In this laser processing, usual embroidering data is used for controlling the work holder 1016 holding the cloth 1130 for movement. This embroidering data permits direct embroidering when it is used for an embroidering machine.

In the embroidering operation, however, the embroidering frame which corresponds to the work holder 1016 has to be moved intermittently since it can be moved only while the needle is separated from the cloth held thereby. In the embroidering, it is only necessary that the needle falls at points as specified by data, and the embroidering frame is not always moved along lines connecting points.

In the laser processing, on the other hand, the work holder 1016 has to be moved continuously at a uniform speed while providing linear interpolation. More specifically, in the laser processing, the work holder 1016 is moved continuously at a uniform speed along lines connecting points specified by data. When the stitch length of the embroidering data is set to be small to some extent, however, the linear interpolation or uniform speed control for controlling the work holder 1016 for movement is unnecessary.

The embroidering data used for laser processing (or cutting) includes special codes which command laser cutting (hereinafter referred to as "laser cut codes"). When a first "laser cut code" in the data is read out, the radiation of the laser beam from the laser head 1040 is started, and when the next "laser cut code" is read out, the radiation of the laser beam is stopped.

With the cut patterns 1132 to 1135 shown in FIG. 25, points a1 to d1 are start points of cutting and also end points of cutting. The embroidering data includes "laser cut codes" at a total of eight positions corresponding to the points a1 to d1.

The laser processing to produce the cut patterns 1132 to 1135 shown in FIG. 25 will now be described First, the work holder 1016 shown in FIG. 25, holding the cloth 1130, is manually moved to bring the point a1 of the cut pattern 1132 to a position right above the beam hole 1022 located below each laser head 1040. Subsequently, when the machine is started, each protective cylinder 1050 is lowered from the retreated position as shown by phantom lines in FIG. 15 to the working position as shown by solid lines. Then, air blowing into the protective cylinder 1050 through the air pipe 1076 and air suction by the suction nozzle 1064 shown in FIG. 16 are started. As shown in FIG. 22(A), the guide pipe 1086 in each of the beam guides 1080 and 1081 is then opened by driving the latching solenoid 1114 of each blocking device 1110.

The movement control of the work holder 1016 is then started, and the laser beam is irradiated from each laser head 1040 in response to the reading of the first "laser cut code" corresponding to the point a1 of the cut pattern 1132. Also, the work holder 1016 is controlled for movement at a uniform speed along the cut pattern 1132, and this portion is cut away in the position where each laser head 1040 is located.

When the second "laser cut code" corresponding to the point a1 at the end of the cutting is read out, radiation of the laser beam is stopped. Subsequently, the work holder 1016 is controlled for movement to bring the point b1 of the cut pattern 1133 to a position right above the beam hole 1022. Thus, the cloth 1130 is not cut between the points a1 and b1.

The radiation of the laser beam is started again in response to the reading of the third "laser cut code" corresponding to the point b1 of the cut pattern 1133. At the same time, the work holder 1016 is controlled for movement at a uniform speed along the cut pattern 1133, and this portion is thus cut away in the position where each laser head 1040 is located.

In response to the reading of the fourth "laser cut code" corresponding to the point b1 at the end of cutting of the cut pattern 1133, the radiation of the laser beam is stopped, and also the work holder 1016 is controlled for movement to bring the point c1 of the cut pattern 1134 to a position right above the beam hole 1022.

In the above way, the cut patterns 1134 and 1135 are produced successively at each laser head 1040. As shown in FIG. 22(B), in response to the reading of the eighth "laser cut code" corresponding to the point d1 at the end of cutting of the last cut pattern 1135, the latching solenoid 1114 of the blocking device 1110 is driven to close the guide pipe 1086 in each of the beam guides 1080 and 1081, and then each protective cylinder 1050 is raised to the retreated position as shown by phantom lines in FIG. 15.

The air blowing into the protective cylinder 1050 and the air suction by the suction nozzle 1064 are discontinued whenever radiation of the laser beam is stopped.

The air blowing into the protective cylinder 1050 during the above laser cutting, has an effect of extinguishing a flame generated as the cloth 1130 is scorched by the laser beam, and smoke is blown out through the clearance between the lower end of the protective cylinder 1050 and the cloth 1130 to the outside. The blown-out smoke is sucked by the suction nozzle 1064 for disposal.

As an alternative construction, the protective cylinder 1050 and a suction duct 1068 shown in FIG. 16 may be connected to each other with a pipe or the like, so that air is sucked from the protective cylinder 1050 during laser cutting. With this construction, air is sucked through the clearance between the lower end of the protective cylinder 1050 and the cloth 1130 into the protective cylinder 1050, and an air stream thus generated extinguishes the flame, while at the same time blowing out the smoke.

Since the blocking device 1110 is provided for each of the beam guides 1080 and 1081, the radiation of the laser beam from each laser head 1040 can be blocked individually through independent control of each associated latching solenoid 1114. This means that even when a single laser generator 1100 is used in common for the laser heads 1040, it is possible, if necessary, to set radiation or cutoff (i.e., suspension) of the laser beam for each laser head 1040.

According to the second embodiment, it is possible to increase the number of laser heads in a multiple laser head laser processing machine while permitting reduction in cost.

Third Embodiment

A third embodiment will now be described with reference to FIGS. 26 to 43. This embodiment is an application of the invention to a multiple head embroidering machine having laser heads corresponding in number to the number of sewing heads.

Figure 26:
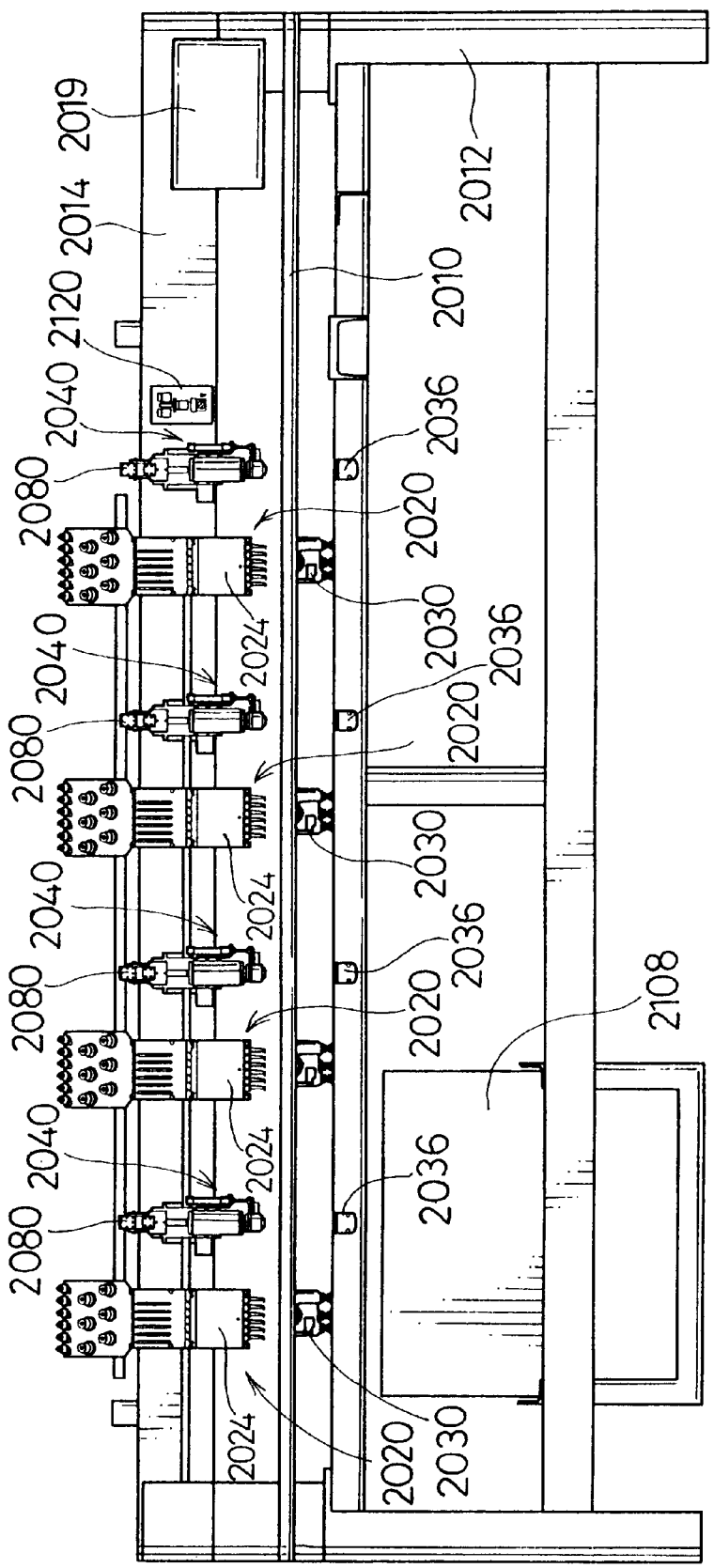
FIG. 26 is a front view of an embroidering machine.
Figure 27:
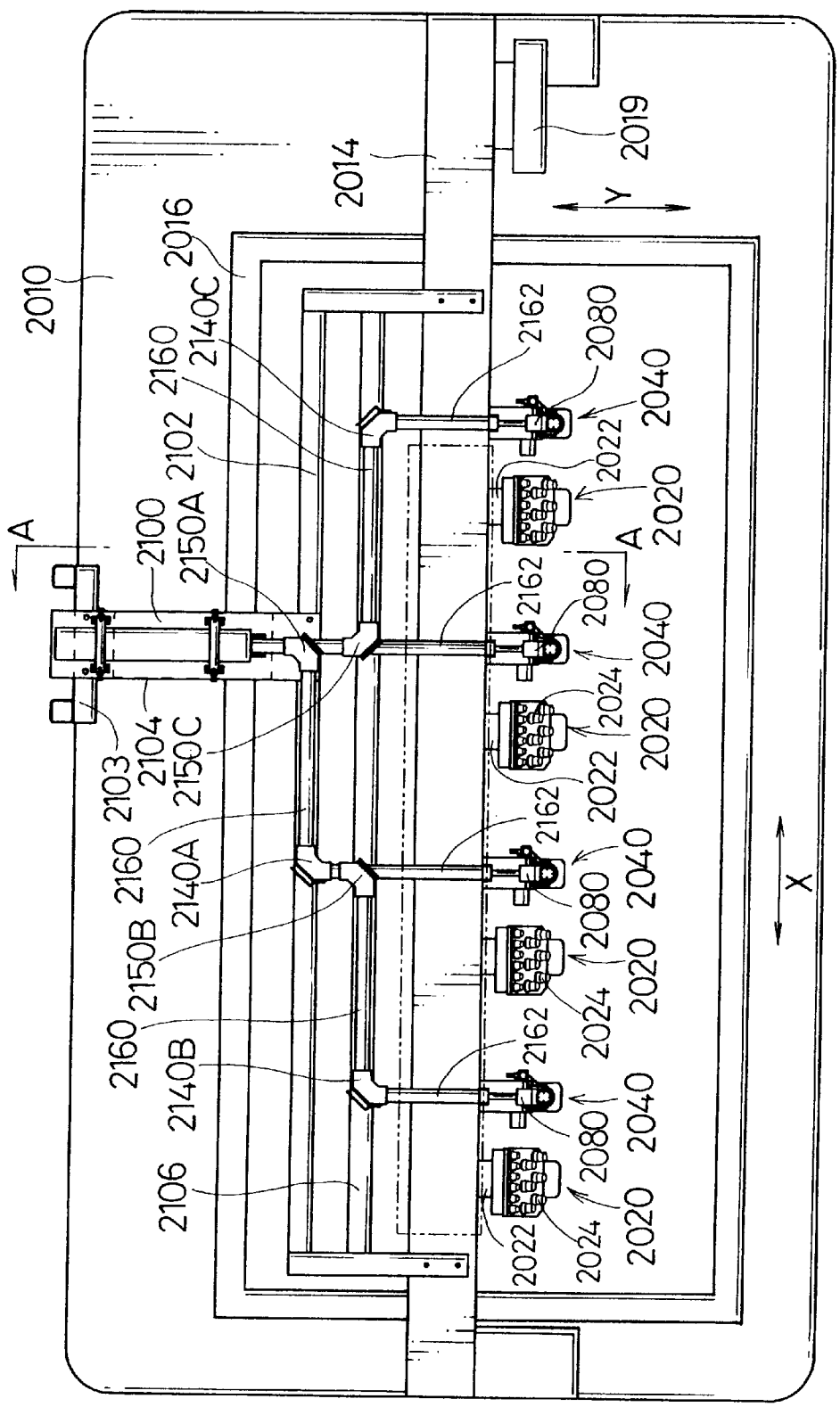
FIG. 27 is a plan view of FIG. 26.

FIG. 26 is a front view of the embroidering machine, and FIG. 27 is a plan view of FIG. 26. As shown in these drawings, the machine has four sewing heads 2020 which are disposed at a uniform interval in front of a machine frame 2014 located above a machine table 2010. The machine also has laser heads 2040 corresponding in number to the sewing heads 2020 (i.e., four) and disposed in front of the machine frame 2014. Each laser head 2040 is disposed with a predetermined spacing to the right from each sewing head 2020.

On top of the machine table 2010, an embroidering frame 2016 as a work holder for holding a work (or cloth) to be described later, is provided such that it can be controlled for movement in X- and Y-axis directions in FIG. 27 according to predetermined movement data (or embroidering data). As shown in FIG. 26, a horizontal frame supported between opposite table legs 2012 on the underside of the machine table 2010, supports shuttle bases 2030 each located at a position corresponding to each sewing head 2020, and also supports on the front thereof steel blocks 2036 each located at a position corresponding to each laser head 2040 for blocking a laser beam irradiated from each laser head 2040.

Each sewing head 2020 has a needle bar case 2024 which is supported by the front of a machine arm 2022 secured to the machine frame 2014 such that it is slidable in the transversal direction of the machine. The sewing head 2020 in this embodiment is of a multiple needle (i.e., six needle) type, and in the needle bar case 2024, six needle bars (not shown) each with a needle provided in the lower end portion thereof are supported for vertical movement.

As is well known in the art, by sliding the needle bar case 2024 of each sewing head 2020 by a drive source at a time in the same direction, one of the needle bars is selected, and only the selected needle bar is vertically driven together with its associated needle.

Figure 28:
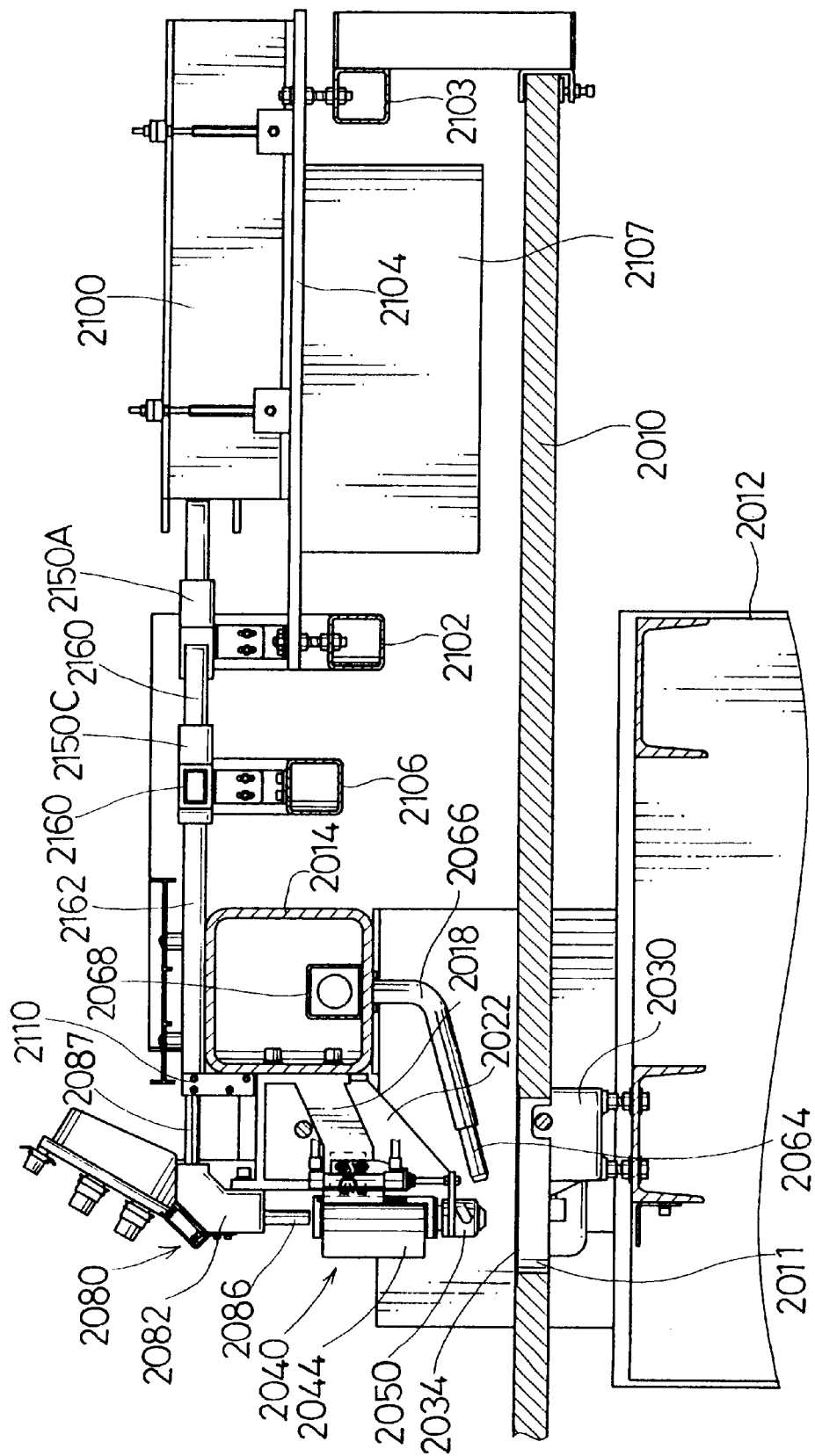
FIG. 28 is a side view taken along line A—A in FIG. 27.
Figure 29:
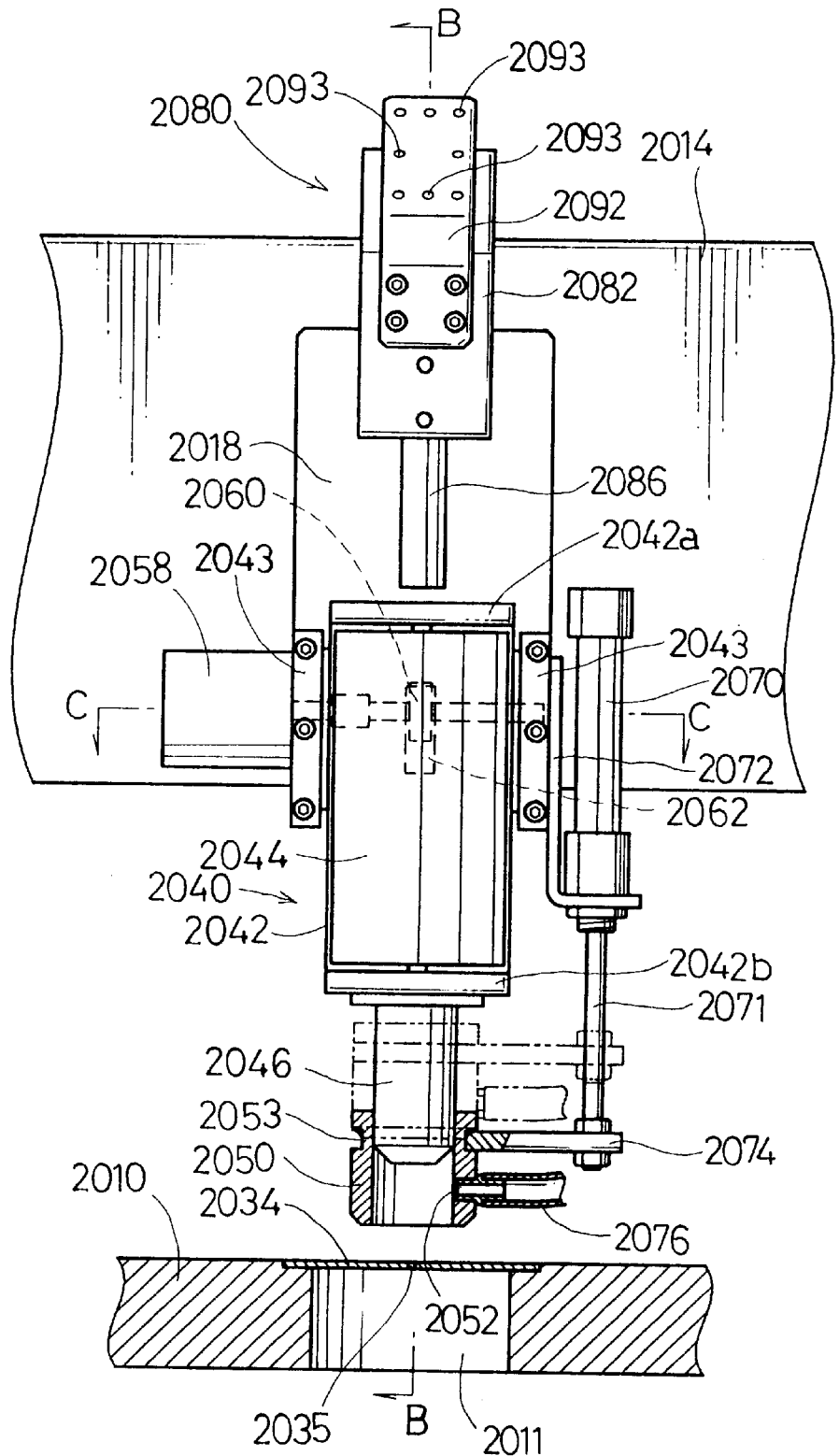
FIG. 29 is a front view, on an enlarged scale, of one of laser heads and its peripheral parts.
Figure 30:
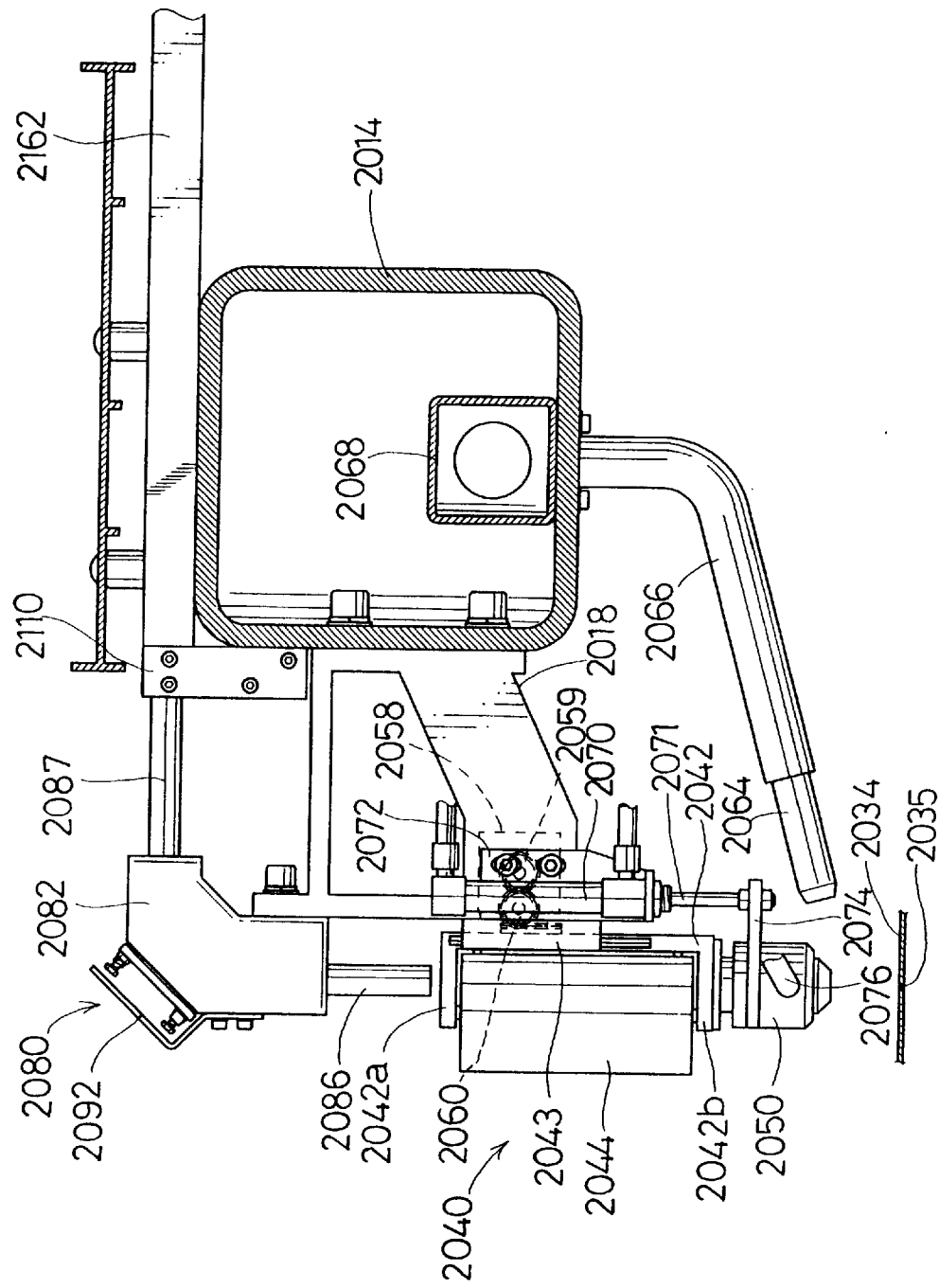
FIG. 30 is a side view of FIG. 29.
Figure 31:
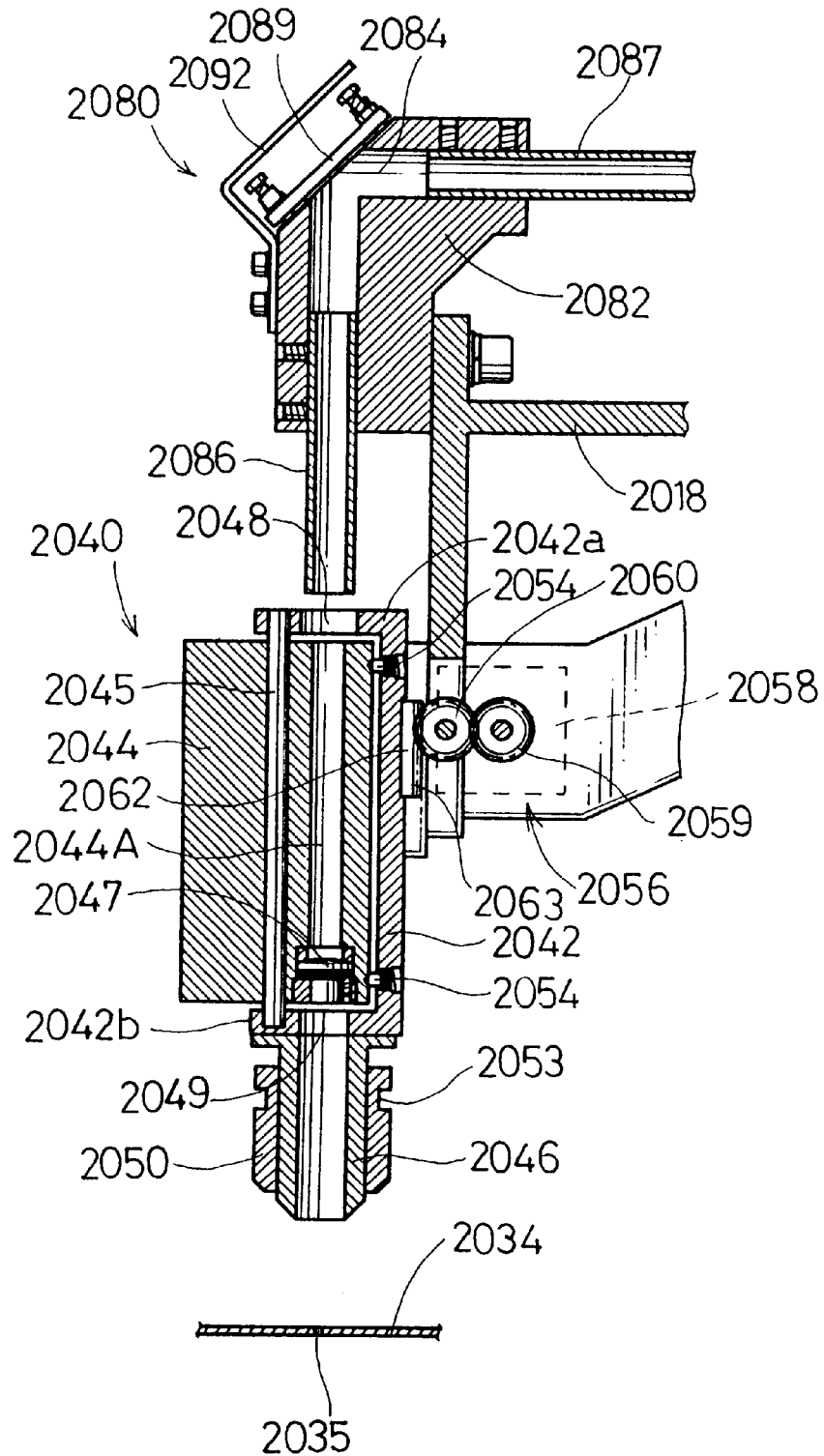
FIG. 31 is a sectional view taken along line B—B in FIG. 29.

FIG. 28 is a side view taken along line A—A in FIG. 27, FIG. 29 is a front view, on an enlarged scale, of one laser head 2040 and its peripheral parts, FIG. 30 is a side view showing part of FIG. 29, and FIG. 31 is a sectional view taken along line B—B in FIG. 29.

As shown in these drawings, the laser head 2040 has a support 2042 supported for vertical movement on a front lower portion of a bracket 2018, a lens rack 2044 mounted on the support 2042, a guide cylinder 2046 coupled to a lower portion of the support 2042, and a protective cylinder 2050 mounted for vertical movement on the outer periphery of the guide cylinder 2046. As shown in FIGS. 30 and 31, the bracket 2018 is bolted to the front of the machine frame 2014.

Figure 32:
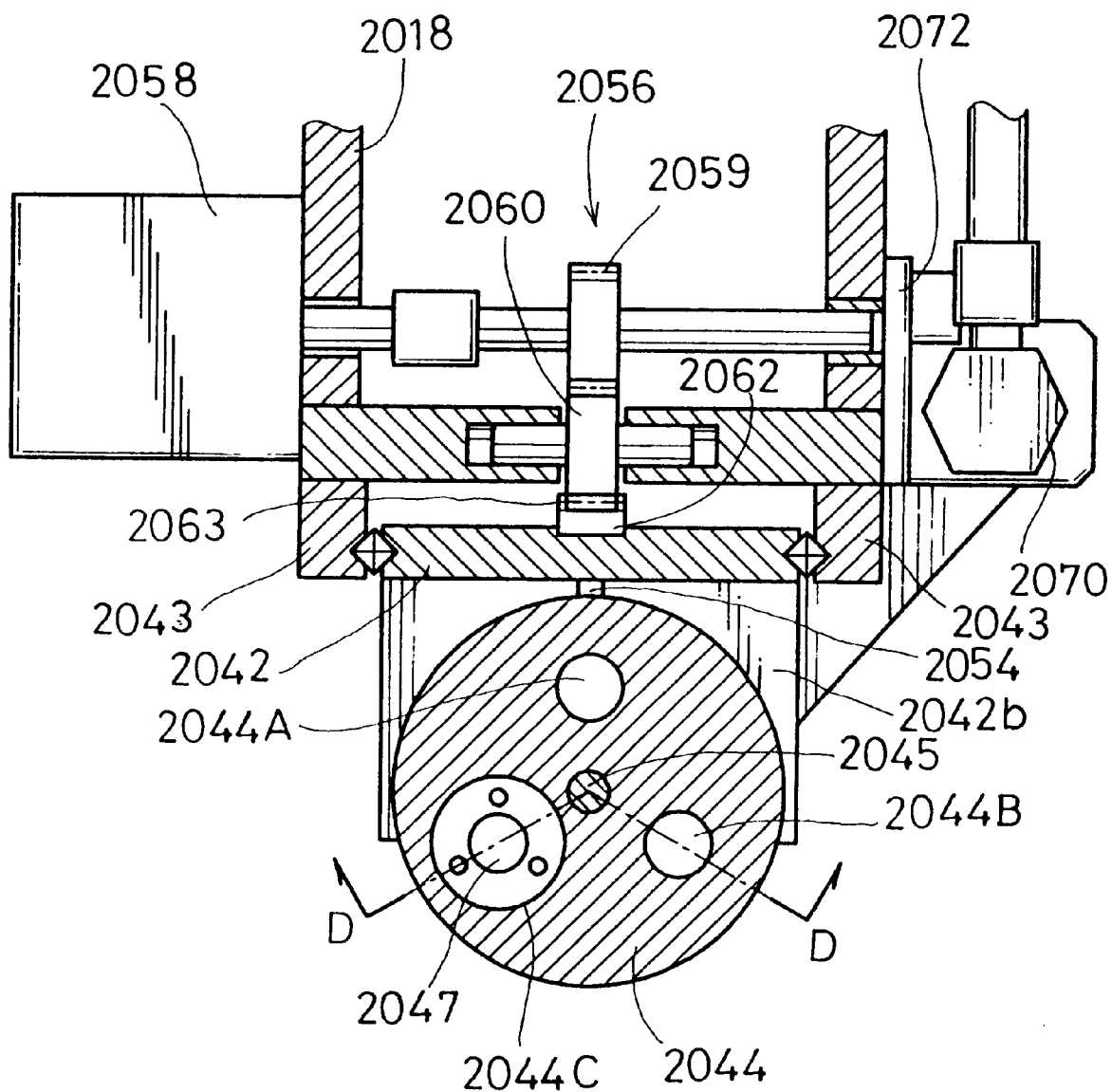
FIG. 32 is an enlarged sectional view taken along line C—C in FIG. 29.
Figure 33:
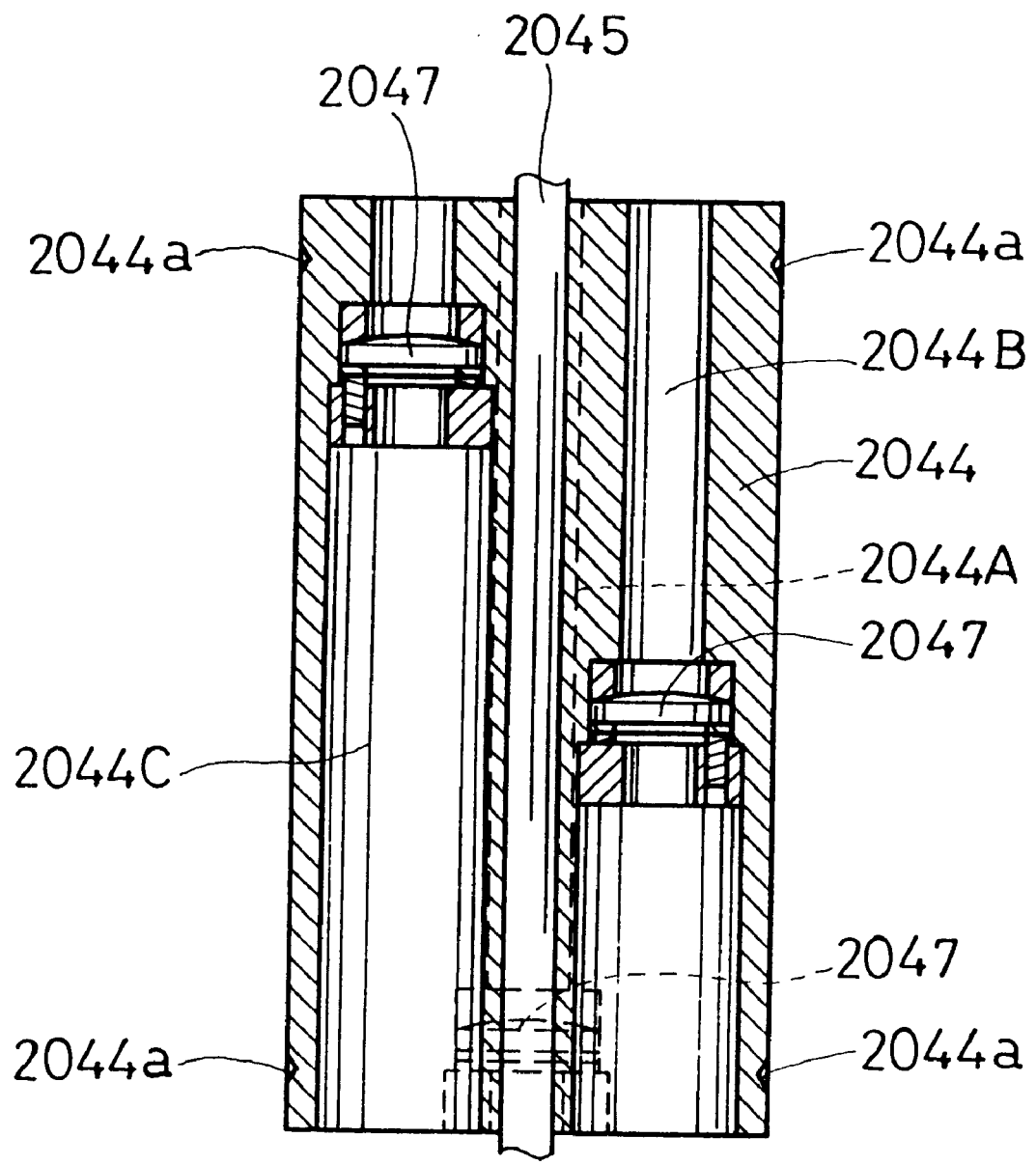
FIG. 33 is a sectional view taken along line D—D in FIG. 32.

FIG. 32 is an enlarged sectional view taken along line C—C in FIG. 29, and FIG. 33 is a sectional view taken along line D—D in FIG. 32. As shown in these drawings, the support 2042 is supported on the bracket 2018 such that it can be moved vertically along rails 2043 secured to the opposite sides of the front of the bracket 2018. The support 2042 can be driven for vertical movement by a lift mechanism 2056.

The construction of the lift mechanism 2056 will now be described mainly with reference to FIGS. 31 and 32. The mechanism has a motor 2058 as a drive source mounted on a side wall of the bracket 2018. The motor 2058 has a shaft which in turn has a drive gear 2059 secured thereto. The drive gear 2059 is meshed with an intermediate gear 2060 supported for rotation on a front wall portion of the bracket 2018. The intermediate gear 2060 is meshed with rack teeth 2063 of a rack 2062 secured to the back of the support 2042. When the motor 2058 is driven for forward and reverse rotations, the support 2042 is raised and lowered by the meshing engagement of the drive gear 2059, the intermediate gear 2060 and the rack teeth 2063 of the rack 2062.

The lens rack 2044 is cylindrical in shape and is supported by a shaft 2045 penetrating the center thereof such that it can be rotated relative to upper and lower horizontal portions 2042a and 2042b of the support 2042. As shown in FIGS. 32 and 33, the lens rack 2044 has three vertically extending through holes 2044A, 2044B and 2044C formed in circumferentially spaced-apart portions centered on the shaft 2045. Lenses 2047 having different focal distances are each assembled in each of the holes 2044A, 2044B and 2044C. The focal distances of the lenses 2047 are set from "large" to "small" in the order of the holes 2044A, 2044B and 2044C.

As shown in FIG. 31, the upper and lower horizontal portions 2042a and 2042b of the support 2042 have respective through holes 2048 and 2049 which can be aligned to one of the holes 2044A, 2044B and 2044C of the lens rack 2044. One of the lenses 2047 to be used can be selected by aligning one of the holes 2044A, 2044B and 2044C to the through holes 2048 and 2049 by manually turning the lens rack 2044 about the axis of the shaft 2045.

Figure 34:
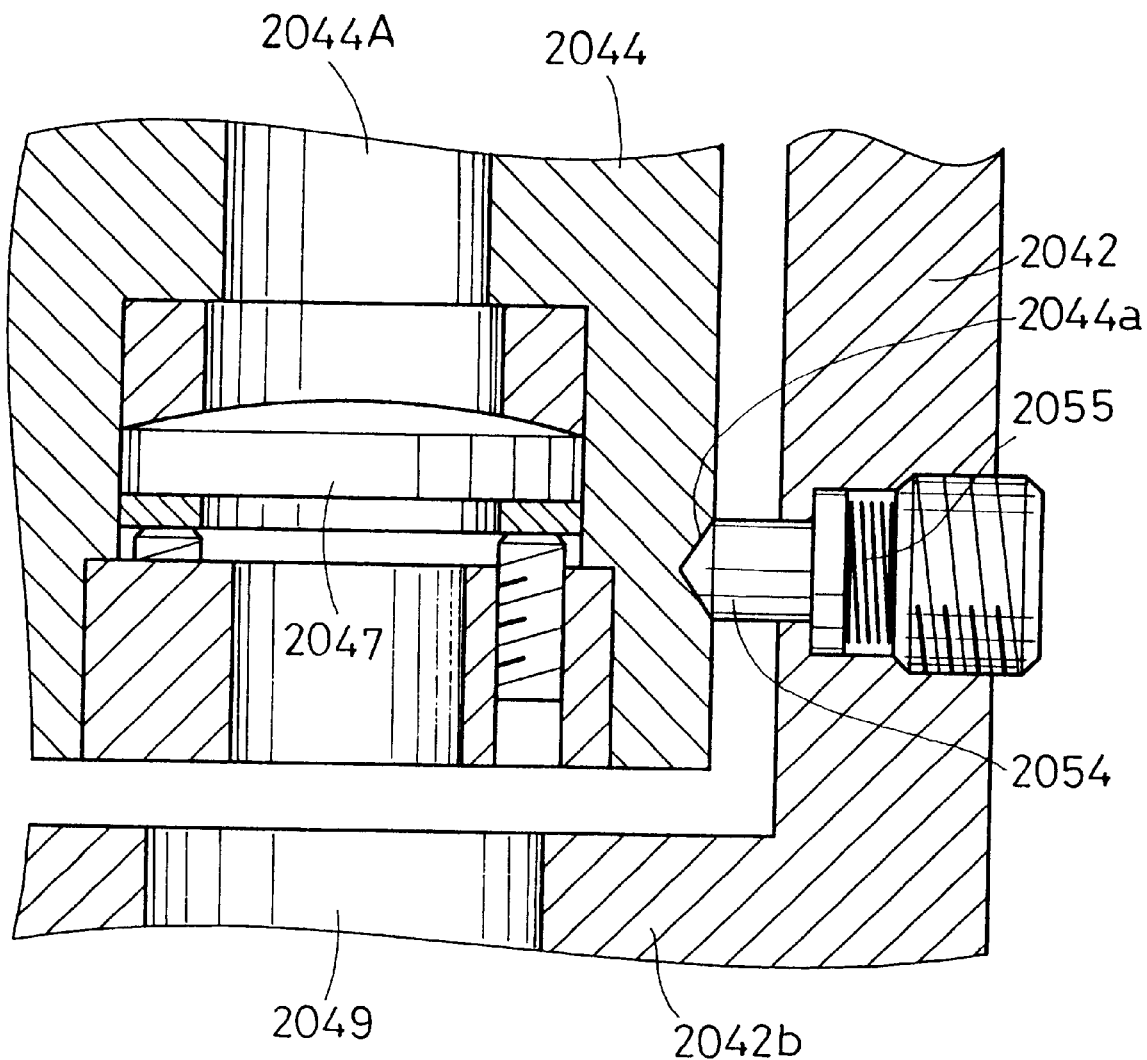
FIG. 34 is an enlarged sectional view showing part of FIG. 31.

FIG. 34 is an enlarged sectional view showing part of FIG. 31. As shown in FIGS. 34 and 31, the support 2042 has two lock pins 2054 provided in upper and lower portions thereof and each biased by a spring 2055 toward the lens rack 2044. As shown in FIG. 34, one of the holes 2044A, 2044B and 2044C is aligned to the through holes 2048 and 2049 of the support 2042 by turning the lens rack 2044, each lock pin 2054 is engaged in a recess 2044a formed in the outer periphery of the lens rack 2044, and the lens rack 2044 is thus locked against rotation (or positioned).

As shown in FIG. 31, the guide cylinder 2046 is secured to the underside of the lower horizontal portion 2042b of the support 2042 such that it is aligned to the through hole 2049 of the horizontal portion 2042b. The protective cylinder 2050 which is mounted for vertical movement on the outer periphery of the guide cylinder 2046, is made of a transparent synthetic resin or like material, and has an annular groove 2053 formed in the outer periphery of the upper end portion thereof. As shown in FIGS. 28 to 30, a fork-like arm 2074 is engaged in the annular groove 2053 and is coupled to a rod 2071 of an air cylinder 2070 extending downwardly and mounted on the bracket 2018 via a cylinder bracket 2072. The protective cylinder 2050 thus can be driven by the air cylinder 2070 for movement along the outer periphery of the guide cylinder 2046 between a raised position (or retreated position) as shown by phantom lines in FIG. 29 and a lowered position (or working position) as shown by solid lines.

As shown in FIG. 28, the protective cylinder 2050 has an air hole 2052 formed in the lower end portion thereof. As shown in FIGS. 29 and 30, an air pipe 2076 is connected at one end to the air hole 2052 and at the other end to an air source (not shown), and air can be blown through the air hole 2052 into the protective cylinder 2050.

As shown in FIGS. 28 and 30, on the rear side of the laser head 2040, a pipe 2066 extends forwardly of the machine from the machine frame 2014. To the front end of the pipe 2066 is connected a suction nozzle 2064 which is located adjacent the lower end of the laser head 2040 (i.e., the lower end of the protective cylinder 2050). The rear end of the pipe 2066 is connected to a duct 2068 which is disposed in the machine frame 2014. The duct 2068 is connected to a suction blower (not shown) so that air around the lower end of the laser head 2040 can be sucked out.

As shown in FIGS. 28 and 29, the machine table 2010 has vertically extending through holes 2011 each formed in a portion thereof corresponding to each laser head 2040. Each of the holes 2011 is closed by a beam plate 2034 mounted on top of the table 2010. As shown in FIGS. 29 to 31, the beam plate 2034 has a beam hole 2035 for passing a laser beam therethrough. The laser beam irradiated from the laser head 2040 is passed through the beam hole 2035 without being reflected by the beam plate 2034 and is blocked by the block 2036 under the machine table 2010.

Above the laser head 2040, a beam guide 2080 is mounted on the front of the bracket 2018. As shown in FIGS. 30 and 31, the beam guide 2080 has a mirror support block 2082 and two guide pipes 2086 and 2087 connected thereto. The mirror support block 2082 is bolted to the front of the bracket 2018.

The two guide pipes 2086 and 2087 are connected to the mirror support block 2082 such that they are perpendicular to each other, one extending in the vertical direction of the machine and the other extending in the transversal direction thereof. Specifically, the guide pipe 2086 extends downward from the mirror support block 2082, and has a free end facing a through hole 2048 formed in the upper horizontal portion 2042a of the support 2042 of the laser head 2040. The other guide pipe 2087 extends rearwardly of the machine from the mirror support block 2082.

Figure 35:
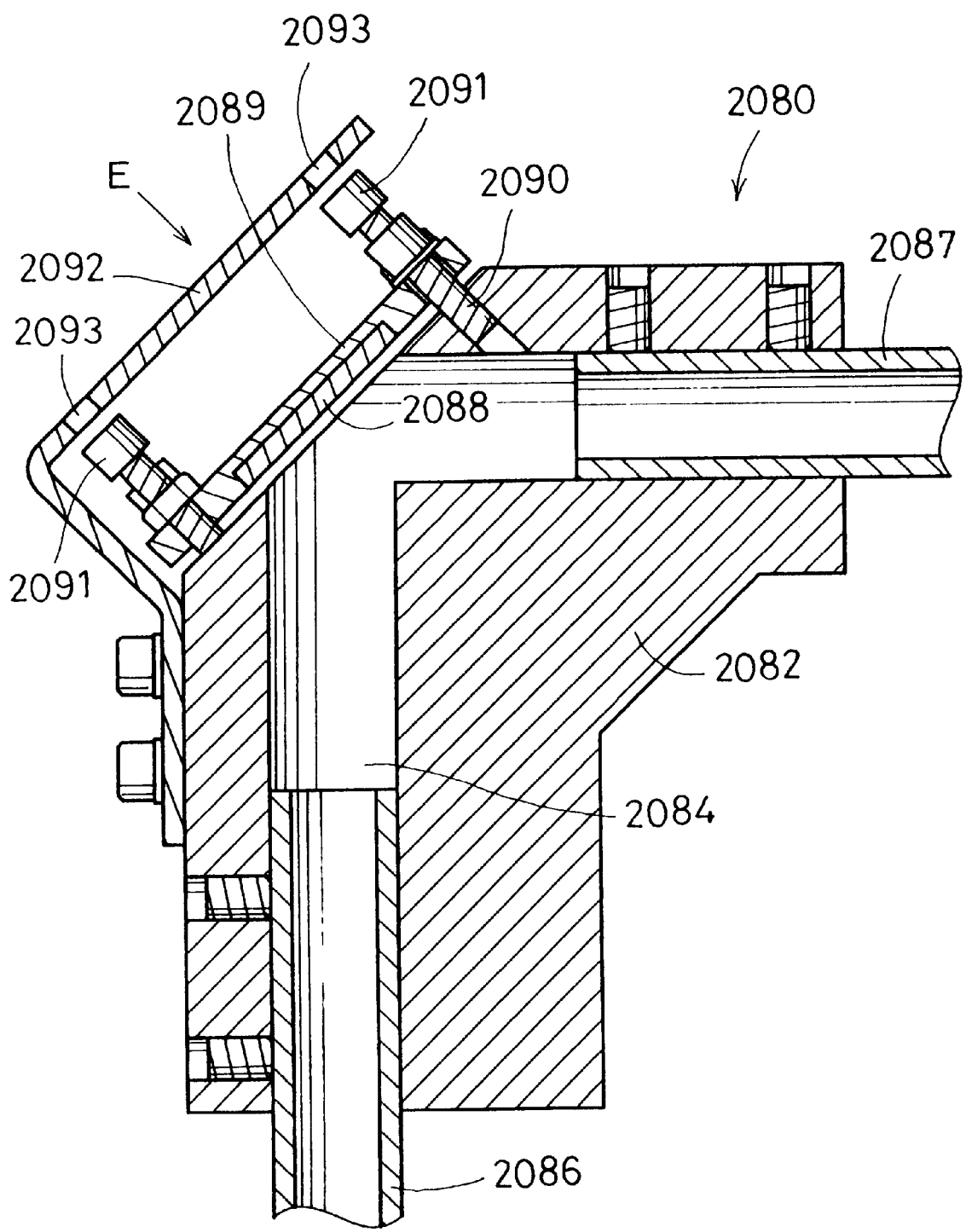
FIG. 35 is a sectional view, on an enlarged scale, showing part of a beam guide.
Figure 36:
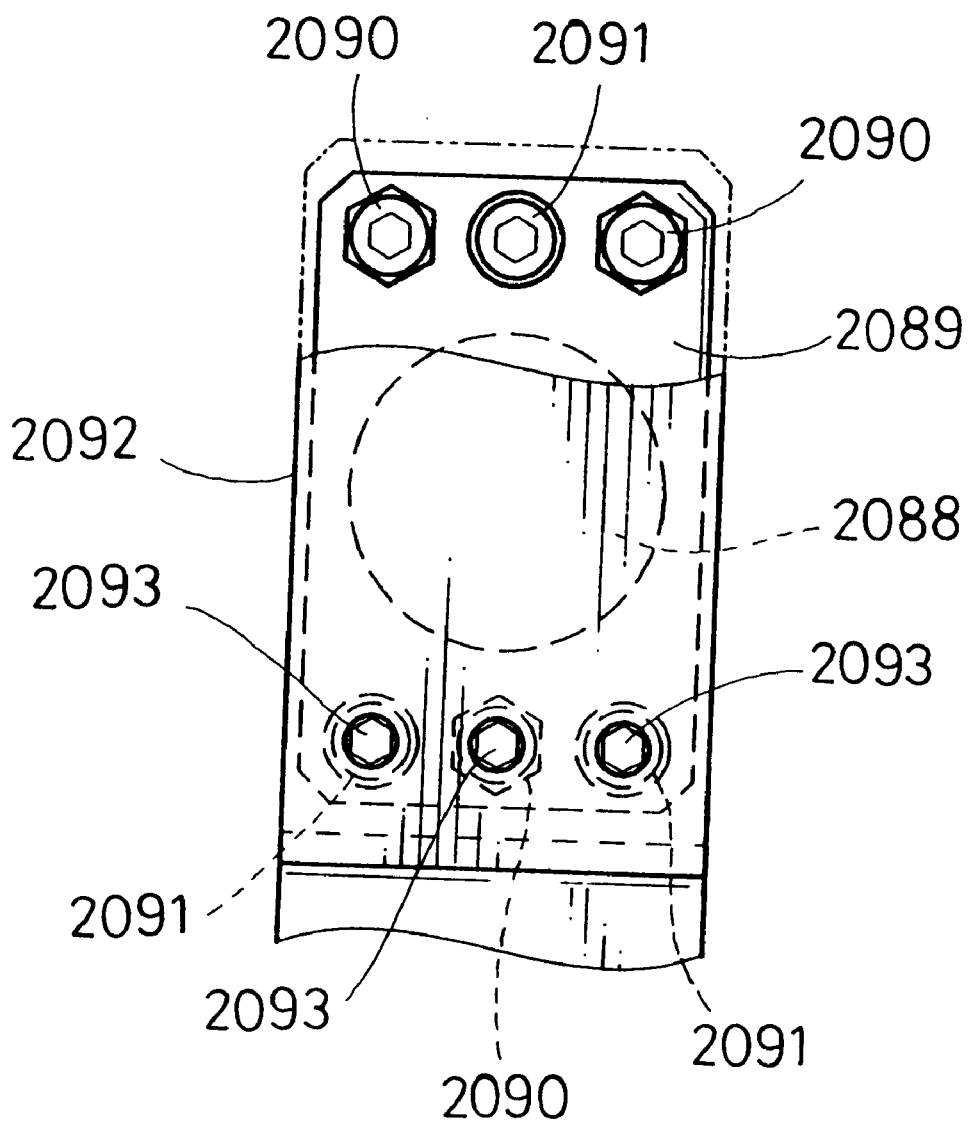
FIG. 36 is a view taken in the direction of arrow E in FIG. 35.

FIG. 35 is a sectional view, on an enlarged scale, showing part of the beam guide 2080, and FIG. 36 is a view taken in the direction of arrow E in FIG. 35. As shown in these drawings, the two guide pipes 2086 and 2087 are inserted from the opposite ends of a communication hole 2084 which is formed in the mirror support block 2082 and which is bent at right angles. At the corner of the communication hole 2084, the mirror support block 2082 is open, and a mirror holder 2089 with a full reflection mirror 2088 provided therein is mounted in the open portion of the mirror support block 2082.

As shown in FIG. 36, the mirror holder 2089 is clamped to the mirror support block 2082 by three set bolts 2090, i.e., left and right ones in an upper bolt row and a central one in a lower bolt row. As shown in FIG. 36, three adjustment bolts 2091, i.e., a central one in the upper bolt row and left and right ones in the lower bolt row, each have a free end in contact with the surface of the mirror support block 2082. The tilt of the mirror holder 2089 or the mirror 2088, can be adjusted in correspondence to the extent of turning of the adjustment bolts 2091. After the adjustment, the mirror holder 2089 is secured to the mirror support block 2082 by tightening the set bolts 2090.

A protective cover 2092 is mounted on the front of the mirror support block 2082 such that it covers the mirror holder 2089 supporting the mirror 2088. The protective cover 2092 serves to protect the operator from the laser beam in the event of detachment of the mirror holder 2089 from the mirror support block 2082. The protective cover 2092 has through holes 2093 in which a tool for turning the set bolts 2090 and the adjustment bolts 2091 is inserted.

As shown in FIGS. 27 and 28, behind the machine frame 2014, a laser generator 2100 which is used in common for the laser heads 2040, is disposed such that it is directed in the transversal direction of the machine. The laser generator 2100 uses a gas laser (i.e., $CO_2$ laser) capable of continuously irradiating a laser beam. The laser beam irradiated from a radiation nozzle (not shown) of the laser generator 2100 is distributed to the beam guide 2080 of each laser head 2040. The laser beam that has entered each beam guide 2080 strikes the mirror 208 and reflects downward to be led to one of the holes 2044A, 2044B and 2044C of the lens rack 2044 in the laser head 2040, thus permitting laser processing (such as cutting) on a work (or cloth) at the focal point of the lens 2047.

As shown in FIG. 28, the laser generator 2100 is set on and secured to the top of a support 2104 which is supported horizontally by a support frame 2102 secured to the machine frame 2014 and a support frame 2103 secured to the rear end of the machine table 2010. A controller 2107 for the laser generator 2100 is mounted on the underside of the support 2104. As shown in FIG. 26, below the machine table 2010, a chiller box 2108 is disposed for cooling the laser generator 2100.

As shown in FIG. 27, the laser beam irradiated from the laser generator 2100 is led to the respective beam guides 2080 along optical paths which are formed mainly by beam guides 2140A, 2140B and 2140C of full reflection type, beam guides 2150A, 2150B and 2150C of half reflection type, connecting pipes 2160 connecting the beam guides, and guide pipes 2162 extending toward the beam guides 2080.

Figure 37:
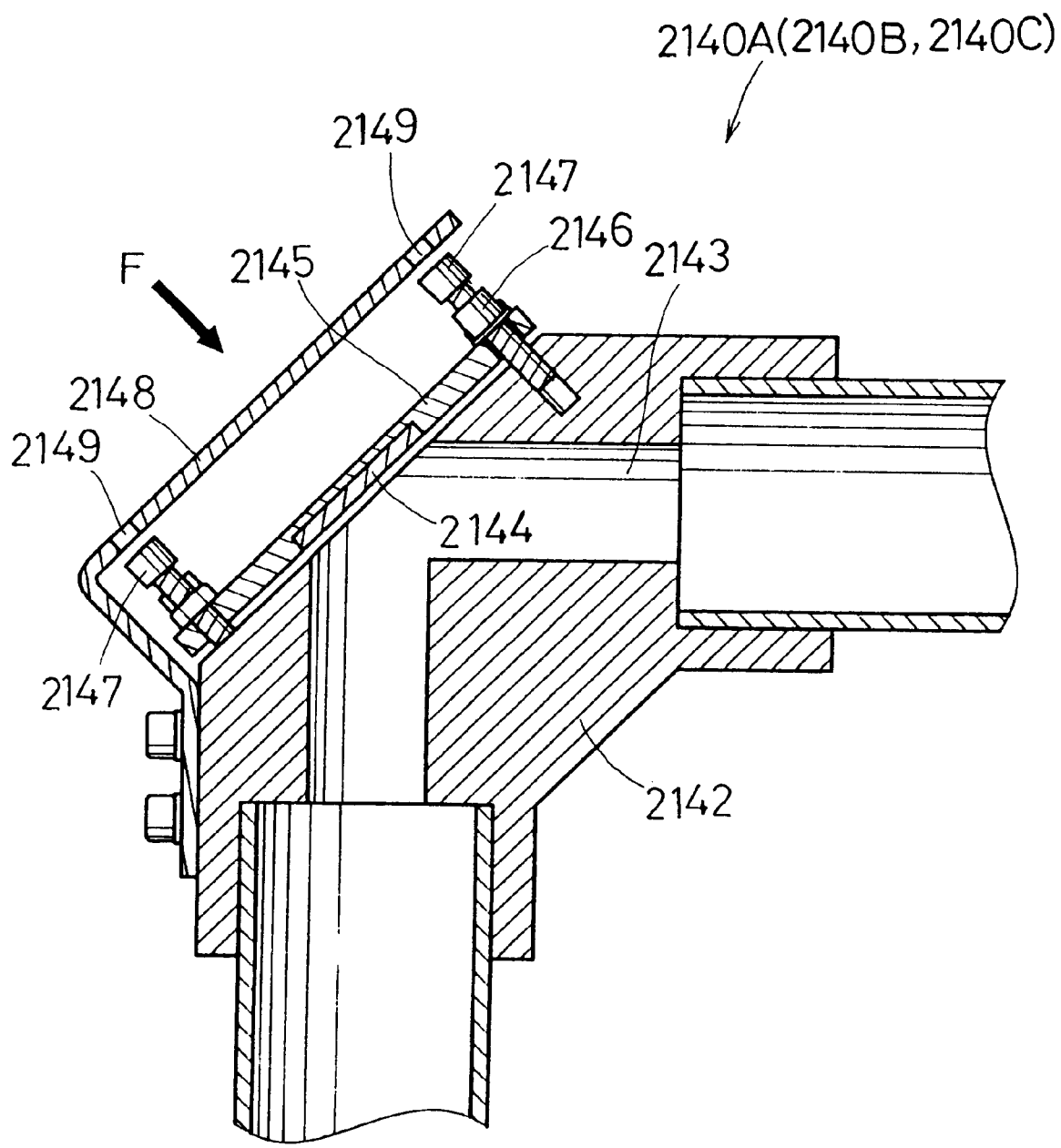
FIG. 37 is a sectional view, on an enlarged scale, showing part of a different beam guide.
Figure 38:
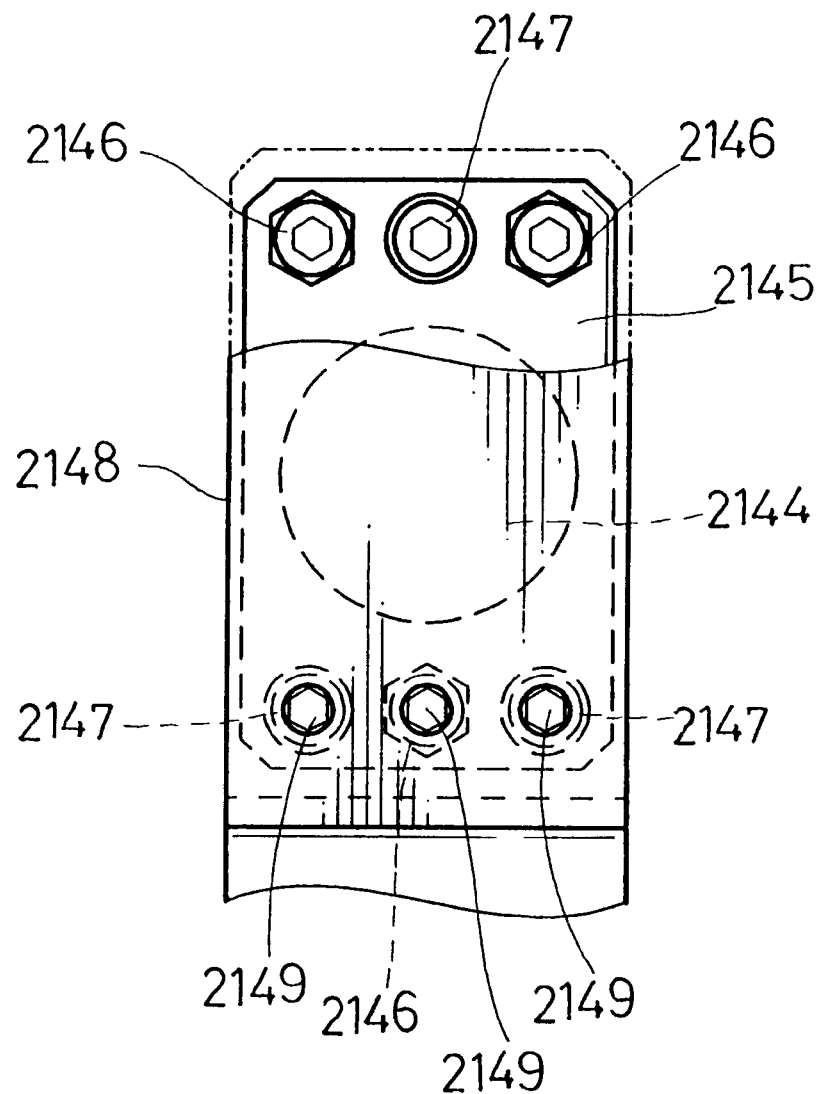
FIG. 38 is a view taken in the direction of arrow F in FIG. 37.

FIG. 37 is a sectional view of one of the beam guides 2140A, 2140B and 2140C of full reflection type, and FIG. 38 is a view taken in the direction of arrow F in FIG. 37. As shown in these drawings, the construction of the beam guides 2140A, 2140B and 2140C is substantially the same as the beam guide 2080. Specifically, a mirror holder 2145 with a full reflection mirror 2144 therein is mounted on the corner of a communication hole 2143 extending in two directions and bent at right angles in the mirror support block 2142.

As shown in FIG. 38, the mirror holder 2145 is clamped to the mirror support block 2142 by three set bolts 2146, i.e., left and right ones in an upper bolt row and a central one in a lower bolt row. As shown in FIG. 36, three adjustment bolts 2147, i.e., a central one in the upper bolt row and left and right ones in the lower bolt row, each have their free end in contact with the surface of the mirror support block 2142. The tilt of the mirror holder 2145 or the mirror 2144, can be adjusted in correspondence to the extent-of turning of the adjustment bolts 2147. After the adjustment, the mirror holder 2145 is secured to the mirror support block 2142 by tightening the set bolts 2146.

A protective cover 2148 is mounted on the front of the mirror support block 2142 such that it covers the mirror holder 2145 supporting the mirror 2144. The protective cover 2148 serves to protect the operator from the laser beam in the event of detachment of the mirror holder 2145 from the mirror support block 2142. The protective cover 2148 has through holes 2149 in which a tool for turning the set bolts 2146 and the adjustment bolts 2147 is inserted.

Figure 39:
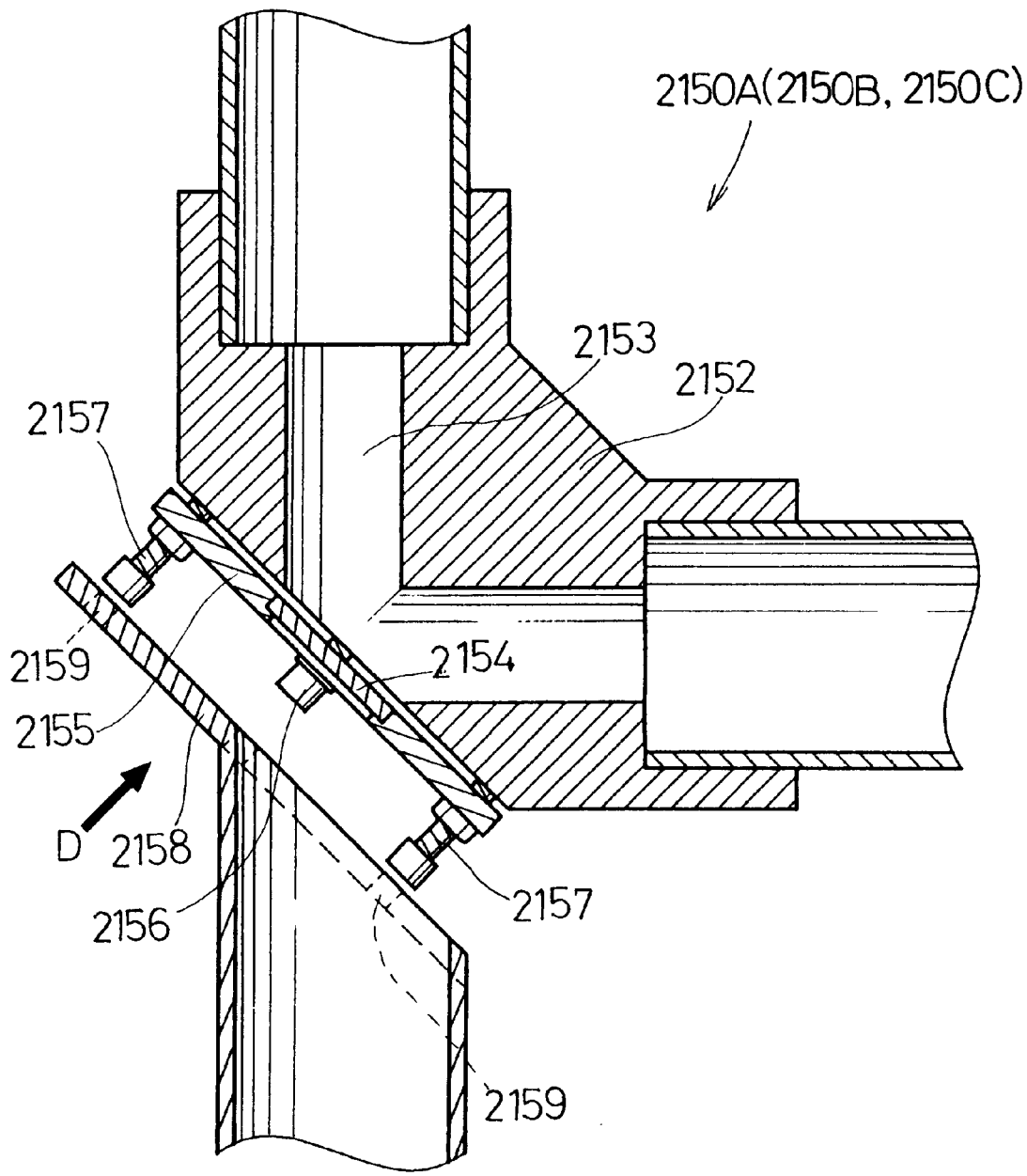
FIG. 39 is a sectional view, on an enlarged scale, showing part of a further different beam guide.
Figure 40:
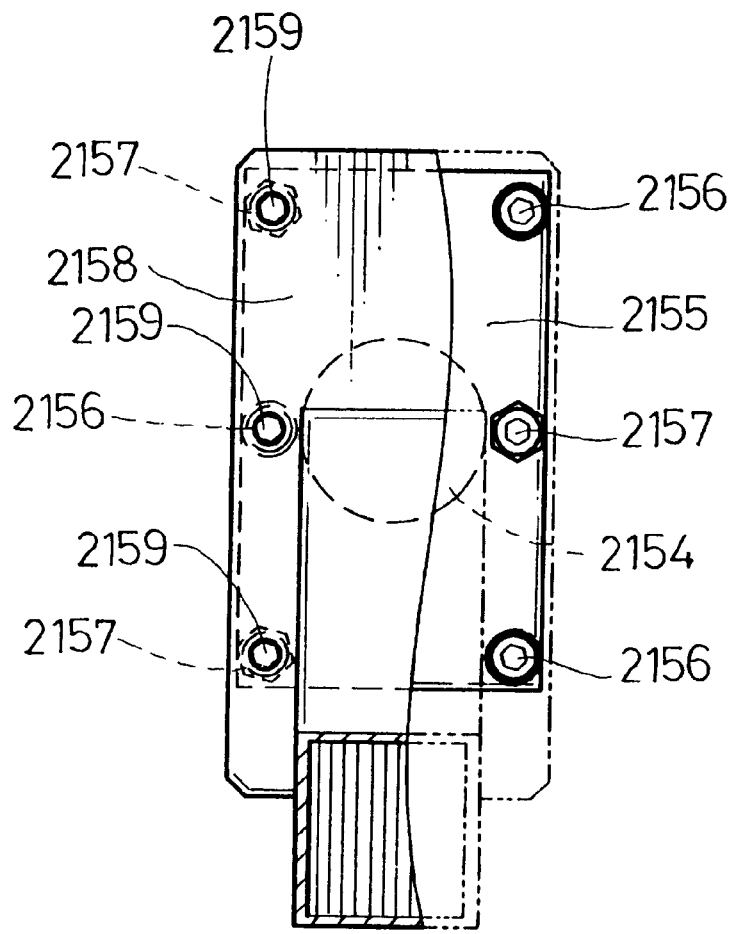
FIG. 40 is a view taken in the direction of arrow D in FIG. 39.

FIG. 39 is a sectional view showing one of the beam guides 2150A, 2150B and 2150C of half reflection type, and FIG. 40 is a view taken in the direction of arrow D in FIG. 39. As shown in these drawings, in each of the beam guides 2150A, 2150B and 2150C, a mirror holder 2155 with a half reflection mirror 2154 therein is mounted on the corner of a communication hole 2153 extending in two directions and bent at right angles in the mirror support block 2152. As shown in FIG. 40, the mirror holder 2155 is clamped to the mirror support block 2152 by three set bolts 2156, i.e., upper and lower ones in a right bolt row and a central one in a left bolt row. As shown in FIG. 40, the tilt of the mirror holder 2155 or the mirror 2154, can be adjusted in correspondence to the extent of turning of three adjustment bolts 2157, i.e., a central one in the right bolt row and upper and lower ones in the left bolt row. After the adjustment, the mirror holder 2155 is secured to the mirror support block 2152 by tightening the set bolts 2156.

A protective cover 2158 is mounted on the front of the mirror support block 2152 such that it covers the mirror holder 2155 supporting the mirror 2154. The protective cover 2158 serves to protect the operator from the laser beam in the event of detachment of the mirror holder 2155 from the mirror support block 2152. The protective cover 2158 has through holes 2159 in which a tool for turning the set bolts 2156 and the adjustment bolts 2157 is inserted. The mirror holder 2155 and the protective cover 2158 have open portions on the back side of the mirror 2154 for passing the laser beam having been transmitted through the mirror 2154.

As shown in FIGS. 27 and 28, the guide pipes 2162 are disposed such that they lead the laser beam from the full reflection type beam guides 2140B and 2140C and half reflection type beam guides 2150B and 2150C, which are secured to a frame 2106 disposed behind and along the machine frame 2014, to the guide pipes 2087 of the beam guides 2080. As shown in FIGS. 27, 28 and 30, between each guide pipe 2162 and each guide pipe 2087, a blocking device 2110 which can block the laser beam is provided. The blocking device 2110 is provided as a safety measure in the event of radiation of the laser beam due to erroneous operation of the drive system for the laser generator 2100 or as a control means for independently blocking the laser beam irradiated from each laser head 2040.

Figures 41A, 41B:
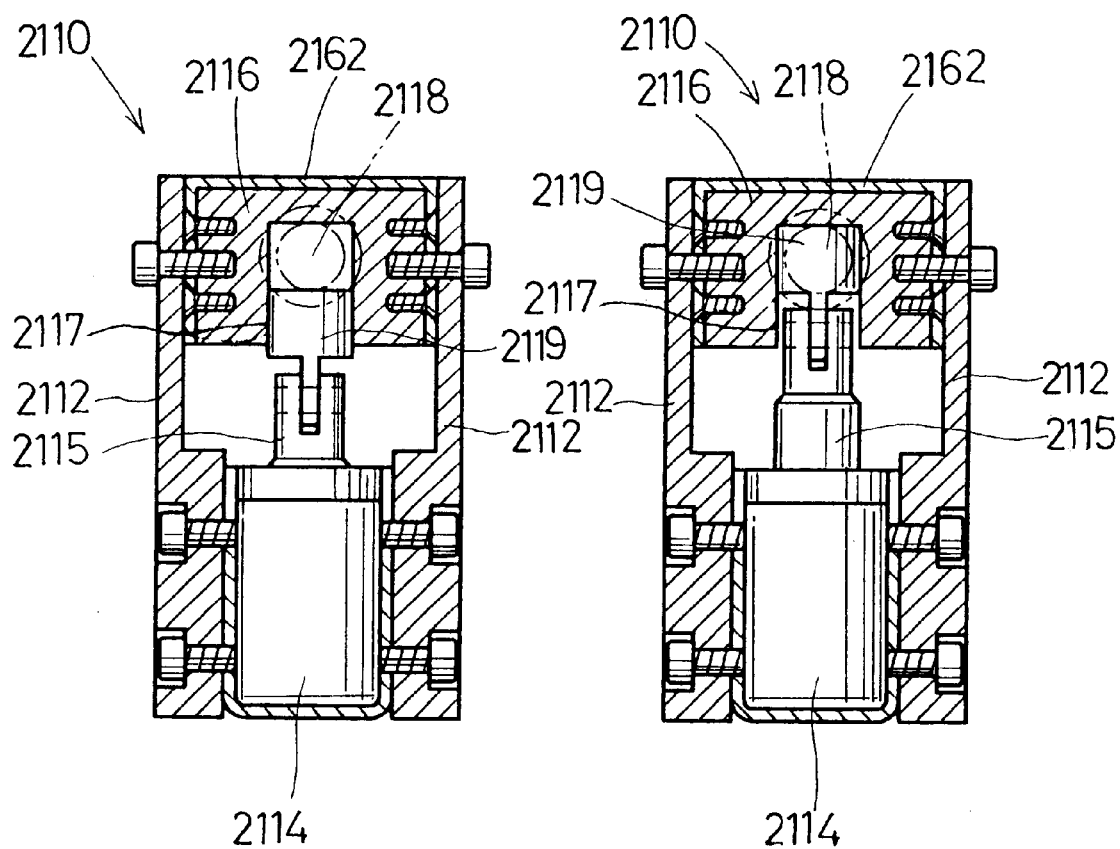
FIG. 41(A) is an enlarged sectional view showing a blocking device with a rod of a solenoid in a retreated position.
FIG. 41(B) is an enlarged sectional view showing the blocking device with the solenoid rod in a projected position.

FIGS. 41(A) and 41(B) are enlarged sectional views of the blocking device 2110. As shown in these drawings, the blocking device 2110 has supports 2112 fitted on and secured to the guide pipe 2162 on the opposite outsides thereof. A steel block member 2116 fitted in and secured to the guide pipe 2162. Below the open end of the guide pipe 2162, a latching solenoid 2114 as an actuator of the blocking device 2110 is secured to the support 2112 with its rod 2115 directed upward.

The block member 2116 has a vertically extending through hole 2117 and a transversally extending horizontal through hole 2118 crossing the through hole 2117. The horizontal hole 2118 communicates with the interior of the guide pipe 2162, so that a laser beam can pass therethrough.

A blocking element 2119 coupled to the rod 2115 of the solenoid 2114, is vertically movably located in the vertical hole 2117 of the block member 2116. As shown in FIG. 41 (A), when the rod 2115 of the solenoid 2114 is in its retreated position, the blocking element 2119 is pulled down to hold the horizontal hole 2118 open. By contrast, as shown in FIG. 41(B), when the rod 2115 is in its projected position, the blocking element 2119 is pushed up to hold the horizontal hole 2118 closed and blocks the laser beam irradiated from the laser generator 2100. Even when the latching solenoid 2114 is deenergized in either position shown in FIG. 41(A) or 41(B), it can hold the rod 2115 in that position.

As shown in FIG. 26, a control panel 2120 for the laser heads 2040 is provided on a front right portion of the machine frame 2014.

Figure 42:
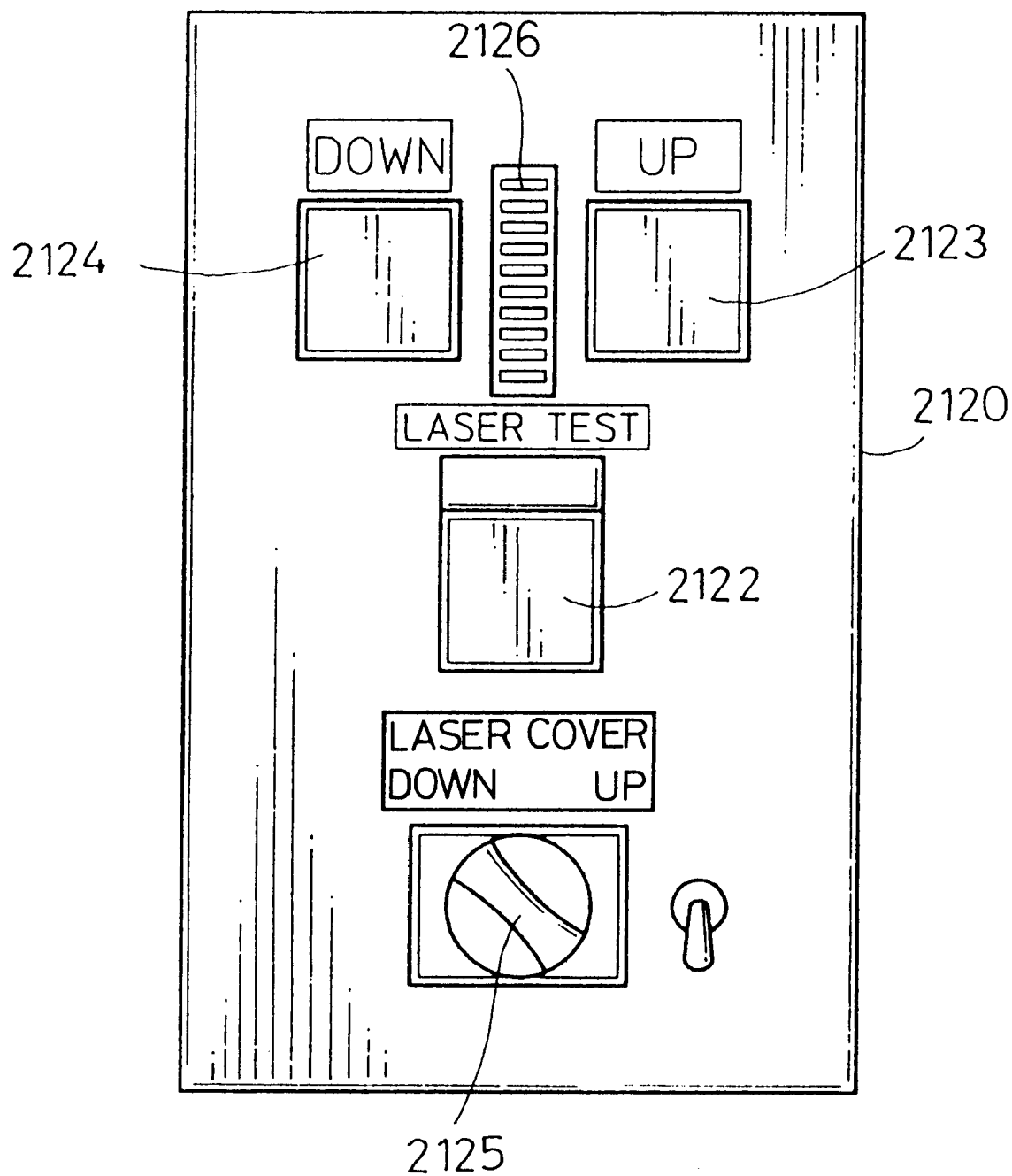
FIG. 42 is an enlarged view of a control panel.

FIG. 42 shows the control panel 2120 on an enlarged scale. As shown in the drawing, the control panel 2120 has a test switch 2122 for commanding radiation of a laser beam in such a case as when adjusting the power level of the laser beam, power-up and power-down switches 2123 and 2124 for adjusting the power level during radiation of the laser beam, a display 2126 for displaying the power level of the laser beam, a lift switch 2125 for commanding the driving of the air cylinder 2070 for raising and lowering the protective cylinder 2050 of the laser head 2040, and other switches or the like.

In the operation of the machine having the above construction, when a main switch (not shown) is turned on, the power is supplied to each laser generator 2100 and the chiller box 2108 to start preheating of each laser generator 2100 and also start circulatory supply of cooling water from the chiller box 2108 to each laser generator 2100. Various adjustments of the laser beam irradiated from the laser generator 2100 will now be described.

Laser beam position adjustment:

(21) "LASER PROCESSING (or CUTTING)" mode is set on an operating panel 2019 of the machine shown in FIG. 26.

(22) Each protective cylinder 2050 is then lowered from the retreated position to the working position by operating the lift switch 2125 on the control panel 2120.

(23) The test switch 2122 and the power-up switch 2123 on the control panel 2120 are depressed momentarily at a time. As a result, "TEST" mode is set up, and a laser beam of superlow power level is irradiated for a predetermined period of time.

(24) A check is made as to whether the laser beam irradiated from each laser head 2040 properly passes through the center of the beam hole 2035 in the beam plate 2034.

When the laser beam is deviated from the center of the beam hole 2035, the deviation of the laser beam is corrected by adjusting, for instance, the tilt of the mirror 2088 in the beam guide 2080 as described above.

Laser beam power level adjustment:

After the operations in (21) to (24) above:

(25) The mode is switched over to "SETTING" mode on the operating panel 2019 of the machine.

(26) In this mode, the laser beam is irradiated while the test switch 2122 on the control panel 2120 is held depressed. The status of cutting by the laser beam is thus checked by putting a test cloth on the beam plate 2034.

The power level of the laser beam is gradually increased by holding the test switch 2122 and the power-up switch 2123 depressed simultaneously and is gradually reduced by holding the test switch 2122 and the power-down switch 2124 depressed simultaneously. The power level is displayed on the display 2126.

Focal point adjustment:

After the operations in (21) to (26) above:

(27) "FOCAL POINT ADJUSTMENT" mode is set on the operating panel 2019 of the machine, and the height of each laser head 2040 is adjusted by controlling the driving of the motor 2058 of the lift mechanism 2056 with a drive switch (not shown).

In this way, the focal point of the lens 2047 is adjusted. The adjustment of the focal point may be done for each laser head 2040.

The switching of embroidering and laser processing over to each if other will now be described.

After displaying "HEAD SELECTION" menu on the operating panel 2019 of the machine, selecting "SEWING HEAD" mode makes it ready to perform embroidering with each sewing head 2020, while selecting "LASER HEAD" mode makes it ready to perform laser processing with each laser head 2040.

The embroidering and the laser processing may be switched manually. Usually, these operations are set in advance. The setting is made by key inputs on the operating panel 2019 and is made in units of embroidering and laser processing. In this embodiment, each sewing head 2020 has six needle bars (or needles), and when the "SEWING HEAD" mode is selected in the "HEAD SELECTION" menu, the selection of a needle bar is made with either of key inputs "1" to "6" on the operating panel 2019.

The difference of the control of the embroidering frame 2016 for movement in the embroidering and in the laser processing will now be briefly described. In the embroidering, the embroidering frame 2016 is controlled for normal movement according to movement data (or embroidering data). In the laser processing, the embroidering frame 2016 is controlled for continuous movement at a uniform speed while providing linear interpolation according to the embroidering data.

In the embroidering operation, the embroidering frame 2016 has to be moved intermittently since it can be moved only while the needle is separated from the work (or cloth) held thereon. In the embroidering operation, it is only necessary that the needle falls at points specified by data, and the embroidering frame 2016 is thus not always moved along lines connecting points.

On the other hand, in the laser processing operation, it is necessary to move the embroidering frame 2016 continuously and at a uniform speed along lines connecting points specified by data. However, when the stitch length of the embroidering data used for laser processing is set to be small to some extent, it is possible to perform laser processing without controlling the embroidering frame 2016 for movement at a uniform speed or with linear interpolation. In the laser processing operation, the main shaft of the machine which is a drive source for the needle bars of the sewing heads 2020 and so forth is not rotated.

A combination operation of embroidering and laser processing (or cutting) will now be described.

Figure 43:
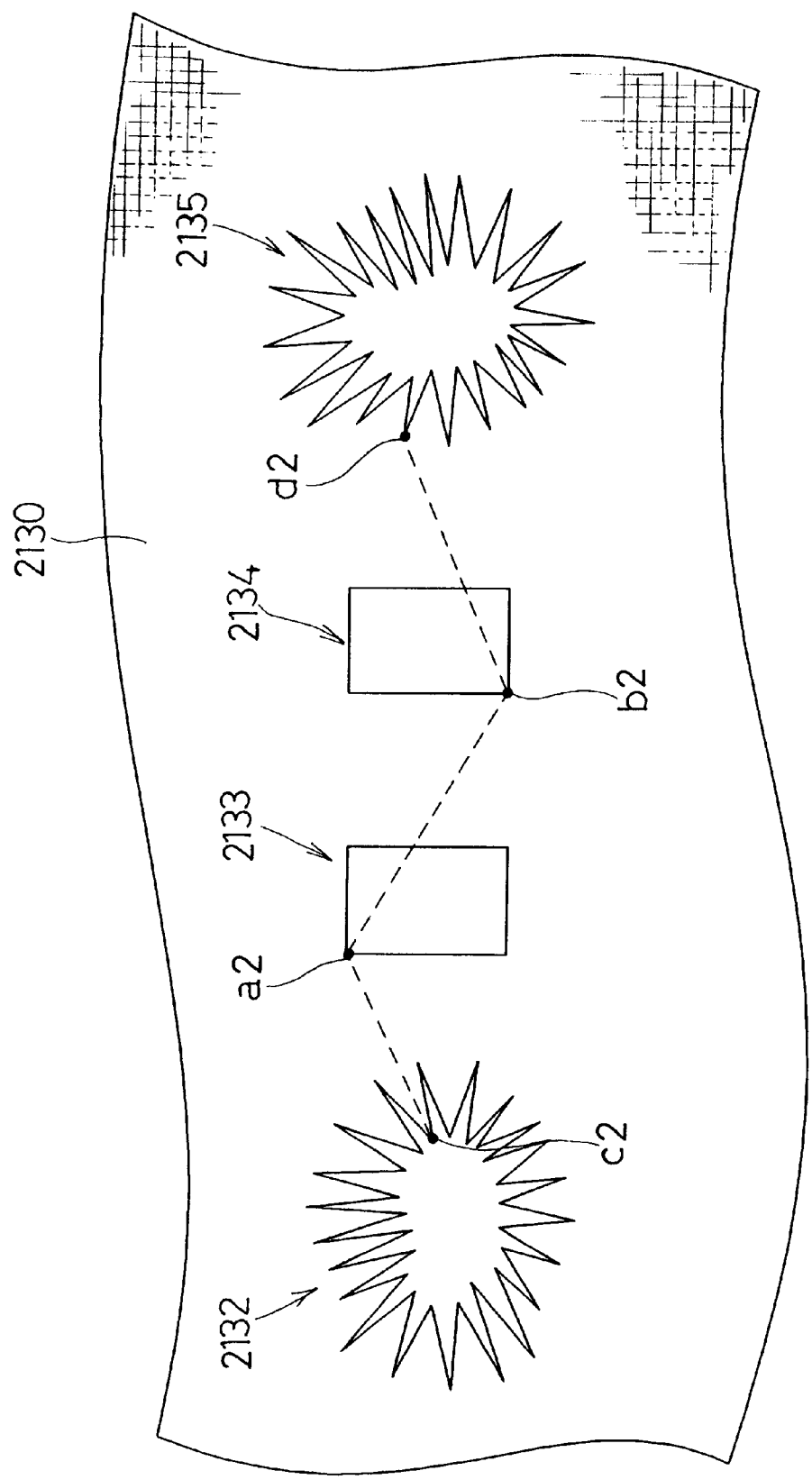
FIG. 43 is a view illustrating an example of combination operation of embroidering and laser processing (or cutting)

FIG. 43 illustrates an example of the combination operation. As shown therein, in this operation, on a cloth 2130 as a work, an embroidery 2132 is produced in a first step, laser cuts 2133 and 2132 are produced in a second step, and an embroidery 2135 is produced in a third step.

After embroidering data for this operation has been inputted and set, setting is made for performing embroidering and laser cutting in the order of the first to third steps. As described above, the setting is made by key inputs on the operating panel 2019 of the machine. Specifically, for the first step, the "SEWING HEAD" mode is selected in the "HEAD SELECTION" menu, while selecting the needle bar to be used by, for instance, key input "1". For the second step, the "LASER HEAD" mode is selected in the "HEAD SELECTION" menu. For the third step, the "SEWING HEAD" mode is selected in the "HEAD SELECTION" menu, while selecting the needle bar to be used by, for instance, key input "5".

The embroidering data for the combination operation of embroidering and laser processing, includes special codes which command laser cutting (hereinafter referred to as "laser cut codes"). The data is such that when a first "laser cut code" is read out, the radiation of the laser beam from the pertinent laser head 2040 is started, and that when the next "laser cut code" is read out, the radiation of the laser beam is stopped.

With the laser cuts 2133 and 2134 shown in FIG. 43, points a2 and b2 are start points of cutting and also end points of cutting. The embroidering data thus includes a total of four "laser cut codes" corresponding to the two points a2 and b2.

In the following description, a step for which the selection of the sewing head 2020 is commanded, such as the first and third steps, is referred to as "embroidering step", and a step for which the selection of the laser head 1040, such as the second step, is referred to as "laser processing step". In the "laser processing step", the controller 2107 shown in FIG. 28 controls the laser generator 2100 for starting and stopping the radiation of the laser beam when the "laser cut codes" are read out.

In performing the combination operation shown in FIG. 43, with the start of the machine, the needle bar commanded by key input "1" is selected by sliding the needle bar case 2024. Also, the embroidering frame 2016 is controlled for movement to bring a point c2 on the embroidery 2132 to be produced in the first step to a position right above the needle hole (not shown) in the throat plate 2032. The production of the embroidery 2132 in the first step is executed by driving the selected needle bar and controlling the embroidering frame 2016 for movement.

After the end of production of the embroidery 2132, the embroidering frame 2016 is controlled for movement to bring the point a2 of the laser cut 2133 to be produced in the second step to a position right above the beam hole 2035 in the beam plate 2034.

Then, the protective cylinder 2050 is lowered from its retreated position as shown by phantom lines in FIG. 29 to the working position as shown by solid lines. Also, air blowing into the protective cylinder 2050 through the air pipe 2076 and air suction through the suction nozzle 2064 are started. As shown in FIG. 41(A), the solenoid 2114 in the blocking device 2116 is then driven to open the horizontal hole 2118.

The second step is the "laser processing step" in which the laser beam is irradiated from the laser head 2040 in response to the reading of the first "laser cut code" corresponding to the point a2 of the laser cut 2133 to be produced. At the same time, the embroidering frame 2016 is controlled for movement at a uniform speed along the laser cut 2133, so that this portion is cut away.

Upon reading of the second "laser cut code" corresponding to the point a2 at the end of the cutting, the radiation of the laser beam is stopped. Subsequently, the embroidering frame 2016 is controlled for movement to bring the point b2 of the laser cut 2134 to be produced to a position right above the beam hole 2035 in the beam plate 2034. The cloth 2130 thus is not cut while the embroidering frame 2016 is moved from the point a2 to the point b2.

Upon reading of the third "laser cut code" corresponding to the point b2 of the laser cut 2134 to be produced, the radiation of the laser beam is started, and at the same time, the embroidering frame 2016 is controlled for movement at a uniform speed along the laser cut 2134, so that this portion is cut away.

Upon reading of the fourth "laser cut code" corresponding to the point b2 at the end of production of the laser cut 2134, the radiation of the laser beam is stopped. Then, the embroidering frame 2016 is controlled for movement to bring the point d2 of the embroidery 2135 to be produced in the third step to a position right above the needle hole (not shown) in the throat plate 2032. Then, the needle bar 2024 is operated for sliding movement, and the production of the embroidery 2135 in the third step is executed by driving the needle bar which has been selected by the key input "5", and also by controlling the embroidering frame 2016 for movement.

As shown in FIG. 41(B), after the needle bar has been selected in the third step, the horizontal hole 2118 is closed by driving the solenoid 2114 in the blocking device 2110. Also, the protective cylinder 2050 is raised to the retreated position as shown by phantom lines in FIG. 29. The air blowing into the protective cylinder 2050 and the air suction by the suction nozzle 2064 are discontinued whenever the radiation of the laser beam is stopped.

The air blowing into the protective cylinder 2050 during the above laser cutting, has an effect of extinguishing a flame generated as the cloth 2130 is scorched by the laser beam, and smoke is blown out through the clearance between the lower end of the protective cylinder 2050 and the cloth 2130 to the outside. The blown-out smoke is sucked by the suction nozzle 2064 for disposal.

As an alternative construction, the protective cylinder 2050 and a suction duct 2068 shown in FIG. 30 may be connected to each other with a pipe or the like, so that air is sucked from the protective cylinder 2050 during laser cutting. With this construction, air is sucked through the clearance between the lower end of the protective cylinder 2050 and the cloth 2130 into the protective cylinder 2050, and an air stream thus generated extinguishes the flame, while at the same time blowing out the smoke.

Since the blocking device 2110 is provided for each beam guide 2080, the radiation of the laser beam from each laser head 2040 can be blocked individually through independent control of each latching solenoid 2114. This means that even when a single laser generator 2100 is used in common for the laser heads 2040, it is possible, if necessary, to preset radiation or cutoff (i.e., suspension) of the laser beam for each laser head 2040.

In the above combination operation, it is possible to display a "POWER LEVEL SELECTION" menu for the laser generator 100 in each laser cutting step in addition to the "HEAD SELECTION" menu and "NEEDLE BAR SELECTION" menu on the operating panel 2019 of the machine.

While this embodiment is concerned with a machine having a plurality of (i.e., four) sewing heads 2020 and the equal number of laser heads 2040, the invention is also applicable to a machine having a single sewing head 2020 and a single laser head 2040. It is further possible to provide one laser head 2040 for each sewing head group of two or more sewing heads 2020. This permits a combination operation of embroidering and laser processing with a low cost machine.

With this third embodiment, the laser beam radiation is provided at a locality distant from the sewing head. This means that the needle plate located below the sewing head does not receive any laser beam, so that it is possible to avoid adverse effects of the heat of a laser beam on the shuttle located beneath the throat plate, the lower thread wound on the bobbin provided in the shuttle and other parts. When pluralities of sewing heads and laser heads are provided, it is possible to perform a combination operation of embroidering and laser processing simultaneously at a plurality of different portions of a work.

Fourth Embodiment

A fourth embodiment of the invention will now be described with reference to FIGS. 44 to 60. This embodiment is an application of the invention to an embroidering machine which has a plurality of (i.e., four) multiple needle sewing heads and laser heads each corresponding to each sewing head.

Figure 44:
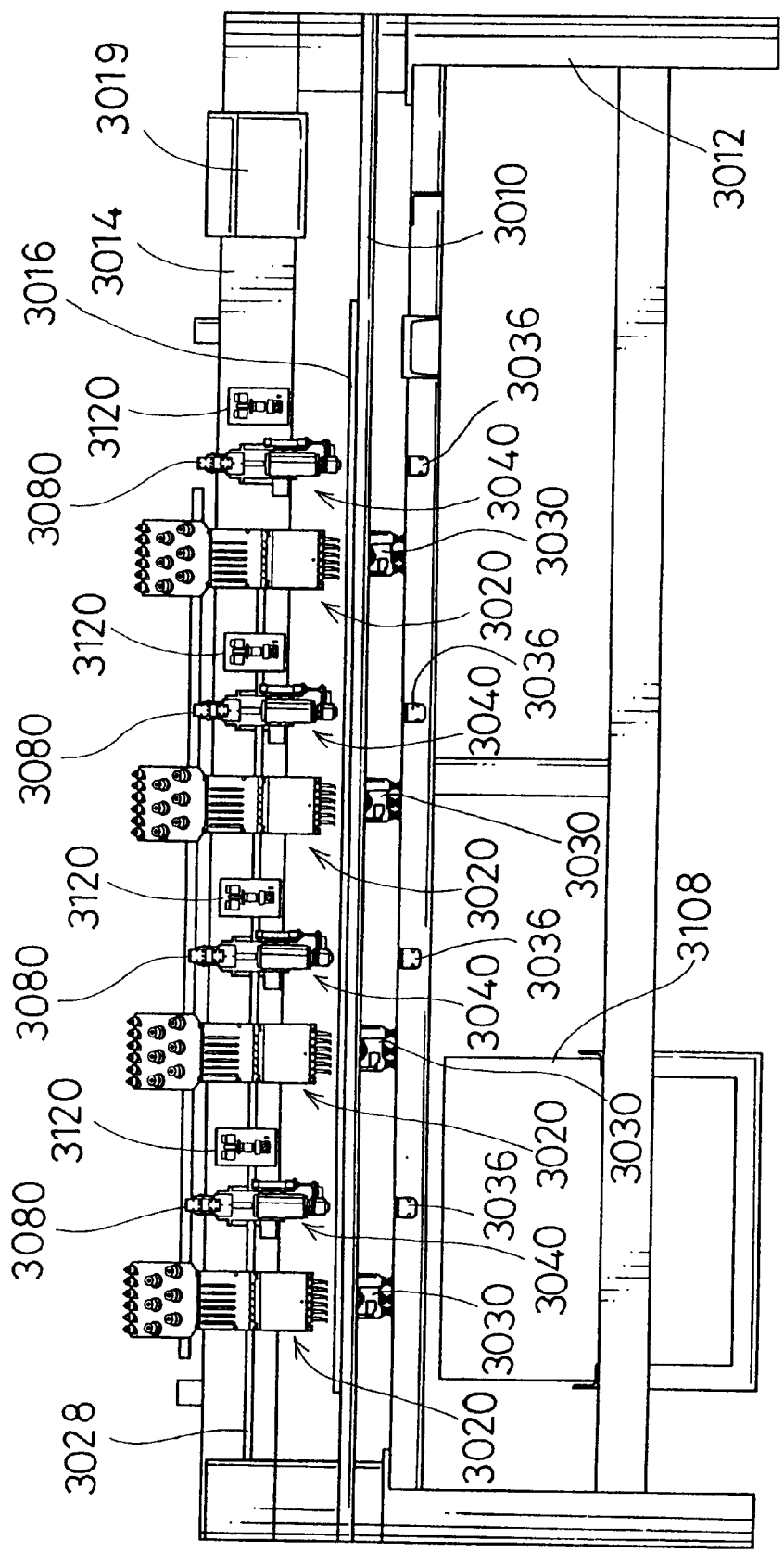
FIG. 44 is a front view of an embroidering machine.
Figure 45:
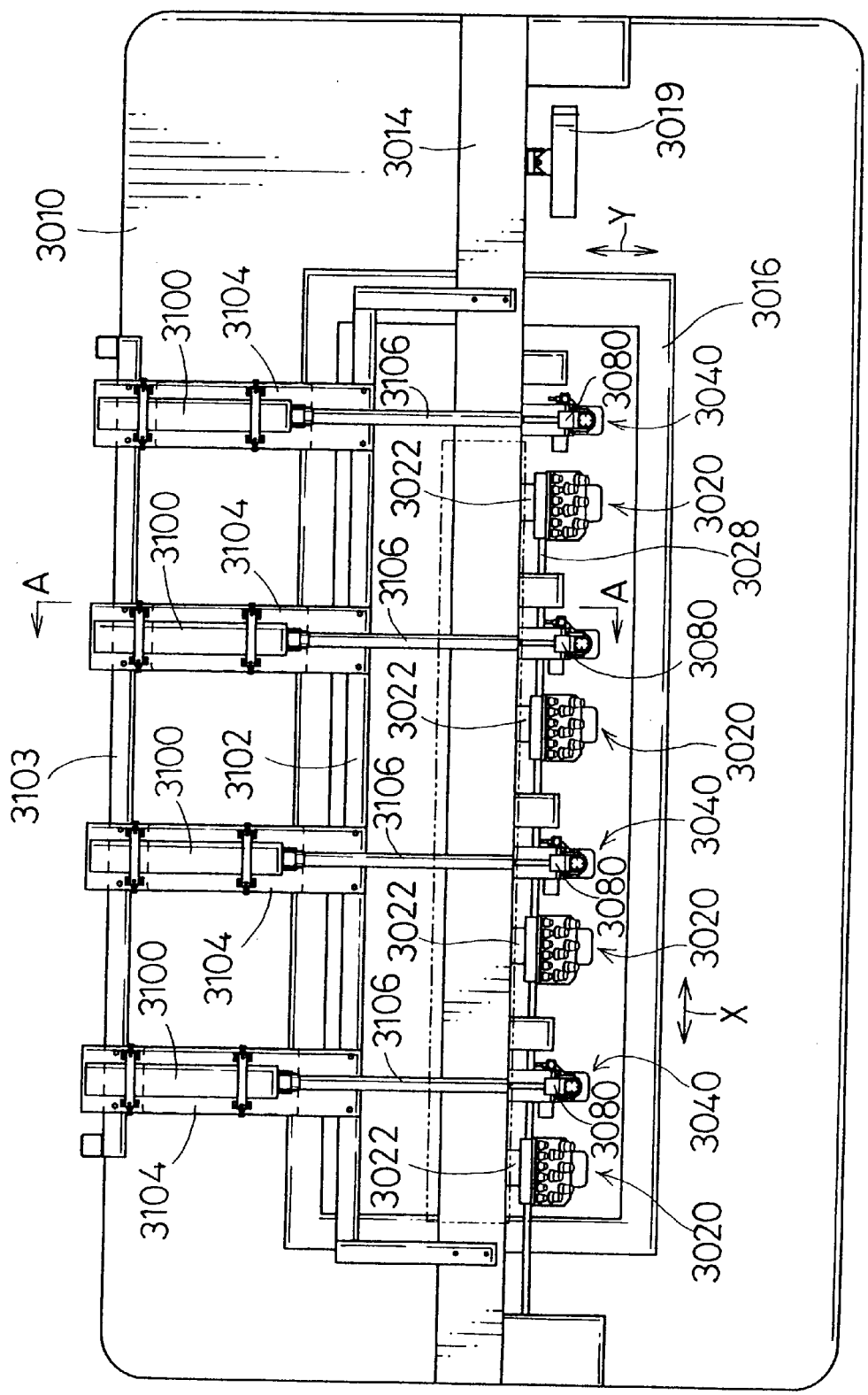
FIG. 45 is a plan view of FIG. 44.
Figure 46:
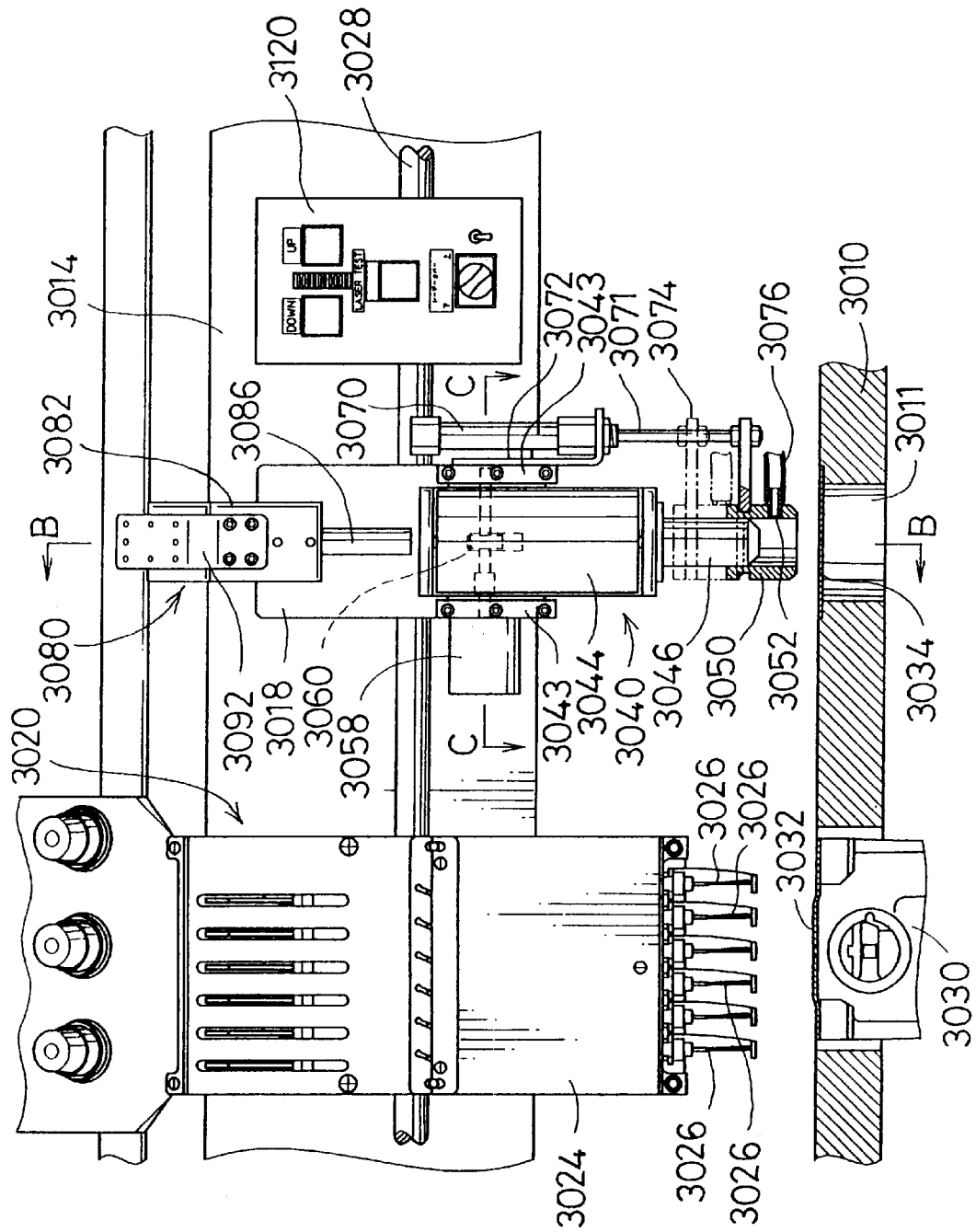
FIG. 46 is a front view, on an enlarged scale, showing part of FIG. 44.

FIG. 44 is a front view of the embroidering machine, FIG. 45 is a plan view of FIG. 44, and FIG. 46 is a front view, on an enlarged scale, showing part of FIG. 44. As shown in these drawings, the machine has four sewing heads 3020 which are disposed at a uniform interval on the front surface of a machine frame 3014 located above a machine table 3010. The machine also has four laser heads 3040 provided on the front surface of the machine frame 3014 and each corresponding to each sewing head 3020.

As shown in FIGS. 44 and 45, on top of the machine table 3010, a work frame 3016 as a work holder which can hold a work (i.e., sheet-like material such as cloth) as will be described later, is provided such that it can be controlled for movement in X- and Y-axis directions in FIG. 45 according to predetermined movement data (or embroidering data). As shown in FIG. 44, a horizontal frame between opposite table legs 3012 on the underside of the machine table 3010, supports shuttle bases 3030 each located at a position corresponding to each sewing head 3020. The horizontal frame also supports steel block plates 3036 each secured to the front surface thereof at a position corresponding to each laser head 3040 for blocking the laser beam irradiated from each laser head 3040.

Figure 47:
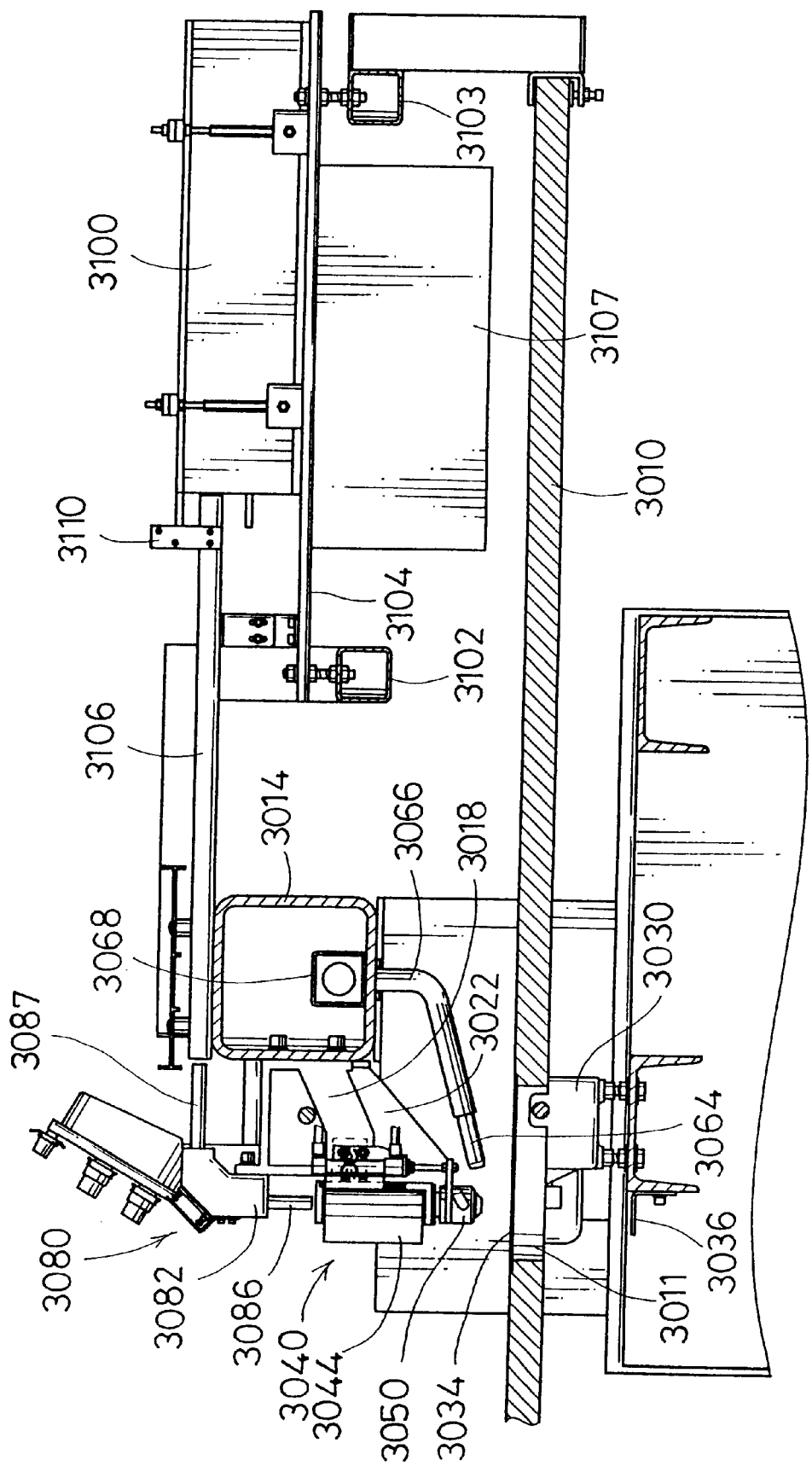
FIG. 47 is a side view taken in the direction of arrow A in FIG. 45.

As shown in FIGS. 45 and 47, in each sewing head 3020, a needle bar case 3024 as shown in FIG. 46 is supported for sliding movement in the longitudinal direction of the machine on a front portion of a machine arm 3022 secured to the machine frame 3014. As shown in FIG. 46, in the needle bar case 3024, six needle bars (not shown) each with a needle 3026 provided in the lower end portion thereof are supported for vertical movement.

The needle bar cases 3024 of the sewing heads 3020 are coupled to one another by connecting rods 3028 and can be driven at a time by a predetermined drive source for sliding in the same direction. As is well known in the art, one of the needle bars is selected by this operation, and only the selected needle bar is driven vertically together with its associated needle 3020.

Figure 48:
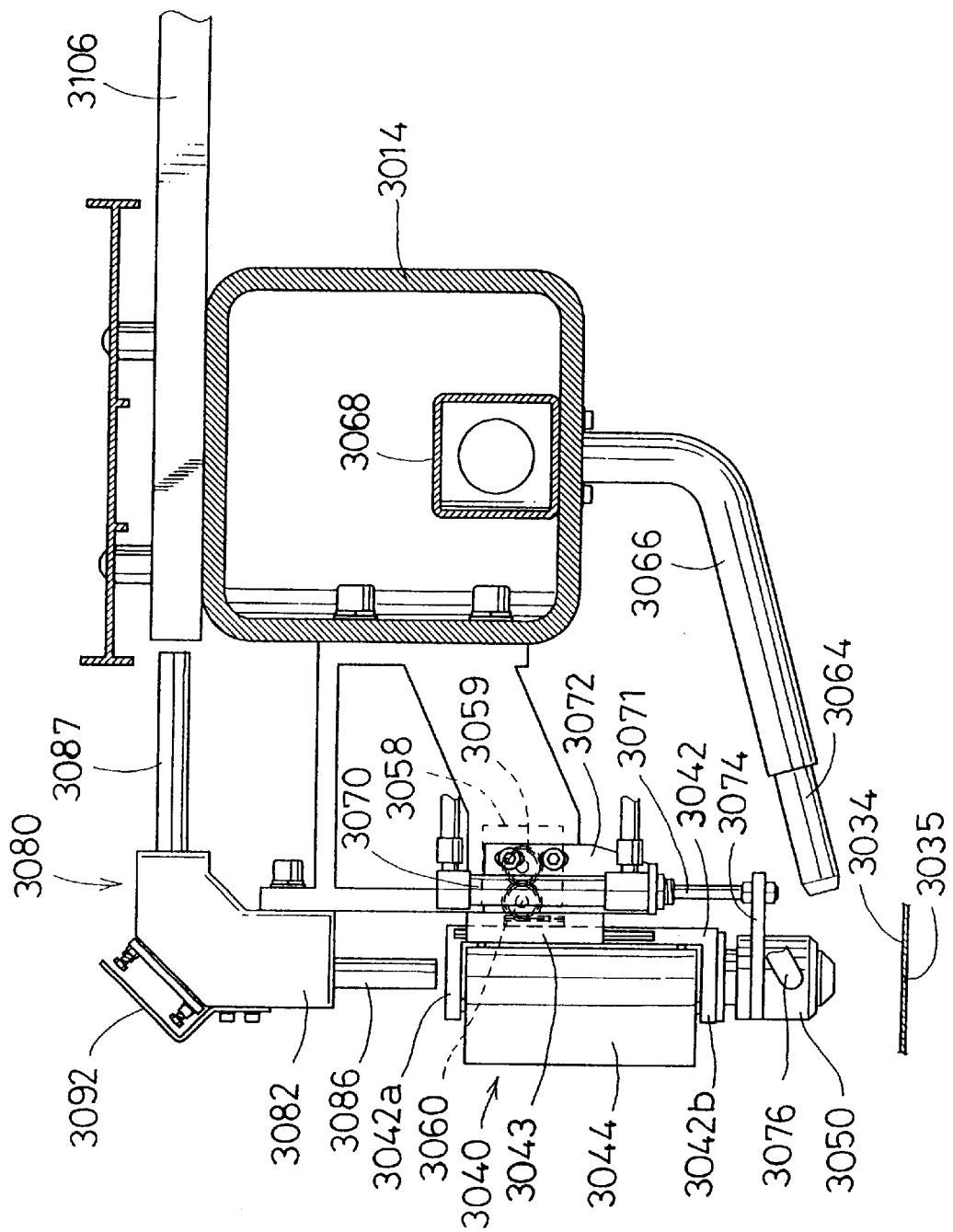
FIG. 48 is a side view, on an enlarged scale, showing part of FIG. 47.
Figure 49:
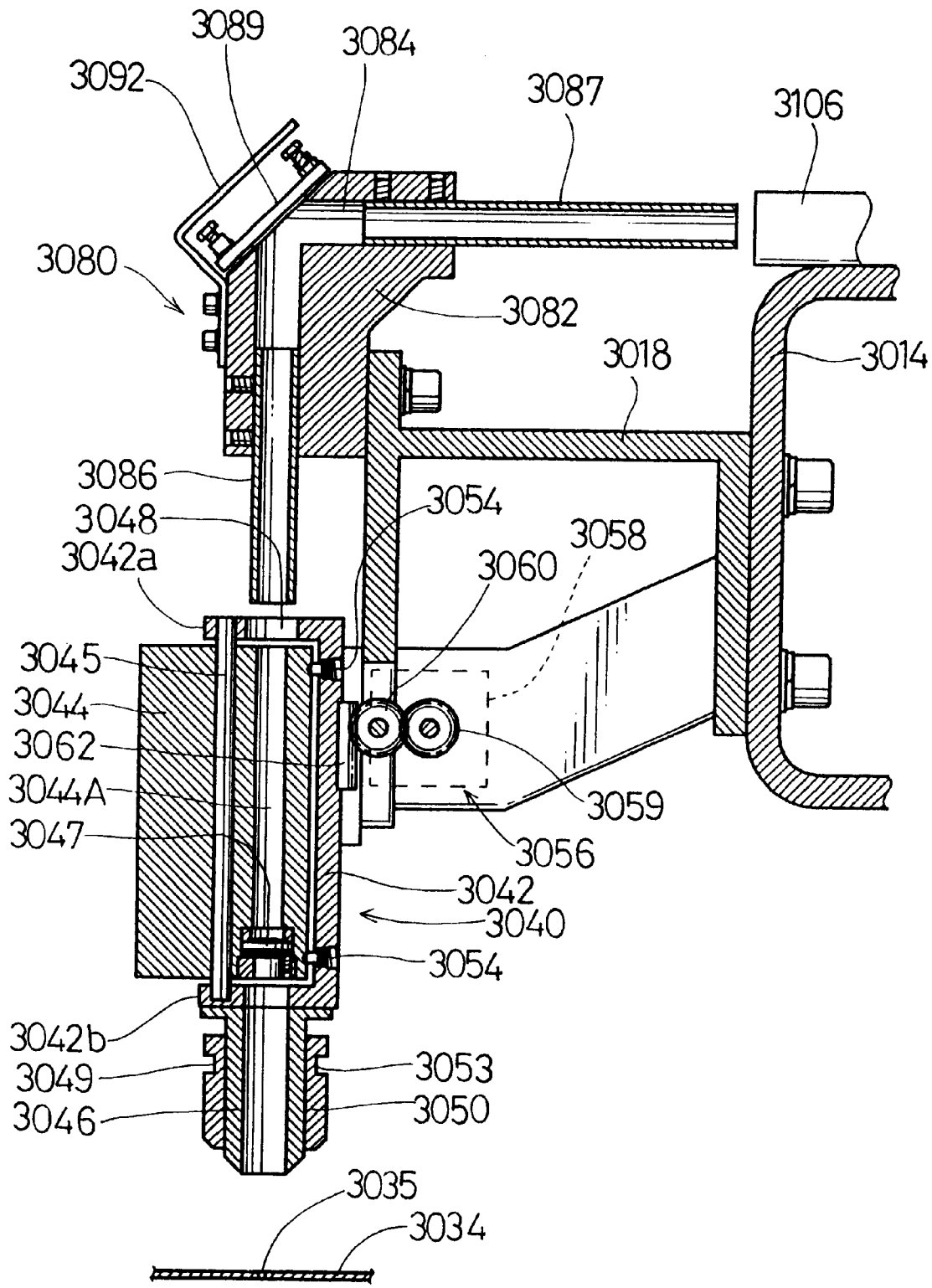
FIG. 49 is a sectional view taken along line B—B in FIG. 46.

FIG. 47 is a side view taken along line A—A in FIG. 45, FIG. 48 is a side view, on an enlarged scale, showing part in FIG. 47, and FIG. 49 is a sectional view taken along line B—B in FIG. 46.

As shown in these drawings, the laser head 3040 has a support 3042 supported for vertical movement on a front lower portion of a bracket 3018, a lens rack 3044 mounted on the support 3042, a guide cylinder 3046 coupled to a lower portion of the support 3042, and a protective cylinder 3050 mounted for vertical movement on the outer periphery of the guide cylinder 3046. As shown in FIGS. 47 to 49, the bracket 3018 is bolted to the front of the machine frame 3014.

Figure 50:
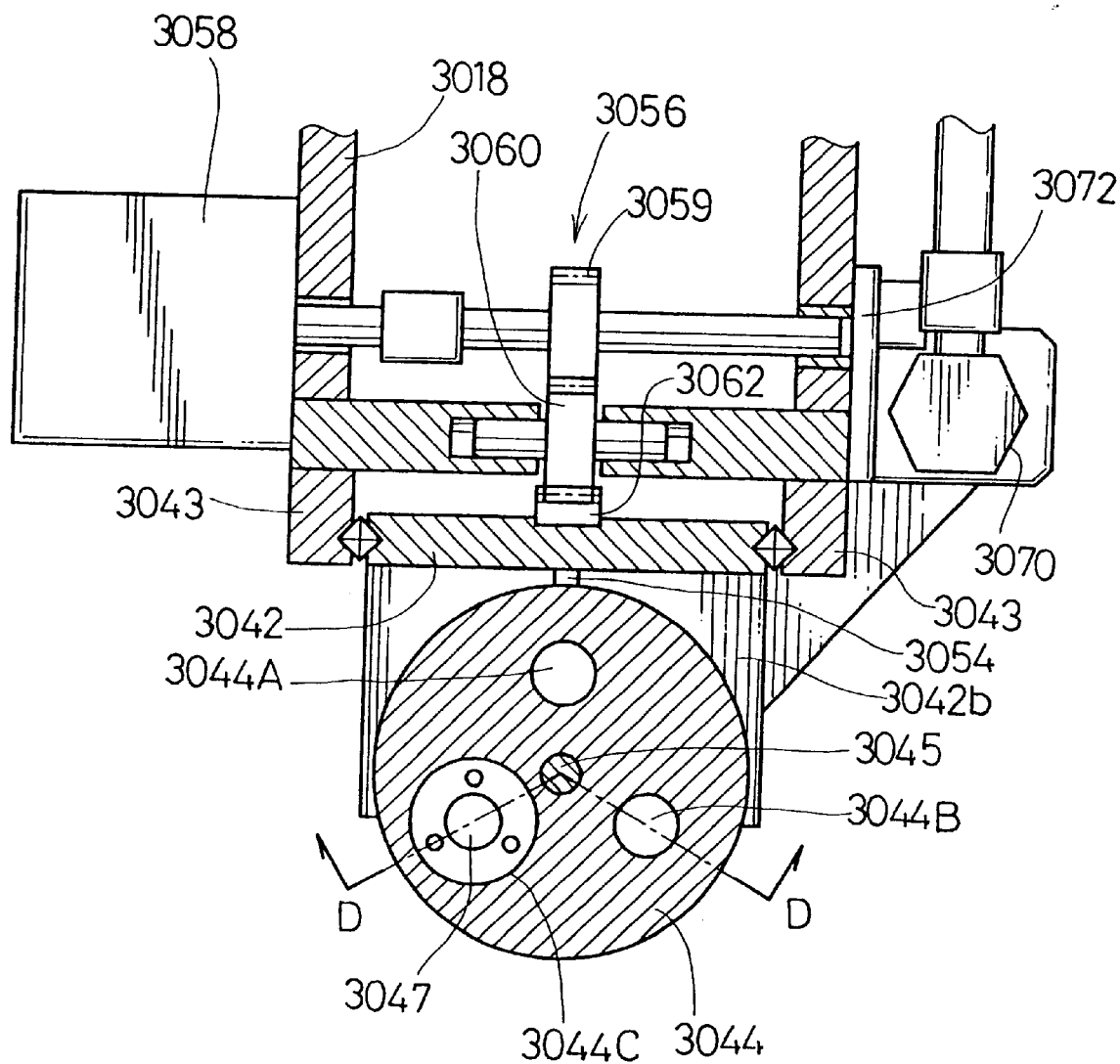
FIG. 50 is an enlarged sectional view taken along line C—C in FIG. 46.
Figure 51:
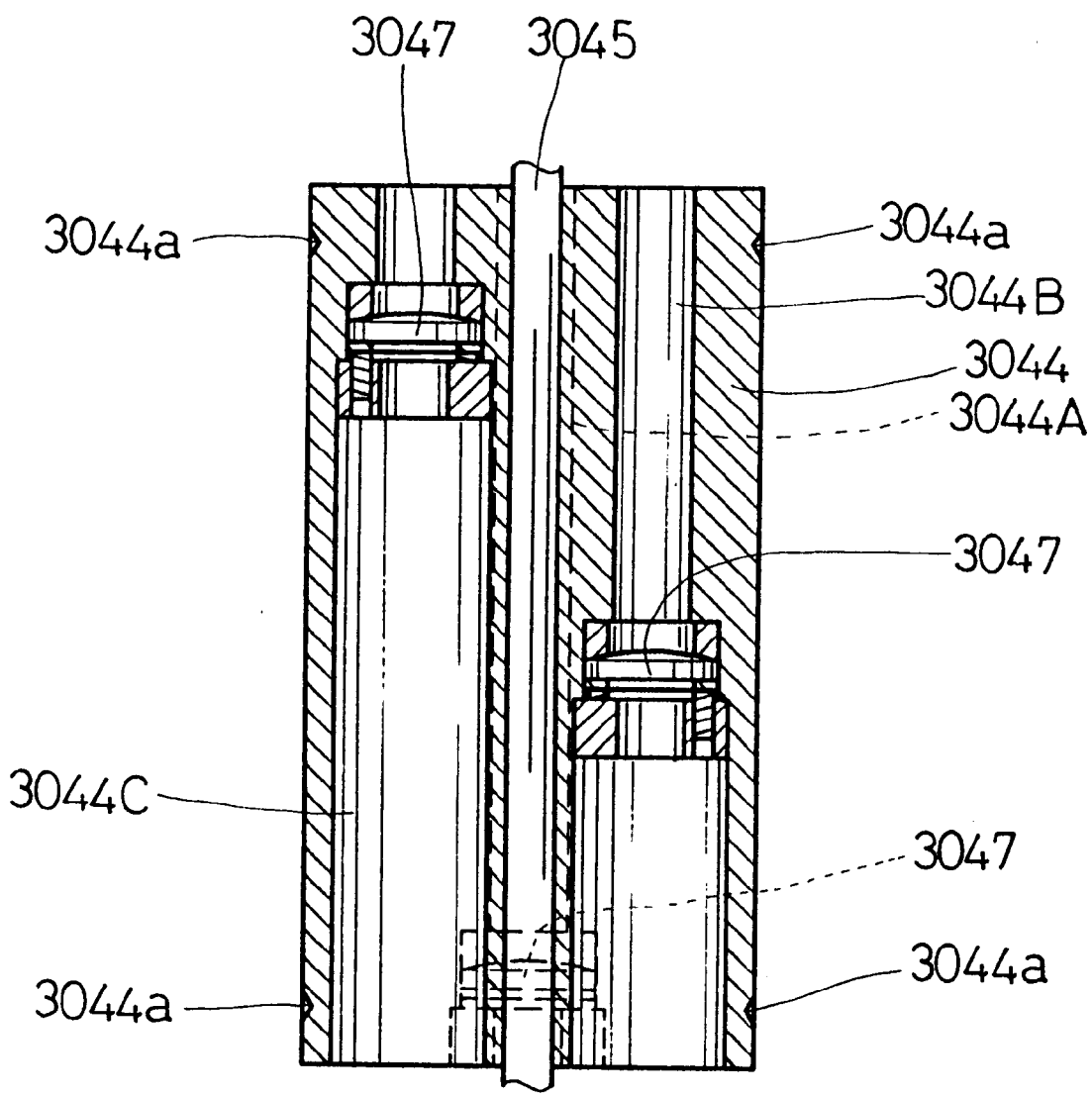
FIG. 51 is a sectional view taken along line D—D in FIG. 50.

FIG. 50 is an enlarged sectional view taken along line C—C in FIG. 46, and FIG. 51 is a sectional view taken along line D—D in FIG. 50. As shown in these drawings, the support 3042 is supported on the bracket 3018 such that it can be moved vertically along rails 3043 secured to the opposite sides of the front of the bracket 3018. The support 3042 can be driven for vertical movement by a lift mechanism 3056.

The construction of the lift mechanism 3056 will now be described mainly with reference to FIGS. 49 and 50. The bracket 3018 has a motor 3058 as a drive source mounted on the side wall thereof. The motor 3058 has a shaft which in turn has a drive gear 3059 secured thereto. The drive gear 3059 is meshed with an intermediate gear 3060 supported for rotation on a front wall portion of the bracket 3018. The intermediate gear 3060 is meshed with rack teeth of a rack 3062 secured to the back of the support 3042. When the motor 3058 is driven for forward and reverse rotations, the support 3042 is raised and lowered by the meshing engagement of the drive gear 3059, the intermediate gear 3060 and the rack 3062. In this way, the height of the laser head 3040 can be adjusted to thereby adjust the focal point of a lens 3047 to be described below.

The lens rack 3044 is cylindrical in shape and is supported by a shaft 3045 penetrating the center thereof such that it can be rotated relative to upper and lower horizontal portions 3042*a* and 3042*b* of the support 3042. As shown in FIGS. 50 and 51, the lens rack 3044 has three vertically extending through holes 3044A, 3044B and 3044C formed in circumferentially spaced-apart portions centered on the shaft 3045.

Lenses 3047 having different focal distances are assembled in the respective holes 3044A, 3044B and 3044C. The focal distances of the lenses 3047 are set from "large" to "small" in the order of the holes 3044A, 3044B and 3044C.

As shown in FIG. 49, the upper and lower horizontal portions 3042*a* and 3042*b* of the support 3042 have respective through holes 3048 and 3049 which can be aligned to one of the holes 3044A, 3044B and 3044C of the lens rack 3044. One of the lenses 3047 to be used can be selected by aligning one of the holes 3044A, 3044B and 3044C to the through holes 3048 and 3049 by manually turning the lens rack 3044 about the axis of the shaft 3045.

Figure 52:
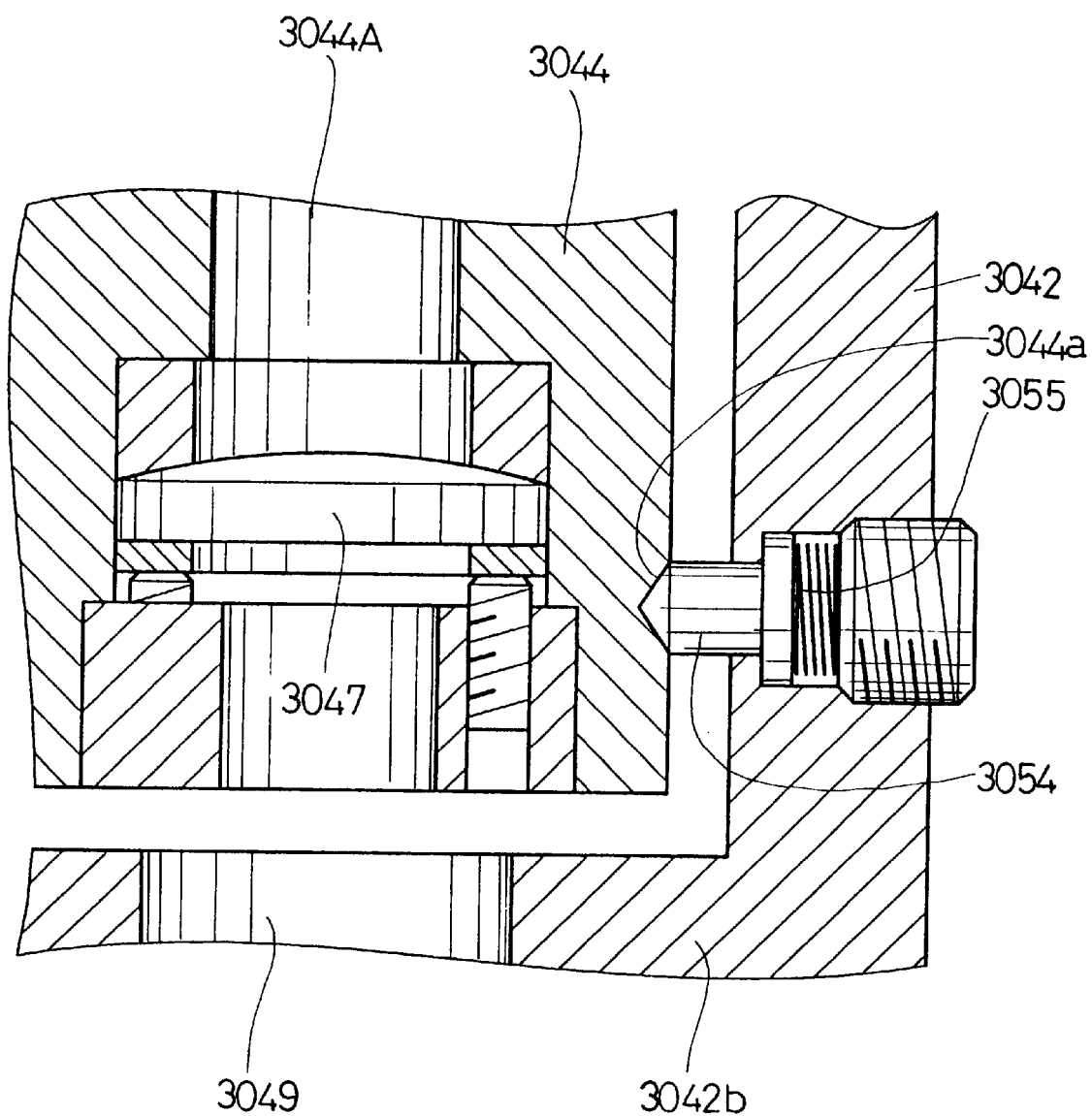
FIG. 52 is an enlarged sectional view showing part of FIG. 49.

FIG. 52 is an enlarged sectional view showing part of FIG. 49. As shown in FIGS. 52 and 49, the support 3042 has two lock pins 3054 provided in upper and lower portions thereof and each biased by a spring 3055 toward the lens rack 3044. As shown in FIG. 52, when one of the holes 3044A, 3044B and 3044C is aligned to the through holes 3048 and 3049 of the support 3042 by turning the lens rack 3044, each lock pin 3054 is engaged in a recess 3044*a* formed in the outer periphery of the lens rack 3044, and the lens rack 3044 is thus locked against rotation (or positioned).

As shown in FIG. 49, the guide cylinder 3046 is secured to the underside of the lower horizontal portion 3042*b* of the support 3042 such that it is aligned to the through hole 3049 in the horizontal portion 3042*b*. The protective cylinder 3050 which is mounted for vertical movement on the outer periphery of the guide cylinder 3046, is made of a transparent synthetic resin or like material, and has an annular groove 3053 formed in the outer periphery of the upper end portion thereof. As shown in FIGS. 46 to 48, a fork-like arm 3074 is engaged in the annular groove 3053 and is coupled to a rod 3071 of an air cylinder 3070 extending downwardly of and mounted on the bracket 3018 via a cylinder bracket 3072. The protective cylinder 3050 thus can be driven by the air cylinder 3070 for movement along the outer periphery of the guide cylinder 3046 between a raised position (or retreated position) as shown by phantom lines in FIG. 46 and a lowered position (or working position) as shown by solid lines.

As shown in FIG. 46, the protective cylinder 3050 has an air hole 3052 formed in the lower end portion thereof. As shown in FIGS. 46 to 48, an air pipe 3076 is connected at one end to the air hole 3052 and at the other end to an air source (not shown), and air can be blown through the air hole 3052 into the protective cylinder 3050.

As shown in FIGS. 47 and 48, on the rear side of the laser head 3040, a pipe 3066 extends forwardly of the machine from the machine frame 3014. To the front end of the pipe 3066 is connected a suction nozzle 3064 which is located adjacent the lower end of the laser head 3040 (i.e., the lower end of the protective cylinder 3050). The rear end of the pipe 3066 is connected to a duct 3068 which is disposed in the machine frame 3014. The duct 3068 is connected to a suction blower (not shown) so that air around the lower end of the laser head 3040 can be sucked out.

As shown in FIGS. 46 and 47, the machine table 3010 has vertically extending through holes 3011 each formed in a portion thereof corresponding to each laser head 3040. The hole 3011 is closed by a beam plate 3034 mounted on top of the table 3010. As shown in FIGS. 47 to 49, the beam plate 3034 has a beam hole 3035 for passing a laser beam therethrough. The laser beam irradiated from the laser head 3040 is passed through the beam hole 3035 without being reflected by the beam plate 3034 and is blocked by the block plate 3035 under the machine table 3010.

Above the laser head 3040, a beam guide 3080 is mounted on the front of the bracket 3018. As shown in FIGS. 48 and 49, the beam guide 3080 has a mirror support block 3082 and two guide pipes 3086 and 3087 connected thereto. The mirror support block 3082 is bolted to the front of the bracket 3018.

The two guide pipes 3086 and 3087 are connected to the mirror support block 3082 such that they are perpendicular to each other, one extending in the vertical direction of the machine and the other extending in the transversal direction thereof. Specifically, the guide pipe 3086 extends downward from the mirror support block 3082, and has a free end facing the through hole 3048 formed in the upper horizontal portion 3042a of the support 3042 of the laser head 3040. The other guide pipe 3087 extends rearwardly of the machine from the mirror support block 3082.

Figure 53:
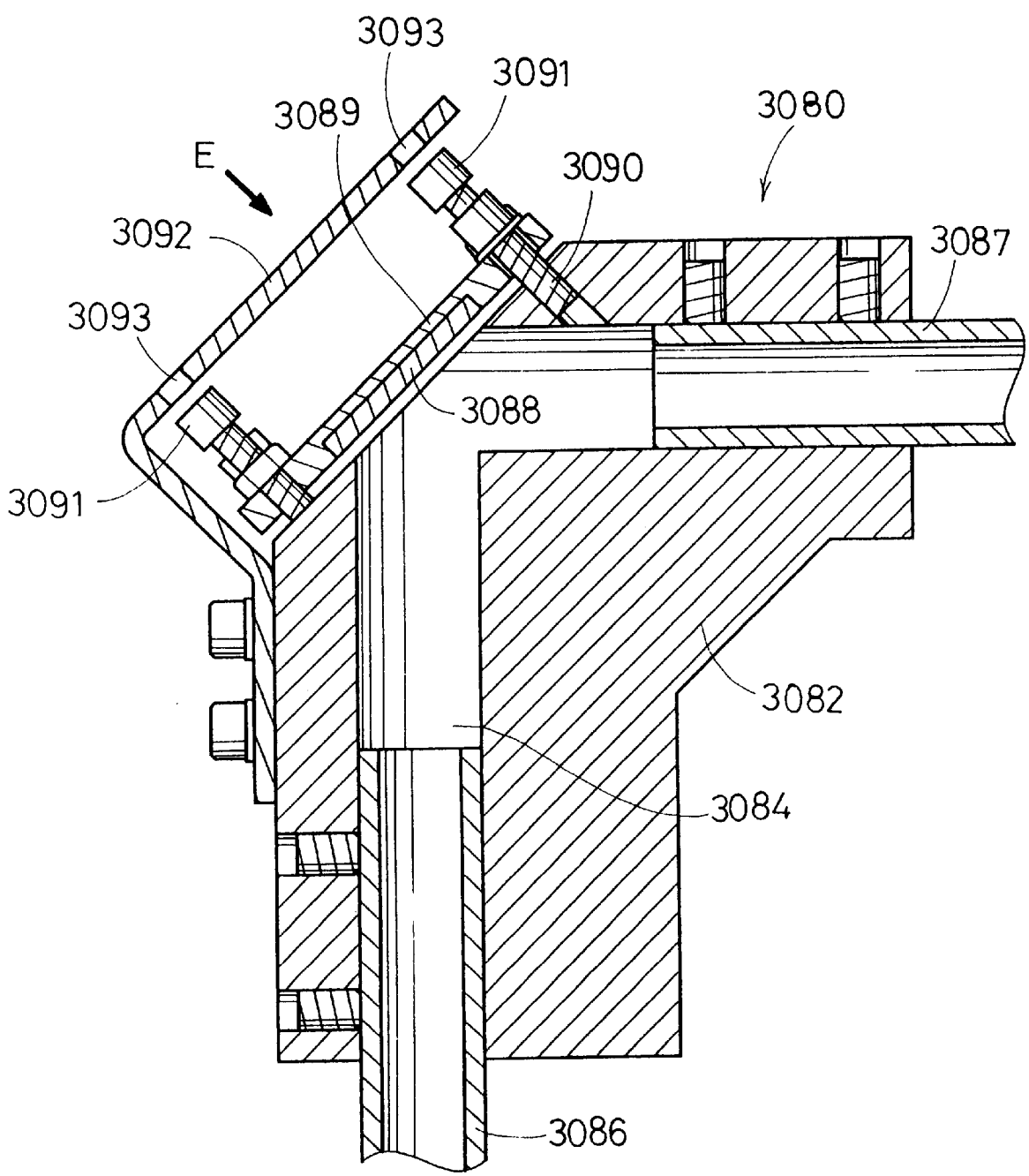
FIG. 53 is a sectional view, on an enlarged scale, showing part of a beam guide.
Figure 54:
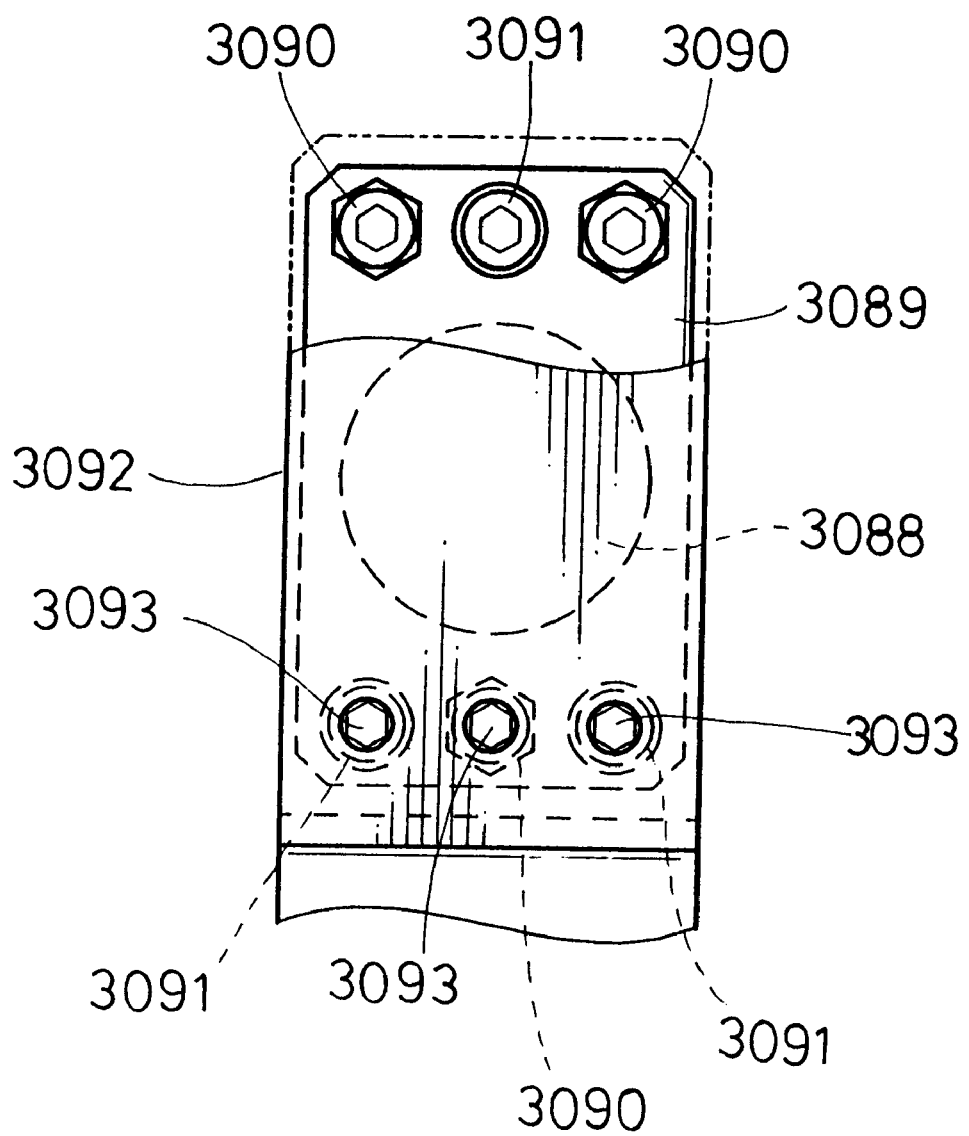
FIG. 54 is a view taken in the direction of arrow E in FIG. 53.

FIG. 53 is a sectional view, on an enlarged scale, showing part of the beam guide 3080, and FIG. 54 is a view taken in the direction of arrow E in FIG. 53. As shown in these drawings, the two guide pipes 3086 and 3087 are inserted from the opposite ends of a communication hole 3084 which is formed in the mirror support block 3082 and which is bent at right angles. At the corner of the communication hole 3084, the mirror support block 3082 is open, and a mirror holder 3089 with a full reflection mirror 3088 provided therein is mounted in the open portion of the mirror support block 3082.

As shown in FIG. 54, the mirror holder 3089 is clamped to the mirror support block 3082 by three set bolts 3090, i.e., a central one in an upper bolt row and left and right ones in a lower bolt row. As shown in FIG. 54, three adjustment bolts 3091, i.e., left and right ones in the upper bolt row and a central one in the lower bolt row, each have a free end in contact with the surface of the mirror support block 3082. The tilt of the mirror holder 3089 or the mirror 3088, can be adjusted in correspondence to the extent of turning of the adjustment bolts 3091. After the adjustment, the mirror holder 3089 is secured to the mirror support block 3082 by tightening the set bolts 3090.

A protective cover 3092 is mounted on the front of the mirror support block 3082 such that it covers the mirror holder 3089 supporting the mirror 3088. The protective cover 3092 serves to protect the operator from the laser beam in the event of detachment of the protective cylinder 3089 from the mirror support block 3082. The protective cover 3092 has through holes 3092 in which a tool for turning the set bolts 3090 and the adjustment bolts 3091 is inserted.

As shown in FIGS. 45 and 47, behind the machine frame 3014, laser generators 3100 each corresponding to each laser head 3040 are disposed such that they are directed in the transversal direction of the machine. The laser generators 3100 each use a gas laser (i.e., $CO_2$ laser) capable of continuously irradiating a laser beam. Behind each laser generator 3100, a guide pipe 3106 is provided to lead the laser beam irradiated from a radiation nozzle (not shown) to a guide pipe 3100 in the beam guide 3087.

The laser beam that has entered each beam guide 3080 strikes the mirror 3088 and reflects downward to be led to one of the holes 3044A, 3044B and 3044C in the lens rack 3044 of the laser head 3040, so that laser processing (such as cutting) on work is performed at the focal point of the lens 3047 in that hole.

As shown in FIG. 47, the laser generator 3100 is set on and secured to the top of a support plate 3104 which is supported horizontally by a support frame 3102 secured to the machine frame 3014 and a support frame 3103 secured to the rear end of the machine table 3010. A controller 3107 for the laser generator 3100 is mounted on the underside of the support plate 3104. As shown in FIG. 44, below the machine table 3010, a chiller box 3108 is disposed for cooling the laser generators 3100.

As shown in FIG. 47, on the end of each guide pipe 3106 adjacent the laser generator 3100, a blocking device 3110 which can block the laser beam is provided. The blocking device 3110 is provided as a safety measure in the event of radiation of the laser beam due to erroneous operation of the drive system for the laser generator 3100 or as a means for independently blocking the laser beam irradiated from each laser head 3040.

Figures 55A, 55B:
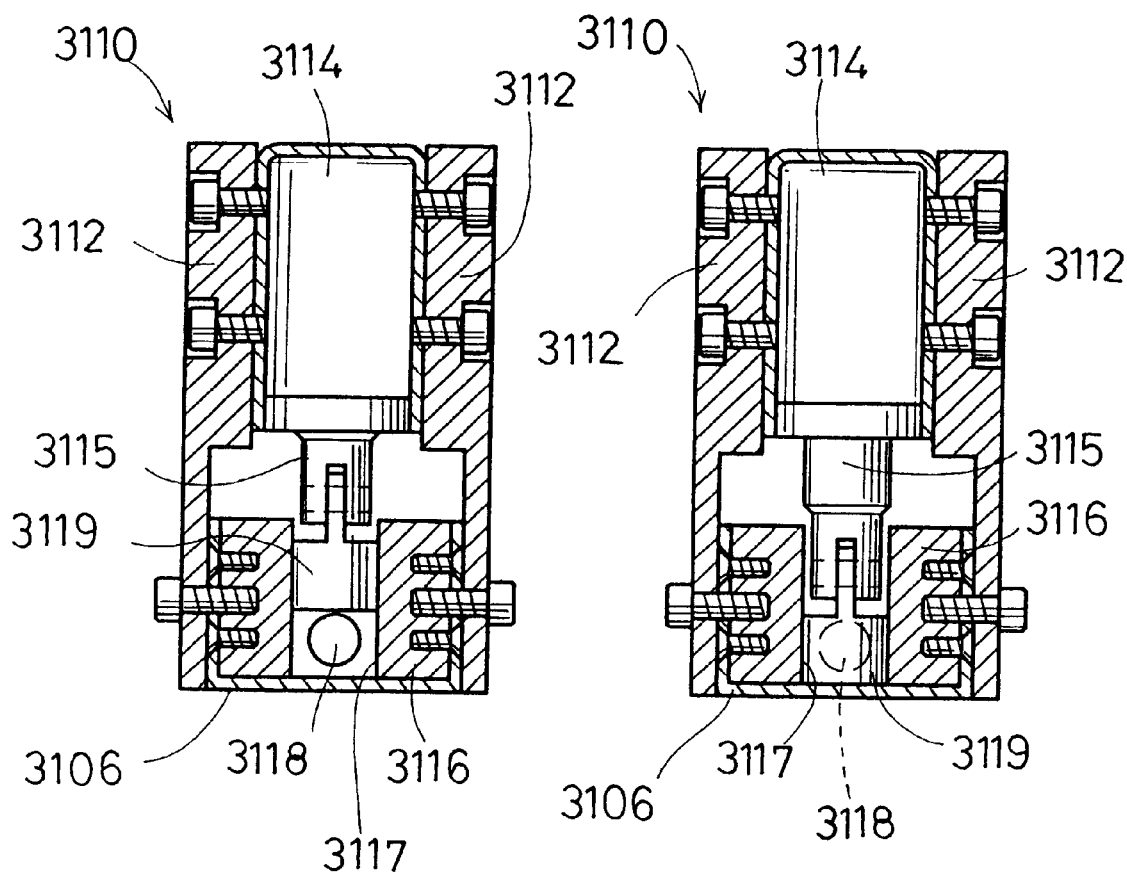
FIG. 55(A) is an enlarged sectional view showing a blocking device with a rod of a solenoid in a retreated position.
FIG. 55(B) is an enlarged sectional view showing the blocking device with the solenoid rod in a projected position.

FIGS. 55(A) and 55(B) are enlarged sectional views of the blocking device 3110. As shown in these drawings, the blocking device 3110 has supports 3112 fitted on and secured to the guide pipe 3106 and a steel block member 3116 fitted in and secured to the guide pipe 3106. Above the open end of the guide pipe 3106, a latching solenoid 3114 as an actuator of the blocking device 3110 is secured to the support 3112 with its rod 3115 directed downward.

The block member 3116 has a vertically extending through hole 3117 and a transversally extending horizontal through hole 3118 crossing the through hole 3117. The horizontal hole 3118 communicates with the interior of the guide pipe 3106, so that a laser beam can pass therethrough.

A blocking element 3119 coupled to the rod 3115 of the solenoid 3114, is vertically movably located in the vertical hole 3117 of the block member 3116. As shown in FIG. 55(A), when the rod 3115 of the solenoid 3114 is in its retreated position, the blocking element 3119 is pulled up to hold the horizontal hole 3118 open. By contrast, as shown in FIG. 55(B), when the rod 3115 is in its projected position, the blocking element 3119 is pushed down to hold the horizontal hole 3119 closed and blocks the laser beam irradiated from the laser generator 3100. Even when the latching solenoid 3114 is deenergized in either position shown in FIG. 55(A) or 55(B), it can hold the rod 3115 in that position.

As shown in FIGS. 44 and 46, control panels 3120 for the laser heads 3040 are each provided on the front of the machine frame 3014 at a position spaced apart to the right from each laser head 3040.

Figure 56A:
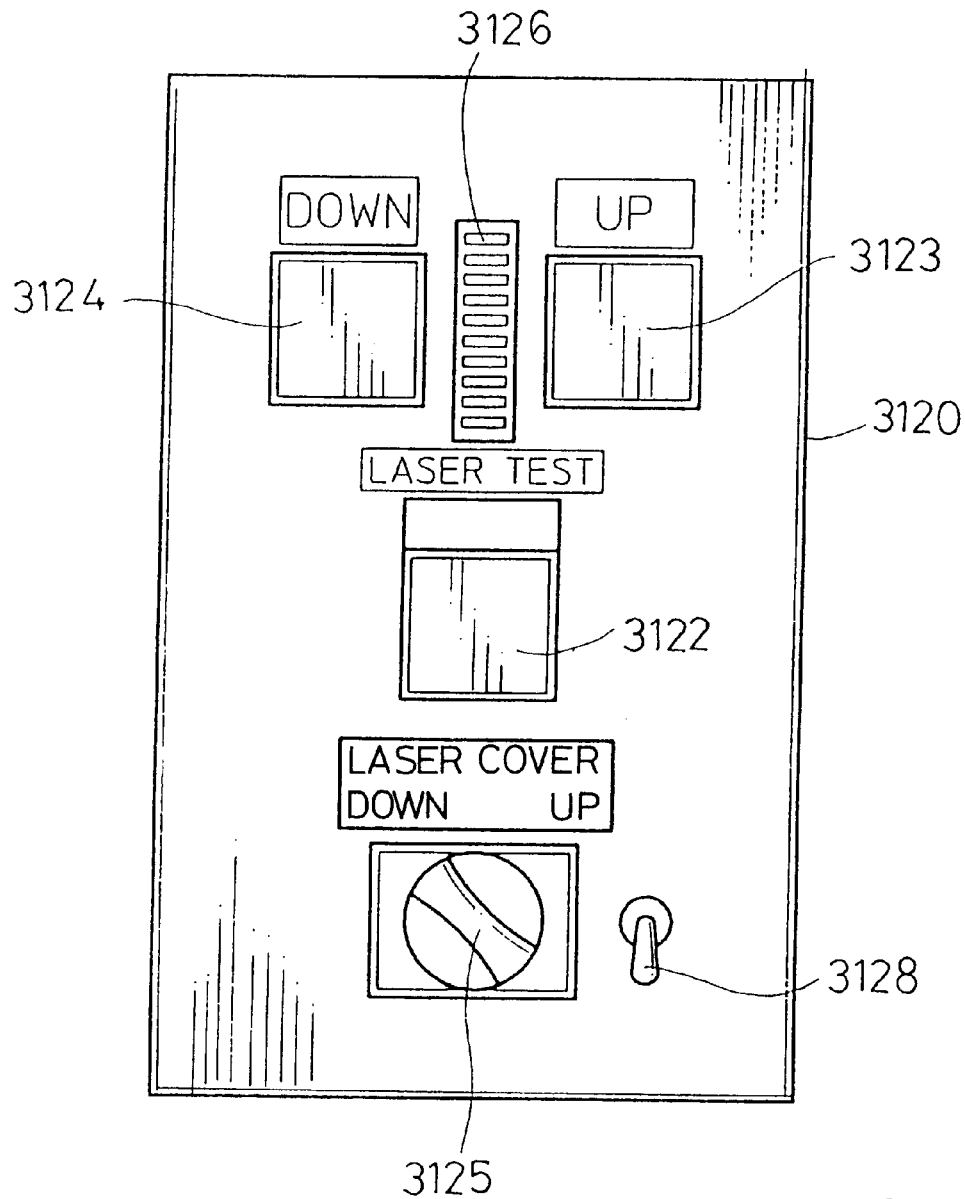
FIG. 56(A) is a view of a control panel.
Figure 56B:
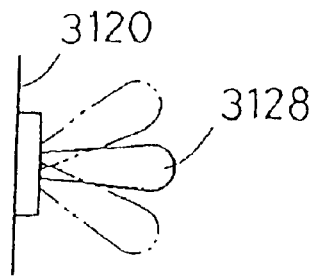
FIG. 56(B) is a view of a toggle switch on the control panel shown in FIG. 56(A)

FIG. 56(A) shows the control panel 3120 on an enlarged scale. As shown in the drawing, the control panel 3120 has a test switch 3122 for commanding radiation of a laser beam in a case as when adjusting the power level of the laser beam, power-up and power-down switches 3123 and 3124 for adjusting the power level during radiation of the laser beam, a display 3120 for displaying the power level of the laser beam, a lift switch 3125 for commanding the driving of the air cylinder 3070 for raising and lowering the protective cylinder 3050 of the laser head 3040, and a toggle switch 3128. As shown in FIG. 56(B), the toggle switch 3128 is capable of switching to one of three positions, i.e., an upper position, a middle position and a lower position. When it has been switched to the upper position, it can be automatically returned to the middle position as shown by solid lines in FIG. 56(B) by the force of an internal spring in response to releasing the operating force.

When a main switch (not shown) of the laser processing machine having the above construction is turned on, the power is supplied to the laser generators 3100 and the chiller box 3108 to start preheating of the laser generators 3100 and also start circulatory supply of cooling water from the chiller box 3108 to each laser generator 3100. Various adjustments of the laser beam irradiated from the laser generator 3100 will now be described.

Laser beam position adjustment:

(31) "LASER PROCESSING (or CUTTING)" mode is set on an operating panel 3019 of the machine shown in FIGS. 44 and 45.

(32) The protective cylinder 3050 is lowered from the retreated position to the working position by operating the lift switch 3125 on the control panel 3120.

(33) The test switch 3122 and the power-up switch 3123 on the control panel 3120 are depressed momentarily at a time. As a result, "TEST" mode is set up, and a laser beam of superlow power level is irradiated for a predetermined period of time.

(34) A check is made as to whether the laser beam irradiated from each laser head 3040 properly passes through the center of the beam hole 3035 in the beam plate 3034.

When the laser beam is deviated from the center of the beam hole 3035, the deviation of the laser beam is corrected by adjusting, for instance, the tilt of the mirror 3088 in the beam guide 3080 as described above.

Laser beam Power level adjustment:

After the operations in (31) to (34) above:

(35) The mode is switched over to "SETTING" mode on the operating panel 3019 of the machine.

(36) In this mode, the laser beam is irradiated while the test switch 3122 on the control panel 3120 is held depressed. The status of cutting by the laser beam is thus checked by putting a test cloth on the beam plate 3034.

The power level of the laser beam is gradually increased by holding the test switch 3122 and the power-up switch 3123 depressed simultaneously and is gradually reduced by holding the test switch 3122 and the power-down switch 3124 depressed simultaneously. The power level is displayed on the display 3126.

The adjustment of the power level of a laser beam by the operations in (35) and (36) above is made for each laser head 3040.

Focal point adjustment:

After the operations in (31) to (36) above:

(37) "FOCAL POINT ADJUSTMENT" mode is set on the operating panel 3019 of the machine, and the height of the laser head 3040 is adjusted by controlling the driving of the motor 3058 of the lift mechanism 3056 with a drive switch (not shown) of the laser head 3040. In this way, the focal point of the lens 3047 is adjusted.

The adjustment of the focal point can be done for each laser head 3040. The adjustment of the power level of laser beam and the adjustment of the focal point are made whenever the work is replaced.

Depending on the work, the lens 3047 is suitably replaced with one having a different focal distance. In such a case, the lens 3047 of a desired focal distance is selected by manually turning the lens rack 3044 of the laser head 3040 as described before.

The switching of embroidering with the sewing heads 3020 and laser processing with the laser heads 3040 over to each other will now be described. After displaying "HEAD SELECTION" menu on the operating panel 3019 of the machine, selecting "SEWING HEAD" menu makes it ready to perform embroidering with the sewing heads 3020, and selecting "LASER HEAD" menu makes it ready to perform laser processing with the laser heads 3040.

The embroidering and the laser processing may be switched manually. Usually, these operations are set in advance. The setting is made by key inputs on the operating panel 3019 and is made in units of embroidering and laser processing. With the multiple needle sewing head 3020, it is necessary to set in advance the needle 3026 (or needle bar) that is to be selected by sliding the needle bar case 3024. Since the needles 3026 in the sewing head 3020 are six in number, an intended needle 3026 can be set with either of key inputs "1" to "6" on the operating panel 3019 when the "SEWING HEAD" mode is selected in the "HEAD SELECTION" menu.

The difference of the control of the work frame 3016 for movement in the embroidering and in the laser processing will now be briefly described. In the embroidering, the work frame 3016 is controlled for normal movement according to movement data (or embroidering data). In the laser processing, the work frame 3016 is controlled for continuous movement at a uniform speed while providing linear interpolation according to the embroidering data.

In the embroidering operation, the work frame 3016 has to be moved intermittently since it can be moved only while the needle 3026 is separated form the work held thereon. In the embroidering operation, it is only necessary that the needle 3026 falls at points specified by data, and the work frame 3010 is thus not always moved along lines connecting points.

On the other hand, in the laser processing operation, the work frame 3016 has to be moved continuously at a uniform speed along lines connecting points specified by data. However, when the stitch length of the embroidering data used for laser processing is set to be small to some extent, it is possible to perform the laser processing without controlling the work frame 3016 for movement at a uniform speed or with linear interpolation. In the laser processing operation, the main shaft of the machine which is a drive source for the needle bars of the sewing heads 3020 and so forth is not rotated.

Now, the production of a simple applique by a combination of embroidering and laser processing (or cutting) will be described.

Figure 57A:
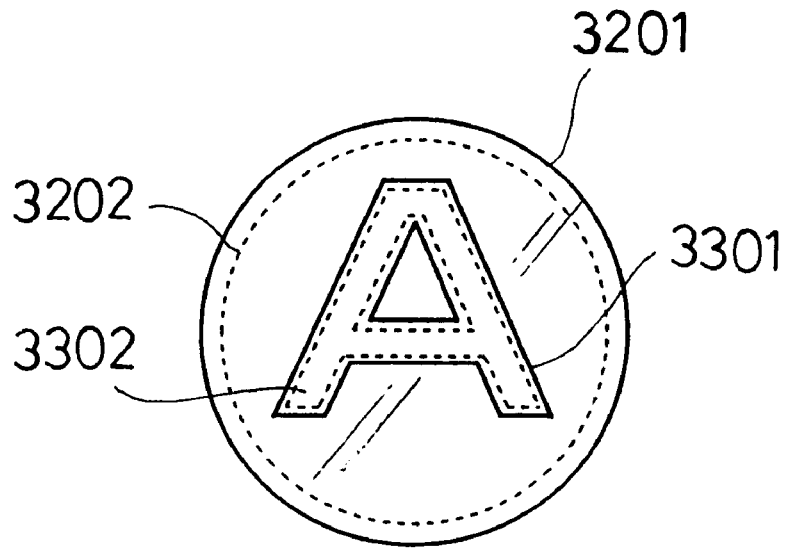
FIG. 57(A) is a front view of an example of applique that is produced.
Figure 57B:
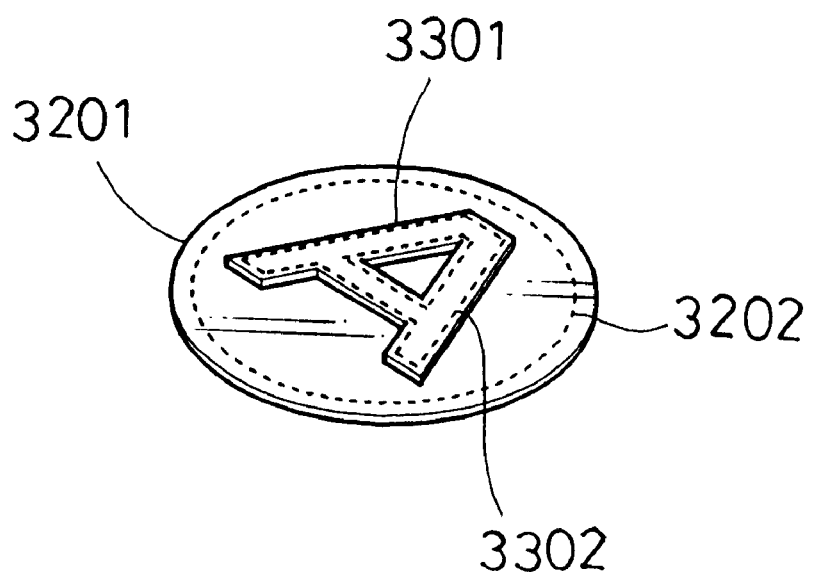
FIG. 57(B) is a perspective view of an example of applique that is produced.

FIGS. 57(A) and 57(B) show an example of an applique that has been produced. The illustrated applique comprises a circular base 3201 with a stitch line 3202 formed adjacent the circumference thereof, and a cut portion 3301 in the form of alphabet letter "A" sewed to the front surface of the base 3201 with a stitch line 3302.

Figure 58A:
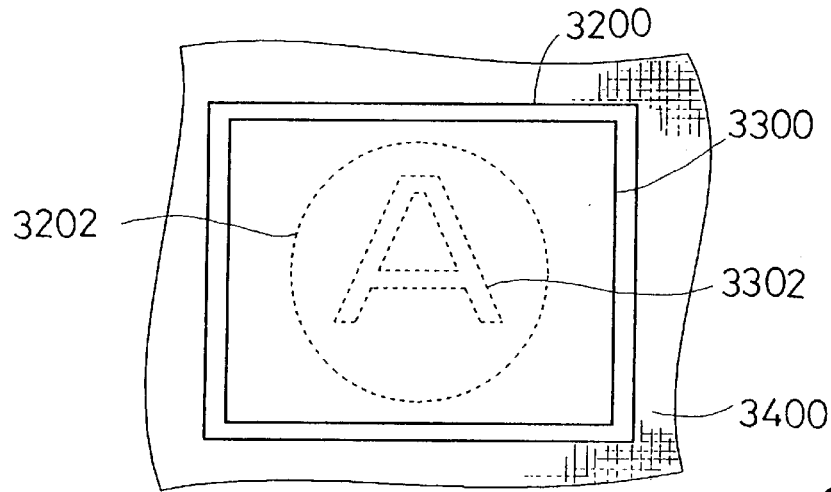
FIG. 58(A) is a view for describing an applique production procedure, specifically showing various materials involved.
Figure 58B:
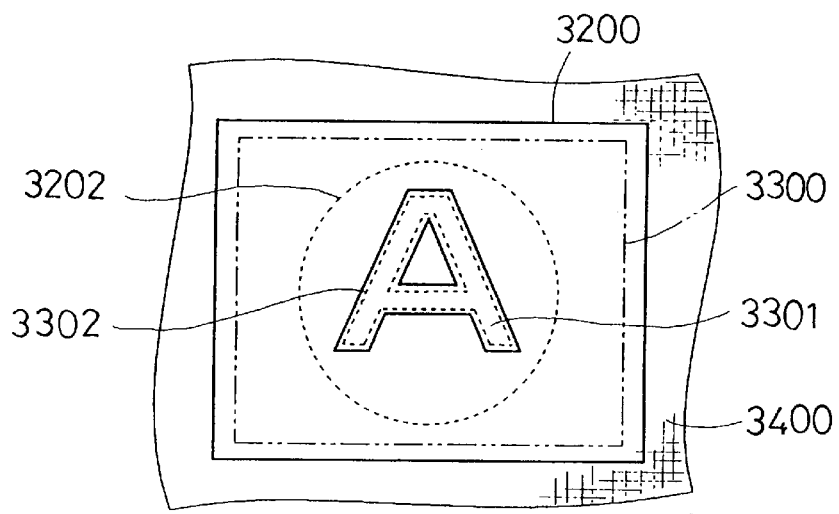
FIG. 58(B) is a view for describing the applique production procedure, specifically showing a sheet having been cut along the outer shape of a removing portion (i.e., the outer shape of an alphabet letter "A")
Figure 58C:
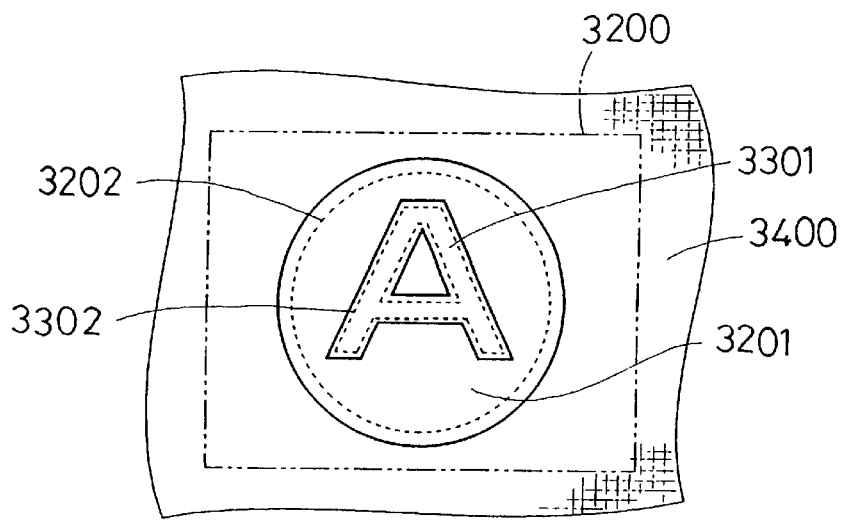
FIG. 58(C) is a view for describing the applique production procedure, specifically showing the sheet having been cut along the outer shape of a base (i.e., a circle)

FIGS. 58(A) to 58(C) illustrate the procedure of producing the applique. As shown in FIG. 58(A), first, a holder sheet 3400 of vinyl or the like is held in a stretched state on the work frame 3016. Then, a sheet 3200 as the material of the base 3201 is put on the holder sheet 3400. Then, a sheet 3300 as the material of the cut portion 3301 is put on. The sheets 3200 and 3300 are of cloth or leather and constitute the work. Desirably, the sheets 3200, 3300 and 3400 are tentatively bonded together with spray glue or the like to prevent mutual deviation. In this state, the stitch lines 3202 and 3302 are formed by the sewing operation of the sewing head 3020 and control of the work frame 3016 for movement.

As shown in FIG. 58(B), the sheet 3300 is then cut along the outer shape of the cut portion 3301 (i.e., outer shape of the alphabet letter "A") with laser beam radiation from the laser head 3040 and control of the work frame 3016 for movement, and the remainder of the sheet 3300 is removed. For this operation, the power level of the laser beam is adjusted in advance lest the lower sheet 3200 should be cut.

As shown in FIG. 58(C), the sheet 3200 is then cut along the outer shape (i.e., circular shape) of the base 3201 with laser beam radiation from the laser head 3040 and control of the work frame 3016 for movement, and the remainder of the sheet 3200 is removed. The completed applique is taken out from the holder sheet 3400, thus ending the operation of the applique production.

Now, the action to be taken in the event of imperfect laser cutting due to some cause will be described with reference to FIGS. 59 and 60.

Figure 59:
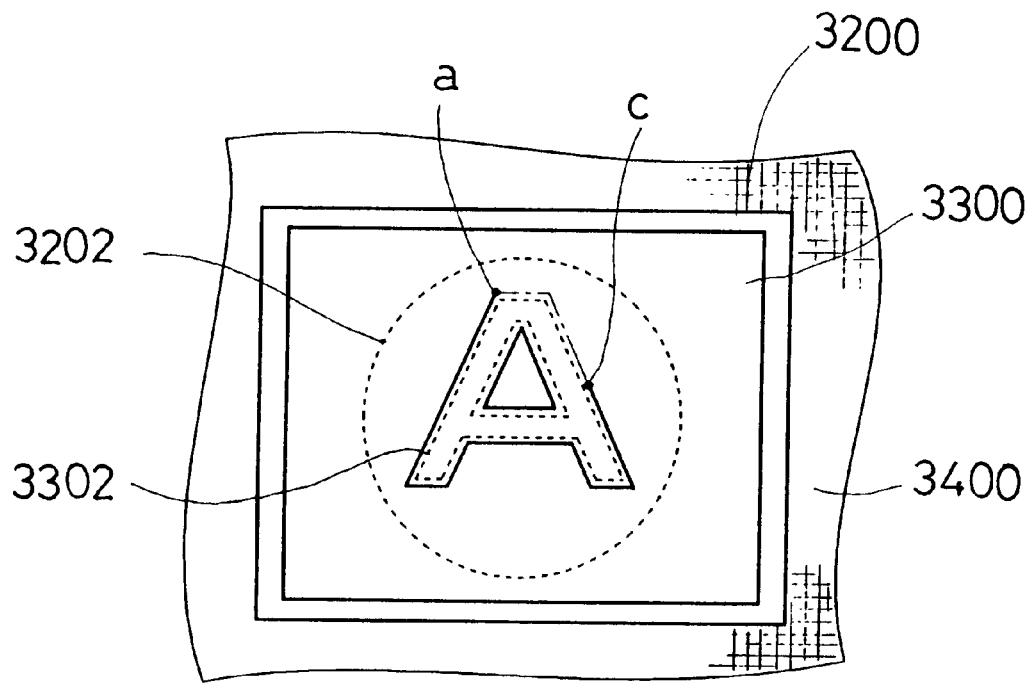
FIG. 59 is a view for describing a proper laser cutting state.

As shown in FIG. 59, it is assumed that the cutting of the sheet 3300 started from a point (and end point) a3 along the outer shape of the cut portion 3301 is now at a point c3. As shown in FIG. 60, it is also assumed that at this moment, a laser head which has failed to effect cutting after a point b3 (hereinafter referred to as "correction head") is found among the laser heads 3040. At this time, the machine is stopped, and the work frame 3016 of the "correction head" is moved back by a frame return operation according to movement data to bring the radiation point of the laser beam to the point b3 from which the cutting is to be made afresh.

The frame return operation is to move the work frame 3016 backward, i.e., in the direction opposite to the direction of progress, in steps each of a needle pitch or a plurality of needle pitches according to movement data. Such operation is executed automatically according to a frame return command. This function is utilized to make laser cutting afresh with the "correction head".

When the machine is restarted after switching the toggle switch 3128 on the control panel 3120 corresponding to the "correction head" to the upper position, the toggle switch 3128 is immediately automatically returned to the middle position, and only the "correction head" is caused to irradiate the laser beam while the work frame 3016 is moved from the recutting start point b3 to the return start point c3. During this time, the laser heads 3040 without switching of their corresponding toggle switches 3128 on the control panels 3120 to the upper position do not irradiate any laser beam. In other words, no other laser heads 3040 than the "correction head" irradiate any laser beam again to the portion having already been cut property. It is thus possible to avoid cutting or scorching the lower sheet 3200.

In the above way, the "correction head" is caused to make cutting afresh from the cutting restart position b3 to the return start position c3. When the return start point c3 is reached again with the progress of the work frame 3016, the other laser heads 3040 are caused to resume the radiation of the laser beam, so that the sheet 3300 is cut up to the end point a3 by all the laser heads 3040.

Figure 60:
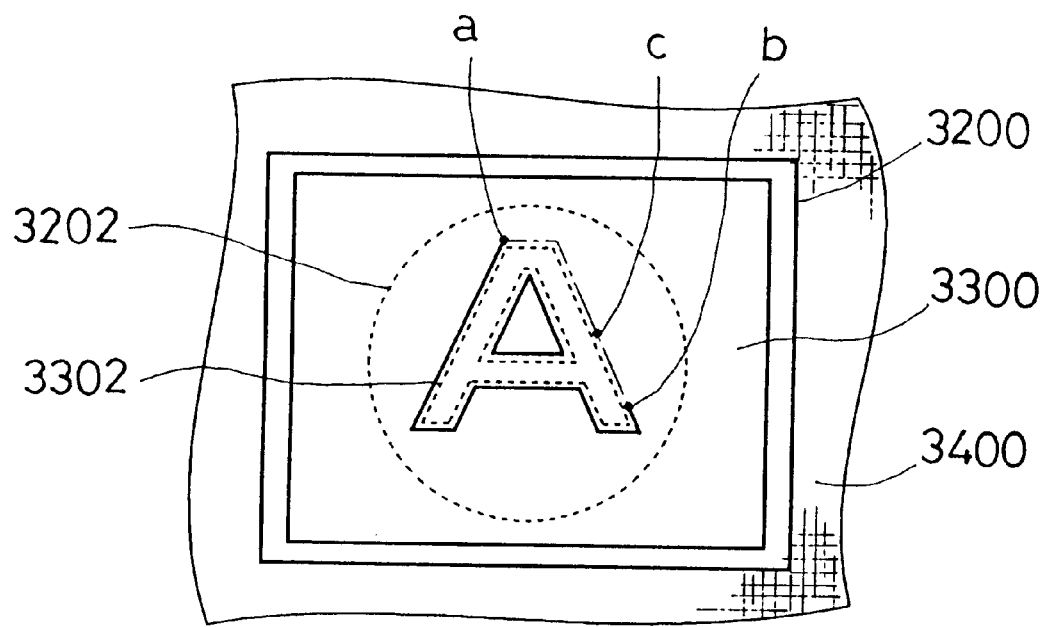
FIG. 60 is a view for describing an imperfect laser cutting state.

As an alternative operation, subsequent to the detection of laser head (i.e., "correction head") failing to effect cutting subsequent to the point b3 in FIG. 60, the cutting of the sheet 3300 by the other laser heads 3040 may be continued, and the cutting corresponding to the failure may be effected afresh after the machine has been stopped by a stop code. Specifically, the cutting corresponding to the failure is effected by returning the work frame 3016 by the frame return operation noted above to a position at which the radiation point of the laser beam in the "correction head" corresponds to the recutting start point b3, then switching the toggle switch 3128 on the control panel 3120 corresponding to the "correction head" to the upper position, and then restarting the machine. In consequence, only the "correction head" is caused to irradiate the laser beam to effect recutting up to the end point a3, and the machine is stopped.

In the recutting operation as shown above, the radiation of the laser beam from the other laser heads 3040 than the "correction head", may be stopped by stopping the laser output from the laser generators 3100 for these laser heads 3040. Alternatively, the laser beams from these laser heads 3040 may be blocked by the corresponding blocking devices 3110.

It is further possible to arrange that switching the toggle switch 3128 to the lower position causes suspension of the laser output form the laser generator 3100 of the corresponding laser head 3040. In this way, the operation of each laser head 3040 may be suspended independently by switching the corresponding toggle switch 3128 to the lower position.

Like the above recutting operation, reembroidering by the sewing head 3020 may be performed in the embroidering operation. Control to this end is made by key operation on the operating panel 3019 of the machine, operation of the toggle switch 3128 on the control panel 3120 and processing of a machine controller (or microcomputer) on the basis of these operations.

In the laser processing as described, the frame returning means for returning the work frame 3016 from, for instance, the point c3 in FIG. 60 to the recutting start point b3, the beam control means for stopping the radiation of the laser beam from the laser heads 3040 other than the "correction head" while the work frame 3016 is moved from the recutting start point b3 to the return start point c3, and the releasing means for releasing the stopping of the radiation of the laser beam from the laser heads 3040 other than the "correction head" upon reaching of the return start point c3 of the work frame 3016, are constituted mainly on the basis of the key operation on the operating panel 3019 of the machine, operation of the toggle switch 3128 on the control panel 3120 and the processing function of the machine controller based on these operations.

With the fourth embodiment as shown, when making recutting due to imperfect laser processing by any one of a plurality of laser heads, the radiation of the laser beam from the other laser heads than that one is stopped from the recutting start point from which the laser processing is performed afresh, to the return start point from which the work frame has been returned, so that it is possible to prevent the laser beam from being irradiated again to a portion of the work having been properly laser processed. When the work frame reaches the return start point, the laser heads from which the radiation of the laser beam has been stopped during the recutting operation, are released from the stopping of radiation of the laser beam, and the laser processing by these laser heads is automatically resumed.

Fifth Embodiment

A fifth embodiment of the invention will now be described with reference to FIGS. 61 to 69. This embodiment is an application of the invention to an embroidering machine which has a plurality of (i.e., four) multiple needle sewing heads and also laser heads each corresponding to each sewing head.

Figure 61:
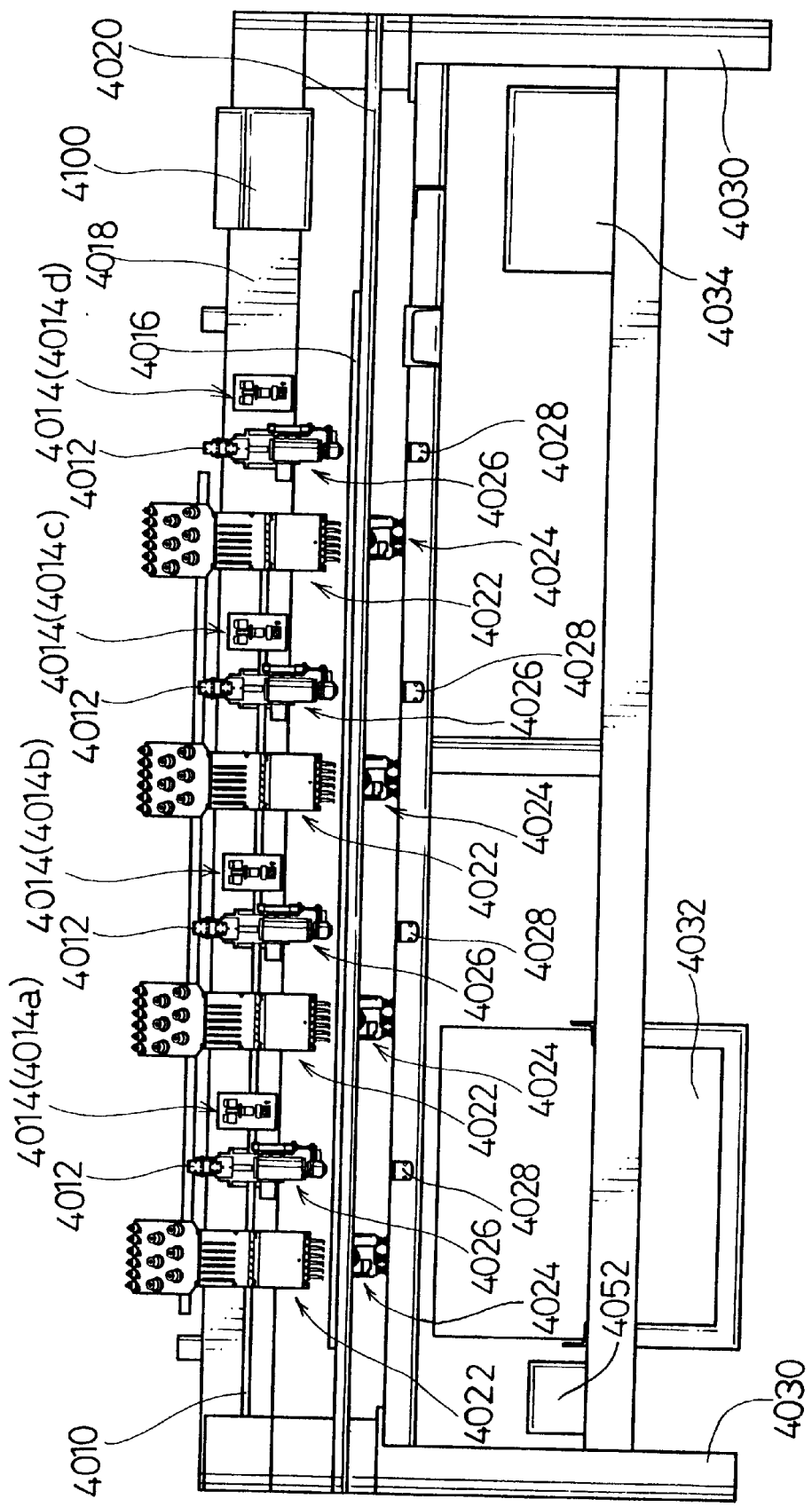
FIG. 61 is a front view of a multiple head embroidering machine.
Figure 62:
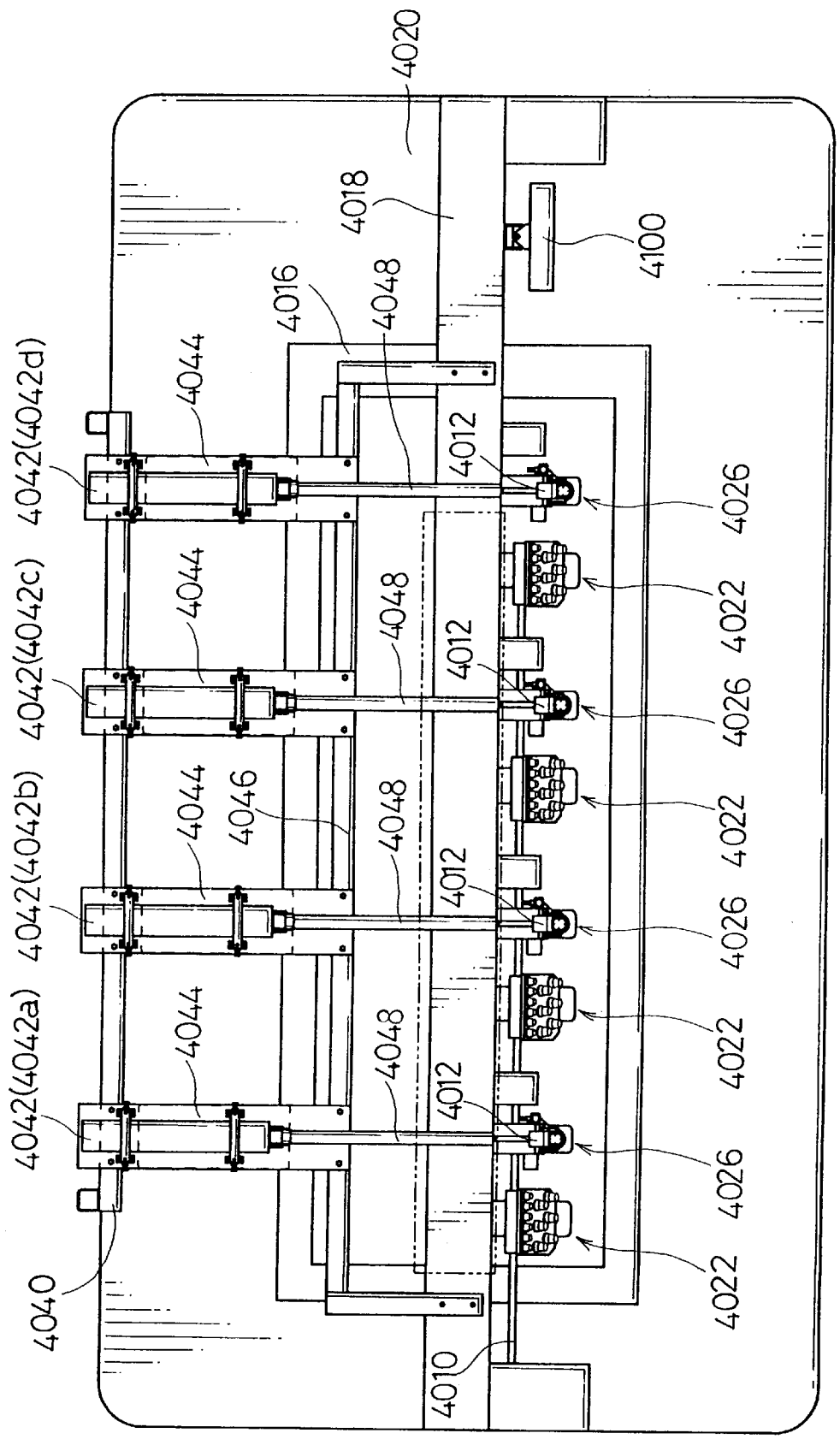
FIG. 62 is a plan view of the multiple head embroidering machine.

FIG. 61 is a front view of the embroidering machine, and FIG. 62 is a plan view of FIG. 61. As shown in these drawings, the machine has four sewing heads 4022 which are disposed at a uniform interval on the front surface of a machine frame 4018 located above a machine table 4020. The machine also has four laser heads 4026 provided on the front surface of the machine frame 4018 and each corresponding to each sewing head 4022.

The construction of the embroidering machine will now be described. As shown in FIGS. 61 and 62, a work frame 4016 as a work holder which can hold a work 4016a (sheet-like material such as leather or cloth) to be described later, is provided on top of the machine table 4020. The work frame 4016 can be controlled for movement in X- and Y-axis directions in FIG. 62 according to predetermined movement data (or embroidering data).

As shown in FIG. 61, a horizontal frame between opposite table legs 4030 on the underside of the machine table 4020, supports shuttle bases 4024 each located at a position corresponding to each sewing head 4022. The horizontal frame also supports steel block plates 4028 each secured to the front surface thereof at a position corresponding to each laser head 4026 for blocking laser beam irradiated from each laser head 4026.

As shown in FIG. 62, in each sewing head 4022, a needle bar case is supported for sliding movement in the longitudinal direction of the machine on a front portion of a machine arm secured to the machine frame 4018. In the needle bar case, a plurality of (for instance, six) needle bars each with a needle provided on the lower end portion thereof are supported for vertical movement.

The needle bar cases of the sewing heads 4022 are coupled to one another by connecting rods 4010 and can be driven at a time by a predetermined drive source for sliding movement in the same direction. As is well known in the art, one of the needle bars is selected by this operation, and only the selected needle bar is driven vertically together with its associated needle.

A laser processing machine for performing laser processing will now be described. As shown in FIG. 62, above each laser head 4026, a beam guide 4012 is mounted on the front surface of a bracket. Behind the machine frame 4018, laser generators 4042 each corresponding to each laser head 4026 are disposed such that they are directed in the transversal direction of the machine.

The laser generator 4042 uses a $CO_2$ laser as a gas laser capable of continuously irradiating a laser beam. In front of each laser generator 4042, a guide pipe 4048 is disposed to lead the laser beam irradiated from a radiation nozzle to a guide pipe in the beam guide 4012.

The laser beam that has entered each beam guide 4012 strikes a mirror and reflects downward to be led to a hole formed in a lens rack of the laser head 4026, so that the work 4016*a* is laser processed (specifically, engraved or cut) at the focal point of a lens in the hole.

A blocking plate for blocking the laser beam can be mounted between the laser generator 4042 and the guide pipe 4048. Usually, for operations other than the laser processing, the radiation of a laser beam is blocked individually (or collectively) by the blocking plates. This is a safety measure in the event of erroneous radiation of the laser beam from any laser generator 4042 due to some cause.

The laser generator 4042 is set on and secured to the top of a support plate 4044 which is supported horizontally by a support frame 4046 secured to the machine frame 4018 and a support frame 4040 secured to the rear end of the machine table 4020. A controller for the laser generators 4042 is mounted on the underside of the support plate 4044. As shown in FIG. 61, below the machine table 4020, a chiller box 4032 as a cooler for cooling the laser generators 4042 and a centralized control box 4034 for centralizedly controlling the operations of components of the embroidering machine are disposed.

As shown in FIGS. 61 and 62, laser unit boxes 4014 are each provided on the front surface of the machine frame 4018 at a position spaced apart rightward from each laser head 4026. The laser unit box 4014 has a test switch for commanding radiation of the laser beam when adjusting the output power level, a power-up/down switch for adjusting output power level, a display for displaying the output power level, a lift switch for commanding the driving of an air cylinder for raising and lowering a protective cylinder of the laser head 4026, a toggle switch, and so forth.

When a main switch of the embroidering machine having the above construction is turned on, the power is supplied to the laser generators 4042 and the chiller box 4032 to start preheating of the laser generators 4042 and also start circulatory supply of cooling water from the chiller box 4032 to the laser generators 4042. With the circulatory supply of cooling water, each laser generator 4042 is held at a substantially constant temperature, so that an output characteristic peculiar to each laser generator 4042 is maintained.

Figure 63:
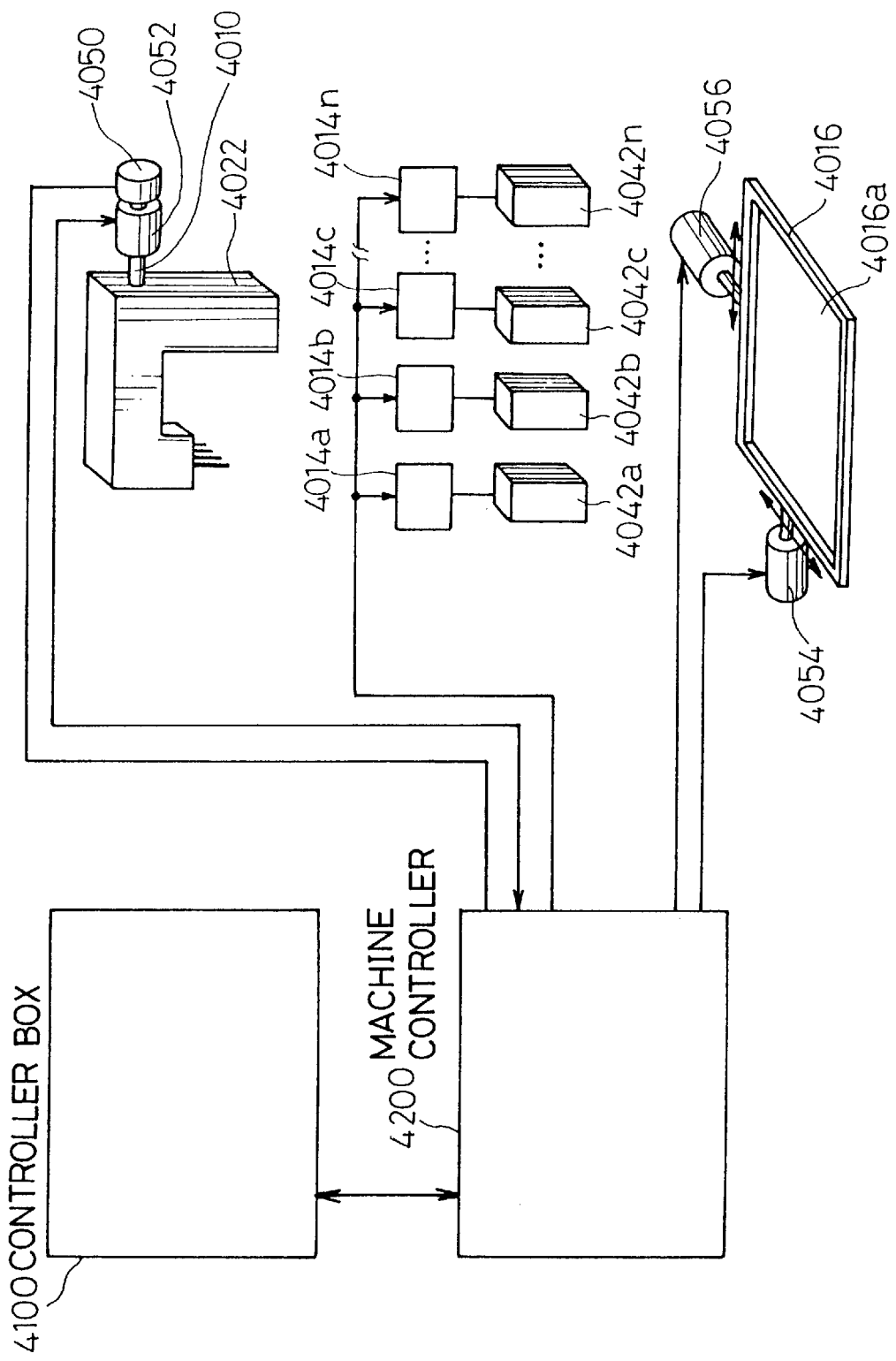
FIG. 63 is a schematic block diagram showing the whole construction of an electric system.
Figure 64:
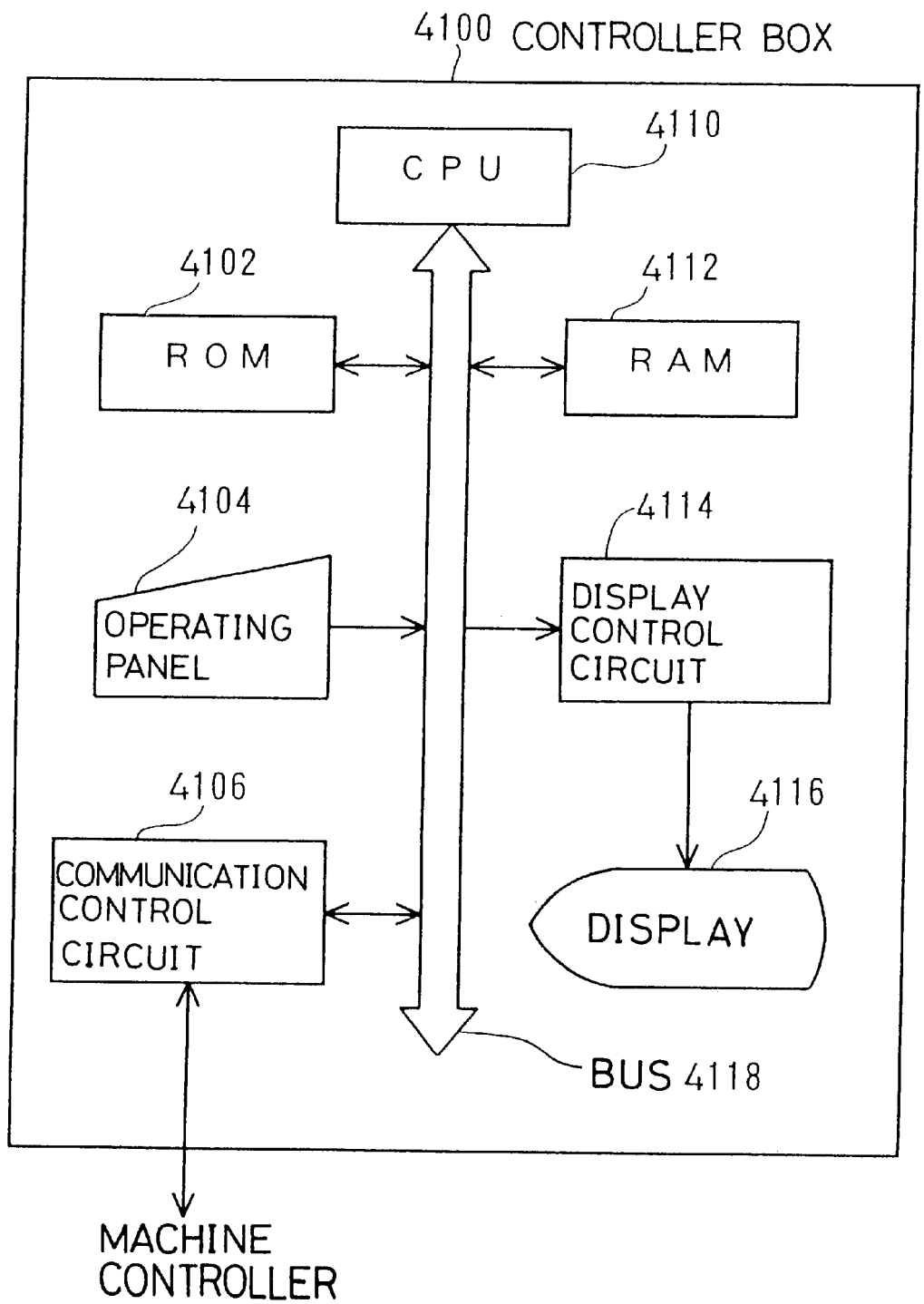
FIG. 64 is a block diagram showing a controller box.
Figure 65:
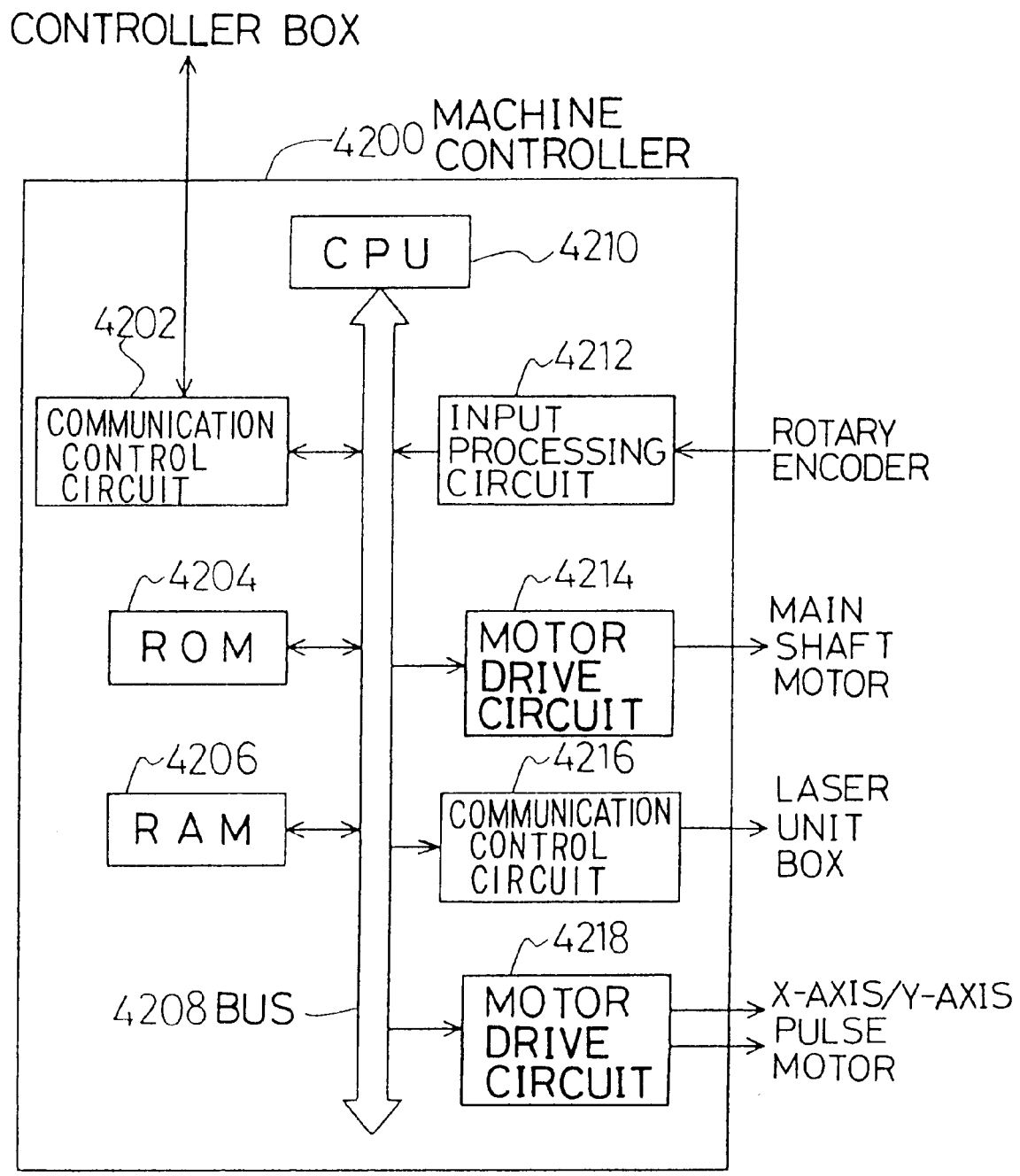
FIG. 65 is a block diagram showing a machine controller.
Figure 66:
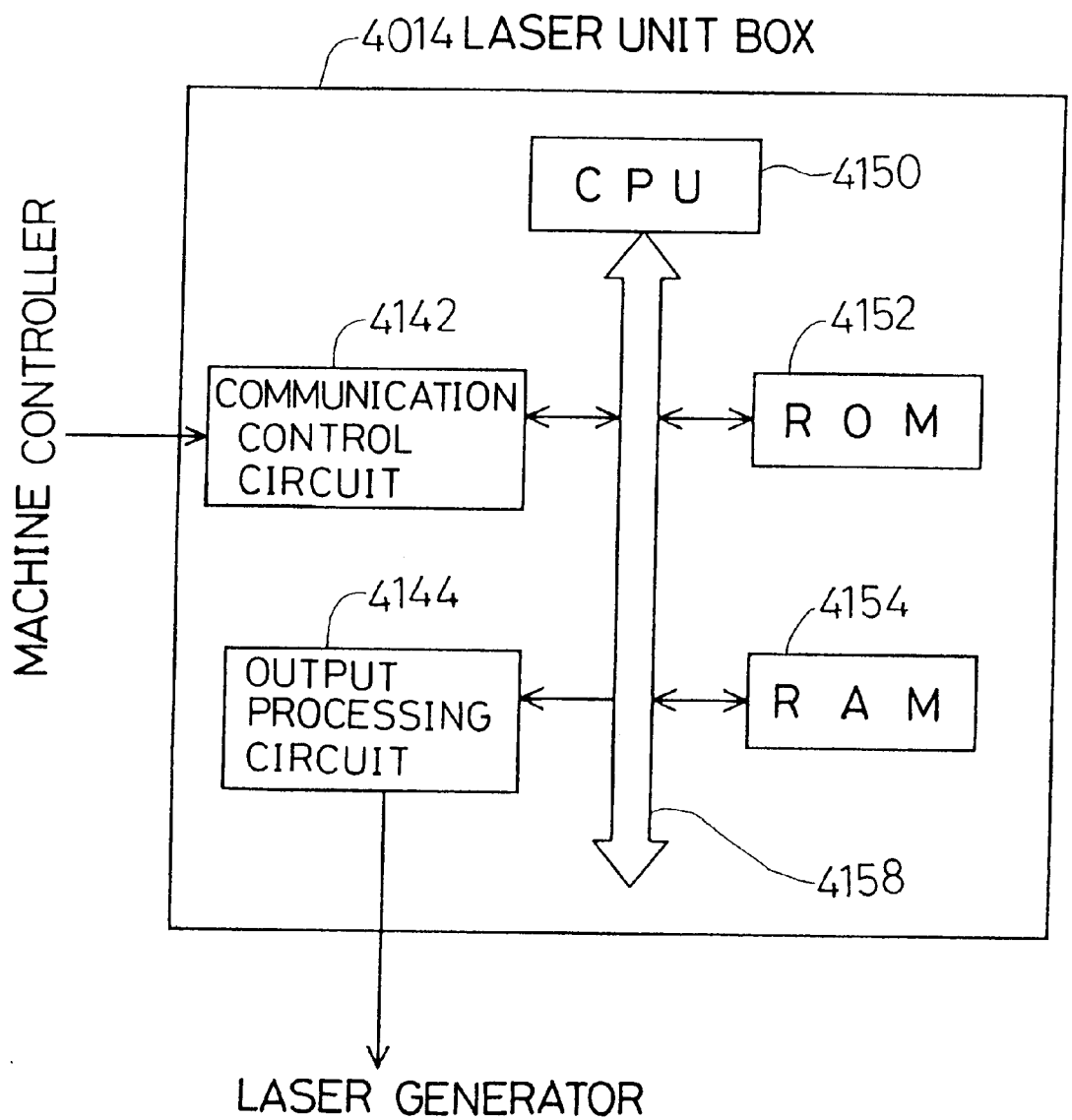
FIG. 66 is a block diagram showing a laser unit box.

The electric system connection in the embroidering machine having the above construction will now be described with reference to FIGS. 63 to 66. FIG. 63 is a block diagram showing the whole electric system, FIG. 64 is a block diagram showing a controller box 4100, FIG. 65 is a block diagram showing a machine controller 4200, and FIG. 66 is a block diagram showing the laser unit box 4014. The illustrated constructions are all necessary for carrying out the embodiment.

As shown in FIG. 63, the controller box 4100, which is also shown in FIGS. 61 and 62, is provided on a portion of the machine frame 4018 near the right end of the machine table 4020. The controller box 4100 serves to input commands concerning operations of the embroidering machine, such as setting of embroidering data.

The machine controller 4200 is provided in the centralized control box 4034 shown in FIG. 61 and performs centralized control of components of the embroidering machine, such as control of the driving of a main shaft motor 4052, control of the driving of pulse motors 4054 and 4056 for moving the work frame 4016, and control of the output of the laser generators 4042 for laser processing.

The construction of the controller box 4100 will now be described. As shown in FIG. 64, the controller box 4100 has a CPU 4110, a ROM 4102, a RAM 4112, an operating panel 4104, a communication control circuit 4106, a display control circuit 4114, and a display 4116.

The CPU 4110 controls the whole controller box 4100 according to controller programs stored in the ROM 4102. An EEPROM is used as the ROM 4102, but this is not limitative; it is possible to use a PROM, an EPROM or a flush memory or a non-volatile memory as well.

As the RAM 4112, a DRAM is used in which display data in a display process or the like are stored. It is possible to use a SRAM, a flush memory or like memory for the RAM 4112 in lieu of the DRAM.

The operating panel 4104 is a control panel operable by the operator for inputting various data or commanding operations of the embroidering machine.

The display control circuit 4114 is a circuit to control the display on the display 4116 according to display control data supplied from the CPU 4110 via a bus 4118. The display 4116 is most suitably a monochromatic liquid crystal display in order to make its housing compact and hold its power consumption to be low. However, the monochromatic liquid crystal display is by no means limitative as the display 4116, and it is possible to use as well other kinds of displays, such as color liquid crystal displays, CRTs, plasma displays, and LED displays (which comprise LEDs arranged in a lattice-like array in a rectangular region).

The communication control circuit 4106 is a control circuit to permit mutual data transfer with the machine controller 4200 to be described later. Specifically, it supplies embroidering commands for executing embroidering and laser processing commands for laser processing to the machine controller 4200 and receives a thread breakage signal, an emergency stop signal, etc. from the machine controller 4200. The embroidering commands and laser processing commands include timing data about operations of the needle bars and the laser generators, stitch data for commanding movement of the work frame 4016 and other command data.

The above components are all interconnected via the bus 4118.

The construction of the machine controller 4200 will now be described. As shown in FIG. 65, the machine controller 4200 has a CPU 4210, a ROM 4204, a RAM 4206, communication control circuits 4202 and 4216, an input processing circuit 4212 and motor drive circuits 4214 and 4218.

The CPU 4210 controls the whole embroidering machine according to machine control programs stored in the ROM 4204. Like the ROM 4102, the ROM 4204 is an EEPROM, but it may be a different kind of non-volatile memory as well. Like the RAM 4112, the RAM 4206 is a DRAM, but it may be a different kind of memory as well.

The communication control circuit 4202 is a control circuit for mutual data transfer with the controller box 4100. Data that are mutually transferred are as described above.

The communication control circuit 4216 is a control circuit for mutual data transfer with the laser unit box 4014. Specifically, the communication control circuit 4216 supplies data of common output power level for laser processing to the laser unit box 4014, and receives data of output power level, etc. from the laser unit box 4014.

The motor drive circuit 4214 drives a main shaft motor 4052 shown in FIG. 63 according to main shaft drive control data supplied from the CPU 4210 via a bus 4208. A rotary encoder 4050 provided on the main shaft motor 4052 detects the rotation thereof and provides a pulse signal, which is converted in an input processing circuit 4212 into a form capable of being processed in the machine controller 4200, the converted signal being supplied to the CPU 4210 and the RAM 4206.

The motor drive circuit 4218 drives an X-axis pulse motor 4056 and a Y-axis pulse motor 4054 shown in FIG. 63 independently for rotation according to frame drive control data supplied from the CPU 4210 via the bus 4208.

The above components are interconnected via the bus 4208.

The construction of the laser unit box 4014 will now be described. As shown in FIG. 66, the laser unit box 4014 has a CPU 4150, a ROM 4152, a RAM 4154, a communication control circuit 4142, and an output processing circuit 4144.

The CPU 4150 controls the entire laser unit box 4014 according to laser control programs stored in the ROM 4152. In the ROM 4152, values of control voltage applied to the laser generators 4042 are stored for each common output power level in addition to the laser control programs. Like the ROM 4102, the ROM 4152 is an EEPROM, but it may be a different kind of non-volatile memory as well.

The communication control circuit 4142 is a control circuit for executing mutual data transfer with the machine controller 4200. Mutually transferred data are as described above.

The output processing circuit 4144 is a circuit to convert the voltage outputted from the laser generator 4042 according to output data (selected data) supplied from the CPU 4150 via a bus 4158. As the current or voltage to be outputted for the control of the laser generator 4042, pulse width modulation (PWM) or pulse frequency modulation (PFM) is used in order that it can be varied according to the work. The pulse width modulation is a control for varying the duty ratio of the pulse wave outputted at a constant frequency, and the pulse frequency modulation is a control for varying the frequency of a pulse wave outputted with a constant duty ratio. The construction of the output processing circuit 4144 is not limited to that for the pulse width modulation, but it is possible as well to adopt a construction which can switch a plurality of control currents or a plurality of control voltages to be outputted through a current hysteresis control, relays, resistor circuit networks, etc.

The above components are all interconnected via the bus 4158.

Figure 67:
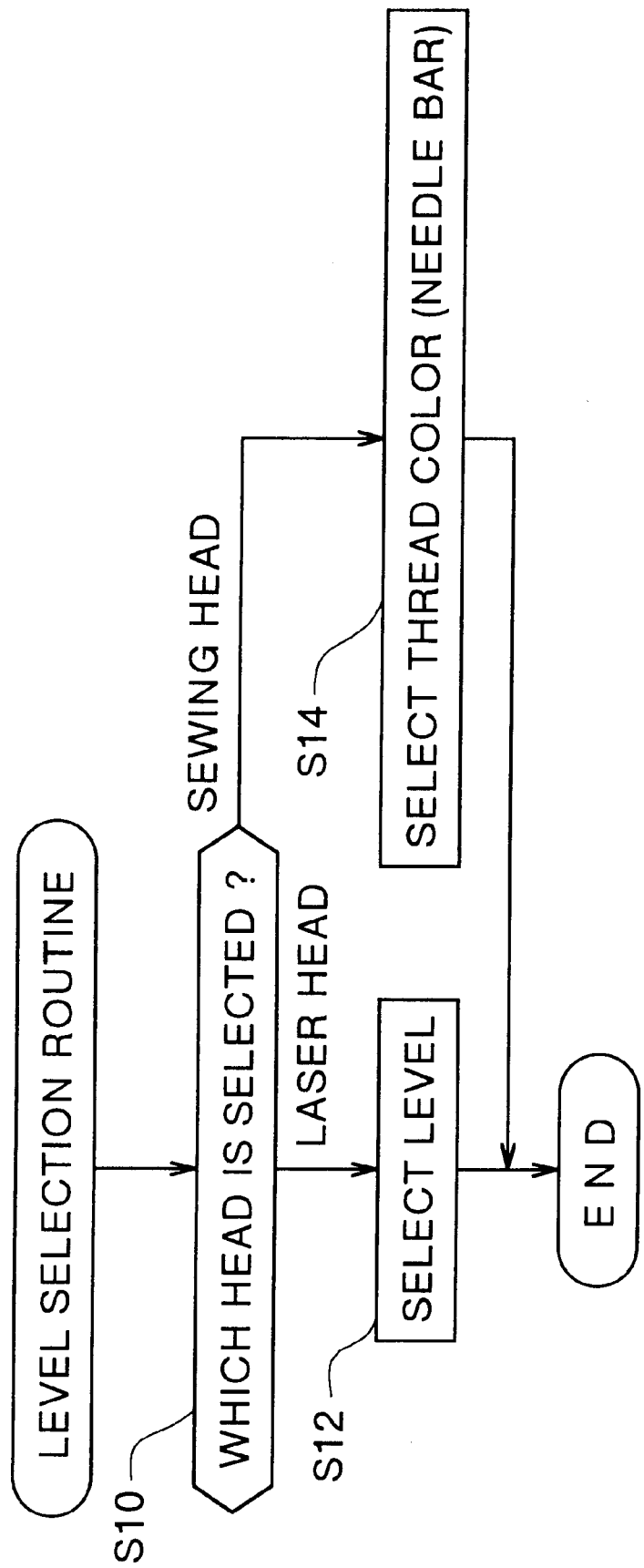
FIG. 67 is a flow chart illustrating a level selection routine.
Figure 68:
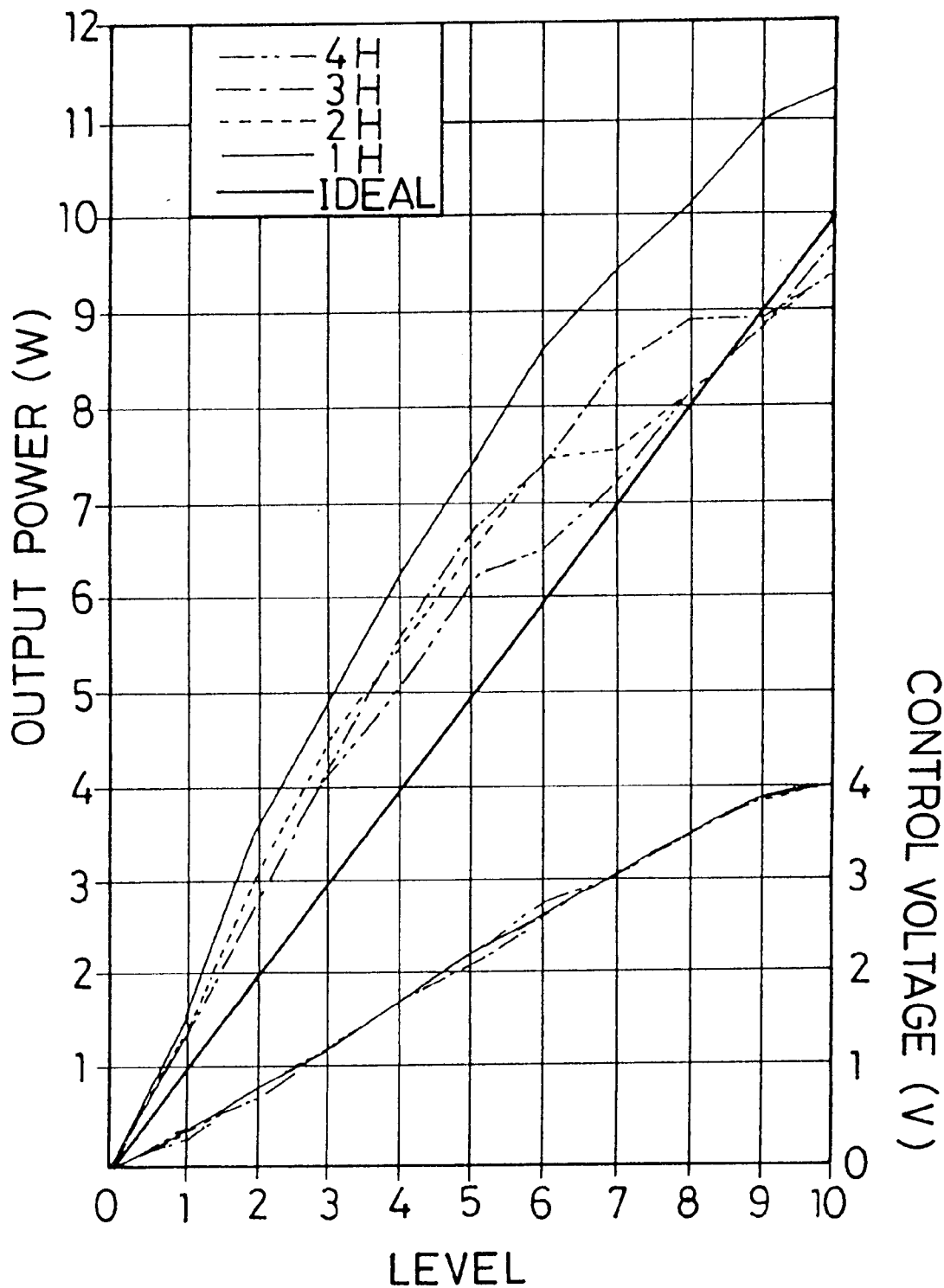
FIG. 68 is a graph showing the relation between output power and control voltage at various levels.
Figure 69:
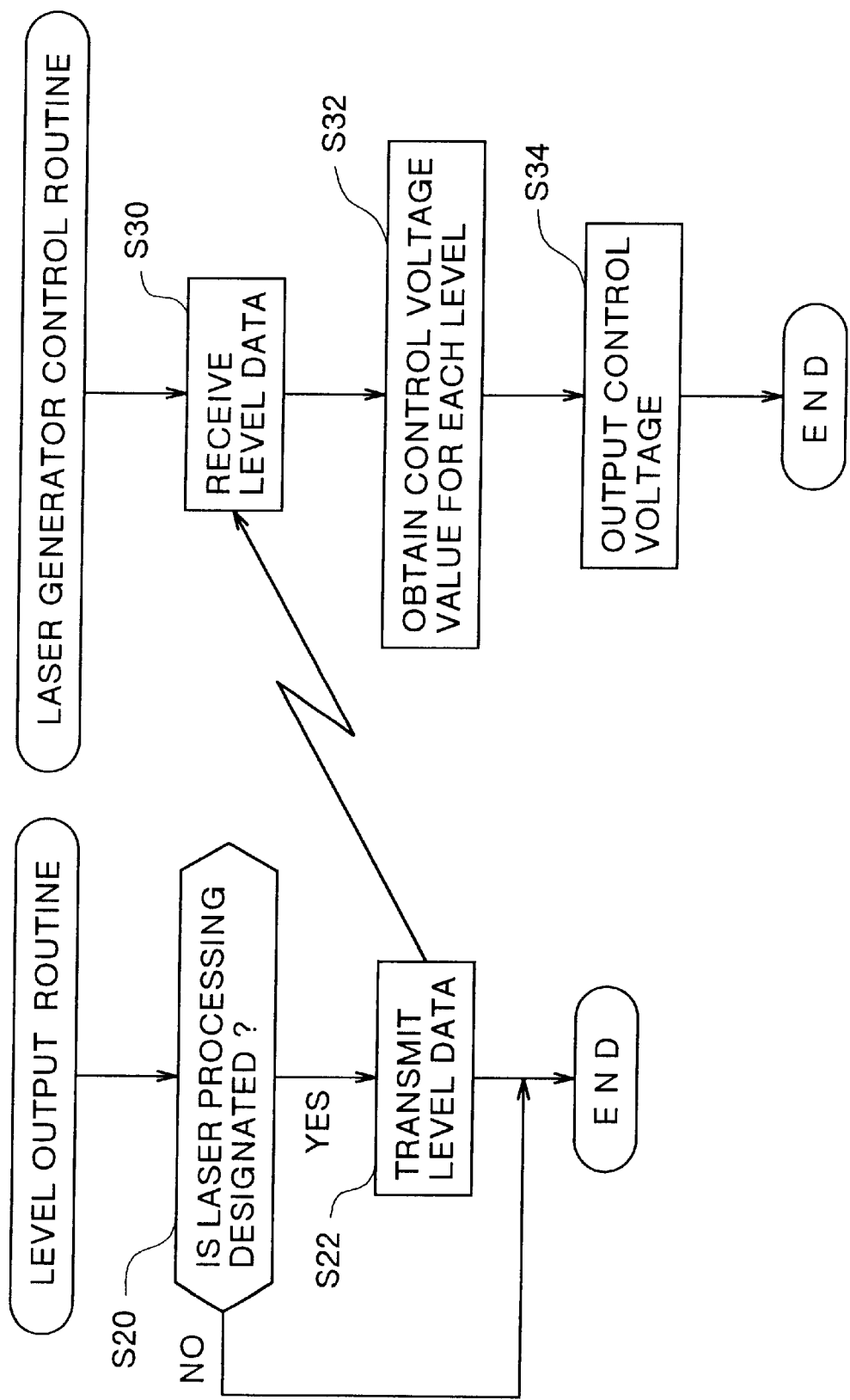
FIG. 69 is a flow chart illustrating a level output routine and a laser generator control routine.

The processing procedures executed in this embodiment will now be described with reference to FIGS. 67 to 69. FIGS. 67 and 69 are flow charts illustrating the processing procedures for carrying out the embodiment. FIG. 67 illustrates a level selection routine, and FIG. 69 illustrates a level output routine and a laser generator control routine. FIG. 68 is a graph showing output power and control voltage for various levels.

The routine shown in FIG. 67 is executed prior to embroidering or laser processing operation, and it is executed block by block (or stitch by stitch) after reading (or inputting) of embroidering data. The embroidering data that is read out is stored in the RAM 4112.

When it is determined in step S10 that the "SEWING HEAD" mode has been selected according to the embroidering data, the color of the thread, i.e., the needle bar, to be used is selected (step S14). The technique of selecting the needle bar and switching different heads for embroidering or laser processing operation is well known in the art, and it is not described in detail.

When it is determined in step S10 that the "LASER HEAD" mode has been selected according to the embroidering data, level selection is made (step S12). The "levels" mean steps of power outputted from the laser generator 4042. In the instant case, ten steps (from step "0" to step "10") are provided.

It is possible as well to provide any other number of steps than the 10 steps, for instance, 100 steps from step "0" to step "100"). The level that is selected in step S12 is stored in the RAM 4112 for each pertinent block.

In an embroidering machine having, for instance, four laser generators 4042, the output power and control voltage for each of levels (i.e., steps from step "0" to step "10") are as in the characteristics shown in FIG. 68. Each laser generator 4042 provides output power of 10 W with a rated control voltage (i.e., 4 V in this example). In FIG. 68, labeled "1H", "2H", "3H" and "4H" are the characteristics of a first laser generator 4042a (thin solid plot), a second laser generator 4042b (broken plot), a third laser generator 4042c (dot and bar plot) and a fourth laser generator 4042d (double dot and bar plot) shown in FIG. 61. Labeled "IDEAL" is the characteristic (bold solid plot) of ideal output power.

Table 1 below lists the output power L and control voltage P at various levels as shown in the above characteristics. The output power L and control voltage P shown in Table 1 concern energy density, with which cotton cloth is cut by setting the speed of movement of the work frame 4016 to 2.5 to 3.5 m/sec.

TABLE 1

| Level | First Laser Generator | | Second Laser Generator | | Third Laser Generator | | Fourth Laser Generator | |
|---|---|---|---|---|---|---|---|---|
| | L(W) | P(V) | L(W) | P(V) | L(W) | P(V) | L(W) | P(V) |
| 0 | 0.0 | 0.0 | 0.0 | 0.0 | 0.0 | 0.0 | 0.0 | 0.0 |
| 1 | 1.6 | 0.4 | 1.5 | 0.4 | 1.4 | 0.3 | 1.4 | 0.5 |
| 2 | 3.6 | 0.8 | 3.0 | 0.8 | 2.8 | 0.8 | 2.8 | 0.7 |
| 3 | 4.9 | 1.2 | 4.4 | 1.2 | 4.2 | 1.2 | 4.1 | 1.2 |
| 4 | 6.2 | 1.7 | 5.5 | 1.7 | 5.6 | 1.7 | 5.1 | 1.7 |
| 5 | 7.3 | 2.2 | 6.5 | 2.2 | 6.7 | 2.0 | 6.2 | 2.2 |

TABLE 1-continued

| Level | First Laser Generator | | Second Laser Generator | | Third Laser Generator | | Fourth Laser Generator | |
|---|---|---|---|---|---|---|---|---|
| | L(W) | P(V) | L(W) | P(V) | L(W) | P(V) | L(W) | P(V) |
| 6 | 8.6 | 2.6 | 7.4 | 2.7 | 7.4 | 2.6 | 6.5 | 2.5 |
| 7 | 9.4 | 3.0 | 7.6 | 3.0 | 8.4 | 3.0 | 7.2 | 3.0 |
| 8 | 10.1 | 3.4 | 8.1 | 3.4 | 8.9 | 3.4 | 8.1 | 3.4 |
| 9 | 11.0 | 3.8 | 8.8 | 3.8 | 8.9 | 3.8 | 8.3 | 3.8 |
| 10 | 11.3 | 4.0 | 9.3 | 4.0 | 9.3 | 4.0 | 9.6 | 4.0 |

In the case of setting the output power L to 6 W when the level is "6", the control voltage to be outputted to the laser generators 4042 may be set to 1.5, 1.8, 1.7 and 2.0 V from the first laser generator. In other words, in this case, the values of control voltage at the intersections of the 6 W line and the characteristic curves may be stored. Likewise, in the case of setting the output power L to 7 W when the level is "7", 1.9, 2.2, 2.1 and 2.7 may be set from the first laser generator as the control voltage P to be outputted to the laser generators 4042.

In the case of providing a desired number of steps, for instance, 100 steps (from step "0" to step "100"), the value of control voltage for each step can be obtained through interpolation of the 10 steps noted above. For example, step "65" can be readily obtained by calculating the mid point between steps "6" and "7" in Table 1.

The values of control voltage to be applied to the laser generators 4042 for generating common output power, are stored in the ROMs 4152 in the laser unit boxes 4014a, 4014b . . . , 4014n shown in FIG. 63 for each level for each common output power. That is, the values of control voltage for generating common output power are stored in the laser unit box 4014a for the laser generator 4042a, in the laser unit box 4014b for the laser generator 4042b, . . . , and in the laser unit box 4014n for the laser generator 4014n. In the case of the embroidering machine shown in FIGS. 61 and 62, the values of control voltage applied to the laser generators 4042a, 4042b, 4042c and 4042d for generating common output power, are stored in the ROMs 4152 of the respective laser unit boxes 4014a, 4014b, 4014c and 4014d.

The relation between the level and the output power is not determined absolutely, but is subject to variations in dependence on the energy density at the radiation position of a laser beam and the speed of the work frame 4016. It is thus necessary to set output power corresponding to a level suited for the energy density or the speed.

The routines illustrated in FIG. 69 are executed whenever laser processing is performed. These routines are a level output routine and a laser generator control routine, the former being executed by the controller box 4100, and the latter being executed in the laser unit box 4014.

First, the controller box 4100 determines whether "LASER HEAD" mode or "SEWING HEAD" mode is designated by each block (or stitch) of embroidering data (step S20). In the case of the "LASER HEAD" mode, the level that has been selected in step S12 noted above and stored in the RAM 4112 (corresponding to a laser processing command) is transmitted to the laser unit box 4014 (step S22).

The laser unit box 4014 which is provided in each laser generator 4042, receives the level data transmitted from the controller box 4100 via the machine controller 4200 (step S30), then obtains the value of control voltage corresponding to that level from the ROM 4152 (step S32), and then outputs a control voltage which permits output power corresponding to the designated level to be obtained (more specifically, pulse width modulation voltage) from the output processing circuit 4144 to the laser generator 4042 (step S34).

As described before, although the outputted pulse width modulation voltage varies with different laser generators 4042, the laser beam power outputted from the laser generators 4042 is common (i.e., equal or substantially equal). This is because the output characteristics of the laser generators 4042 can be maintained owing to the fact that the laser generators 4042 are held at a substantially constant temperature by cooling water supplied form the chiller box 4032.

In the above way, the embroidering machine (or laser processing machine) with a plurality of laser generators 4042 is adjusted to equal output power at equal level. Thus, a plurality of laser generators 4042 can provide equal finish as a result of simultaneous laser processing.

In this embodiment, no means for realizing feedback control is necessary, and the invention can be realized by using only the existing apparatuses. It is thus possible to hold the cost of the embroidering machine to be low, that is, it is possible to provide the embroidering machine inexpensively.

For laser processing on a single limited kind of work, for instance, cloth, the value of control voltage for each laser generator 4042 may be stored in the ROM 4152. In addition, it is necessary only to receive the level data transmitted from the controller box 4100 via the machine controller 4200 and output the value of control voltage stored in the ROM 4152 from the output processing circuit 4144 to each laser generator 4042. In this case, it is possible to reduce the memory capacity of the ROM 4152 and dispense with the procedure in step S32 noted above, thus facilitating the preparation of a control routine program.

While an embodiment of the laser processing machine has been described above, the constructions, shapes, sizes, materials, quantities, dispositions, operating conditions, etc. of various components in the laser processing machine are by no means limitative.

While the laser processing machine has been described in relation to the use of a plurality of laser generators 4042 using $CO_2$ gas lasers, the invention is applicable as well to a laser processing machine which has a plurality of laser generators using different kinds of lasers, such as gas lasers (such as He—Ne lasers and Ar* lasers), solid lasers (such as YAG lasers, ruby lasers and glass lasers), semiconductor lasers, HF/DF chemical lasers, and rare gas halide eximer lasers, for simultaneous laser processing.

In the above embodiment, the values of control voltage to be applied to the laser generators 4042 are preliminarily stored for each plurality of levels for common output power in the ROMs 4152 of the laser unit boxes 4014. However, the place and method of storing as described are not limitative. For example, the operator may store the values of control voltage in the RAMs 4154 in the laser unit boxes 4014 by using an up/down switch or the like for adjusting the output power for each laser unit box 4014.

When the laser generators used are adapted to be controlled by current, values of control current for generating common output power may be stored in lieu of the control voltage, so that the laser generators may be controlled according to the values of the control current. By so doing, it is possible to obtain the same effects as with this embodiment by using current-controlled laser generators.

In addition, in the above embodiment, the values of control voltage to be applied to the laser generators 4042 for each level of common output power, are stored for each level of discrete common output power and each laser generator 4042. However, it is also possible to store data in a continuously changing form, such as an equation of a curve spline interpolated on the basis of the values of control voltage corresponding to a plurality of output power levels or a linear equation as an approximation on the basis of a least square method.

Further, in the above embodiment, levels as laser processing commands are supplied from the controller box 4100 to the bus-connected laser unit boxes 4014 for controlling the laser generators 4042. However, this construction is not limitative; for example, the values of control voltage for the laser generators 4042 may be stored for each level of common output power in a ROM or a RAM of the controller box 4100 and supplied to the laser unit boxes 4014 star-connected thereto for controlling the laser generators 4042. This construction is applicable to the machine controller 4200 as well.

With such an alternative arrangement as above, it is consequently possible to output a value of control voltage corresponding to a desired common output power to each laser generator for simultaneous laser processing with that common output power. Again in this case, constant finish is obtainable since the laser processing is done with the common output power.

Further, in the above embodiment, the invention is applied to an embroidering machine having a plurality of multiple needle sewing heads and laser heads each corresponding to each laser head. However, this is by no means limitative, and the invention is applicable to various laser processing machines having a plurality of laser generators for simultaneous laser processing such as the above laser processing machine. Since the laser processing is performed likewise with common output power, it is possible to obtain constant finish.

In the above fifth embodiment, upon receipt of a laser processing command for executing laser processing, corresponding stored values of control voltage are outputted to the laser generators for simultaneous laser processing with common output power with the laser processing that is performed with the common output power, it is possible to obtain constant finish. In addition, since no means for feedback control is needed, it is possible to provide an inexpensive laser generator. Moreover, since values of control voltage are stored for the laser generators for each level of common output power, it is possible to designate control voltage in correspondence to the level of the common output power when executing the laser processing. Since the common output power is switched in dependence on the work, constant finish is obtainable irrespective of changes in work.

Sixth Embodiment

A sixth embodiment will now be described with reference to FIGS. 70 to 81. This embodiment is an application of the invention to a multiple head embroidering machine (hereinafter referred to merely as "machine") having a plurality of (i.e., four) multiple needle sewing heads and laser heads each corresponding to each sewing head.

Figure 70:
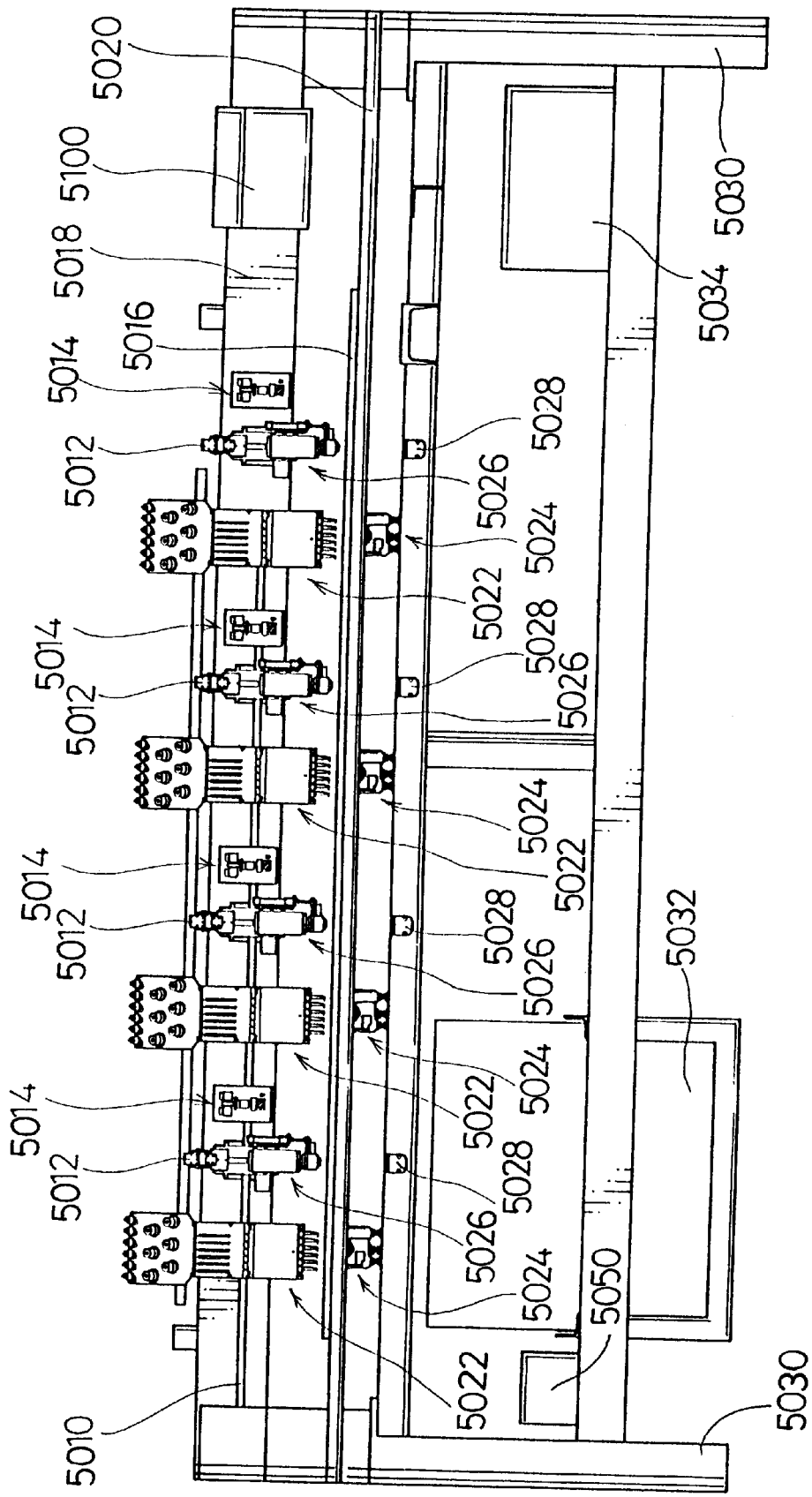
FIG. 70 is a front view of a multiple head embroidering machine.
Figure 71:
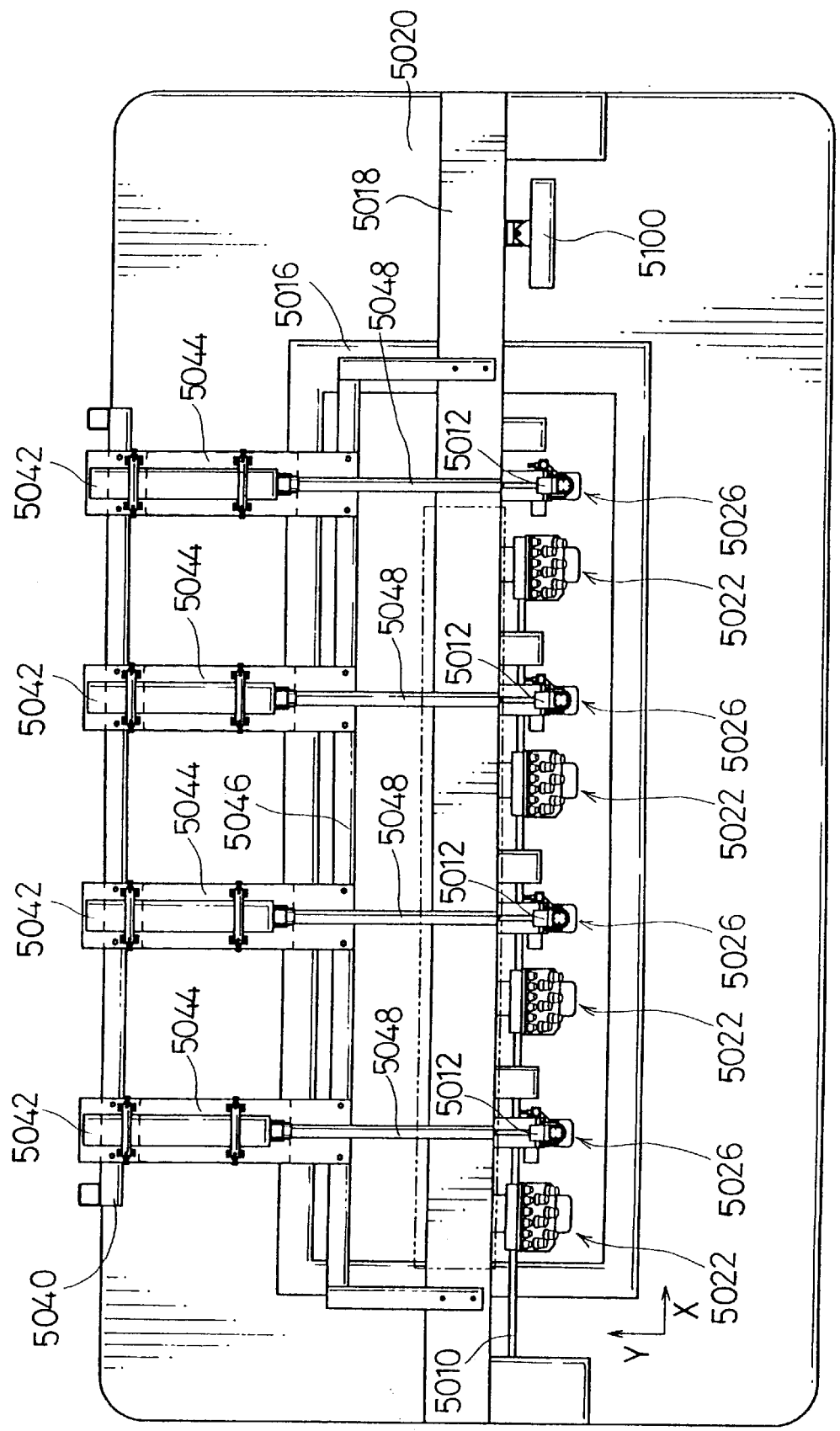
FIG. 71 is a plan view of the multiple head embroidering machine.

FIG. 70 is a front view of the machine, and FIG. 71 is a plan view of FIG. 71. As shown in these drawings, the machine has four sewing heads 5022 which are disposed at a uniform interval on the front surface of a machine frame 5018 located above a machine table 5020. The machine also has four laser heads 5026 provided on the front surface of the machine frame 5018 and each corresponding to each sewing head 5022.

The construction of the machine for producing embroideries or like decorations will now be described. As shown in FIGS. 70 and 71, a work frame 5016 as a work holder for holding a work 5016$a$, as will be described later in detail, is provided on the top of the machine table 5020. The work frame 5016 can be controlled for movement in X- and Y-axis directions in FIG. 71 according to embroidering data as frame movement data.

As shown in FIG. 70, a horizontal frame extending between opposite table legs 5030 on the underside of the machine table 5020, supports shuttle bases 5024 each located at a position corresponding to each sewing head 5022. The horizontal frame also supports steel block plates 5028 each secured to the front surface thereof at a position corresponding to each laser head 5026 for blocking the laser beam irradiated from each laser head 5026.

As shown in FIG. 71, in each sewing head 5022, a needle bar case is supported for sliding movement in the longitudinal direction of the machine on a front portion of a machine arm secured to the machine frame 5018. In the needle bar case, a plurality of (for instance, six) needle bars each with a needle provided on the lower end portion thereof are supported for vertical movement.

The needle bar cases of the sewing heads 5022 are coupled to one another by connecting rods 5010 and can be driven at a time by a color change motor 5052 (see FIG. 72) for sliding movement in the same direction. The driving of the color change motor 5052 is controlled by a needle position sensor 5054 which detects the needle bar selected by sliding the needle bar case. In this way, the intended needle bar can be selected. As is well known in the art, when one of the needle bars is selected, only this selected needle bar is driven vertically together with its associated needle.

The machine according to the invention may be used as a laser processing machine for laser processing such as cutting and engraving (marking). As shown in FIG. 71, above each laser head 5026, a beam guide 5012 is mounted on the front surface of a bracket. Behind the machine frame 5018, laser generators 5042 each corresponding to each laser head 5026 are disposed such that they are directed in the transversal direction of the machine.

The laser generator 5042 uses a $CO_2$ laser as a gas laser capable of continuously irradiating a laser beam. In front of each laser generator 5042, a guide pipe 5048 is disposed to lead the laser beam irradiated from a radiation nozzle to irradiate a work 5016$a$ to a guide pipe in the beam guide 5012.

The laser beam that has entered the beam guide 5012 strikes a mirror and reflects downward to be led to a hole in a lens rack of the laser head 5026, so that the work 5016$a$ is laser processed at the focal point of a lens in the hole.

A blocking plate for blocking the laser beam can be mounted between the laser generator 5042 and the guide pipe 5048. Usually, for operations other than laser processing, the radiation of the laser beam is blocked individually (or collectively) by the blocking plates. This is a safety measure in the event of erroneous radiation of the laser beam from any laser generator 5042 due to some cause.

The laser generator 5042 is set on and secured to the top of a support plate 5044 which is supported horizontally by a support frame 5046 secured to the machine frame 5018 and a support frame 5040 secured to the rear end of the machine table 5020. A controller for the laser generators 5042 is mounted on the underside of the support plate 5044. As shown in FIG. 70, below the machine table 5020, a chiller box 5032 as a cooler for cooling the laser generators 5042 and a centralized control box 5034 for centralizedly controlling the operations of components of the machine are disposed.

As shown in FIGS. 70 and 71, laser unit boxes 5014 are each provided on the front surface of the machine frame 5018 at a position spaced apart rightward from each laser head 5026. The laser unit box 5014 has a test switch for commanding radiation of a laser beam when adjusting output power level, a power-up/down switch for adjusting the output power level, a display for displaying the output power level, a lift switch for commanding the driving of an air cylinder for raising and lowering a protective cylinder of the laser head 5026, and other switches or the like.

When a main switch of the machine having the above construction is turned on, a power source for the laser generators 5042 is turned on to start preheating of the laser generators 5042. Also, a power source for the chiller box 5032 is turned on to start circulatory supply of cooling water from the chiller box 5032 to the laser generators 5042. With the circulatory supply of cooling water, each laser generator 5042 is held at a substantially constant temperature, so that a substantially constant output characteristic of each laser generator 5042 is maintained.

Figure 72:
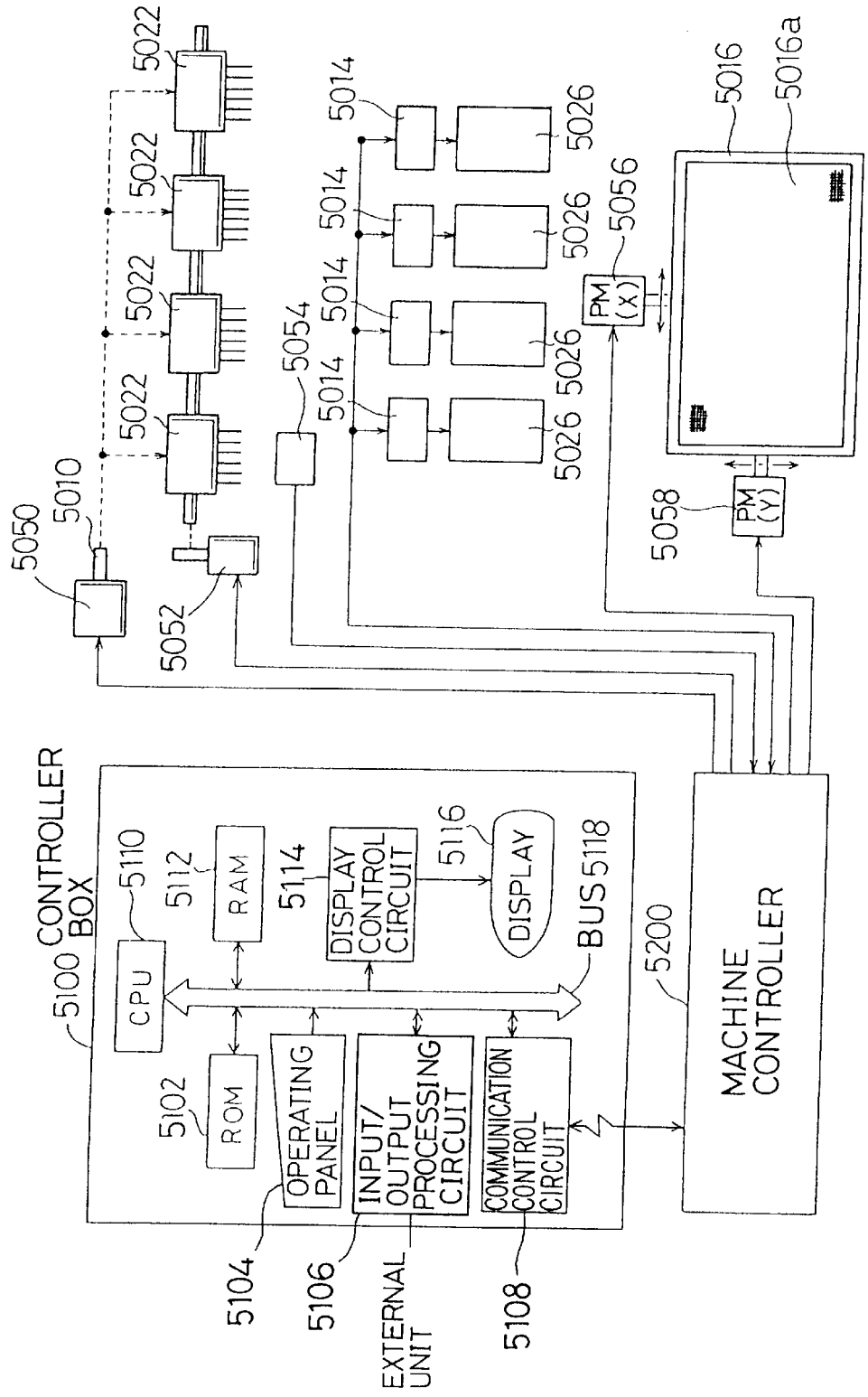
FIG. 72 is a block diagram showing an electric system.
Figure 73:
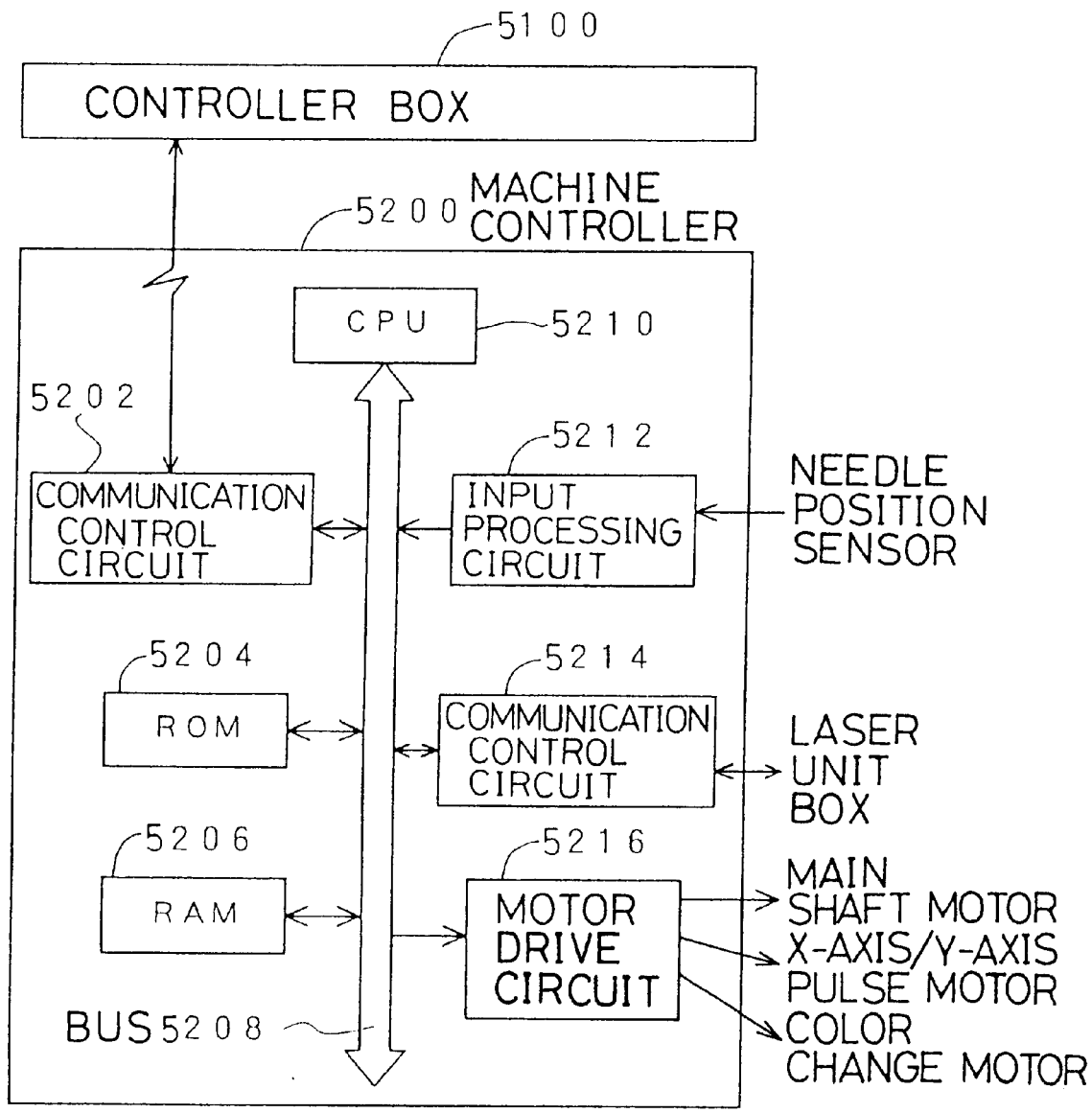
FIG. 73 is a block diagram showing a machine controller.

The electric system connection in the machine having the above construction will now be described with reference to FIGS. 72 and 73. FIG. 72 is a block diagram showing the whole electric system, and FIG. 73 is a block diagram showing a machine controller 5200. The illustrated constructions are all necessary for carrying out the embodiment.

As shown in FIG. 72, a controller box 5100 which is also shown in FIGS. 70 and 71, is provided on a portion of the machine frame 5018 near the right end of the machine table 5020, and it inputs commands concerning operations of the machine, such as setting of embroidering data.

The machine controller 5200 is provided in the centralized control box 5034 shown in FIG. 70 and performs centralized control of the operations of components of the machine, such as control of the driving of a main shaft motor 5050, control of the driving of pulse motors 5056 and 5058 for moving the work frame 5016, and control of the output of the laser generators 5042 for laser processing.

The construction of the controller box 5100 will now be described. As shown in FIG. 72, the controller box 5100 has a CPU 5110, a ROM 5102, a RAM 5112, an operating panel 5104, an input/output control circuit 5106, a communication control circuit 5108, a display control circuit 5114, and a display 5116.

The CPU 5110 controls the whole controller box 5100 according to control programs stored in the ROM 5102. An EEPROM is used as the ROM 5102, but this is not limitative; it is possible to use a PROM, an EPROM or a flush memory or like non-volatile memory as well.

As the RAM 5112, a DRAM is used, and it stores various data such as processing times data, output level data, feed speed data, and display data in a display process. It is possible to use a SRAM, a flush memory or like memory for the RAM 5112 in lieu of the DRAM.

The operating panel 5104 is a control panel operable by the operator for inputting various data or commanding operations of the machine.

The input/output control circuit 5106 is a circuit to control input and output of data with external units. Among the external units are external memories and communication controllers, etc. Among the external memories are flexible disc units, hard disc units, photoelectromagnetic disc units, etc. Among the communication controllers are modems for connection to communication networks.

The display control circuit 5114 is a circuit to control the display on the display 5116 according to display control data supplied from the CPU 5110 via a bus 5118. The display 5116 is most suitably a monochromatic liquid crystal display in order to make its housing compact and hold its power consumption to be low. However, the monochromatic liquid crystal display is not limitative as the display 5116, and it is possible to use as well other kinds of displays, such as color liquid crystal displays, CRTs, plasma displays, and LED displays (which comprise LEDs arranged substantially in close contact with one another as a lattice-like array in a rectangular region).

The communication control circuit 5108 is a control circuit for executing mutual data transfer with the machine controller 5200 to be described later. Specifically, it supplies embroidering commands for executing embroidering and laser processing commands for executing laser processing to the machine controller 5200 and receives a thread breakage signal, an emergency stop signal, etc., from the machine controller 5200. The embroidering commands and laser processing commands include timing data about operations of needle bars and the laser generators 5042, stitch data for commanding movement of the work frame 5016 and other command data.

The above components are all interconnected via the bus 5119.

The construction of the machine controller 5200 will now be described. As shown in FIG. 73, the machine controller 5200 has a CPU 5210, a ROM 5204, a RAM 5206, communication control circuits 5202 and 5214, an input processing circuit 5212, and a motor drive circuit 5216.

The CPU 5210 controls the whole machine according to machine control programs stored in the ROM 5204. Like the ROM 5102, the ROM 5024 is an EEPROM, but it may be a different kind of non-volatile memory as noted above. Like the RAM 5112, the RAM 5206 is a DRAM, but it may be a different kind of memory as noted above.

The communication control circuit 5202 is a control circuit for executing mutual data transfer with the controller box 5100. Data that are mutually transferred are as described above.

The communication control circuit 5214 is a control circuit for executing mutual data transfer with the laser unit box 5014. For example, for performing laser processing, the communication control circuit 5214 supplies data of the laser beam output level to the laser unit box 5014. The laser unit box 5014 receives data of output level from the laser unit box 5014 and converts the data of output level to a voltage to be outputted to the laser generator 5042. The laser generator 5042 is ultimately driven according to the data of output level which is included in a command supplied from the CPU 5110 in the controller box 5100 through the communication control circuit 5202 or 5214, so that the laser processing is performed.

The motor drive circuit 5216 drives a main shaft motor 5050 shown in FIG. 72 for vertically moving the needle according to main shaft drive control data supplied from the CPU 5210 via a bus 5028. The motor drive circuit 5216 also drives an X-axis pulse motor 5050 and a Y-axis pulse motor 5058 shown in FIG. 72 independently to move the work frame 5016 according to frame drive control data supplied from the CPU 5210 via the bus 5208. The above components are all interconnected via the bus 5208.

Figure 74:
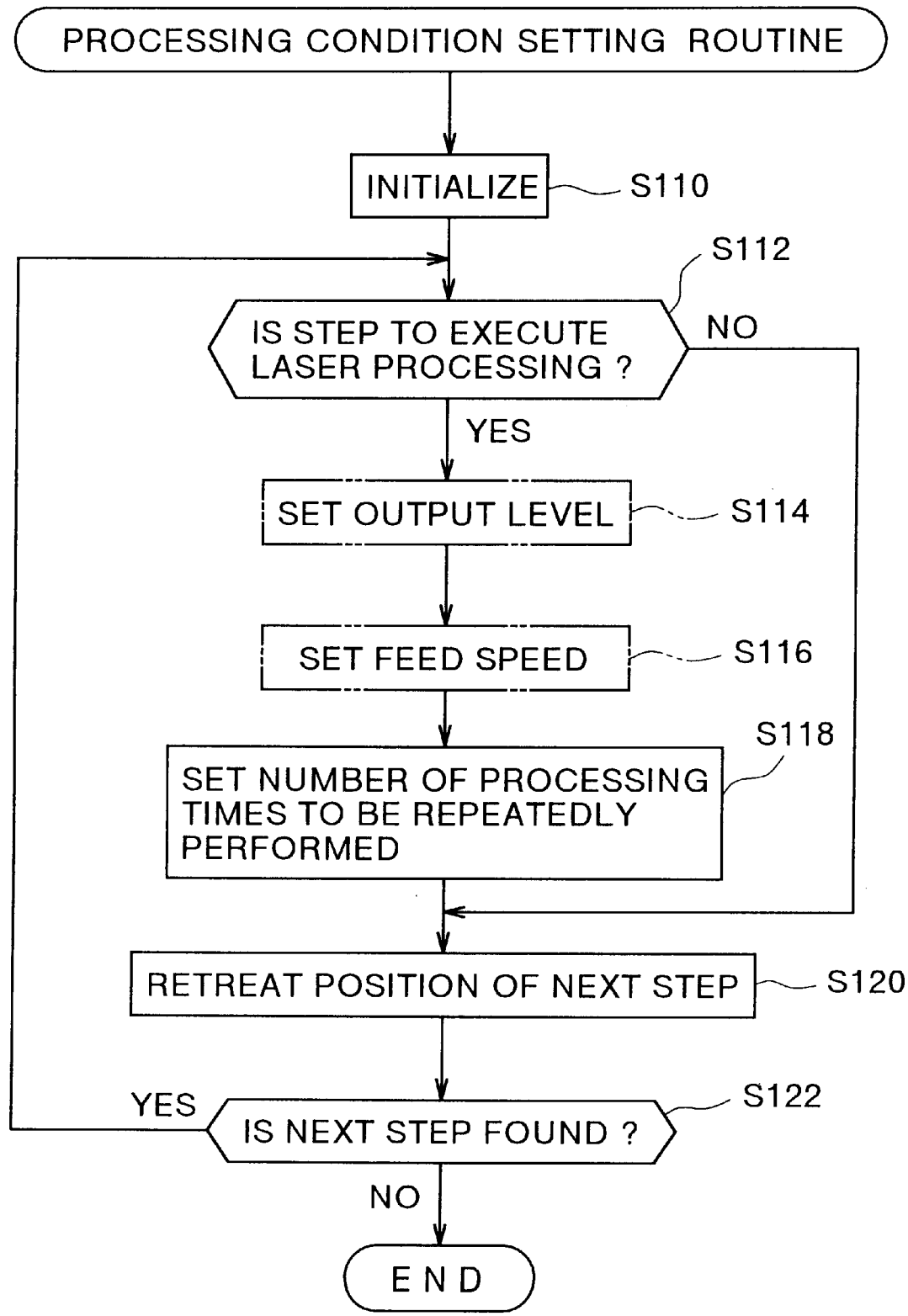
FIG. 74 is a flow chart illustrating a processing condition setting routine.
Figure 75:
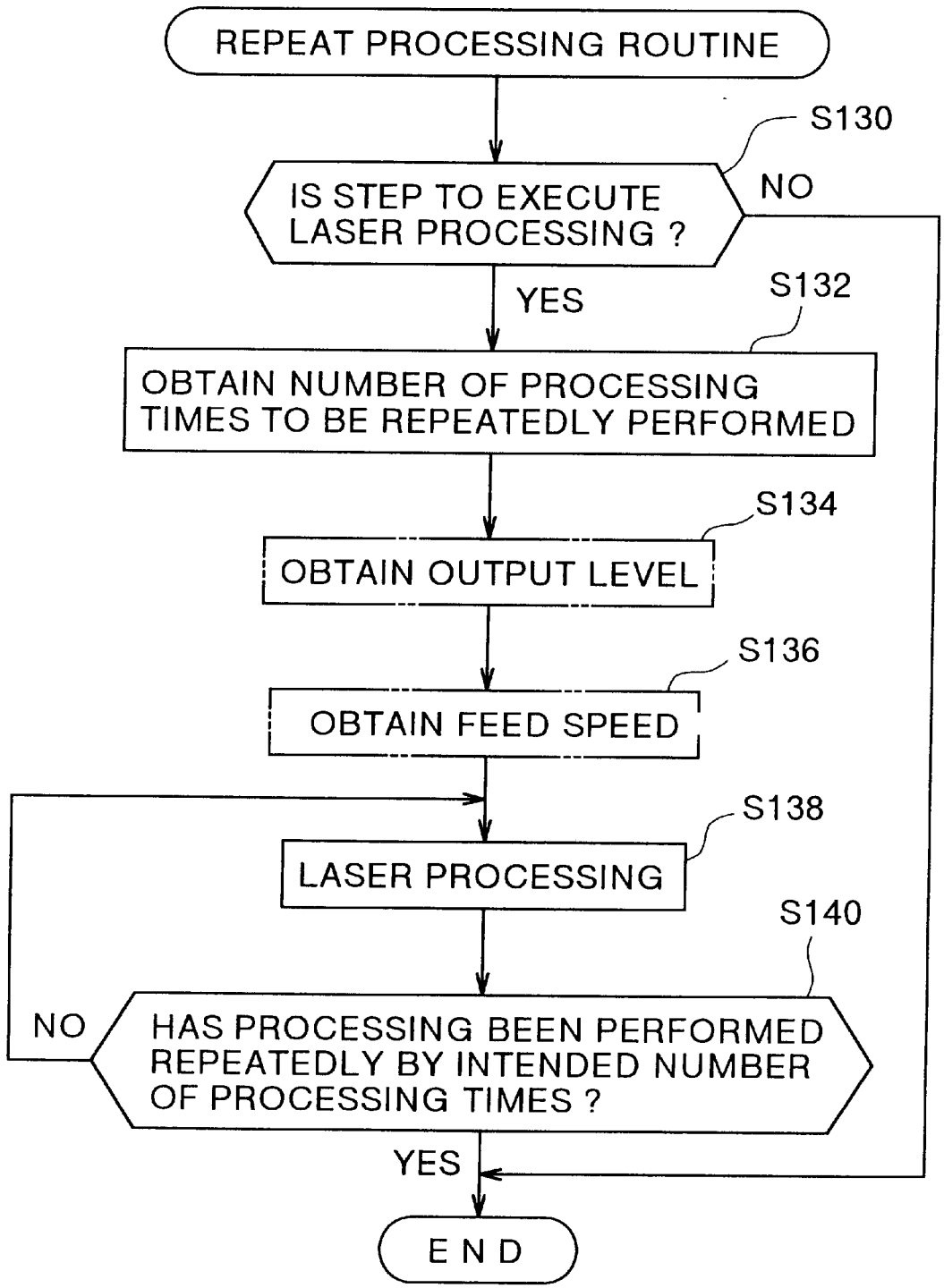
FIG. 75 is a flow chart illustrating a repeat processing routine.
Figure 76A:
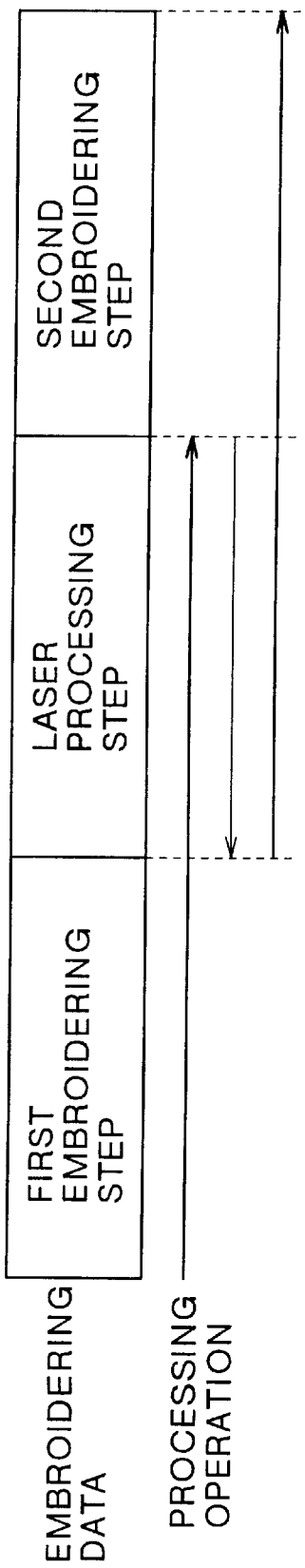
FIG. 76(A) is a view illustrating processing operation in a repeat processing routine according to three-step embroidering data.
Figure 76B:
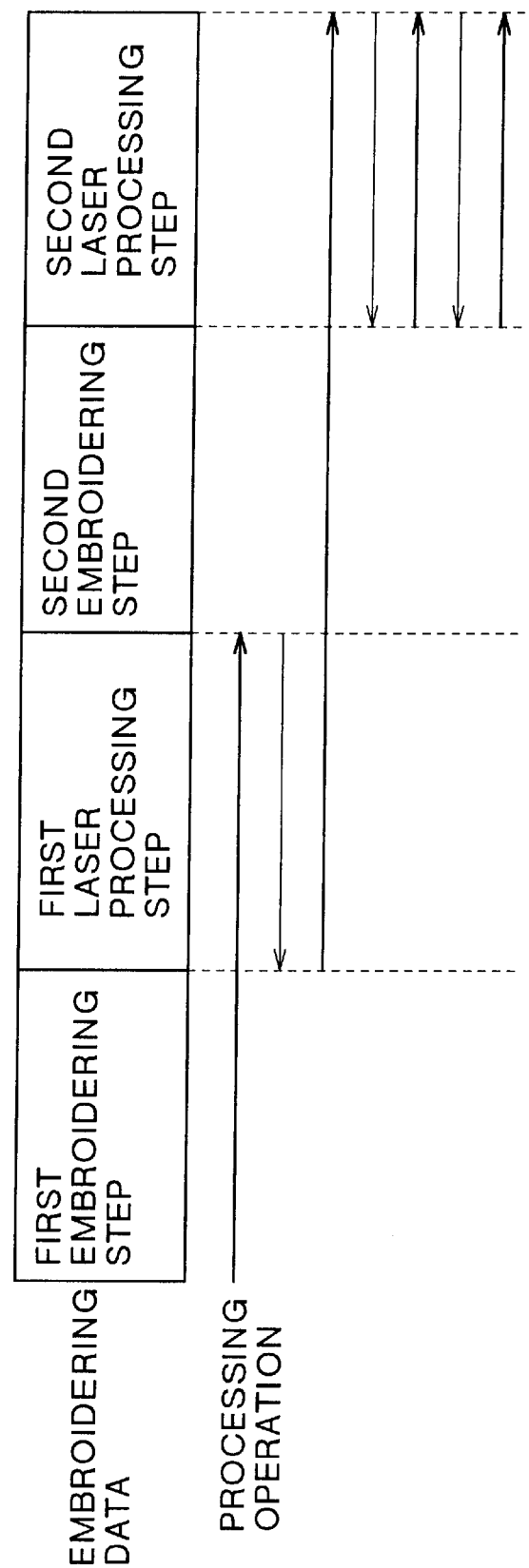
FIG. 76(B) is a view illustrating processing operation in a repeat processing routine according to four-step embroidering data.
Figure 77:
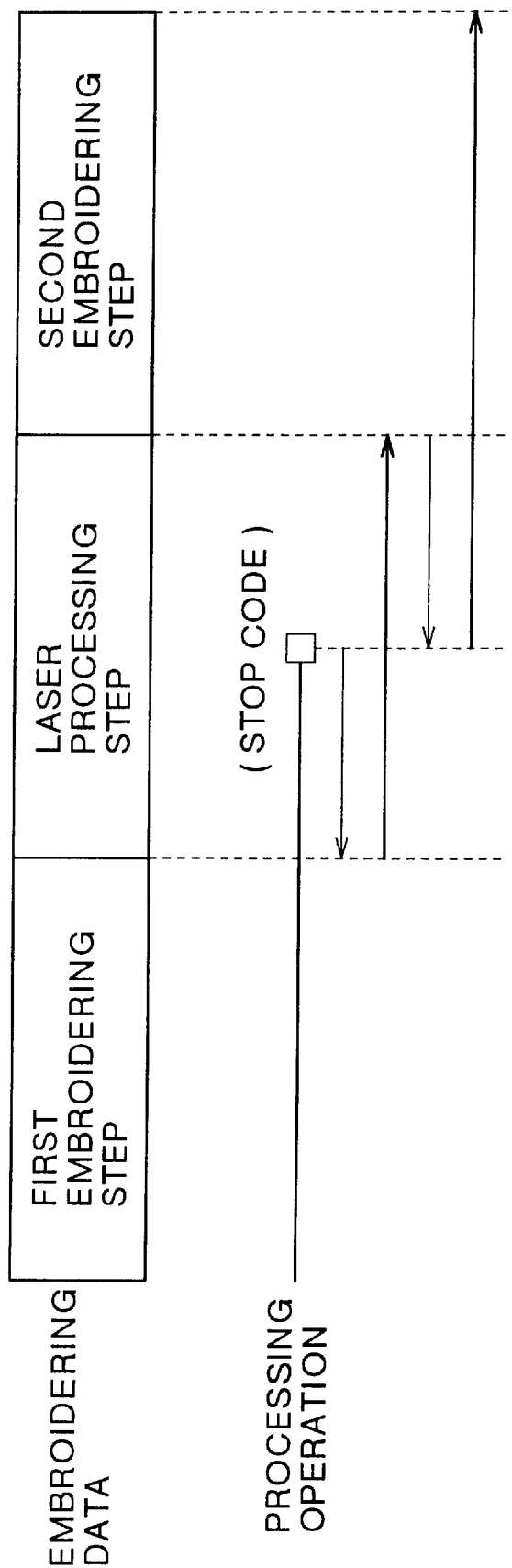
FIG. 77 is a view illustrating processing operation in the repeat processing routine.
Figure 78:
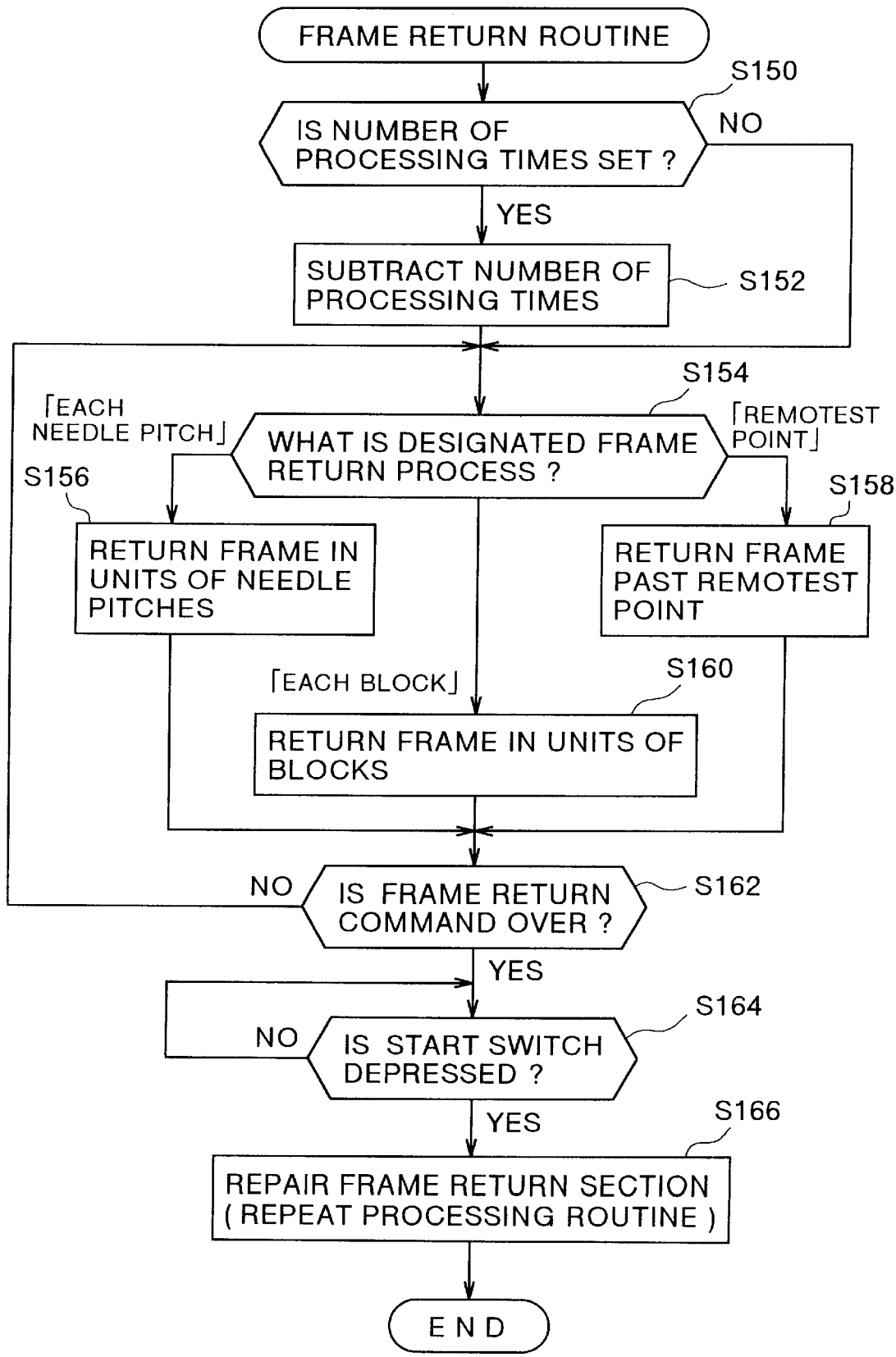
FIG. 78 is a flow chart illustrating a frame return routine.

The processing procedures executed in this embodiment will now be described with reference to FIGS. 74 to 80. FIGS. 74, 75 and 78 are flow charts illustrating the processing procedures for carrying out this embodiment. These procedures are realized as the CPU 5110 executes controller programs stored in the ROM 5102 shown in FIG. 72. FIG. 74 illustrates a processing condition setting routine, FIG. 75 illustrates a repeat processing routine, and FIG. 78 illustrates a frame return routine. FIGS. 76(A), 76(B) and 77 show processing operation in the repeat processing routine. FIGS. 79(A), 79(B) and 80 show processing operation in the frame return routine.

The processing condition setting routine will first be described with reference to FIG. 74. The processing condition setting routine is executed to set such processing conditions as the number of processing times, the output level of laser beam, the feed speed of the work frame 5016, etc. for a step of executing laser processing (hereinafter referred to as "laser processing step") in embroidering data. This routine is generally executed prior to the actual laser processing. It is assumed that the embroidering data has been stored by general operation in the ROM 5112 in the controller box 5100.

First, initialization is performed (step S110). Specifically, such operations as setting a pointer representing the forefront position of the embroidering data are made.

Then, a check is made as to whether the step to be started from the position of the pointer having been set is a laser processing step (step S112). This step S112 is to detect a laser processing step when the embroidering data covers a plurality of different steps such as a laser processing step, embroidering step and decorating step.

When it is found in step S112 that the checked step is the laser processing step (YES), the number of times of laser processing to be performed repeatedly is set (step S118). Specifically, the operator inputs the number of processing times, and the data of this number is stored in a predetermined area of the ROM 5112.

If necessary, setting of output level (step S114) and setting of feed speed of the work frame 5016 (step S116) may be made. That is, the output level of the laser beam and the feed speed of the work frame 5016 may be set in the setting of output level in dependence on the thickness, material, etc., of the work 5016a. Like the data of the number of processing times, the data of the output level and feed speed thus set are stored in predetermined areas of the RAM 5112.

When it is determined in step S112 that the checked step is other than the laser processing step (NO), or after step S118, the position of the next step is retrieved (step S120). In this retrieval, a pointer representing the forefront position of the next step is set.

The operation from step S112 to step S120 is executed repeatedly until it is found in step S122 that the retrieval of the next step is in vain, thus setting the number of processing times for all the steps in the embroidering data. When it is found in step S122 that the retrieval of the next step is in vain, an end is brought to the routine.

It is thus possible to set the number of processing times independently for each laser processing step in embroidering data. A laser processing step, for which "1" is set as the number of processing times, is dealt with in the same way as the usual laser processing.

While in the above routine, the number of laser processing times is set independently for each laser processing step, as an alternative, it is possible to retrieve the embroidering data as to whether a laser processing step is involved and set the number of processing times for any laser processing step that is involved. In this case, the setting is simplified, and laser processing is performed repeatedly in a plurality of laser processing steps with the same number of processing times.

The repeat processing routine will now be described with reference to FIGS. 75 to 77. The repeat processing routine is generally executed when performing actual laser processing.

As shown in FIG. 75, a check is first made as to whether the pertinent step is the laser processing step (step S130). In the case of the laser processing step (YES), the number of times of laser processing to be performed repeatedly is obtained (step S132). Specifically, data of laser processing times is obtained, which has been set in step S118 shown in FIG. 74 and stored in a predetermined area in the RAM S112.

If necessary, the output level having been set in step S114 is obtained (step S134). Also, if necessary, the feed speed set in step S116 is obtained (step S136). In these steps, the output level data and the feed speed data are obtained in the manner as in step S132.

Laser processing is then performed according to the data obtained in steps S134 and S136 (step S138). This laser processing is performed repeatedly by the number of processing times obtained in step S132 (step S140). Specifically, the laser processing is performed by output of laser beam and movement of the work frame 5016. More specifically, a command (including output level data) from the CPU 5110 of the controller box 5100, is supplied through the communication control circuit 5108 to the machine controller 5200 and thence through the laser unit box 5014 to the laser head 5026. Thus, the laser beam is outputted from the laser generator 5042 in the laser head 5026. In addition, a command (including feed speed data) from the CPU 5110 is supplied to the machine controller 5200 to drive the pulse motors 5056 and 5058. The work frame 5016 is thus controlled for movement.

When it is found in step S130 that the checked step is not a laser processing step (NO), or when it is found in step S140 that the laser processing has been performed repeatedly by the intended number of processing times, an end is brought to the routine.

The laser processing operation that is performed by the execution of the above repeat processing routine, will now be described with reference to FIGS. 76(A), 76(B) and 77. In these drawings, bold lines with arrow represent processing operations such as embroidering and laser processing, and solid lines with arrow represent non-processing operations such as frame forward feed and frame return.

FIG. 76(A) shows embroidering data representing three steps, i.e., a first embroidering step, a laser processing step, and a second embroidering step. It is assumed that the number of processing times has been set to "1" in step S118 shown in FIG. 74. In this case, the first embroidering step and the laser processing step are executed in succession, then frame return is executed automatically, then the laser processing step is executed again, and ultimately the second embroidering step is executed. In other words, in the laser processing step, laser processing is performed twice along the same route.

FIG. 76(B) shows embroidering data representing four steps, i.e., a first embroidering step, a first laser processing step, a second embroidering step, and a second laser processing step. It is assumed that in step S118 shown in FIG. 74, the number of processing times is set to "2" for the first laser processing step and to "3" for the second laser processing step. In this case, the first embroidering step and the first laser processing step are executed in succession, then frame return is executed automatically, then the first laser processing step is executed, and then the second embroidering step and the second laser processing step are executed in succession. Subsequently, frame return and the second laser processing step are repeatedly executed twice. Thus, in the first laser processing step, the laser processing is performed twice along the same route, and in the second laser processing step, the laser processing is performed three times along the same route.

FIG. 77 includes a processing operation in the case of embroidering data which includes a laser processing operation with a stop code. It is assumed that the embroidering data represents the same steps and the same number of processing times as in the case of FIGS. 76(A).

At the instant of detection of the stop code, frame return is executed automatically, and the laser processing is performed again from the start till the end of the laser processing step. Then, frame return is executed again up to the position of the stop code. Then, the laser processing step is executed again from the stop code position, followed by the second embroidering step.

In the above way, using the stop code, the laser processing step is divided into a plurality of (i.e., two in the above case) sub-steps to perform more proper laser processing by varying the number of processing times or the processing conditions such as the laser beam output or feed speed for the sub-steps. The output of the laser beam may be varied by varying the focal distance of the lens in the laser generator 5042 (i.e., varying the spot diameter) or by changing the lens itself.

In the above operation, only the laser processing step in the embroidering data (or frame movement data) is automatically executed repeatedly by the number of processing times that has been set. Thus, laser processing such as cutting and engraving may be performed reliably regardless of the thickness, material, etc. of the work 5016a. In addition, portions of the work to be processed for cutting, engraving, etc. can be finished neatly by repeatedly performing laser processing with low output.

A frame return routine which is executed when a frame return command is given during execution of the repeat processing routine, will be described with reference to FIG. 78. The frame return command is usually given after giving a stop command. A stop command is given when a stop button, for instance, provided on the operating panel 5014 is depressed by the operator.

In the routine, a check is first made as to whether the number of processing times has been set (step S150). Specifically, this check is made by checking whether the data of the number of processing times stored in a predetermined area of the RAM 5112 is greater than "1".

When the number of processing times has been set (YES), the value of the data of the number of processing times is decreased by "1" (step S152). This is done so in the case when frame return is executed in a laser processing step in order to permit laser processing to be performed reliably by the number of processing times as set by the operator.

Then, the commanded frame return method is checked (step S154), and according to the result of the check, frame return for each needle pitch (step S156), frame return for each block (plurality of needle pitches) (step S160) or frame return past the remotest point (step S158) is executed until the command is over (step S162). The frame return past the remotest point is a method of frame return in which the frame return is executed from the present position to the forefront position of a predetermined step past the remotest position in the route (i.e., remotest point) as given by data. This method permits movement of the work frame 5016 more quickly than the frame return for each needle pitch or for each block. In addition, the work frame 5016 which has a curved shape like a hat frame for instance, can be prevented from striking the needle or the like by moving it past the remotest point.

After the command is over, depression of a start switch by the operator is waited for (step S164). When the start switch is depressed, repair of a frame return section is made by executing the repeat processing routine shown in FIG. 75 (step S166). The frame return section is one in which the work frame 5016 is moved in the direction opposite to an embroidering data command from an instant corresponding to a frame return command to an instant corresponding to a restart command. In step S166, laser processing is performed repeatedly for the number of processing times adjusted in step S152 for the laser processing step in the frame return section. When the section or step for execution does not concern any laser processing step, an operation of merely moving the work frame 5016 is performed.

The processing operation performed by executing the above frame return routine will now be described with reference to FIGS. 79(A) and 79(B). Like FIGS. 76(A) and 76(B), bold lines with arrow show processing operations such as embroidering and laser processing, and solid lines with arrow show non-processing operations such as frame forward feed or frame return.

FIG. 79(A) shows embroidering data representing three steps, i.e., a first embroidering step, a laser processing step, and a second embroidering step. In this case, it is assumed that the number of processing times has been set to "2" in step S116 shown in FIG. 74. It is also assumed that frame return is commanded during the second embroidering step and that restart is commanded during the first embroidering step.

The frame return command causes frame return, and the restart command causes laser processing to be performed until the end of the laser processing step. Subsequently, frame return is caused automatically for executing the laser processing step once again, and finally the second embroidering step is executed. In the laser processing step after the frame return, the laser processing is performed twice along the same route.

FIG. 79(B) shows embroidering data which is the same as the embroidering data shown in FIG. 79(A), and it is assumed that the number of processing times again has been set to "2". In this case, however, it is assumed that although frame return is commanded during the second embroidering step, restart is commanded in the laser processing step.

Like the previous case, the frame return command causes frame return, and the restart command causes laser processing to be performed until the end of the laser processing step. Also, subsequent frame return is caused automatically for executing the laser processing step, and finally the second embroidering step is executed. Thus, in the laser processing step after the frame return, the laser processing is performed twice along the same route.

As shown, with the execution of the frame return routine, it is possible to perform laser processing repeatedly by merely giving a frame return command. Thus, the operator finding the finish of processing to be unsatisfactory by observation, needs only to give a frame return command. This is particularly effective when laser processing is performed without sufficiently adjusting the output of the laser beam (or without noting such state of the laser generator 5042).

The constructions, shapes, sizes, materials, quantities, dispositions, operating conditions, etc. of various components in the laser processing machine as described, are by no means limitative. Various forms employing one of the above forms can be put into practice as follows.

(1) It is possible to execute a section of a laser processing step repeatedly by the number of processing times that has been set. FIG. 80 shows an example of this case. A section of a laser processing step which is to be repeated according to a stop code as noted above, is stored (memory section), and laser processing is performed for this section by the number of processing times that has been set. In this way, it is possible to obtain a neat finish even in cases of processing works having steps or raised portions or works consisting of a combination of different kinds of materials.

It is possible to store two or more memory sections in a laser processing step. In addition, it is possible to set the number of processing times independently in each of the plural sections.

(2) The number of processing times may be set by inputting the thickness, material, etc. of the work by the operator. Specifically, the optimum number of processing times for various work thicknesses and materials are stored in the ROM 5102 or RAM 5112, and the number of processing times is set according to the inputted thickness or material data of the work. By so doing, the optimum number of processing times for the thickness or material of the work can be set without relying upon the operator's intuition or the like, and it is possible to obtain a neat finish of the work. As a further modification, the machine shown in FIG. 70 may be provided with a sensor for detecting the thickness of work, a sensor for detecting the material of work, etc. for automatically setting the number of processing times. As a still further modification, the number of processing times may be set through an external unit as shown in FIG. 72. This setting may be made according to such data as frame movement data stored in an external memory (including a recording medium) or data transmitted from a personal computer or the like through a communication network or a communication control system.

(3) The laser beam output is varied according to the number of processing times. For example, the laser beam output for laser processing is set to 1 W for the first processing, 2 W for the second processing, and so forth. In such a case, it is necessary to provide a correspondence relation such that x W is set for the n-th processing for laser processing (n and x being desired real numbers).

(4) The feed speed of the work frame 5016 is varied according to the number of processing times. For example, the feed speed is set to 1 mm/sec for the first processing, 3 mm/sec for the second processing, and so forth. In such a case, it is necessary to provide a correspondence relation that the feed speed is x mm/sec for the n-th processing.

(5) The output of the laser beam is varied according to the feed speed of the work frame 5016. For example, the output of the laser beam is doubled when the feed speed of the work frame 5016 is tripled. In this case, the output of the laser beam per unit area of work is decreased to ⅔ times in effect.

In the modifications shown above in (3) to (5), the laser beam output per unit area of work can be varied according to a correspondence relation between the output of the laser beam and the feed speed of the work frame 5016. It is also possible to obtain neat finish of work by setting the output of the laser beam and the feed speed of the work frame 5016 to proper values. The laser processing with such laser variations in the output of the laser beam, is particularly effective when repairing a frame return section as in step S166 shown in FIG. 78.

Figure 81:
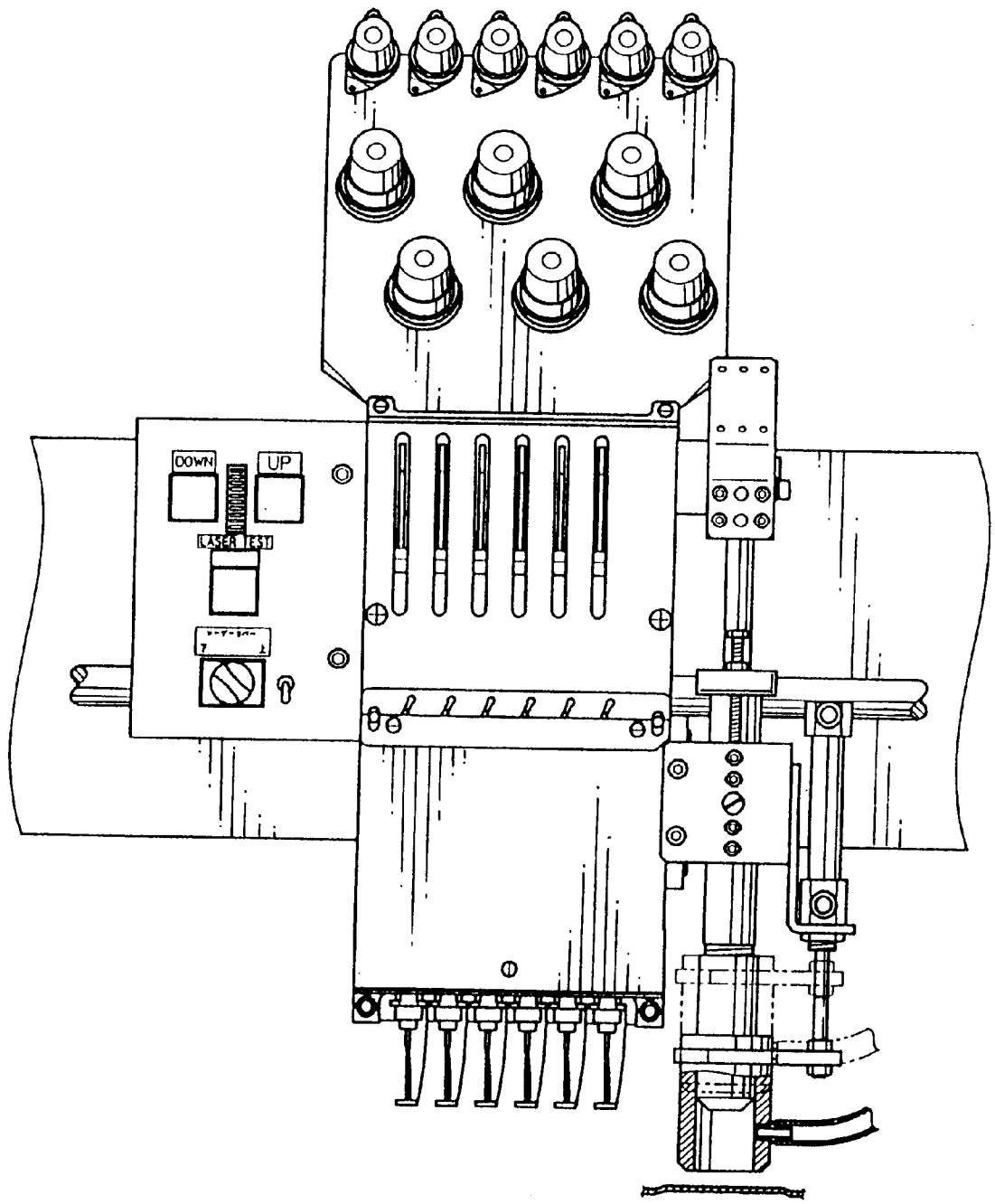
FIG. 81 is a front view, on an enlarged scale, showing part of a different embroidering machine.

(6) The invention is applicable as well to various laser processing machines having laser generators for laser processing. Shown in FIG. 81 is an example of such a laser processing machine (or sewing machine) in which a sewing head and a laser head are integral with each other. Another example is a laser processing machine with a laser generator for performing various laser processing operations. Any of these laser processing machines can automatically execute a laser processing step specified by embroidering data (frame movement data) repeatedly for the number of processing times having been set. It is thus possible to perform laser processing such as cutting and engraving reliably with any thickness or material of work.

While the sixth embodiment of the invention has been described above, the following modifications of the embodiment are possible in addition to what is claimed in connection with this embodiment. In connection with the following modifications, related descriptions will be given when necessary.

(1) A machine with a laser processing function which comprises a sewing head disposed to be able to perform embroidering on a work held on a work holder driven longitudinally and transversally according to frame movement data, and a laser head capable of irradiating a laser beam for laser processing, the number of times of laser processing to be performed repeatedly being stored in advance, and the work being laser processed by the stored number of processing times in a step for executing laser processing as specified by the frame drive data.

The machine with the laser processing function thus can perform laser processing repeatedly by the stored number of processing times, and it is thus possible to obtain a neat finish of the portion that is processed, such as cut or engraved.

(2) The machine with the laser processing function as stated in (1), in which part of the step for executing laser processing as specified by the frame drive data is stored for laser processing of work with respect to the stored part of the laser processing step by the stored number of processing times.

Laser processing thus is performed with respect to the stored part of the laser processing step for the stored number of processing times. It is thus possible to perform reliable laser processing such as cutting and engraving even with works having partly increased thicknesses or being made of materials difficult to process.

(3) A laser processing machine which, upon delivery of a frame return command, performs laser processing on the work with respect to a step for executing laser processing as specified by the frame movement data for the stored number of processing times.

It is thus possible to perform laser processing repeatedly by merely giving the frame return command. Thus, when the status of processing is unsatisfactory, it is possible to reliably perform cutting, engraving or like laser processing again by merely giving a frame return command and obtain the desired finish of the portion of work which is processed again.

(4) A laser processing machine which comprises a work frame capable of being driven longitudinally and transversally according to frame movement data, and a laser head capable of laser processing on a work held on the work frame, and in which the outputs of a laser beam are memorized in advance for all or part of a step for executing laser processing as specified by the frame movement data, the work being laser processed with a memorized output of laser beam for all or part of the step for executing a laser processing.

It is thus possible to reliably obtain the desired finish of the processed part of the work by setting the output of the laser beam to be high when the work has a large thickness or consists of a hard material and to be low when the material has a small thickness or consists of a soft material.

(5) A laser processing machine, which comprises a work frame capable of being driven longitudinally and transversally according to frame movement data, and a laser head capable of laser processing on a work held on the work frame, and in which the feed speeds of the work frame are memorized in advance for all or part of a step for executing laser processing as specified by the frame movement data, the work being laser processed at a memorized feed speed of the work frame for all or part of the step for executing laser processing.

It is thus possible to reliably obtain a desired finish of the processed part of the work by setting the feed speed of the work frame to be low when the work has a large thickness or consists of a hard material and to be high when the work has a small thickness or consists of a soft material.

According to the sixth embodiment, it is thus possible to obtain a neat finish of the portion of the work that is processed, such as cutting and engraving, by repeatedly performing laser processing. In addition, repeated laser processing of part of a step or some steps, permits a neat finish of works having steps or raised portions or works constituted by a combination of a plurality of different kinds of materials.

Seventh Embodiment

A seventh embodiment of the invention will now be described with reference to FIGS. 82 to 90. This embodiment is an application of laser processing machine according to the invention to each sewing head of a multiple head embroidering machine.

Figure 82:
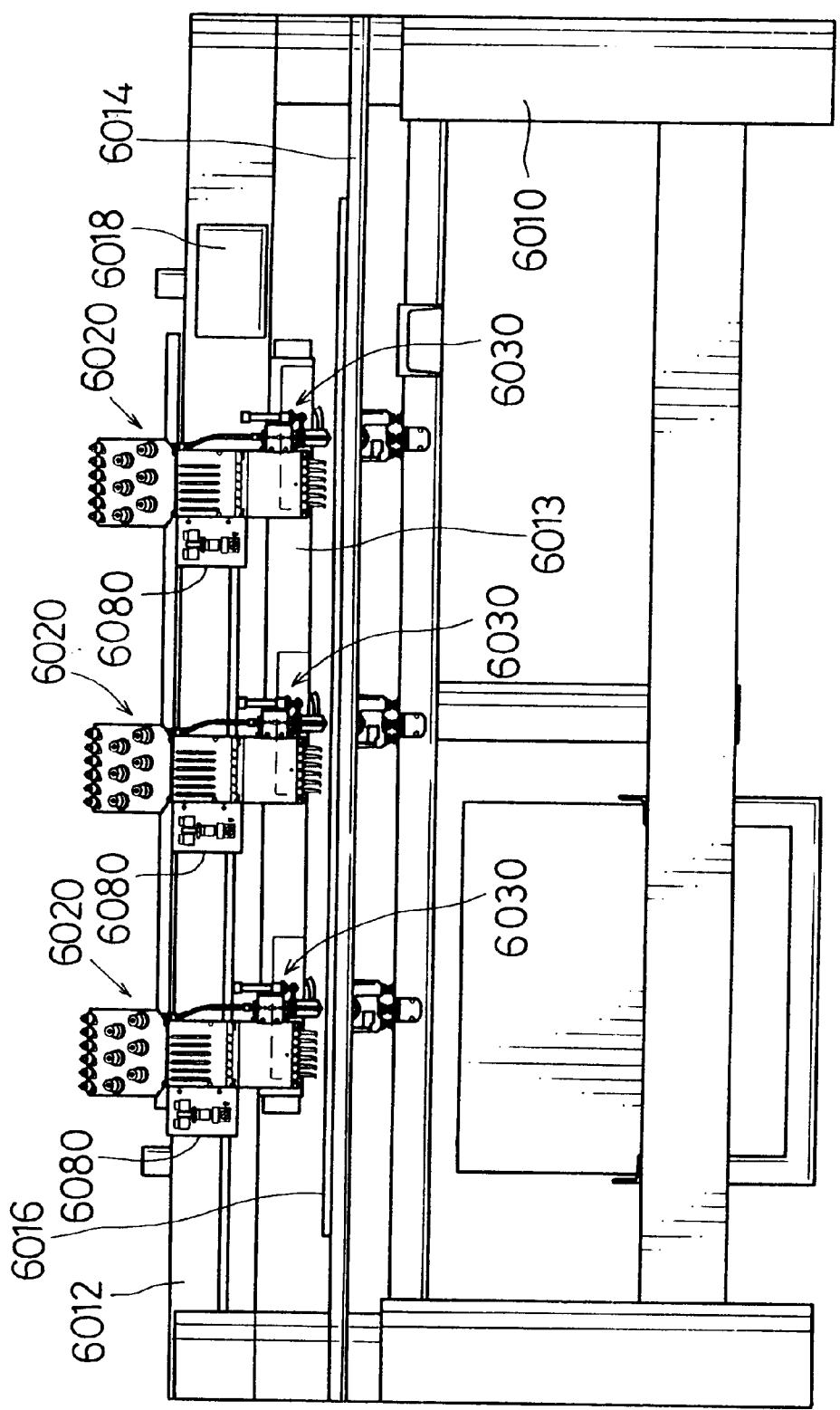
FIG. 82 is a front view of the embroidering machine.
Figure 83:
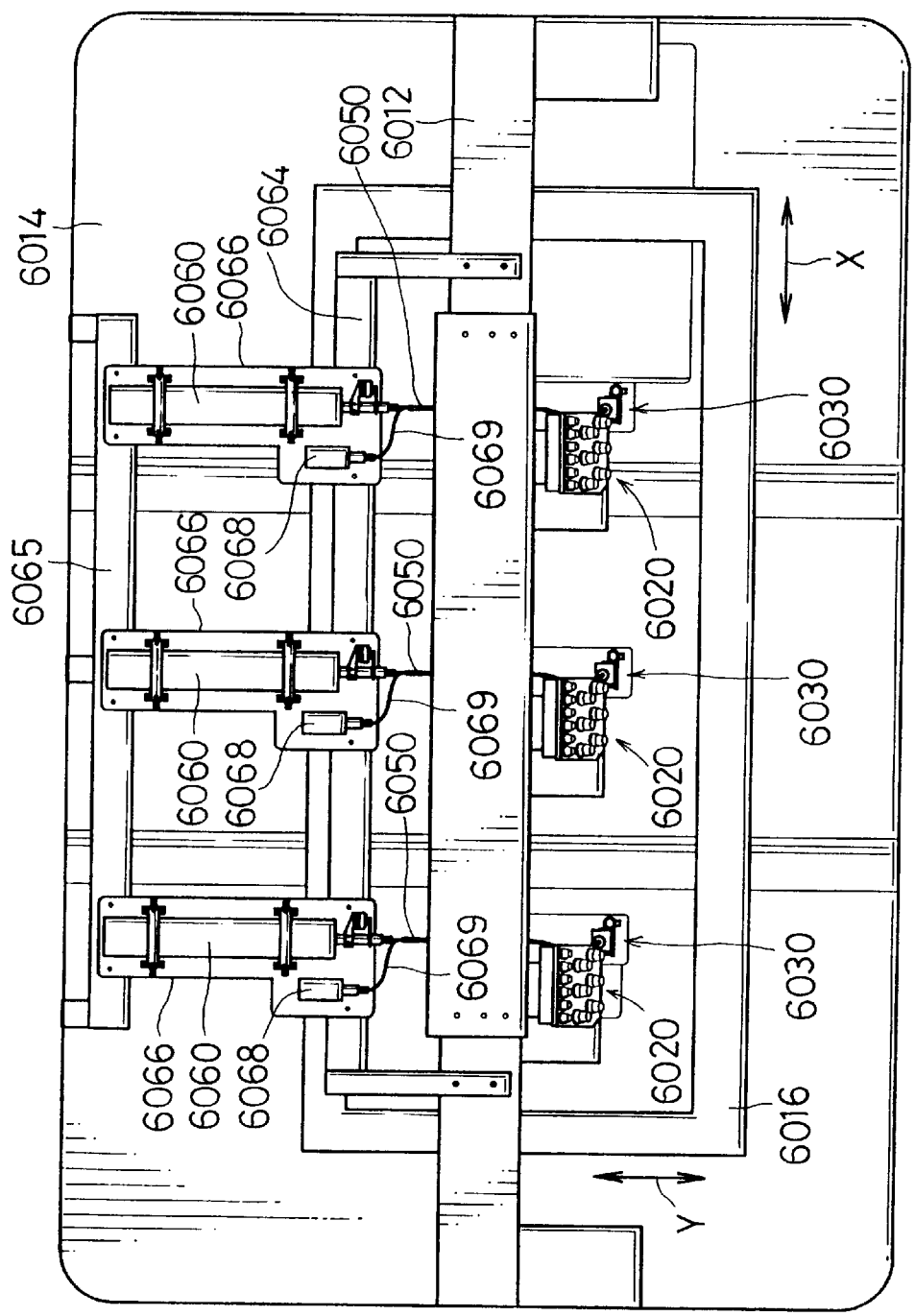
FIG. 83 is a plan view of FIG. 82.

FIG. 82 is a front view of the machine, and FIG. 83 is a plan view of FIG. 82. As shown in these drawings, the machine has three sewing heads 6020 which are disposed at an equal interval on the front surface of a support frame 6012 located above a table 6014 in a machine frame 6010. On top of the table 6014, a work holder (or embroidering frame) 6016 which can support a work (such as cloth) is provided such that it can be controlled for movement in X- and Y-axis directions in FIG. 83 according to predetermined movement data (or embroidering data).

Figure 84:
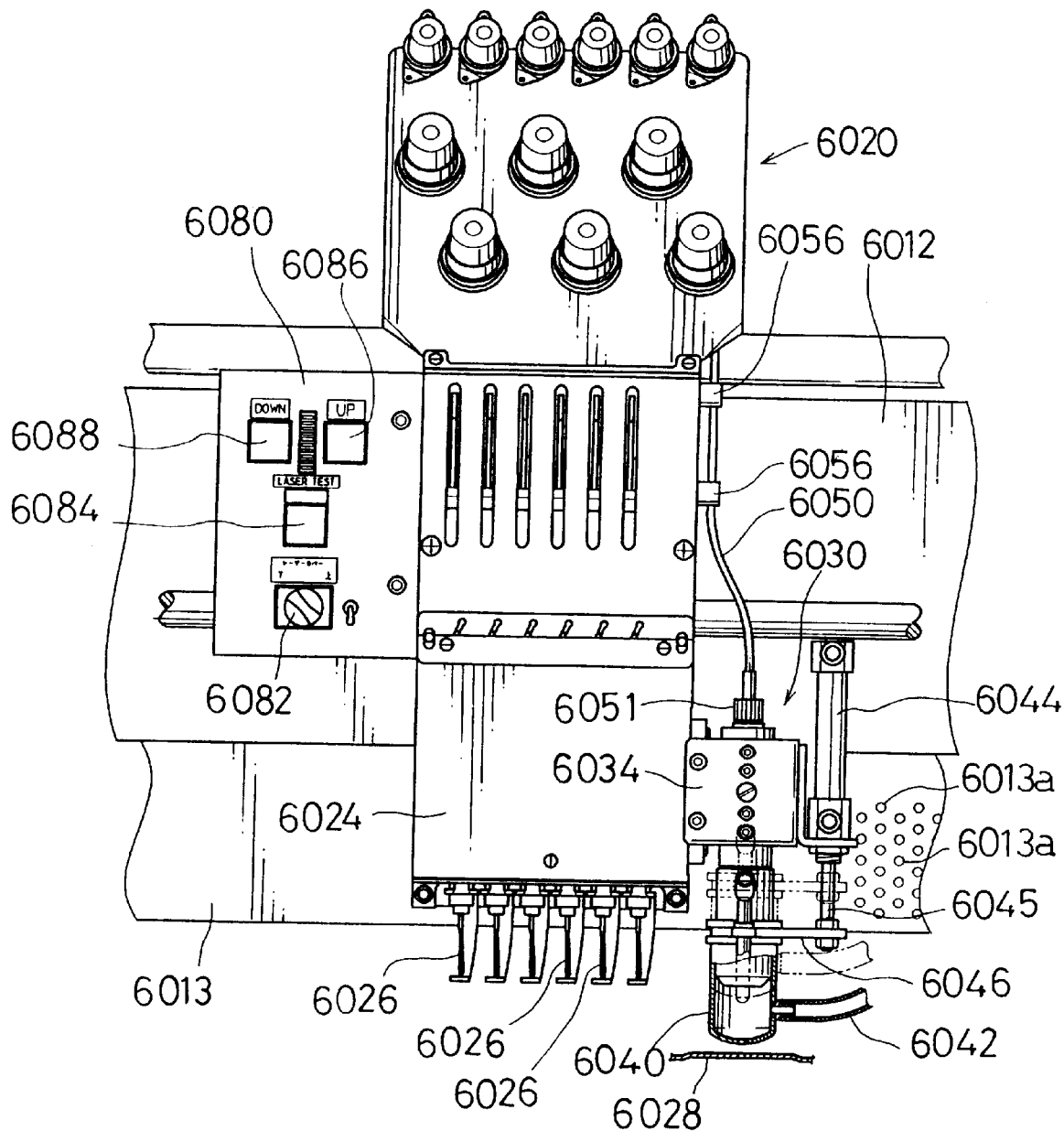
FIG. 84 is a front view, on an enlarged scale, of one of sewing heads and its peripheral parts.
Figure 85:
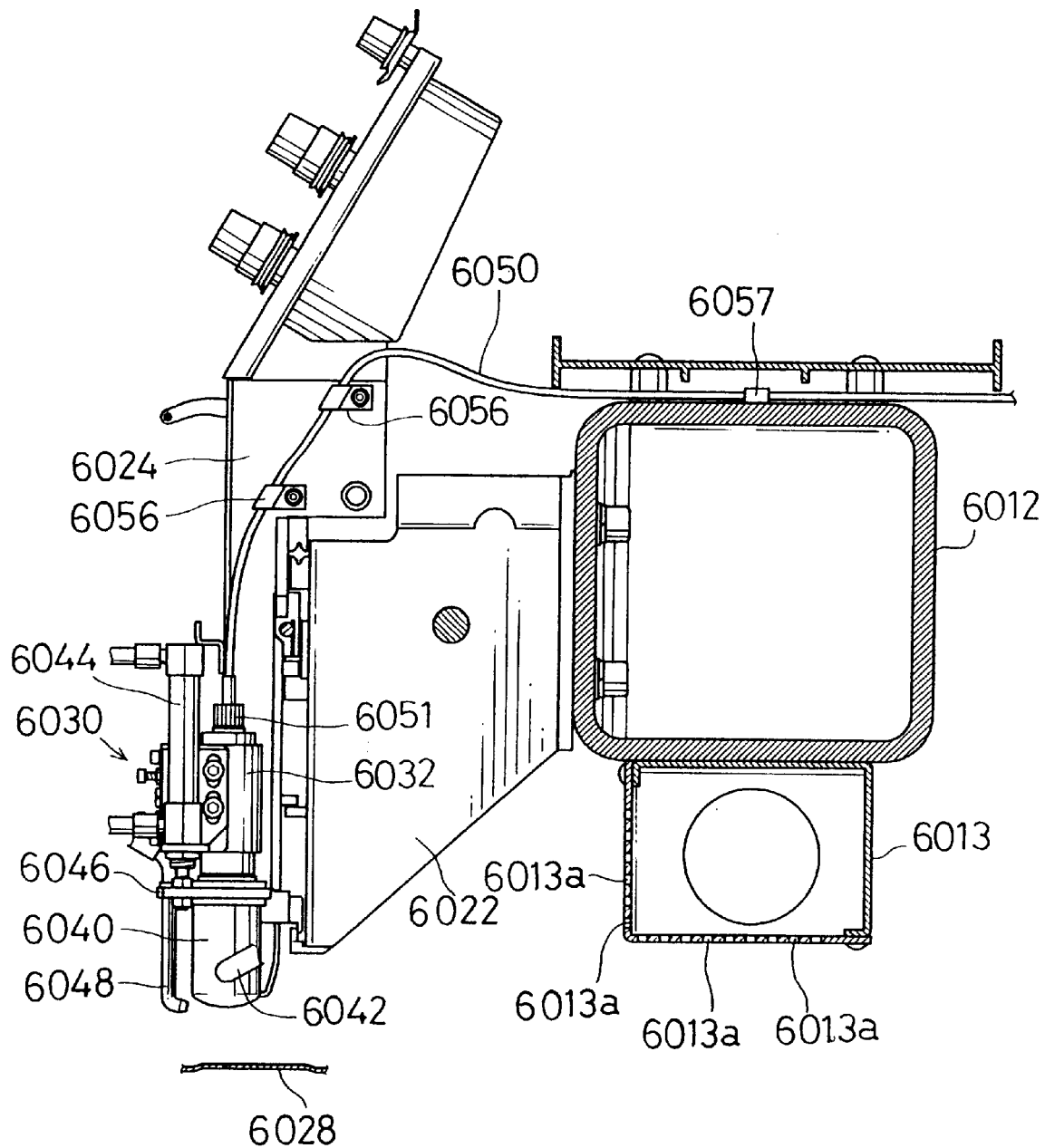
FIG. 85 is a side view of FIG. 84.

FIG. 84 is a front view, on an enlarged scale, of one sewing head 6020 and its peripheral parts, and FIG. 85 is a side view of FIG. 84. As shown in these drawings, the sewing head 6020 has a needle bar case 6024 supported on the front surface of a machine arm 6022 secured to the support frame 6012 for sliding movement in the width direction (i.e., longitudinal direction in FIG. 84) relative to the front surface. In this embodiment, the sewing head 6020 is a multiple needle (i.e., six needle) head. As shown in FIG. 84, needles 6026 are each coupled to a lower end portion of each of needle bars (not shown) supported for vertical movement in each needle bar case 6024. AS is well known in the art, one of the needle bars is selected, and only the selected needle bar is vertically driven together with its associated needle 6026.

A laser head 6030 is mounted on one side of the needle bar case 6024 of each sewing head 6020. The laser beam irradiated from the laser head 6030 has an optical axis which is offset from the right end needle 6020 by a distance equal to an integral multiple (i.e., three times in the illustrated case) of the pitch of the needles 6026 and also offset from the needles 6026 by a predetermined distance forwardly of the machine.

Figure 86:
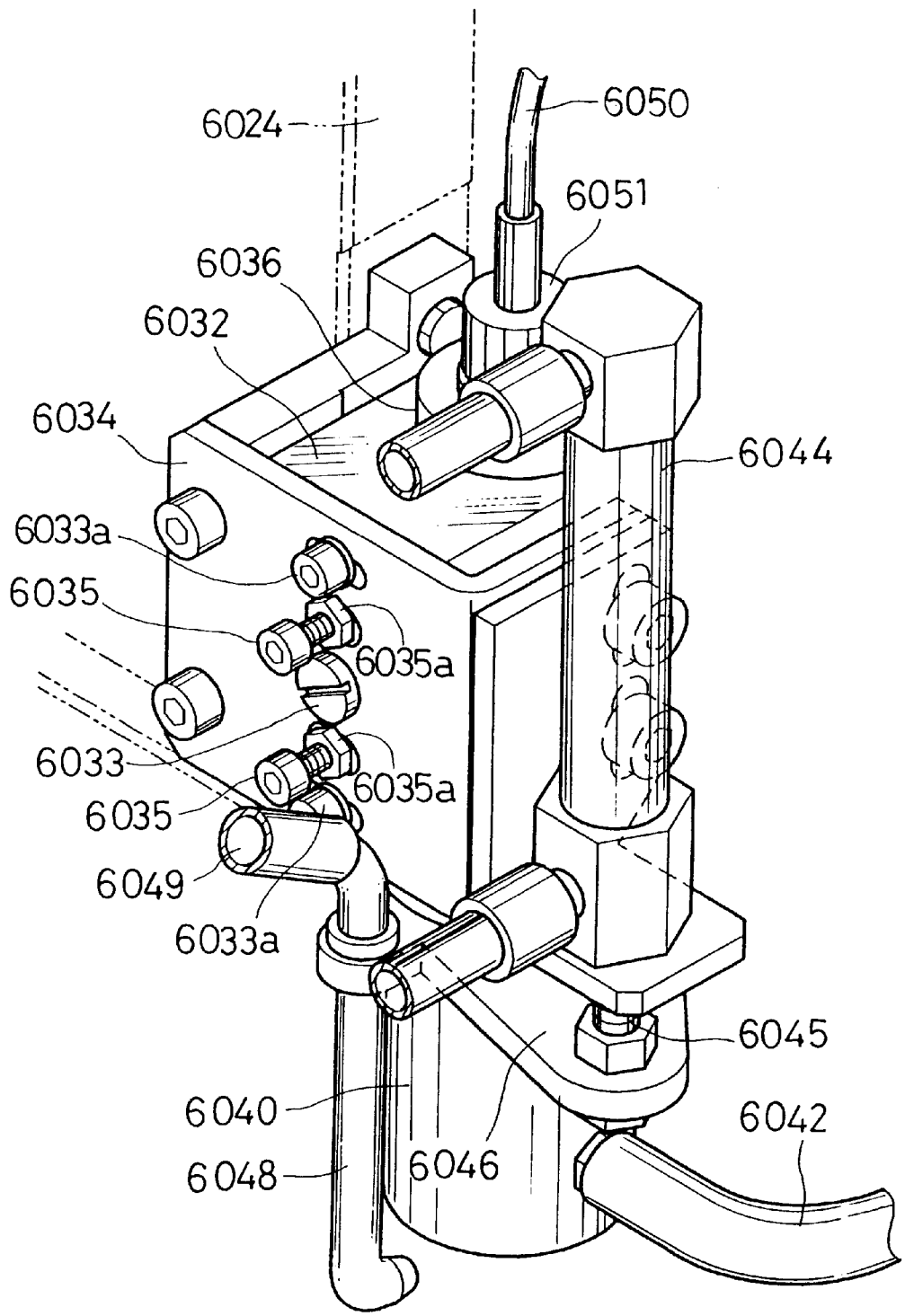
FIG. 86 is a perspective view of a laser head.
Figure 87:
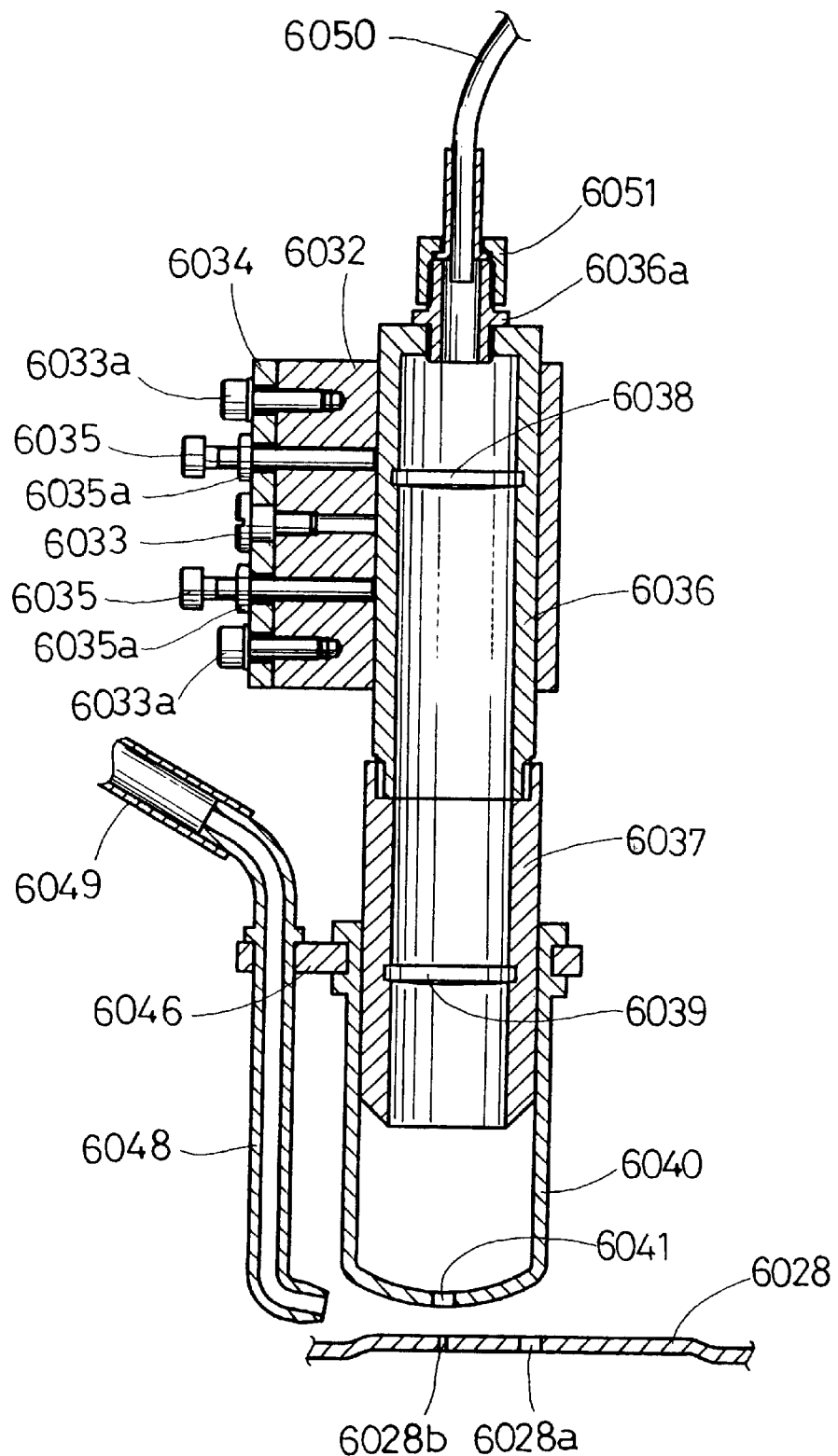
FIG. 87 is a sectional view of the laser head.

FIG. 86 is a perspective view of the laser head 6030, and FIG. 87 is a sectional view of the same laser head 6030. As shown in these drawings, the laser head 6030 has a block 6032, an upper cylinder 6036 and a lower cylinder 6037 mounted on the block 6032 and directed upward and downward, respectively, and a protective cylinder 6040 mounted on the outer periphery of the lower cylinder 6037 for being raised and lowered relative thereto.

The block 6032 is mounted on a bracket 6034 which is mounted for transversal tilt adjustment on the side surface of the needle bar case 6024, and is capable of adjusting its tilt to the left and right about the axis of a pin 6033. After its tilt adjustment, the block 6032 is held at the adjusted position by tightening two lock bolts 6033a shown in FIGS. 86 and 87.

As shown in FIG. 87, the upper cylinder 6036 extends through and is mounted in the block 6032, and has a lower end screwed to the upper end of the lower cylinder 6037. The upper cylinder 6036 is capable of adjusting its vertical position relative to the block 6032, and after this adjustment, it is held at the adjusted position by tightening two lock nuts 6035a on respective lock bolts 6035 shown in FIGS. 86 and 87. A first lens 6038 for converging and focusing a laser beam is held in the upper cylinder 6036, and a second lens 60439 is held in the lower cylinder 6037.

An upper end portion of the protective cylinder 6040 is supported by a plate-like support member 6046 which is coupled to a rod 6045 of an air cylinder 6044. The protective cylinder 6040 is driven by the air cylinder 6044 to be raised and lowered between a retreated position shown by phantom lines in FIG. 84 and a working position shown by solid lines. As shown in FIGS. 84 to 86, an air pipe 6042 is connected at one end to the peripheral wall of the protective cylinder 6040. Air from an air source (not shown) can be blown through the air pipe 6042 into the protective cylinder 6040. The protective cylinder 6040 is made of a transparent synthetic resin or like material to permit visual inspection of laser beam irradiated from the laser head 6030.

On the front side of the protective cylinder 6040, an air blowout pipe 6048 is supported by the support member 6046. The air blowout pipe 6048 is connected to an air source (not shown) via a pipe 6049, and the lower end of the air blowout pipe 6048 is open downwardly of the protective cylinder 6040. As shown in FIGS. 84 and 85, a duct 6013 is provided on the underside of the support frame 6012, and has a plurality of suction holes 6013a formed on front and bottom walls thereof at positions corresponding to the laser head 6030. The duct 6013 communicates with a dust collector via a suction blower (not shown).

As shown in FIG. 87, a throat plate 6028 which is provided on the table 6014, has a needle hole 6028a for passing the needle 6026 therethrough and also a through hole 6028b which is formed right below a beam hole 6041 formed in the bottom of the protective cylinder 6040 so that it can pass the laser beam.

As shown in FIG. 87, a nipple 6036a is screwed to the upper end of the upper cylinder 6636 in the laser head 6030. To the nipple 6036a is connected a connector 6051 provided on an optical fiber 6050 at one end thereof. The optical fiber 6050 is fixed by a clip 6056 to the side wall of the needle bar case 6024 and is led upward, and is also fixed by a clip 6057 to the top of the support frame 6012 and is led rearward (see FIGS. 84 and 85).

The optical fiber 6050 uses polycrystalline fibers of a silver halide and is excellently flexible (minimum bending radius: 2 cm), and for a gas laser (i.e., $CO_2$ laser), it can transmit energy up to 30 W.

As shown in FIG. 83, behind the support frame 6012, laser generators 6060 corresponding in number to the number (i.e., three) of laser heads 6030, are provided such that they are transversally directed. Each laser generator 6060 uses a gas laser (i.e., $CO_2$ laser) capable of permitting continuous radiation of a laser beam.

Figure 88:
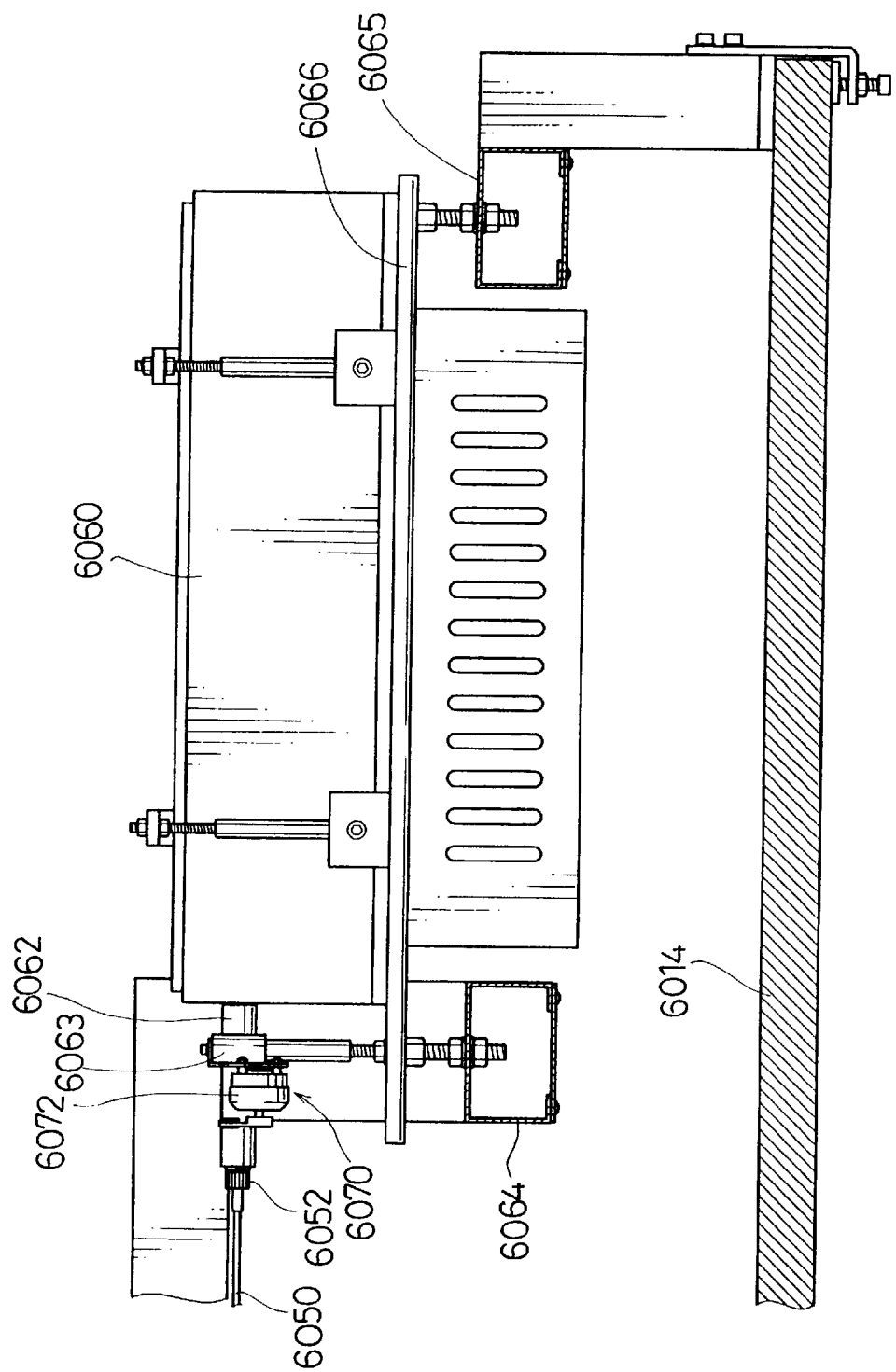
FIG. 88 is a side view, on an enlarged scale, of a laser generator and its peripheral parts.

As shown in FIG. 88, which shows the laser generator 6060 and its peripheral parts on an enlarged scale, each laser generator 6060 is set on a support plate 6066 which is supported horizontally by a support frame 6064 secured to the support frame 6012 and a support frame 6065 secured to the rear end of the table 6014. Each support plate 6066 also supports a block 6063 which supports a guide pipe 6062 for guiding the laser beam irradiated from the laser generator 6060.

Figure 89:
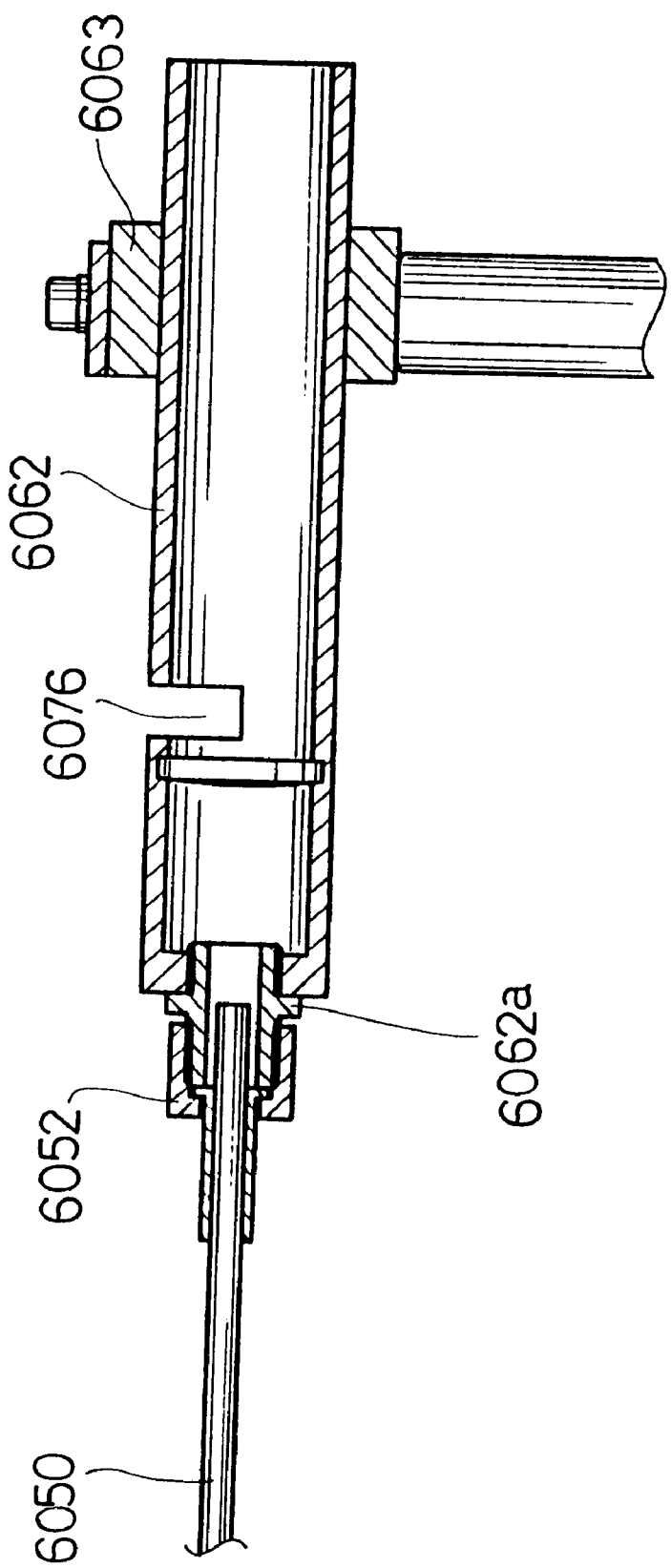
FIG. 89 is a sectional view of a guide pipe in the laser generator.

FIG. 89 is an enlarged sectional view of the guide pipe 6062. As shown therein, the other end of the optical fiber 6050 is provided with a connector 6052 which is connected to a nipple 6062a screwed to an end of the guide pipe 6062.

As shown in FIG. 83, semiconductor laser generators 6068 which are capable of outputting visible light, are each provided on top of each support plate 6066. An optical fiber 6069 connected to an output port of each semiconductor laser generator 6068, is connected to the optical fiber 6050 of each laser generator 6060. Thus, a colorless laser beam outputted from each laser generator 6060 becomes visible light.

Figure 90:
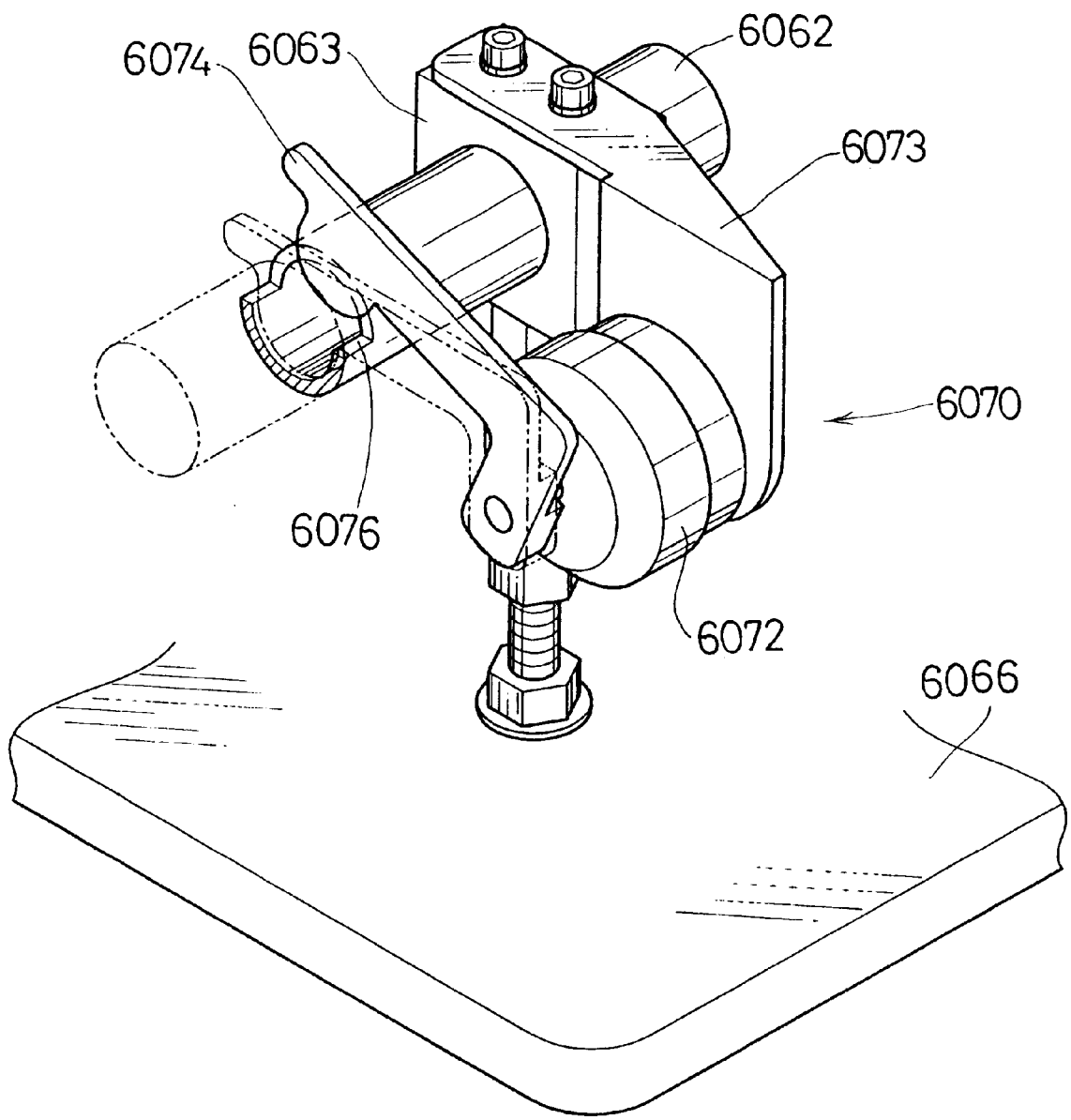
FIG. 90 is a perspective view of a laser beam blocking device.

As shown in FIG. 90, a blocking device 6070 for blocking the laser beam is provided on a guide pipe 6062 in each laser generator 6060. The blocking device 6070 functions when a laser beam is outputted from the laser generator 6060 not according to a regular output signal, and it has a rotary solenoid 6072 mounted on a bracket 6073 secured to the block 6063 and a shutter 6074 secured to an output shaft of the solenoid 6072. When the shutter 6074 is brought from a position shown by solid lines in FIG. 90 to a position shown by phantom lines by the rotary solenoid 6072, an arcuate portion of the shutter 6074 enters the guide pipe 6062 through a slit 6076 thereof and blocks a light path in the guide pipe 6062.

When a main switch (not shown) of the laser processing machine having the above construction is turned on, the power is supplied to the laser generators 6060 and semiconductor laser generators 6068 to start preheating thereof. Concurrently, a laser head 6030 is selected by sliding the needle bar case 6024 of the sewing head 6020, and the protective cylinder 6040 is lowered to the working position shown by solid lines in FIG. 84 or in FIG. 87 by operating the air cylinder 6044 of the laser head 6030. As shown in FIG. 84, a lift switch 6082 on a control panel 6080 which is provided on one side of the needle bar case 6024 of the sewing head 6020, is operated for controlling the air cylinder 6044.

The colorless laser beam outputted from the laser generator 6060 is made to be a visible beam by the laser beam outputted from the semiconductor laser generator 6068, the visible beam being passed through the optical fiber 6020 and transmitted to the laser head 6030. By depressing a test switch 6084 and a power-up switch 6086 on the control panel 6080 at a time, "TEST" mode is set up, and a laser beam of superlow power level is outputted for a predetermined period of time. In the test mode, a check is made as to whether the laser beam passes through the center of the through hole 6028b in the throat plate 6026. When the laser beam is deviated, it is corrected by adjusting the tilt of the bracket 6034 with respect to the needle bar case 6024 in the transversal direction or by adjusting the tilt of the block 6032 with respect to the bracket 6034 in the longitudinal direction.

The adjustment of the power level of the laser beam is made after switching to "SETTING" mode on an operating panel 6018 shown in FIG. 62. The power level is gradually increased by holding the test switch 6084 and the power-up switch 6086 on the control panel 6080 depressed simultaneously and is gradually reduced by holding the test switch 6084 and the power-down switch 6088 depressed simultaneously. For adjusting the focal point of the laser beam, the focal points of the lenses 6038 and 6039 are adjusted by adjusting the vertical position of the upper cylinder 6036 relative to the block 6032.

In some cases, lenses having different focal distances are more suitably used depending on the work (such as cloth). In such a case, the laser head 6030 itself is removed and is replaced with one having lenses with different focal distances. The adjustment of the power level of the laser beam and the adjustment of the focal point are made whenever the work is changed.

For laser processing, the work (such as cloth or leather) is set on the work holder (i.e., embroidering frame) 6016 shown in FIGS. 82 and 83, and the laser beam is irradiated continuously from the laser head 6030 while controlling the work holder 6016 for movement in X- and Y-axis directions in FIG. 83 according to embroidering data. In this way, laser processing such as cutting and engraving is performed on the work according to data. In the laser processing operation, the work frame 6016 is moved through movement control according to the embroidering data at a uniform speed and continuously while providing linear interpolation. When the stitch length of the embroidering data is set to be small to some extent, it is possible to perform laser processing without linear interpolation or movement at a uniform speed.

During the laser processing operation, air is supplied through the air pipe 6042 into the protective cylinder 6040 and is discharged through the beam hole 6041 of the protective cylinder 6040 to the work portion being processed on. Thus, smoke generated as the work is scorched by the laser beam is extinguished, and smoke that is produced as a result is supplied toward the duct 6013 shown in FIGS. 84 and 85 by air blown out from the blowout pipe 6048. The smoke is thus sucked through the suction hole 6013a in the duct 6013 and is supplied to the dust collector for such processing as deodorizing.

The work holder 6016 may be controlled for movement according to exclusive data for laser processing instead of the embroidering data. In the case of simple laser processing (such as straight line cutting), it is possible to hold the work holder 6016 stationary and control the support frame 6012 for movement relative to the machine frame 6010. The laser head 6030 may be mounted directly on the support frame 6012 instead of mounting it on the needle bar case 6024 of the sewing head 6020.

The above embodiment has been described in relation to the case in which a laser processing machine is provided in an embroidering machine to permit a combination operation of embroidering and laser processing. However, it is of course possible to apply the invention to a machine exclusive for laser processing.

While the seventh embodiment of the invention has been described, it covers the following technical matter in addition to the technical matter as set forth in the appended claims.

(1) When the optical fiber is a polycrystalline fiber of silver halide, it is excellently flexible and increases the degree of freedom of the disposition of the laser generator and the laser head.

(2) Laser processing can be performed by utilizing the embroidering data without any modification as data for causing relative movement of the work holder and the laser head.

(3) The machine frame and the drive mechanism therefor can be utilized for laser processing by moving the work holder relative to the laser head.

According to the seventh embodiment, no mirror is necessary for leading the laser beam outputted from the laser generator to the laser head, and also no time-consuming fine adjustment of the mounting angle of such a mirror is necessary.

Eighth Embodiment

An eighth embodiment of the invention will now be described with reference to FIGS. 91 to 100. This embodiment is an application of the invention to a case in which a multiple head embroidering machine having a plurality of sewing heads also has laser heads corresponding in number to the number of sewing heads.

Figure 91:
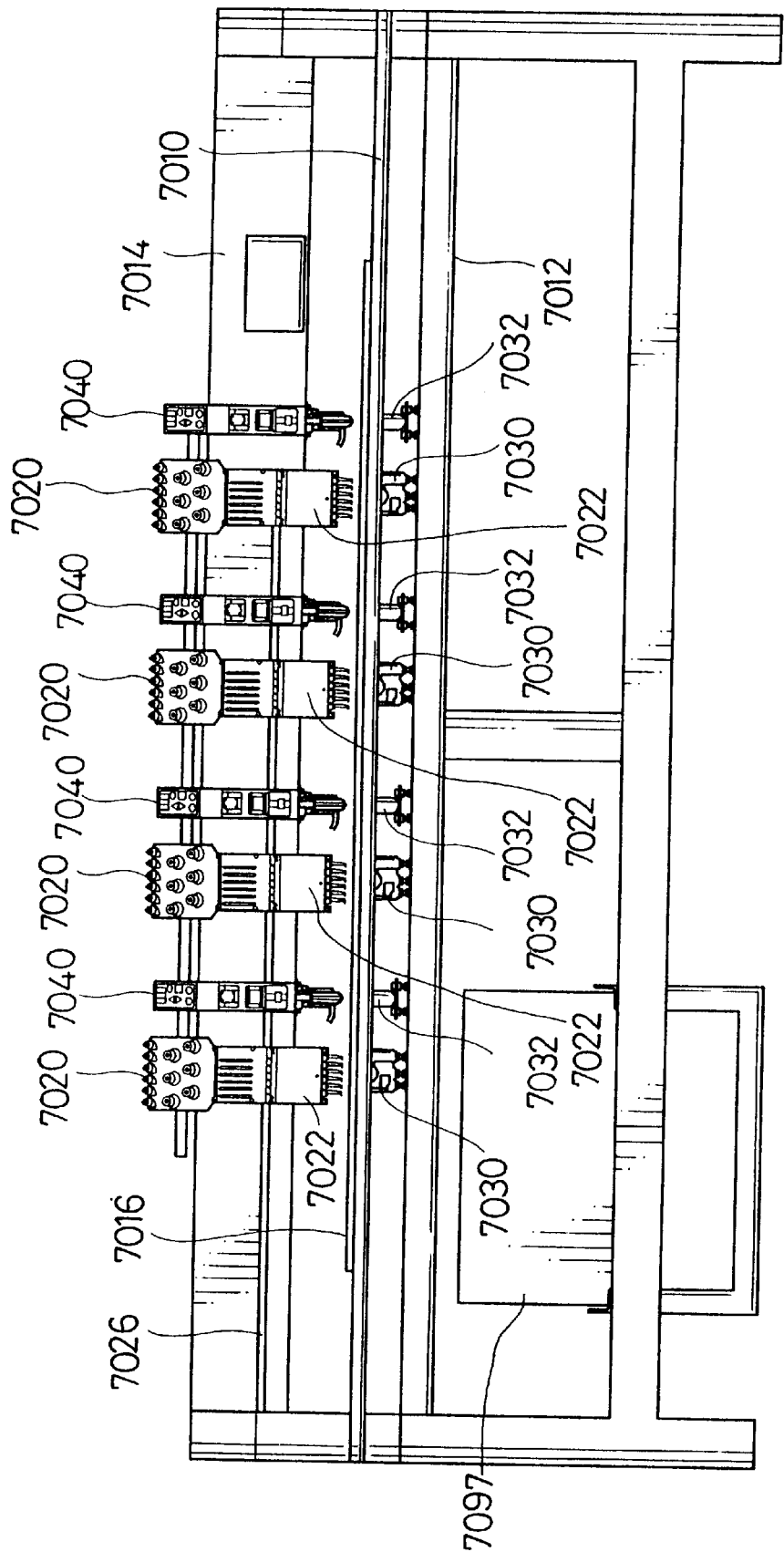
FIG. 91 is a front view of a multiple head embroidering machine.
Figure 92:
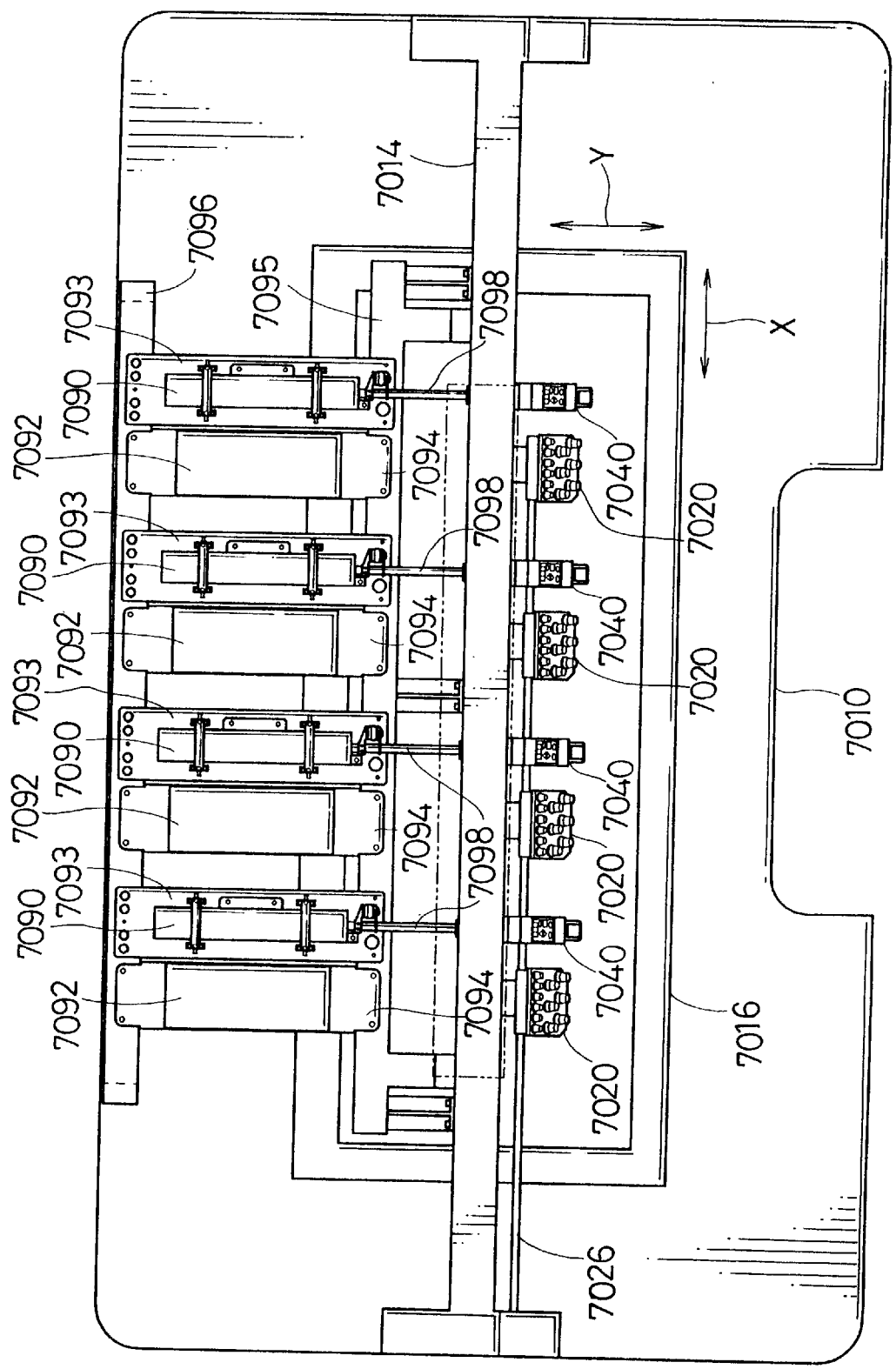
FIG. 92 is a plan view of the multiple head embroidering machine.
Figure 93:
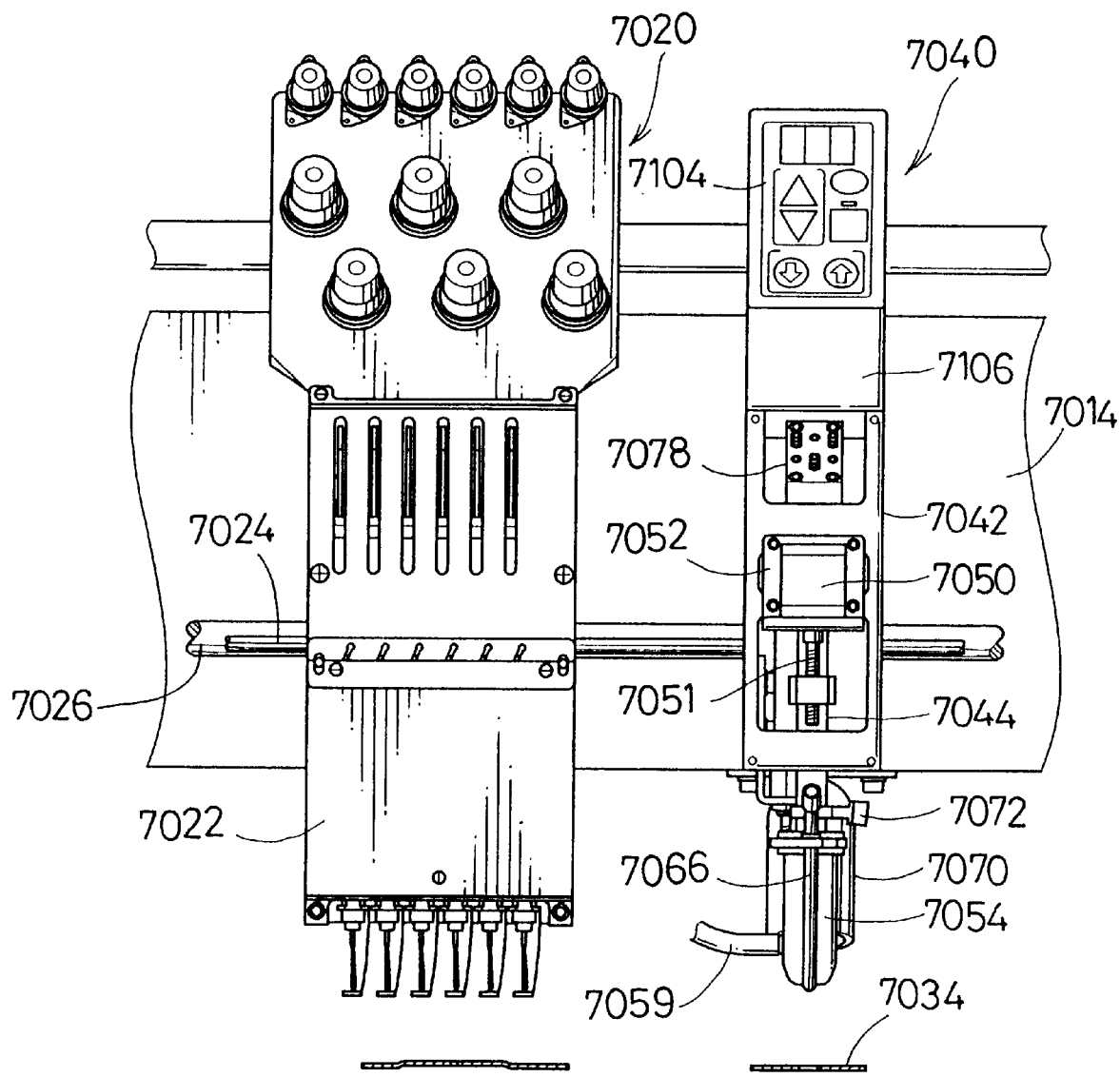
FIG. 93 is a front view, on an enlarged scale, showing part of FIG. 91.

FIG. 91 is a front view of the embroidering machine, FIG. 92 is a plan view of FIG. 91, and FIG. 93 is a front view, on an enlarged scale, showing part of FIG. 91. As shown in these drawings, the machine has four sewing heads 7020 which are disposed at a uniform interval on the front surface of a machine frame 7014 located above a machine table 7010 and also laser heads 7040 corresponding in number to the number of sewing heads 7020 and also disposed on the front surface of the machine frame 7014. Each laser head 7040 is spaced apart to the right from each sewing head 7020 by a predetermined distance.

On the top of the machine table 7010, an embroidering frame 7016 is provided for movement in X- and Y-axis directions in FIG. 92 according to embroidering data. As shown in FIG. 91, a horizontal frame provided between opposite table legs 7012 on the underside of the machine table 7010, supports shuttle bases 7030, and also supports suction pipes 7032 each located at a position corresponding to each laser head 7040.

Each sewing head 7020 has a needle bar case 7022. As shown in FIG. 93, all the needle bar cases 7022 are controlled together for sliding movement via a slide shaft 7024. Six needle bars (not shown) are supported for vertical movement in each needle bar case 7022. One of the needle bars is selected by sliding the needle bar case 7022, and only the selected needle bar is driven vertically in an interlocked relation to the rotation of a main shaft 7026 of the machine.

Figure 94:
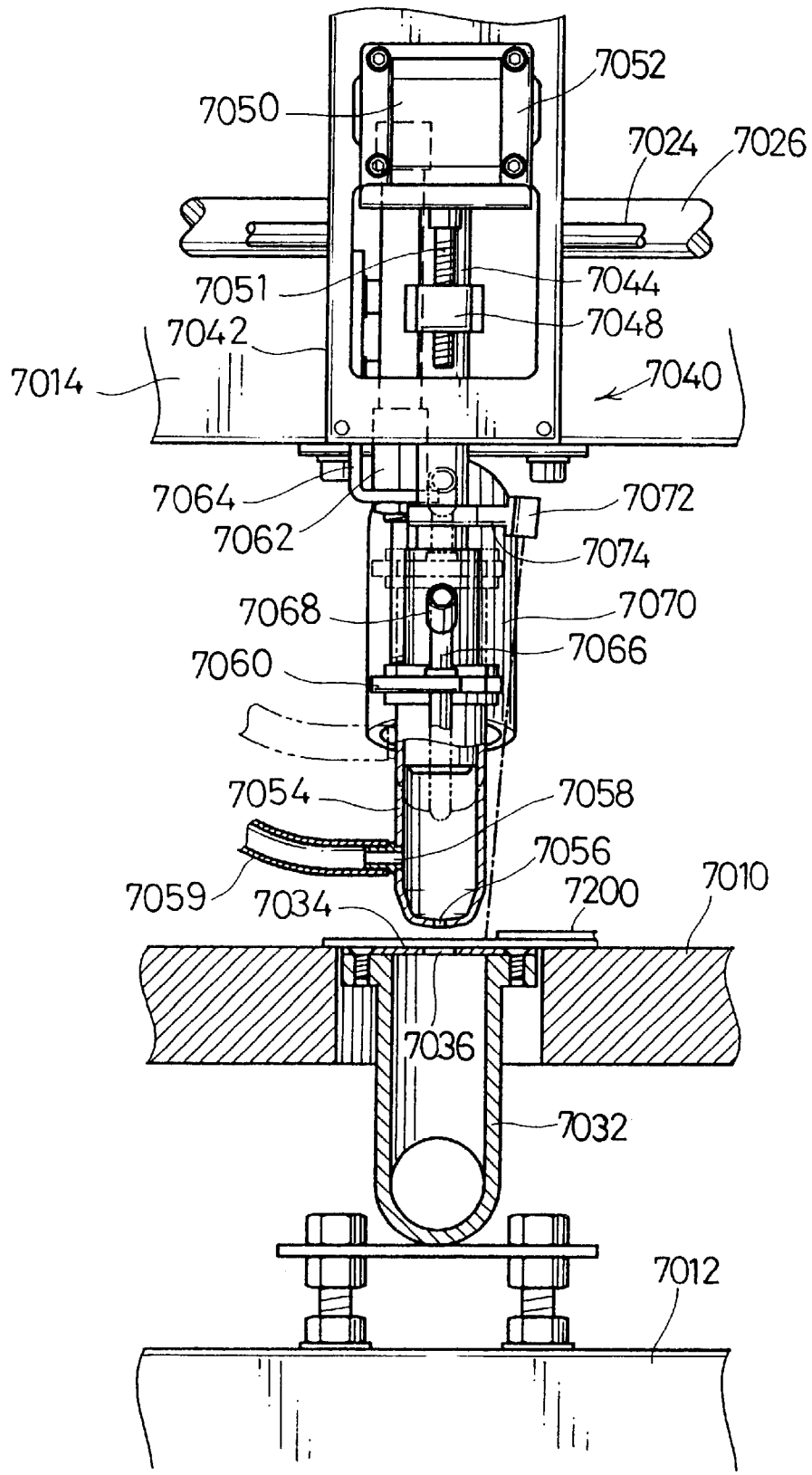
FIG. 94 is a front view, on an enlarged scale, showing part of a laser head.
Figure 95:
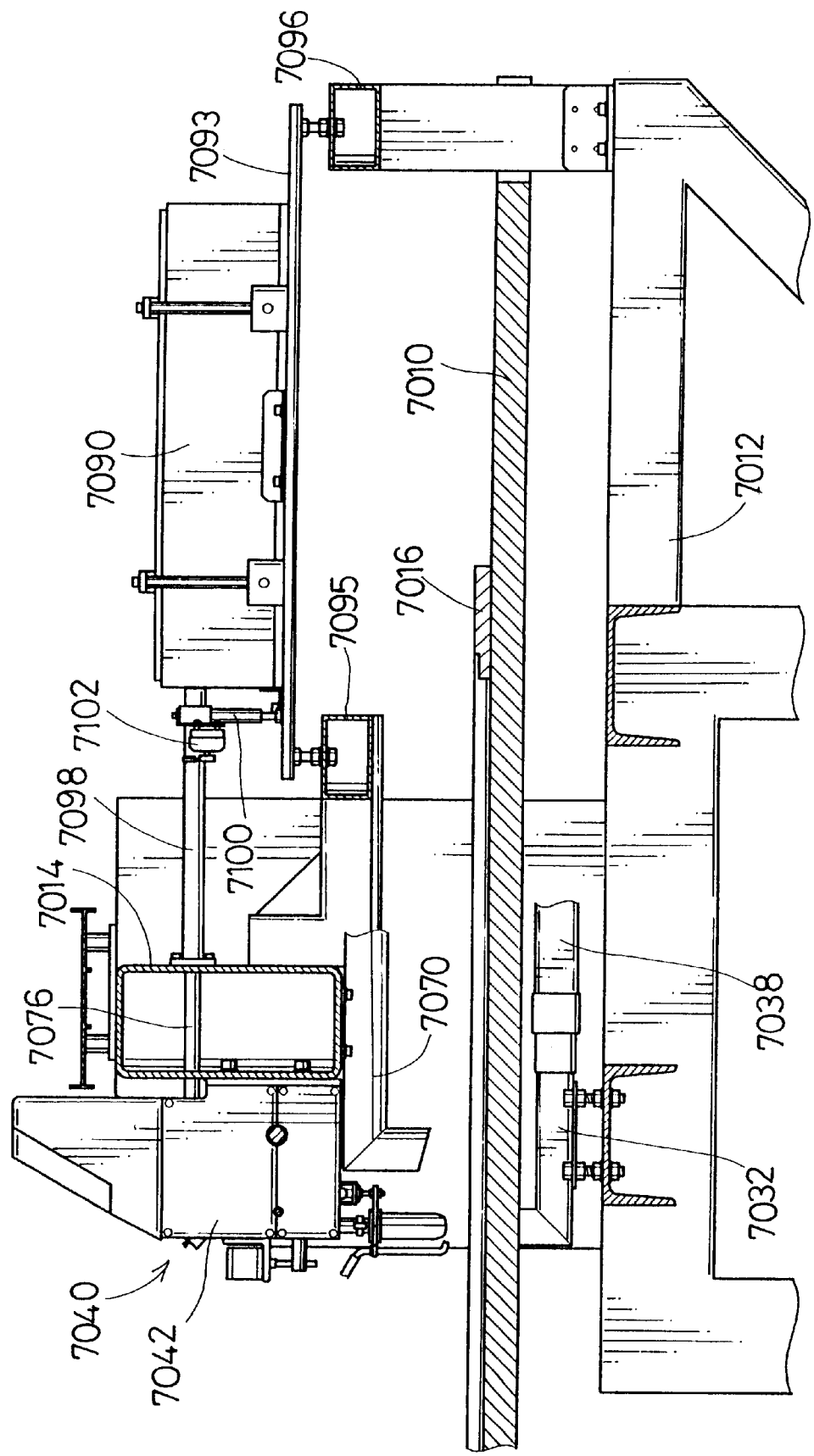
FIG. 95 is a side view of the laser head and related parts.
Figure 96:
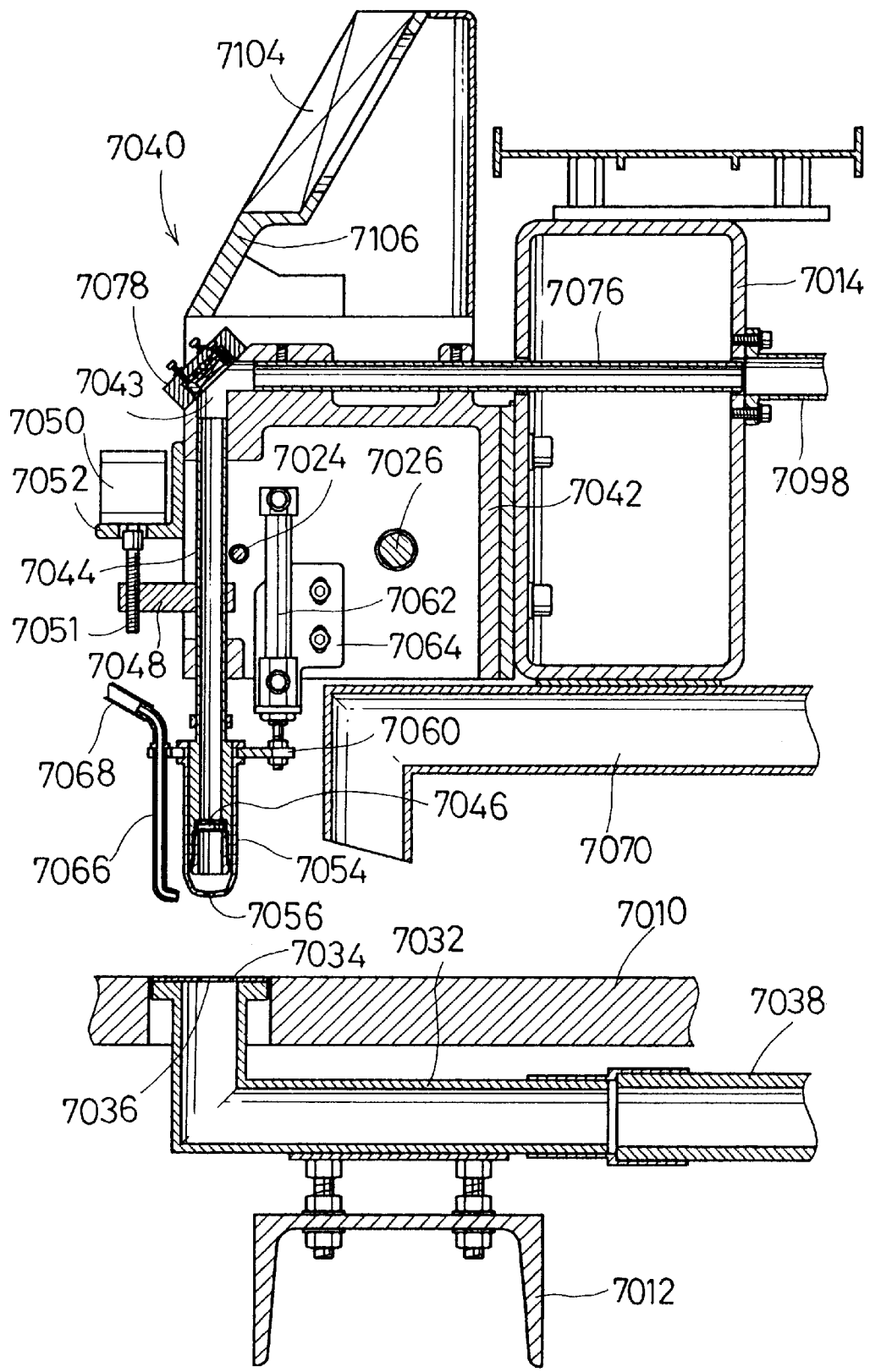
FIG. 96 is a sectional view, on an enlarged scale, showing part of FIG. 95.

FIG. 94 is an enlarged view showing part of the laser head 7040 shown in FIG. 93, FIG. 95 is a side view of the laser head 7040 and its peripheral parts, and FIG. 96 is a sectional view, on an enlarged scale, showing part of FIG. 95. As shown in these drawings, the laser head 7040 has a head bracket 7042 secured to the front of the machine frame 7014, a cylindrical member 7044 supported for vertical movement on the head bracket 7042, a protective cylinder 7054 fitted for vertical movement on a lower end portion of the cylindrical member 7044, and a control panel 7104 mounted on the top of the head bracket 7042 via a base 7106.

As shown in FIG. 96, the cylindrical member 7044 accommodates a lens 7046 secured thereto. As shown in FIG. 94, a laser beam transmitted through the lens 7046 can be irradiated to a work 7200 such as cloth on the top of the machine table 7010. Laser processing such as cutting thus can be performed with a converged laser beam at the focal point of the lens 7046.

An arm 7048 is secured to the outer periphery of the cylindrical member 7044 substantially at a vertically middle position thereof. A motor 7050 as an actuator is mounted on the front surface of the head bracket 7042 via a motor base 7052 such that it is directed downward. A stud 7051 is coupled to the drive shaft of the motor 7050, and has a threaded portion screwed in a threaded hole in the arm 7048.

By controlling the driving of the motor 7050, the cylindrical member 7044 with the lens 7046 is vertically moved to adjust the focal point of the lens 7040.

As shown in FIGS. 93 and 94, below the head bracket 7042, a distance measuring device 7072 (i.e., laser displacement measuring device) is secured by a support member 7074 to the cylindrical member 7044. The distance measuring device 7072 can measure the distance between the work 7200 and the cylindrical member 7044, i.e., the distance between the work 7200 and the lens 7040, sidewise of the position at which the work 7200 is irradiated by the laser beam.

The protective cylinder 7054 is made of a transparent synthetic resin or like material, and has a free end portion which in turn has a central beam hole 7056 for passing the laser beam therethrough. As shown in FIG. 94, the protective cylinder 7054 has a peripheral air hole 7058. The air hole 7058 is connected to a pipe 7059, and air can be blown from an air source (not shown) into the protective cylinder 7054 through the pipe 7059.

An arm 7060 is engaged with the outer periphery of an upper end portion of the protective cylinder 7054, and is coupled to a rod of an air cylinder 7082 which is mounted on the head bracket 7042 via a cylinder base 7064 such that it is directed downward. By driving the air cylinder 7062, the protective cylinder 7054 is moved along the outer periphery of the cylindrical member 7044 between a retreated position shown by phantom lines in FIG. 94 and a working position shown by solid lines.

In front of the protective cylinder 7054, an air nozzle 7066 is secured to the arm 7060. The air nozzle 7066 is also connected to an air source (not shown) through a pipe 7068. The air nozzle 7066 has a free end (or lower end) open to blow air toward a locality under the beam hole 7056 of the protective cylinder 7054. The amount of air to be blown can be adjusted in dependence on the material of the work 7200 or the kind of the laser processing.

As shown in FIGS. 95 and 96, a duct 7070 is secured to the underside of the machine frame 7014. A separate duct 7038 is connected to each suction pipe 7032 supported on the horizontal frame between the table legs 7012. The ducts 7038 and 7070 both communicate with a dust collector through a suction blower (not shown). The suction force of the suction blower can be switched such that it selectively acts on both of or either one of the ducts 7038 and 7070.

As shown in FIGS. 94 and 96, the suction pipe 7032 is open at the top of the machine table 7010, and a plate 7034 is provided at the open end. The plate 7034 has a through hole 7036 which is formed right below the beam hole 7056 of the protective cylinder 7054 and can thus pass the laser beam therethrough.

As shown in FIGS. 95 and 96, a guide pipe 7076 is secured to the top of the head bracket 7042 and extends at right angles to the cylindrical member 7064 and in the transversal direction. A front end portion of the guide pipe 7076 and an upper end portion of the cylindrical member 7044 are inserted from the opposite ends of a communication hole 7043 which is formed in the head bracket 7042 and which is bent at right angles. A mirror support block 7078 is secured at the corner of the communication hole 7043.

Figure 97:
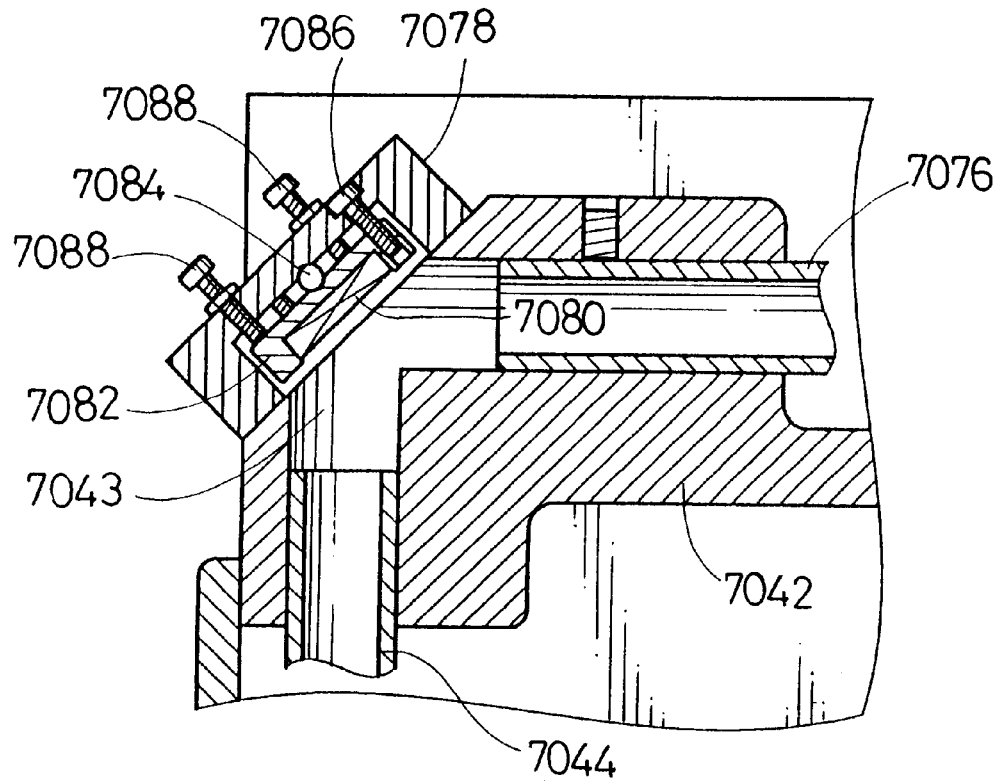
FIG. 97 is a sectional view, on an enlarged scale, of a mirror support block and its peripheral parts.
Figure 98:
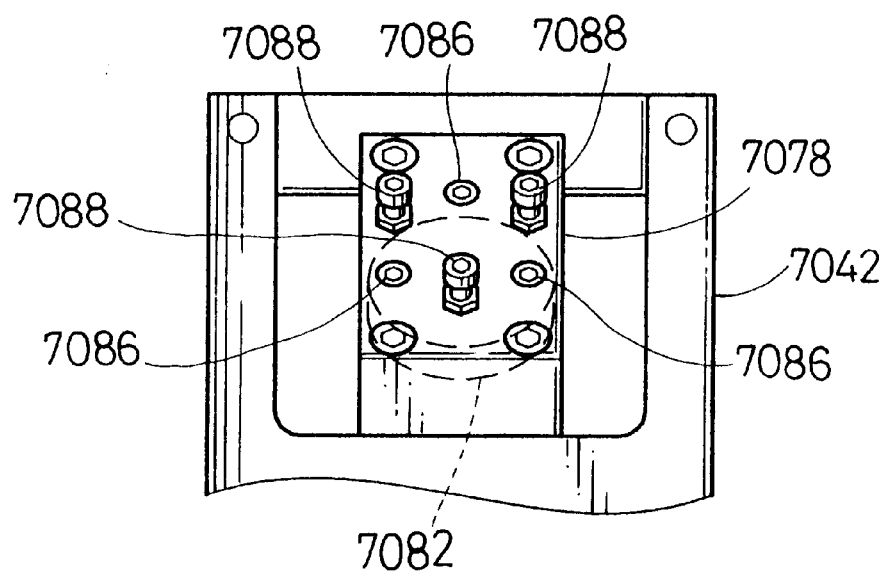
FIG. 98 is a left side view showing part of FIG. 97.

FIG. 97 is a sectional view, on an enlarged scale, of the mirror support block 7078 and its peripheral parts, and FIG. 98 is a left side view of FIG. 97. As shown in these drawings, a mirror holder 7082 with a mirror 7080 provided therein is secured by three set bolts 7086 to the mirror support block 7078. Three adjustment bolts 7088 are turned in the mirror support block 7078, and they each have a free end in contact with the surface of the mirror holder 7082. By adjusting the extent of turning of the adjustment bolts 7088 with the set bolts 7086 loosened, the tilt of the mirror holder 7082 (or the mirror 7080) is adjusted with respect to a ball 7084 provided as a fulcrum between the mirror holder 7082 and the mirror support block 7078. After the adjustment, the mirror holder 7082 is secured to the mirror support block 7078 by tightening the set bolts 7086.

As shown in FIG. 92, behind the machine frame 7014, laser generators 7090 are each provided together with an associated controller 7092 at a position corresponding to each laser head 7040. As shown in FIG.[,] 95, each laser generator 7090 and the associated controller 7092 are secured to the top of respective support plates 7093 and 7094 which are supported horizontally by a support frame 7095 secured to the rear surface of the machine frame 7014 and a support frame 7096 secured to the rear end of the table legs 7012. As shown in FIG. 91, a chiller box 7097 for cooling the laser generators 7090 is provided on the horizontal frame between the table legs 7012 supporting the machine table 7010.

As shown in FIGS. 92 and 95, a guide pipe 7098 for passing a laser beam therethrough is provided in front of each laser generator 7090. As shown in FIG. 95, the rear end of the guide pipe 7098 is supported by a stud 7100 secured to the top of the support plate 7093 and is aligned to a laser beam radiation opening of the laser generator 7090. The guide pipe 7098 has a front end secured to the rear surface of the machine frame 7014. As shown in FIG. 96, the guide pipe 7098 is aligned to the rear end of the guide pipe 7076 in the laser head 7040.

The stud 7100 supports a blocking device 7102 which can block the light path provided by the guide pipe 7098. The blocking device 7102 is adapted to block the light path with a shutter by operating a rotary solenoid (not shown) or the like when a laser beam is outputted from the laser generator 7090 not according to a regular output signal.

Figure 99:
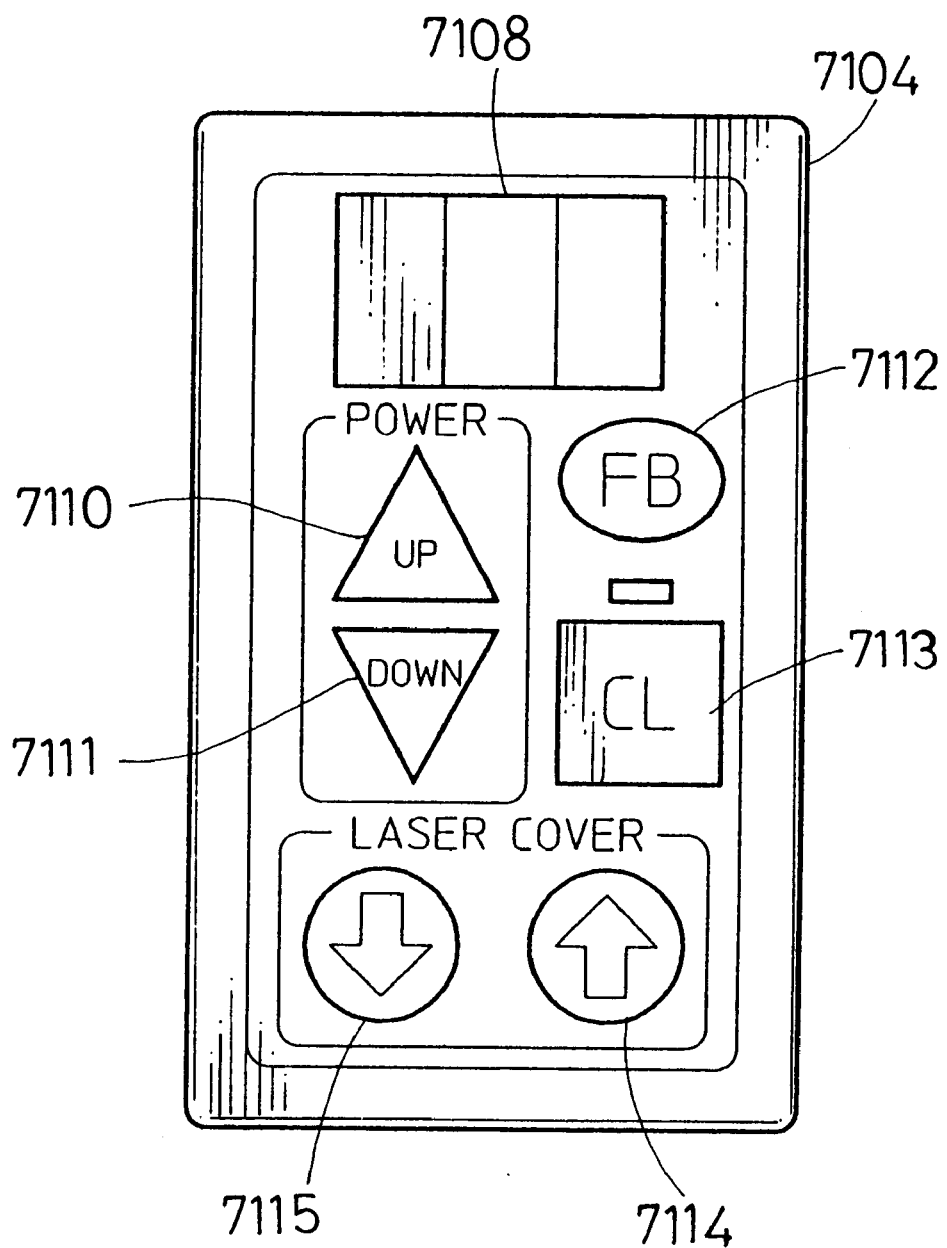
FIG. 99 is an enlarged view of a control panel.

FIG. 99 shows the control panel 7104 on an enlarged scale. The control panel 7104 has a display 7108 for displaying the power level of the laser beam, a power-up switch 7110 and a power-down switch 7111 for adjusting the power level during the radiation of the laser beam, a frame return switch 7112 for commanding radiation of the laser beam to restart laser processing after returning the embroidering frame 7016 to a given position in such a case as when it has been found that the laser processing so far is insufficient, a stop switch 7113 for commanding the stop of a laser generator 7090 when stopping the corresponding laser head 7040, and a lift switch 7114 and a lowering switch 7115 for commanding the driving of the air cylinder 7062 to raise and lower the protective cylinder 7054, respectively.

When a main switch (not shown) of the machine having the above construction is turned on, the power is supplied to the laser generators 7090 and the chiller box 7097 to start preheating of the laser generators 7090 and also start circulatory supply of cooling water from the chiller box 7097 to the laser generators 7090. Various adjustments of the laser beam irradiated from the laser generator 7090 will now be described.

Laser beam position adjustment:
(41) "TEST" mode is set on an operating panel (not shown) of the machine.
(42) The protective cylinder 7054 is lowered from the retreated position to the working position by operating a lowering switch 7115 on the control panel 7104.
(43) The power-up switch 7110 and the power-down switch 7111 on the control panel 7104 are momentarily depressed at a time. As a result, a laser beam of superlow power level is caused to irradiate for a predetermined period of time.
(44) A check is made as to whether the laser beam irradiated from the laser beam 7040 properly passes through the center of the through hole 7036 in the plate 7034.

When the laser beam is deviated from the center of the through hole 7036, the deviation of the laser beam is corrected by adjusting the tilt of the mirror 7080 in the mirror support block 7078 as described above.

Laser beam power level adjustment:
After the operations in (41) to (44) above:
(45) The mode is switched over to "NORMAL" mode on the operating panel of the machine.
(46) A test work is set on the embroidering frame 7016, and the machine is started according to data for performing laser processing.
(47) The laser beam is irradiated while the embroidering frame 7016 is controlled for movement. The status of laser processing on the test cloth is checked.

The power level of the laser beam is gradually increased by holding the power-up switch 7110 on the control panel 7104 depressed and is gradually reduced by holding the power-down switch 7111 depressed. The power level of the laser beam is displayed as a numerical value on the display 7108 on the control panel 7104.

Focal point adjustment:
After the operations in (41) to (47) above:
(48) "FOCAL POINT ADJUSTMENT" mode is set on the operating panel on the machine, and the vertical position of the cylindrical member 7044 is adjusted by controlling the driving of the motor 7050 with a drive switch (not shown).

The focal point of the lens 7046 is thus adjusted. The adjustment may be made for each laser head 7040.

The switching of embroidering and laser processing over to each other will now be described.

After displaying "HEAD SELECTION" menu on the operating panel of the machine, embroidering by the sewing head 7020 is made ready by selecting "SEWING HEAD" mode, and laser processing by the laser head 7040 is made ready by selecting "LASER HEAD" mode. The embroidering and the laser processing may be switched manually, but usually these operations are set beforehand. The setting is made by key inputs on the operating panel of the machine, and is made in units of embroidering and laser processing. In this embodiment, each sewing head 7020 has six needle bars, and the selection of needle bar when the "SEWING HEAD" mode is selected in the "HEAD SELECTION" menu, is made by either one of key inputs "1" to "6" on the operating panel.

The difference of control of the embroidering frame 7016 for movement in the embroidering and in the laser processing will now be described. In the embroidering operation, the embroidering frame 7016 is controlled for normal movement according to movement data (or embroidering data). In the laser processing operation, the embroidering frame 7016 is moved continuously at a uniform speed while providing linear interpolation according to the embroidering data. When the stitch length of the embroidering data used for laser processing is set to be small to some extent, the laser processing may be performed without linear interpolation or movement at a uniform speed.

A combination of embroidering and laser processing will now be described.

Figure 100:
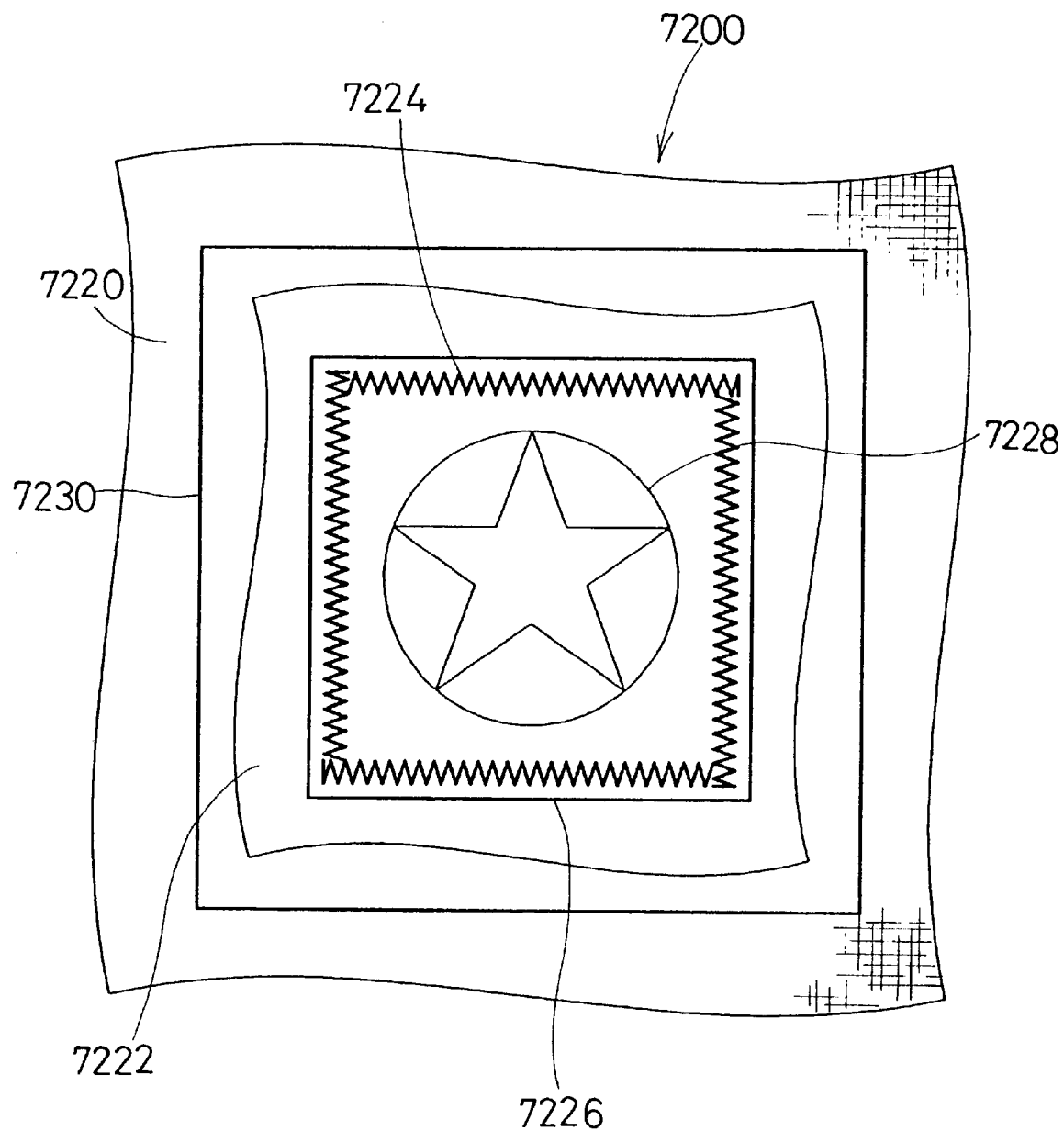
FIG. 100 is a view illustrating an example of work in a combination operation.

FIG. 100 shows an example of the work 7200 as a subject of combination operation. The work 7200 is made such that synthetic leather 7222 is tentatively attached by spray glue or the like to felt 7220 stretched over the embroidering frame 7016. A first step is to produce an embroidery 7224, a second step is to produce a profile laser cut (i.e., half cut) 7226 in only the synthetic leather 7222, a third step is to produce a marking 7228 on the synthetic leather 7222 by scorching the surface thereof with the laser beam, and a fourth step is to produce a profile laser cut 7230 in the felt 7220.

After inputting and setting embroidering data for the combination operation, setting is made for performing embroidering and laser processing in the order of the first to fourth steps. As described earlier, the setting is made on the operating panel of the machine. For the first step, the "SEWING HEAD" mode is selected in the "HEAD SELECTION" menu, and the needle bar to be used is selected by, for instance, key input "1". For the second to fourth steps, the "LASER HEAD" mode is selected in the "HEAD SELECTION" menu, and the amount of air blown from the air nozzle 7066, "ON" or "OFF" state of suction for the ducts 7038 and 7039, the power level of the laser beam, and the focal point of the lens 7046 are set. For the setting of the focal point, it is necessary to set in advance a reference value of the vertical position of the cylindrical member 7044. In the combination operation shown in FIG. 100, the vertical position of the cylindrical member 7044 when the focal point is set on the synthetic leather 7222 is set and memorized as reference value "0".

The setting for the second to fourth steps is made as follows. It is assumed that the thickness of the synthetic leather 7222 is 2 mm, and that the power level of the laser beam is set to values suited for the respective laser processing steps.

For the second and third steps, the intensity of air blowing from the air nozzle 7066 is set to "WEAK", the suction for the duct 7038 is set to be "OFF", the suction for the duct 7070 is set to be "ON", the focal point of the lens 7046 is set to reference value "0". For the fourth step, the intensity of air blow from the air nozzle 7066 is set to "STRONG", the suction for both the ducts 7038 and 7039 is set to be "ON", and the focal point of the lens 7046 is set to "-2".

In performing the combination operation shown in FIG. 100, with the start of the machine, the needle bar set by the key input "1" is selected by sliding the needle bar case 7022 of the sewing head 7020. Concurrently, the embroidering frame 7016 is controlled for movement to bring the start point of the embroidery 7224 to be produced in the first step to a position right below the selected needle bar. The embroidery 7224 is then produced by vertically driving the selected needle bar and controlling the embroidering frame 7015 for movement.

When the production of the embroidery 7224 is completed, the embroidering frame 7016 is controlled for movement to bring the start point of the laser cut 7226 to be produced in the second step to a position right below the beam hole 7056 in the protective cylinder 7054 of the laser head 7040. Then, the protective cylinder 7054 is lowered from the retreated position to the working position.

At this time, air blowing through the air pipe 7059 into the protective cylinder 7054 is started, and also weak air blowing from the air nozzle 7066 is started. At the same time, suction by the duct 7070 is started. Then, the blocking device 7102 is operated to open the optical path in the guide pipe 7098, and the laser beam is outputted from the laser generator 7090, while the embroidering frame 7016 is controlled for movement at a uniform speed. As a result, the laser cut 7226 is produced.

At the end point of the laser cut 7226, radiation of the laser beam from the laser generator 7090 is stopped, and the embroidering frame 7010 is controlled for movement to bring the start point of the marking 7228 to be produced in the third step to a position right below the beam hole 7056. Then, the radiation of the laser beam from the laser generator 7090 is started again, and the embroidering frame 7010 is controlled for movement at a uniform speed. As a result, the marking 7228 is produced.

At the end point of the marking 7228, the radiation of the laser beam from the laser generator 7090 is stopped, and the embroidering frame is controlled for movement to bring the start point of the laser cut 7230 to be produced in the fourth step to a position right below the beam hole 7056. Then, the cylindrical member 7044 is lowered by 2 mm on the basis of the focal point setting, thus setting the focal point of the lens 7046 on the felt 7220. At this time, the air blowing from the air nozzle 7066 is switched to "STRONG", and suction by the duct 7038 is started. Then, the radiation of the laser beam from the laser generator 7090 is started, and the embroidering frame 7016 is controlled for movement at a uniform speed. As a result, the laser cut 7230 is produced.

At the end point of the laser cut 7230, the radiation of the laser beam from the laser generator 7090 is stopped, and the protective cylinder 7054 is raised to the retreated position. Also, the air blowing into the protective cylinder 7054 and the air blowing from the air nozzle 7066 are stopped, and the suction for the ducts 7038 and 7070 is stopped. Then, the blocking device 7102 is operated to block the optical path in the guide pipe 7098.

By making the focal point setting for the third step to be "-10" for instance, the cylindrical member 7044 is lowered by 10 mm from the reference value "0". In this way, it is possible to increase the line width of the marking 7228.

In the above laser processing, a flame generated in the work portion irradiated by the laser beam is extinguished by the air blowing through the pipe 7059 into the protective cylinder 7054 and also by the air blowing from the air nozzle 7066, and smoke is blown out rearwardly of the protective cylinder 7054. The blown-out smoke is collected in the dust collector through the ducts 7038 and 7070 for disposal. Since the intensity of air blowing from the air nozzle 7066 is adjusted in dependence on the material of the work 7200 or the like, it is possible to obtain a neat finish of the laser processing. In the second and third steps, the suction for the duct 7038 connected to the suction pipe 7032 is not provided, and no smoke is passed through the felt 7220 and the synthetic leather 7222 of the work 7200 to be sucked into the suction pipe 7032. Thus, no odor of smoke is attached to these materials.

The air blowing into the protective cylinder 7054, air blowing from the air nozzle 7066 and suction for the ducts 7038 and 7070, may be stopped whenever the radiation of the laser beam is stopped.

When the function of the distance measuring device 7072 is utilized for the combination operation shown in FIG. 100, the focal point of the lens 7046 is set on the synthetic leather 7222 of the work 7200 by vertically displacing the cylindrical member 7044. At this time, the distance up to the synthetic leather 7222 is measured with the distance measuring device 7072, and the measurement is stored as a reference value. When the combination operation proceeds to the fourth step, the measurement by the distance measuring device 7072 is changed because the felt 7220 is now the subject of laser processing. This change is read out, and for the production of the laser cut 7230 in the fourth step, the cylindrical member 7044 is lowered by driving the motor 7050 such that the measurement coincides with the reference value noted above, that is, the focal point of the lens 7046 is set on the felt 7220.

It will be seen that by utilizing the function of the distance measuring device 7072, the focal point of the lens 7046 is automatically adjusted for each step, and it is made unnecessary to set in advance or manually adjust the focal point for each step.

It is possible to permit setting of the vertical position of the cylindrical member 7044 (i.e., focal point of the lens 7046) for a desired point in a given step as well as for each step. It is further possible to replace the air cylinder 7062 as the drive source for the protective cylinder 7052 with a motor, for instance, for raising and lowering the protective cylinder 7052 when adjusting the vertical position of the cylindrical member 7044.

While the above embodiment has been described in relation to the construction based on a multiple head embroidering machine which has laser heads 7040 corresponding in number to the number of sewing heads 7020, the invention is also applicable to machines having a single sewing head 7020 and a single laser head 7040 or having only a laser head or heads 7040. In an exclusive laser processing machine with only a laser head or heads 7040, the laser beam may not be irradiated downwardly, and this means that movement for adjusting the focal point of the lens 7045 may not be in the vertical direction.

According to the eighth embodiment, the focal point of the lens in the laser processing machine can be readily adjusted, and also its fine adjustment is possible.

We claim:

1. A laser processing machine comprising:
   a work holder capable of holding a work;
   means for movement of the work holder in X- and Y-axis directions;
   a laser generator;
   at least one laser head capable of performing laser processing on a work held by the work holder; and
   control means including
      predetermined movement data for the work holder including laser control data for operating a laser generator;
      said laser control data including codes for on-off control of the laser generator.

2. The laser processing machine according to claim 1, further comprising:
   a plurality of laser heads;
   said laser generator used in common for the laser heads; and
   a beam guide for optically splitting a laser beam irradiated from the laser generator and supplying each split laser beam to each of the laser heads.

3. The laser processing machine according to claim 1, wherein a laser beam outputted from the laser generator is led by an optical fiber to the laser head.

4. The laser processing machine according to claim 1, wherein a laser head is capable of being switched between a retreated position remote from the work held by the work holder and a working position close to the work.

5. The laser processing machine according to claim 4, wherein a laser head includes a protective cylinder disposed at an end facing the work, the laser head being capable of being switched between the retreated position and the working position by moving only the protective cylinder.

6. The laser processing machine according to claim 1, wherein a laser head includes a plurality of lenses having different focal distances, one of the lenses being selected for use.

7. The laser processing machine according to claim 1, wherein a laser generator includes a lens capable of being moved in a direction for changing the distance between the work and the lens, and an actuator for moving the lens.

8. The laser processing machine according to claim 1, wherein each of the laser codes is a single code which effects alternate on-off switching of the laser generator whenever the laser codes are read out by the control means.

9. The laser processing machine according to claim 1, wherein a laser head has a gas suction port provided in a lower portion thereof for sucking gas generated by laser processing from a back side of the work.

10. The laser processing machine according to claim 1, wherein assist gas blowing is used during laser processing and the intensity of blowing can be set.

11. The laser processing machine according to claim 1, comprising a plurality of laser heads and a plurality of laser generators;
   the power level of the laser beam irradiated by the laser generators being adjustable.

12. A laser processing machine comprising a work holder capable of holding a work and controlled for movement in X- and Y-axis directions according to predetermined movement data; a plurality of laser heads, each capable of performing laser processing on the work held by the work holder; a plurality of laser generators provided for respective laser heads;
   the predetermined movement data including laser codes for on-off control of the laser generators;
   each laser generator being on-off controlled according to the laser codes by a control voltage;
   the value of each control voltage for generating common output power being memorized for each laser generator; and
   each said control voltage corresponding to the memorized value of control voltage being outputted to the respective laser generators upon reception of a processing execution command for executing laser processing, thus causing the laser heads to perform laser processing simultaneously with the common output power.

13. The laser processing machine according to claim 12, wherein a value of control voltage to be applied to a laser generator is memorized for each level of the common output power, each level of the common output power being capable of being designated when executing laser processing.

14. The laser processing machine according to claim 1, wherein the work is laser processed by executing laser processing steps a predetermined number of times said number of times of laser processing to be performed repeatedly being memorized in advance, the work being laser processed by the memorized number of processing times in a step of executing the laser processing as specified by the machine table movement data.

15. The laser processing machine according to claim 14, wherein part of the step executing the laser processing as specified by the machine table movement data is memorized, the work being laser processed by the memorized number of processing times with respect to the memorized part of the step of executing the laser processing.

16. The laser processing machine according to claim 1, further comprising:
   a plurality of laser generators;
   a plurality of laser heads each for irradiating the laser beam to the work independently from a corresponding laser generator; said means for movement including return means capable of returning the work holder to a given position according to the movement data when restarting the laser processing of the work by any of the laser heads; and beam control means for stopping the radiation of the laser beam from the laser heads other than the laser head for restarting the laser processing only from a point of the restart of the laser processing to a point of the start of returning of the work holder by the return means.

17. The laser processing machine according to claim 16, wherein the beam control means includes stopping release means for releasing the stopping of the radiation of the laser beam from the laser heads other than the laser head for restarting the laser processing.

18. An embroidering and laser processing machine comprising: a machine table including a work holder for holding a work; means for movement of the machine table in X- and Y-axis directions according to predetermined movement data, a sewing head provided on a machine frame disposed above the machine table and capable of performing a sewing operation on the work held by the work holder; a laser generator; at least one laser head disposed above the machine table, said laser head capable of performing laser processing on the work held by the work holder; and control means including the predetermined movement data including laser control data for controlling operating the laser generator; said laser control data including codes for on-off control of the laser generator.

19. The embroidering and laser processing machine according to claim 18, wherein the laser head is mounted on the machine table at a predetermined distance from the sewing head.

20. The embroidering and laser processing machine according to claim 18, further including a plurality of sewing heads and a plurality of laser heads which are mounted on the machine frame.

21. The embroidering and laser processing machine according to claim 18, wherein the machine table is moved intermittently when sewing is performed by the sewing head and is moved continuously when laser processing is performed by the laser head.

22. The embroidering and laser processing machine according to claim 21, wherein the machine table and work holder is moved continuously at a uniform speed when laser processing is performed by the laser head.

23. The embroidering and laser processing machine according to claim 18, wherein the claim 18 functions of the control means of sewing by the sewing head and laser processing by the laser head have been set in advance.

24. The embroidering and laser processing machine according to claim 18, wherein a power level of the laser beam for laser processing by the laser head has been set in advance.

25. The embroidering and laser processing machine according to claim 18, comprising:
 a plurality of laser heads:
  said laser generator used in common for two or more of the laser heads; and
  a beam guide for optically splitting the laser beam irradiated from the laser generator and for guiding each split laser beam to each one of the laser heads.

26. The embroidering and laser processing machine according to claim 18, wherein a laser beam outputted from the laser generator is led by an optical fiber to the laser head.

27. The embroidering and laser processing machine according to claim 18, wherein a laser head is capable of being switched between a retreated position remote from the work held by the work holder and a working position close to the work.

28. The embroidering and laser processing machine according to claim 27, wherein a laser head includes a protective cylinder disposed at an end facing the work, the laser head being capable of being switched between the retreated position and the working position by moving only the protective cylinder.

29. The embroidering and laser processing machine according to claim 18, wherein the a laser head includes a plurality of lenses having different focal distance, one of the lenses being selected for use.

30. The embroidering and laser processing machine according to claim 18, wherein a laser generator includes a lens capable of being moved in a direction for changing the distance between the work and the lens, and an actuator for moving the lens.

31. The embroidering and laser processing machine according to claim 30, wherein actuator movement data for moving the lens by a distance suited for laser processing is set in dependence on a characteristic of the work prior to the laser processing.

32. The embroidering and laser processing machine according to claim 30, further comprising a distance measuring device for measuring the distance between the lens and the work, said actuator for moving the lens being driven according to the value of measurement of the distance measuring device.

33. The embroidering and laser processing machine according to claim 18, wherein each of the laser codes is a single code which effects alternate on-off switching of the laser generator whenever the laser codes are read out by the control means.

34. The embroidering and laser processing machine according to claim 18, wherein a laser head has a gas suction port provided in a lower portion thereof for sucking gas generated by laser processing from a back side of the work.

35. The embroidering and laser processing machine according to claim 18, wherein assist gas blowing is used during laser processing and the intensity of blowing can be set.

36. The embroidering and laser processing machine according to claim 18, comprising a plurality of laser heads and a plurality of laser generators; the power level of the laser beam irradiated by the laser generators being adjustable.

37. An embroidering and laser processing machine comprising:
 a machine table including a work holder for holding a work;
 control means for movement of the machine table in X- and Y-axis directions according to predetermined movement data;
 a sewing head provided on a machine frame disposed above the machine table and capable of performing a sewing operation on the work held by the work holder;
 a plurality of laser heads, each capable of performing laser processing on the work;
 a plurality of laser generators provided for respective laser heads;
 the predetermined movement data including laser codes for on-off control of the laser generators;
 each laser generator being on-off controlled according to the laser codes by a control voltage;
 the value of each control voltage for generating common output power being memorized for each laser generator; and
 each said control voltage corresponding to the memorized values of control voltage being outputted to the respective laser generators upon reception of a processing execution command for executing laser processing, thus causing the laser heads to perform laser processing simultaneously with the common output power.

38. The embroidering and laser processing machine according to claim 37, wherein a value of control voltage to be applied to the laser generators is memorized for each level of the common output power, each level of the common output power being capable of being designated when executing laser processing.

39. The embroidering and laser processing machine according to claim 18, wherein the work is laser processed by executing laser a processing steps a predetermined number of times, said number of times of laser processing to be performed repeatedly being memorized in advance, the work being laser processed by the memorized number of processing times in a step of executing the laser processing as specified by the machine table movement data.

40. The embroidering and laser processing machine according to claim 39, wherein the number of processing times is set in advance.

41. The embroidering and laser processing machine according to claim 39, wherein part of the step executing the laser processing as specified by the machine table movement data is memorized, the work being laser processed by the memorized number of processing times with respect to the memorized part of the step of executing the laser processing.

42. The embroidering and laser processing machine according to claim 18, further comprising:

a plurality of laser generators a plurality of laser heads each for irradiating the laser beam to the work independently from a corresponding laser generator;

machine table return means capable of returning the work holder to be returned to a given position according to the movement data when restarting the laser processing of the work by any of the laser heads; and beam control means for stopping the radiation of the laser beam from the laser heads other than the laser head for restarting the laser processing only from a point of the restart of the laser processing to a point of the start of returning of the work holder by the return means.

43. The embroidering and laser processing machine according to claim 42, wherein the beam control means includes stopping release means for releasing the stopping of the radiation of the laser beam from the laser heads other than the laser head for restarting the laser processing.

44. The laser processing machine according to claim 1, wherein the laser codes are inserted between the predetermined movement data such that each of the laser codes is followed by a corresponding part of the movement data, the laser processing operation being performed by sequentially reading plural sets of laser codes with corresponding movement data.

45. The embroidering and laser processing machine according to claim 18, wherein the predetermined movement data including the laser codes is stored in a RAM.

46. The embroidering and laser processing machine according to claim 18, wherein the laser codes are inserted between the predetermined movement data such that each of the laser codes is followed by a corresponding part of the movement data, the laser processing operation being performed by sequentially reading plural sets of laser codes and corresponding movement data.

47. A laser processing machine comprising a work holder capable of holding a work; means for movement of the work holder in X- and Y-axis directions according to predetermined movement data; a laser generator; and a laser head capable of performing laser processing on the work held by the work holder;

the predetermined movement data including laser codes for on-off controlling a laser generator; and the laser generator being on-off controlled according to the laser codes;

said laser generator including a lens capable of being moved in a direction for changing the distance between the work and the lens;, an actuator for moving the lens; and a distance measuring device for measuring the distance between a lens and the work, the actuator being driven according to the value of measurement of the distance measuring device.

48. The laser processing machine according to claim 47, wherein actuator movement data for moving the lens by a distance suited for laser processing is set in dependence on a characteristic of the work prior to the laser processing.

* * * * *